US012766878B2

(12) United States Patent
Copeland

(10) Patent No.: US 12,766,878 B2
(45) Date of Patent: Oct. 20, 2026

(54) MULTIPLEX VEHICLE WHEEL ASSEMBLY TYPES

(71) Applicant: David Alan Copeland, Orlando, FL (US)

(72) Inventor: David Alan Copeland, Orlando, FL (US)

( * ) Notice: Subject to any disclaimer, the term of this patent is extended or adjusted under 35 U.S.C. 154(b) by 1200 days.

(21) Appl. No.: 17/739,928

(22) Filed: May 9, 2022

(65) Prior Publication Data

US 2022/0363092 A1 Nov. 17, 2022

Related U.S. Application Data

(60) Provisional application No. 63/187,523, filed on May 12, 2021.

(51) Int. Cl.
*B60B 11/10* (2006.01)

(52) U.S. Cl.
CPC ......... *B60B 11/10* (2013.01); *B60B 2900/711* (2013.01); *B60B 2900/731* (2013.01)

(58) Field of Classification Search
CPC ... B60B 11/10; B60B 19/00; B60B 2900/711; B60B 2900/731; B60L 53/126-32; B60Q 1/2661; B60Q 1/326; Y02T 10/70-7072; Y02T 90/12-14
See application file for complete search history.

(56) References Cited

U.S. PATENT DOCUMENTS

| | | | | |
|---|---|---|---|---|
| 527,857 | A | 10/1894 | Hutin et al. | |
| 1,456,258 | A | 5/1923 | Stoner | |
| 2,090,089 | A | 8/1937 | Wiegand | 152/11 |
| 3,578,053 | A | 5/1971 | Milliken | 152/210 |
| 3,987,409 | A | 10/1976 | Freeman | 340/134 |
| 4,042,308 | A | 8/1977 | Freedman | 404/1 |
| 4,196,414 | A | 4/1980 | Muller | 340/58 |
| 4,641,698 | A | 2/1987 | Bitonti | 152/416 |
| 4,836,344 | A | 6/1989 | Bolger | 191/10 |
| 4,881,153 | A | 11/1989 | Scott | 362/78 |
| 5,007,303 | A | 4/1991 | Okuzumi | 74/573 |
| 5,313,996 | A | 5/1994 | Bragg | 152/427 |
| 5,392,200 | A | 2/1995 | Milde | 362/78 |
| 5,548,274 | A | 8/1996 | Anderson et al. | 340/468 |
| 5,583,482 | A | 12/1996 | Chamussy et al. | 340/442 |
| 5,664,534 | A | 9/1997 | Schmitz | 123/192.1 |
| 5,683,164 | A | 11/1997 | Chien | 362/78 |
| 5,800,035 | A | 9/1998 | Aichele | 362/31 |

(Continued)

FOREIGN PATENT DOCUMENTS

| | | | |
|---|---|---|---|
| CN | 209409702 | 9/2019 | B60B 27/00 |
| DE | 102014222695 A1 | 10/2015 | |

(Continued)

OTHER PUBLICATIONS

ABB, https://new.abb.com/ev-charging, accessed Jun. 3, 2022, 3 pgs.

(Continued)

*Primary Examiner* — Jason M Han
(74) *Attorney, Agent, or Firm* — HAYES SOLOWAY P.C.

(57) ABSTRACT

Embodiments of the present disclosure are directed to multiplex vehicle wheel assemblies which can be used to improve various aspects of transportation using vehicles, namely, using wheeled vehicles.

10 Claims, 26 Drawing Sheets

(56) References Cited

U.S. PATENT DOCUMENTS 6,145,559 A 11/2000 Ingram, II .................... 152/417
6,286,565 B1 9/2001 Pike .................................. 141/38
6,350,963 B1 2/2002 Gray ............................ 219/202
6,363,985 B1 4/2002 Beesley ........................ 152/417
6,484,774 B1 11/2002 Naedler ........................ 152/417
6,601,979 B1 8/2003 Byrd et al. .................... 362/500
6,644,839 B2 11/2003 Lee ................................ 362/500
6,817,743 B2 11/2004 Sharper ......................... 362/500
7,079,042 B2 * 7/2006 Reim ....................... B60Q 1/32
340/815.45
7,302,837 B2 12/2007 Wendte ........................ 73/146.5
7,334,462 B2 2/2008 Robert ............................ 73/146
7,377,676 B2 5/2008 Thomas et al. ............... 362/500
7,458,648 B2 12/2008 Esposito et al. ................ 301/65
7,513,282 B1 4/2009 Shoner ........................... 152/510
7,611,267 B2 11/2009 Cooper ......................... 362/500
7,712,842 B2 5/2010 Parker et al. .............. 301/108.1
7,741,963 B2 6/2010 Tsai ............................... 340/442
8,322,901 B2 12/2012 Michelotti .................... 362/500
8,328,294 B2 12/2012 Byers et al. ............... 301/37.25
8,714,869 B1 5/2014 Ries et al. ....................... 404/79
8,833,533 B2 9/2014 Suh et al. ........... B60L 11/1816
8,839,667 B2 9/2014 Kempf ................ B60C 23/0408
8,975,864 B2 3/2015 Kim ...................... B60L 11/182
8,997,955 B2 4/2015 Czainski et al. .......... B60L 9/00
9,045,013 B2 6/2015 Fink ...................... B60C 27/045
9,131,120 B2 9/2015 Schofield et al. ....... H04N 7/18
9,150,060 B2 10/2015 Fink ...................... B60C 27/045
9,190,028 B2 11/2015 Gilbert et al. ........... G09G 5/36
9,248,707 B2 2/2016 Zhou et al. ........... B60C 23/003
9,296,304 B2 3/2016 Krause .................. B60L 11/182
9,310,843 B2 4/2016 Shedletsky et al. .. G06F 1/1637
9,409,455 B2 8/2016 Fink ...................... B60C 27/045
9,446,638 B2 9/2016 Tanno ..................... B60C 29/02
9,446,674 B2 9/2016 Halker et al. ......... B60L 11/182
9,469,165 B2 10/2016 Hibbler et al. ....... B60C 23/003
9,499,016 B2 11/2016 Deniau et al. ...... B60C 23/0494
9,522,577 B2 12/2016 Dilisio et al. ......... B60C 23/003
9,527,253 B2 12/2016 Gong et al. ........ B29D 30/0606
9,586,449 B2 3/2017 Love ..................... B60C 99/003
9,630,506 B2 4/2017 Vietzke et al. ......... B60L 5/005
9,694,633 B2 7/2017 Chen ....................... B60C 23/10
9,757,979 B2 9/2017 Meggiolan et al. .... B60B 21/00
9,862,277 B2 1/2018 Dames et al. .......... B60L 5/005
10,059,154 B2 8/2018 Tanno .................. B60C 23/002
10,059,213 B2 8/2018 Ricci ......................... H02J 7/00
10,144,254 B2 12/2018 Richardson ............. B60C 23/12
10,245,908 B2 4/2019 Richardson ............. B60C 23/10
10,259,272 B2 4/2019 Sidders et al. ........ B60C 23/003
10,325,717 B2 6/2019 Boys et al. ............. B60L 11/18
10,343,457 B2 7/2019 Gong et al. ............... B60C 5/24
10,406,869 B2 9/2019 Richardson ........... B60C 23/004
10,464,477 B2 11/2019 Maeda et al. ............ B60Q 3/14
10,476,323 B2 11/2019 Klassen ................... H02K 1/20
10,493,804 B2 12/2019 Fink .................... B60C 11/1612
10,493,808 B1 12/2019 McCauley et al. ... B60C 23/003
10,590,629 B2 3/2020 Imaizumi et al. ...... E02F 9/245
10,644,578 B2 5/2020 Hunter et al. ......... H02K 16/04
10,647,163 B2 5/2020 Matsumoto ......... B60C 11/1675
10,661,620 B2 5/2020 Wilkinson ............ B60C 99/003
10,967,740 B2 4/2021 Dames et al. .......... B60L 5/005
11,047,702 B1 6/2021 Meyer et al. ...... G01C 21/3632
11,054,861 B2 7/2021 Bushnell ............... G06F 1/1652
11,054,932 B2 7/2021 Xu et al. ............... G06F 3/0416
11,076,261 B1 7/2021 Meyer et al. ......... H04W 4/026
11,100,909 B2 8/2021 Verweij et al. .. G10K 11/17827
11,129,029 B2 9/2021 Eckert et al. ......... H04W 16/14
11,138,873 B1 10/2021 Clifford ................. G08G 1/017
11,186,187 B1 11/2021 Sobota Rodriguez et al. .............
H02J 50/402
11,560,088 B2 * 1/2023 Weirich .................. B60B 21/02
2003/0202356 A1 10/2003 Hung ............................ 362/500
2004/0257825 A1 12/2004 Choi et al. .................... 362/500
2005/0161137 A1 7/2005 Hoang .......................... 152/415
2005/0174308 A1 8/2005 Matlock et al. ................ 345/82
2005/0257872 A1 11/2005 Szykulski ..................... 152/417
2007/0058384 A1 3/2007 Khan ............................ 362/500
2007/0274085 A1 11/2007 Hampton ...................... 362/500
2008/0043099 A1 2/2008 Stein et al. ................... 348/118
2008/0101053 A1 5/2008 Hoffman et al. ............... 362/35
2008/0185086 A1 8/2008 Ingram et al. ................ 152/417
2008/0212334 A1 9/2008 Hickman et al. ............. 362/500
2009/0165912 A1 7/2009 Collette et al. ............... 152/210
2009/0283190 A1 11/2009 Padula et al. ................ 152/417
2009/0314407 A1 12/2009 Browne et al. ............... 152/527
2010/0207445 A1 8/2010 Medley et al. ............. 301/5.24
2010/0230197 A1 9/2010 Ortmann et al. .. B06G 17/0195
2011/0162773 A1 7/2011 Gonska et al. ............... 152/418
2011/0221261 A1 9/2011 Eaton et al. ................. 301/5.24
2012/0067482 A1 3/2012 Stech ............................ 152/415
2012/0069185 A1 3/2012 Stein ............................. 348/148
2012/0152422 A1 6/2012 Rogers .......................... 152/427
2012/0200707 A1 8/2012 Stein et al. ................... 348/148
2012/0305126 A1 12/2012 Merrill .............................. 141/1
2012/0314071 A1 12/2012 Rosenbaum et al. ......... 348/148
2012/0318422 A1 12/2012 Lloyd ........................... 152/417
2013/0000807 A1 1/2013 Pons et al. .................... 152/210
2013/0024059 A1 1/2013 Miller et al. ............ B60L 53/30
2013/0076112 A1 3/2013 Tho ............................ 301/110.5
2013/0087262 A1 4/2013 Hennig ......................... 152/417
2013/0119928 A1 5/2013 Partovi ..................... H02J 7/00
2013/0141580 A1 6/2013 Stein et al. ................... 348/148
2013/0147957 A1 6/2013 Stein ............................. 348/148
2013/0179061 A1 7/2013 Gadh et al. ................... 701/123
2013/0199685 A1 8/2013 Nelson et al. ................ 152/415
2013/0228258 A1 9/2013 Knapke et al. ............... 152/415
2013/0282232 A1 10/2013 Medley et al. ............ 701/134.4
2014/0028016 A1 1/2014 Knapke ........................... 285/98
2014/0055090 A1 2/2014 Krause .......................... 320/108
2014/0069558 A1 3/2014 Favia ......................... 152/152.1
2014/0174870 A1 6/2014 Nizuma ................. H02J 50/12
2014/0372077 A1 12/2014 Templ ........................... 702/182
2015/0158354 A1 6/2015 Lin et al. ................ B60C 25/00
2015/0246614 A1 9/2015 Dame et al. .............. B60L 5/00
2015/0298560 A1 10/2015 Keeling et al.
2015/0360577 A1 12/2015 Greenwood ............ H02J 50/90
2016/0023557 A1 1/2016 Dimke et al. ......... B60L 11/182
2016/0031271 A1 2/2016 Hibbler et al. ....... B60C 23/003
2016/0031332 A1 2/2016 Garcia Briz et al.
2016/0144727 A1 5/2016 Tokura et al. ........ B60L 53/126
2016/0214442 A1 7/2016 Nelson et al. ........ B60C 23/003
2016/0229228 A1 8/2016 Gong et al. ............... B60C 5/24
2016/0236429 A1 8/2016 Gong et al. ............ B29D 30/06
2016/0243949 A1 8/2016 Merkel et al. .......... H02J 50/90
2016/0288590 A1 10/2016 Hennig et al. ........ B60C 23/003
2016/0318359 A1 11/2016 Knapke et al. ......... B60C 23/10
2016/0339785 A1 11/2016 Rumbak ................. B60L 53/12
2016/0347132 A1 12/2016 Knapke et al. ....... B60C 23/003
2016/0347135 A1 12/2016 Racine et al. ........ B60C 29/002
2016/0361957 A1 12/2016 Burke et al. .......... B60C 23/003
2017/0080760 A1 3/2017 Foor et al. ............ B60C 23/003
2017/0113498 A1 4/2017 King et al. ............ B60C 23/003
2017/0136899 A1 5/2017 Mashinsky ............. B60L 58/15
2017/0157988 A1 6/2017 Takita ................. B60C 11/0306
2017/0210184 A1 7/2017 Bonora et al. ........ B60C 23/003
2017/0217261 A1 8/2017 Mays et al. ......... B60C 23/0479
2017/0278314 A1 9/2017 Laskey et al. ......... G07C 5/008
2017/0299077 A1 10/2017 Jabcon et al. .......... F16K 21/06
2017/0341567 A1 11/2017 Englert .................. B60Q 1/326
2017/0341568 A1 11/2017 Englert .................. B60Q 1/326
2017/0349009 A1 12/2017 Ehrlich ............... B60C 23/0486
2017/0368896 A1 12/2017 Balistreri et al. ..... B60C 29/002
2018/0022168 A1 1/2018 Dunning et al. ...... B60C 23/003
2018/0056732 A1 3/2018 Ingram et al. ........ B60C 23/003
2018/0056733 A1 3/2018 Ingram et al. ........ B60C 23/003
2018/0065544 A1 3/2018 Brusco ................... B60Q 1/543
2018/0072111 A1 3/2018 Cappello et al. ..... B60C 23/003
2018/0072112 A1 3/2018 Lee ....................... B60C 23/003
2018/0104993 A1 4/2018 Gillen ................... B60C 23/003
2018/0141393 A1 5/2018 Gillen et al. .......... B60C 23/003
2018/0154713 A1 6/2018 Burke et al. ............ B60C 29/02
2018/0208000 A1 7/2018 Gilardino et al. .... B60C 23/003
2018/0215201 A1 8/2018 Balistreri ................ B60B 35/16
2018/0264963 A1 9/2018 Dudar ................. B60L 11/1833

(56) References Cited

U.S. PATENT DOCUMENTS

| | | | | |
|---|---|---|---|---|
| 2018/0281510 | A1 | 10/2018 | Bach et al. | B60B 7/06 |
| 2018/0290549 | A1 | 10/2018 | Forsberg | B60L 11/1831 |
| 2018/0297423 | A1 | 10/2018 | Furtado | B60C 23/003 |
| 2018/0304699 | A1 | 10/2018 | Castriotta | B60C 23/003 |
| 2018/0304700 | A1 | 10/2018 | Falls et al. | B60C 23/003 |
| 2018/0319227 | A1 | 11/2018 | Abdel-Baset et al. | B60C 23/004 |
| 2019/0001762 | A1 | 1/2019 | Blessing et al. | B60C 23/003 |
| 2019/0009622 | A1 | 1/2019 | Buhrke | B60C 23/003 |
| 2019/0023091 | A1 | 1/2019 | Spindler et al. | B60C 23/12 |
| 2019/0039423 | A1 | 2/2019 | Mattavelli | B60C 23/003 |
| 2019/0039463 | A1 | 2/2019 | Moghe et al. | B60L 11/18 |
| 2019/0077189 | A1 | 3/2019 | Kamiyama | B60B 21/025 |
| 2019/0077190 | A1 | 3/2019 | Kamiyama et al. | B60B 21/12 |
| 2019/0097471 | A1 | 3/2019 | Pantic et al. | B60L 53/12 |
| 2019/0111731 | A1 | 4/2019 | Kamiyama | B60B 21/02 |
| 2019/0111799 | A1 | 4/2019 | Zethraeus et al. | B60L 11/1848 |
| 2019/0176548 | A1 | 6/2019 | Richardson | B60C 23/10 |
| 2019/0187026 | A1 | 6/2019 | Uhrich et al. | G01M 17/02 |
| 2019/0202298 | A1 | 7/2019 | Shin et al. | B60L 9/00 |
| 2019/0257600 | A1 | 8/2019 | Lyu et al. | F28F 27/00 |
| 2019/0315246 | A1 | 10/2019 | Li et al. | B60L 53/66 |
| 2019/0359014 | A1 | 11/2019 | Rethmel et al. | B60C 23/009 |
| 2019/0359210 | A1 | 11/2019 | Sebestyen et al. | B60W 30/12 |
| 2019/0381840 | A1 | 12/2019 | Hennig et al. | B60C 23/003 |
| 2019/0381902 | A1 | 12/2019 | Apostolos et al. | B60L 53/12 |
| 2020/0009976 | A1 | 1/2020 | Ohman et al. | B60L 53/35 |
| 2020/0028408 | A1 | 1/2020 | Arnold | H02K 7/006 |
| 2020/0122601 | A1 | 4/2020 | Nelson | B60L 58/12 |
| 2020/0130410 | A1 | 4/2020 | Kamiyama et al. | B60B 21/12 |
| 2020/0130435 | A1 | 4/2020 | Root et al. | B60C 23/12 |
| 2020/0169125 | A1 | 5/2020 | Will, IV et al. | H02J 50/80 |
| 2020/0185997 | A1 | 6/2020 | Hirasawa et al. | H02K 3/50 |
| 2020/0189325 | A1 | 6/2020 | Pons et al. | B60C 11/1656 |
| 2020/0212721 | A1 | 7/2020 | Narayana Bhat et al. | B60L 53/122 |
| 2021/0001733 | A1 | 1/2021 | Meins et al. | B60L 53/122 |
| 2021/0053445 | A1 | 2/2021 | Forsberg | B60L 5/045 |
| 2021/0122340 | A1 | 4/2021 | Bhimani et al. | B60T 8/1725 |
| 2021/0178841 | A1 | 6/2021 | Garbelli | B60C 23/064 |
| 2021/0178916 | A1 | 6/2021 | Partovi | B60L 53/122 |
| 2021/0188106 | A1 | 6/2021 | Asa et al. | B60L 53/122 |
| 2021/0194356 | A1 | 6/2021 | Afridi et al. | H02M 1/4233 |
| 2021/0242716 | A1 | 8/2021 | Lee | H02J 50/10 |
| 2021/0276374 | A1 | 9/2021 | Puppi et al. | B60C 24/041 |
| 2021/0289067 | A1 | 9/2021 | Dellinger et al. | H04M 1/72409 |
| 2021/0291692 | A1 | 9/2021 | Masoud et al. | B60L 53/66 |
| 2021/0294391 | A1 | 9/2021 | Silvanto et al. | G06F 1/1683 |
| 2021/0298187 | A1 | 9/2021 | Merz et al. | H05K 5/0247 |
| 2021/0298197 | A1 | 9/2021 | Nayak | H05K 7/2039 |
| 2021/0303081 | A1 | 9/2021 | Kuboyama et al. | G06F 3/038 |
| 2021/0303089 | A1 | 9/2021 | Ruscher et al. | H06F 3/03545 |
| 2021/0306812 | A1 | 9/2021 | Gross et al. | H04W 4/029 |
| 2021/0309057 | A1 | 10/2021 | Puppi et al. | B60C 23/041 |
| 2021/0310200 | A1 | 10/2021 | Koudstaal et al. | E01C 11/227 |
| 2021/0311598 | A1 | 10/2021 | Bernstein et al. | G06F 3/0482 |
| 2021/0314493 | A1 | 10/2021 | Meyer et al. | H04N 5/23293 |
| 2021/0318798 | A1 | 10/2021 | Manzari et al. | G06F 3/04847 |
| 2021/0319778 | A1 | 10/2021 | Lerner et al. | G10K 11/17827 |
| 2021/0320281 | A1 | 10/2021 | Shedletsky et al. | H01L 51/5284 |
| 2021/0325932 | A1 | 10/2021 | Bushnell | G06F 1/1652 |
| 2021/0325942 | A1 | 10/2021 | Bir et al. | G06F 1/1683 |
| 2021/0328626 | A1 | 10/2021 | Daga et al. | H04B 5/0031 |
| 2021/0331593 | A1 | 10/2021 | Zethraeus et al. | B60L 53/126 |
| 2021/0333801 | A1 | 10/2021 | Schwie et al. | G05D 1/0278 |
| 2021/0336328 | A1 | 10/2021 | Guffarth et al. | H01Q 1/3266 |
| 2021/0339584 | A1 | 11/2021 | Puppi et al. | B60C 23/0493 |
| 2021/0359556 | A1 | 11/2021 | Bossetti et al. | H02J 50/90 |
| 2022/0036020 | A1 | 2/2022 | Kovarik et al. | G06K 7/1037 |
| 2022/0149666 | A1 | 5/2022 | Sumiya et al. | H02J 50/50 |
| 2022/0412805 | A1 | 12/2022 | Pointner et al. | H04N 5/33 |

FOREIGN PATENT DOCUMENTS

| | | | |
|---|---|---|---|
| DE | 10 2019 208 485 | 8/2020 | B60C 23/00 |
| EP | 3 050 690 | 8/2016 | B29C 33/30 |
| EP | 3 050 717 | 8/2016 | B60C 5/24 |
| EP | 3 573 845 | 12/2019 | B60B 19/06 |
| EP | 3 640 062 | 4/2020 | B60C 23/00 |
| JP | H09-150612 | 6/1997 | B60C 73/02 |
| JP | 2009-168074 | 7/2009 | F16F 15/31 |
| JP | 2013-169904 | 9/2013 | B60K 7/00 |
| JP | 2013-193705 | 9/2013 | B60G 17/016 |
| KR | 10-1265831 | 5/2013 | B60B 21/02 |
| KR | 2021-0040500 | 4/2021 | B60L 58/12 |
| RU | 2 246 410 | 2/2005 | B60C 23/04 |
| WO | WO 2009/140586 | 11/2009 | B60C 23/00 |
| WO | WO 2015/042782 | 4/2015 | B60C 5/24 |
| WO | WO 2015/042788 | 4/2015 | B29C 33/30 |
| WO | WO 2017/116628 | 7/2017 | B60S 5/04 |
| WO | WO 2018/140248 | 8/2018 | B60B 19/06 |
| WO | WO 2020/120774 | 6/2020 | B62J 6/20 |

OTHER PUBLICATIONS

Afridi, Khurram "Energy Seminar", https://www.youtube.com/watch?v=fDXuyKMVzpY, Oct. 14, 2019, posted Nov. 1, 2019, 3 pgs.

Afridi, Khurram "Wireless Charging of Electric Vehicles" University of Colorado Boulder, Oct. 14, 2019, 6 pages.

Bilodeau, "Introduction to PrimoveCity", www.bombardier.com, Dec. 2011, 33 pgs.

Bombardier, Primove Catenary-Free Operation, www.bombardier.com, 2008, 4 pgs.

Bosch, https://www.boschevsolutions.com/, accessed Jun. 3, 2022, 2 pgs.

Brusa, www.brusa.biz, accessed Jun. 7, 2022, 1 pg.

Cavnue, www.cavnue.com, accessed Jun. 6, 2022, 4 pgs.

Cobiella, Kelly, "The future of electric vehicle charging? Tech company tests roads for wireless charging", NBC Nightly News, https://www.nbcnews.com/nightly-news/video/the-future-of-electric- vehicle-charging-tech-company-tests-roads-for-wireless-charging-138360901706 , posted Apr. 22, 2022, 1 pg.

Conductix-Wampfler, https://www.conductix.us/en/content/conductix-wampfler-usa , accessed Jun. 3, 2022, 3 pgs.

Daihen, www.daihen.co.jp/en/d-broad/, accessed Jun. 3, 2022, 15 pgs.

Electreon, www.electreon.com, accessed Jun. 3, 2022 , 9 pgs.

Elonroad, www.elonroad.com, accessed Jun. 3, 2022, 5 pgs.

Hess, www.hess-ag.ch. accessed Jun. 6, 2022, 4 pgs.

Hevo, www.hevo.com, accessed Jun. 6, 2022, 2 pgs.

Kaist, www.kaist.ac.kr/kr/, accessed Jun. 6, 2022, 5 pgs.

Mojo Mobility, https://mojomobility.com/home, accessed Jun. 3, 2022, 2 pgs.

Momentum, www.momentumdynamics.com, accessed Jun. 3, 2022, 5 pgs.

Nutt, David "Research paves way for wireless charging of electrical vehicles" Cornell University, Apr. 28, 2021, https://news.cornell.edu/stories/2021/04/research-paves-way-wireless charging-electric-vehicles, 5 pgs.

Panchal, et al. "Review of Static and Dynamic Wireless Electric Vehicle Charging System" Engineering Science and Technology, An International Journal 21 (2018) www.elsevier.com/locate/jestech Griffith School Engineering, Griffith University, Nathan Campus, Brisbane 4111, Australia, 16 pages.

Panchal et al., "Static In-wheel Wireless Charging Systems for Electric Vehicles", International Journal of Scientific & Technology Research vol. 6, Issue 09, Sep. 2017, pp. 280-284.

Percebon, "Integration of Qualcomm Halo DEVC technology onto a Renault Kangoo—EMC & EMF assessment simulation report", www.qualcom.com. Apr. 25, 2017, 22 pgs.

PlasticRoad, www.plasticroad.com/en, accessed Jun. 6, 2022, 7 pgs.

Plugless Power, www.pluglesspower.com, accessed Jun. 6, 2022, 3 pgs.

Siemens, "Siemens invests in WiTricity to advance wireless charging for electric vehicles", Joint Press Release, www.new.siemans.com/global/en/products/energy, Jun. 9, 2022, 4 pgs.

(56) References Cited

OTHER PUBLICATIONS

Signature Systems, www.signature-systems.com, accessed Jun. 6, 2022, 5 pgs.
UC Berkeley, Institute of Transportation Studies, www.path.berkeley.edu, accessed Jun. 6, 2022, 6 pgs.
WiTricity, https://witricity.com/, accessed Jun. 3, 2022, 8 pgs.
ZF, "ZF Joins Forces with Goodyear to Offer Enhanced Tyre and Fleet Management Solutions for Commercial Vehicles Throughout Europe", Press Release, www.zf.com/mobile/en/technologies/domains , Jun. 8, 2021, 3 pgs.
International Search Report and Written Opinion issued in PCT/US22/29037, dated Jul. 25, 2022, 13 pgs.
Office Action issued in U.S. Appl. No. 18/503,939, dated Jun. 25, 2024, 29 pgs.

* cited by examiner

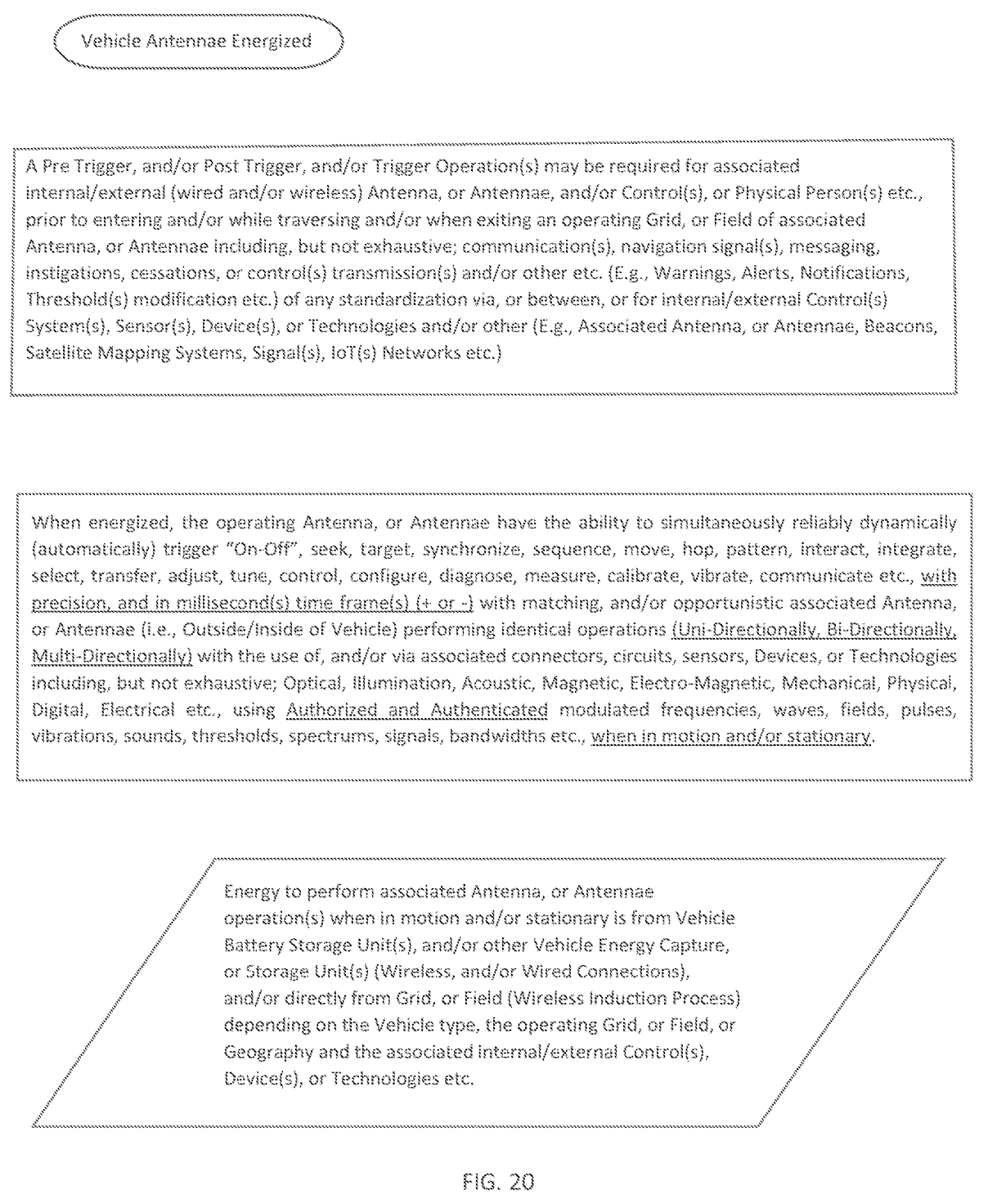

Vehicle Antennae Energized

A Pre Trigger, and/or Post Trigger, and/or Trigger Operation(s) may be required for associated internal/external (wired and/or wireless) Antenna, or Antennae, and/or Control(s), or Physical Person(s) etc., prior to entering and/or while traversing and/or when exiting an operating Grid, or Field of associated Antenna, or Antennae including, but not exhaustive; communication(s), navigation signal(s), messaging, instigations, cessations, or control(s) transmission(s) and/or other etc. (E.g., Warnings, Alerts, Notifications, Threshold(s) modification etc.) of any standardization via, or between, or for internal/external Control(s) System(s), Sensor(s), Device(s), or Technologies and/or other (E.g., Associated Antenna, or Antennae, Beacons, Satellite Mapping Systems, Signal(s), IoT(s) Networks etc.)

When energized, the operating Antenna, or Antennae have the ability to simultaneously reliably dynamically (automatically) trigger "On-Off", seek, target, synchronize, sequence, move, hop, pattern, interact, integrate, select, transfer, adjust, tune, control, configure, diagnose, measure, calibrate, vibrate, communicate etc., with precision, and in millisecond(s) time frame(s) (+ or -) with matching, and/or opportunistic associated Antenna, or Antennae (i.e., Outside/Inside of Vehicle) performing identical operations (Uni-Directionally, Bi-Directionally, Multi-Directionally) with the use of, and/or via associated connectors, circuits, sensors, Devices, or Technologies including, but not exhaustive; Optical, Illumination, Acoustic, Magnetic, Electro-Magnetic, Mechanical, Physical, Digital, Electrical etc., using Authorized and Authenticated modulated frequencies, waves, fields, pulses, vibrations, sounds, thresholds, spectrums, signals, bandwidths etc., when in motion and/or stationary.

Energy to perform associated Antenna, or Antennae operation(s) when in motion and/or stationary is from Vehicle Battery Storage Unit(s), and/or other Vehicle Energy Capture, or Storage Unit(s) (Wireless, and/or Wired Connections), and/or directly from Grid, or Field (Wireless Induction Process) depending on the Vehicle type, the operating Grid, or Field, or Geography and the associated internal/external Control(s), Device(s), or Technologies etc.

FIG. 20

The Antennae may be internally and/or externally controlled (Automatically, Manually, Autonomously (Wirelessly), or Remotely) via Standard Automotive Controls and/or Specialized Controls including, but not exhaustive; an Electronic Control Unit (ECU), Electronic Control Modules (ECM), Actuator(s), Transducer(s), System-on-Chip (SoC(s)), Core-Microcontrollers (MOS-IC), Chiplets, Tuners, Amplifiers, Rectifiers, Inverters, Converters, Transformers, Filters, Capacitors, Resistors, Voltage Regulators, Associated Sensors, Circuits, Switches, Bridges, Wired/Wireless Connectors (E.g., Qi, or PMA etc.), Mixed-Signal Microcontrollers using Digital-to-Analog (DAC) to integrate analog components needed to control non-digital electronic systems, Battery System (BS), Battery Management System (BMS), On-Board Diagnostic System (OBD), IoT(s) (Cloud, Associated Devices, or Technologies, Edge Gateways etc.), Virtual Instrumentation, and other associated Antennae, or Beacons, Digital System(s), Devices, or Technologies, Satellite Systems and Power System(s), Control(s) System(s) (Public and/or Private) etc., by way of, or with the use of digital instruction sets, instruction(s), or software, or programs, or programmable chips, or unique instruction(s) (Algorithms) and/or Machine Learning (AI) etc.

The Simultaneous reliable interaction(s) of and/or between the Antenna, or Antennae (E.g., One, or Two, or a Few, or Many, or Group, or Cluster, or Plexus) are timed stamped at the start (beginning) and finish (end) of a transfer(s) operation(s); each Antenna (send/receive, and/or receive/send side(s)) carries a unique digital, or magnetic signature and/or digital, or magnetic marker(s), or signal(s), or other signal(s) etc., that are used for ready Identification, Requests, Requirements, Information, Authorization, and/or Authentication, Security, Launch, Completion, Navigation, Diagnostics, or Transactions purposes etc., when in motion and/or stationary.

Upon entering the electromagnetic Grid, or Field the associated internal/external Antenna, or Antennae simultaneously reliably begin to search, target, and communicate with opportunistic and/or available Antenna, or Antennae (E.g., Calculating the best possible Antenna, or Antennae to connect with for required transfer(s) (E.g., Electricity, Digital, Navigation transfer(s) etc.) based on position on the Grid, or Field, and calculating upstream positions (in real time, near time position(s), and/or future position(s), and/or via historical information (AI) etc.) while traversing the Grid, or Field; based on Speed, Vehicle Operating Position, Direction(s) of Vehicle Wheels/Tires as placed, or altered while in motion or stationary vis-à-vis throughout the entire circuit of the Grid, or Field, and/or until stated requirements have been fulfilled. Associated Antenna, or Antennae may also simultaneously reliably use Dot Product, and/or Cross Product Computation(s) as a Navigation method, and/or other etc. (E.g., Digital/Electronic/Magnetic/Acoustic Cartesian Coordinate System, Lorentz force, Vectors, Signal(s), Frequencies etc.) along with other internal/external Navigation Device(s), or Technologies etc., as an identifying marker(s) per the associated Vehicle placement(s), or location(s) while traveling (traversing) in motion and/or stationary and/or for other necessary, feasible, or useful operations, functions, purposes, and/or tasks.

FIG. 20 (continued)

While on Grid, or Field, it may be desirable to integrate an "Always on Mode" for some Control(s) and Power Supply to reduce system latency to more predictable real-time control. It may also be desirable to integrate "Emergency Operating Thresholds" including but not exhaustive; automatic stop, partial, or intermittent operating of overheated Antenna and/or Antennae and/or associated Devices, or Technologies as necessary while associated diagnostics and resolutions are being deployed (E.g., control operations with emergency thresholds until resolved and then revert to standard operating thresholds as required), or in the extreme case of Fire or Accident and/or other etc., the system deploys an automatic emergency (SOS) notification to external fire suppression sources (E.g., Fire Departments, or Traffic Control (Police), or Alert(s) messaging to other Vehicles in the area etc.).

Modular Plastic Road Antenna

The Modular Plastic Road is made-up of a corresponding adjoined and/or adjoining Antenna, or Antennae type(s) organized as a pattern, cluster, plexus, or other etc. In general, such Antenna, or Antennae are preferably embedded into a flexible substrate(s) fashioned as measured and dimensional sheet(s), or other etc. (E.g., Made of Polymer(s), and Magnetic Inductive/Conductive material(s) or other useful material(s)) that are laid-out in a desirable number, or pattern, or layers etc., of Antenna, or Antennae along with integrating connectors, circuitry, sensors, and other useful Device(s), or Technologies that allow such Antenna, or Antennae to simultaneously reliably interact with internal/external associated or non-associated Antenna, or Antennae having similar characteristics (E.g., Moving, or Stationary), for the purpose of simultaneous reliable transfer(s) of Resonant Inductive Electromagnetic Flux (Electricity Energy), Communication (Data Bits), Navigation Signal(s) etc. and/or other necessary, or feasible, or useful operations, functions, purposes, or tasks with precise alignment (transfer) and/or within millisecond(s) (+ or -) time-frame(s). Preferably such a Substrate(s) is enclosed, or protected with the use of a Modular interconnecting Protective Housing Case (Piece(s)) shaped and functioning as a Modular Plastic Road(s) Assembly Type(s) Piece(s) and/or other etc. (E.g., Constructed with a plurality of measured and dimensional attached and/or attachable internal/external supporting elements, cover elements etc., and material(s) elements etc., and a plurality of measured and dimensional internal/external surface(s) elements etc., and material(s) elements etc., including, but not exhaustive; connectors, ports, hatches, lids, channels, apertures, areas, tunnels, protrusions, flanges, compartments, material(s) etc., and/or other necessary, or feasible, or useful architecture(s), or materials etc., used to organize, integrate, inspect, maintain, insulate, isolate, protect, use, work, and fix in-place etc., such Antenna, or Antennae and other associated Device(s), or Technologies etc., and such Modular interconnecting Protective Housing Case (Piece(s)) in a desirable location(s), placement(s), and/or arrangement(s) etc.

FIG. 20 (continued)

Ideally, such Antenna, or Antennae are connected to a Public/Private Power Supply that distribute Electricity Power to operate such Antenna, or Antennae. It may be desirable to integrate other Public/Private Power Sources, or Power Storage Systems (E.g., Zonal Emergency Generators, Fuel Cells, Photovoltaic Systems, or Battery Storage Units etc.) as necessary, or feasible, or useful. Additionally, it is desirable for such Antenna, or Antennae to operate with the use of a Public/Private Computing System(s) (E.g., such as IoT(s), Cloud, Device(s), Edge Gateway(s), Zonal Computer(s), Nodes and/or other etc.), and/or Satellite Systems for precision millisecond(s) (+ or -) time frame(s) computations, communications, navigations signals, signals, switching, controls, power transfer operations etc., and/or other operations, functions, purposes, and/or tasks. Ideally such Antenna, or Antennae as integrated into such a Modular Plastic Road Assembly Type(s) (Piece(s)) and/or other etc., are connected by way of a Fiber Optic System (E.g., Connectors, Lines, associated Device(s), or Technologies) for the highest speed and reliable connections of, or for, or between such Antenna, or Antennae and other associated, or non-associated Antenna, or Antennae having similar characteristics (E.g., Moving or Stationary). Ideally, such a Modular Interconnecting Protective Housing Case (Piece(s)) shaped and functioning as a Modular Plastic Road Assembly Type(s) (Piece(s)) and/or other etc., have and/or carry, or use a dedicated plug-in port(s), or connector(s), or junction boxes and hook-up point(s) for ready access to, or with Public/Private Utilities Lines, or Cables, or other hook-up(s) etc., using pre-qualified electrical, digital, fiber-optic and/or other necessary, or feasible, or useful utilities connections, connectors, or plugs, or hook-ups etc., (Wired, and/or Wireless, and/or other etc.) for such Antenna, or Antennae, and/or such Modular Plastic Road (Piece(s)) and/or other etc.

In one embodiment, such a Modular Plastic Road (Piece(s)) is a measured and dimensional Plane, or Curvature (E.g., Overlay) having measured and dimensional attached, or attachable transitional curb(s), or ramp(s), or slope(s), or gradient piece(s), or strip(s), or lane(s), or border(s), or edge(s), or boundary, or fringes, or skirt(s), or gutter(s) etc., used as an easy access and/or egress (exit) stage, and/or as a visible/non-visible signal point(s), or broadcast point(s) having embedded, or attached digital/magnetic/illumination/optical etc., Sensors, Antennae, Device(s), or Technologies, or Equipment etc., used as a Pre, or Post, or Trigger Operation(s) for an associated and/or non-associated traversing Vehicle(s) (E.g., "On-Off" signal(s), Communications transmissions, Navigation Signal(s) point(s), Roadway Surface Signal(s), Warnings, Alert(s), Notifications, Messaging etc.). Ideally such a Modular Plastic Road (Piece(s)) are fitted together, piece by piece to form a desired roadway, circuit, travel surface etc. Ideally such Modular Plastic Road (Piece(s)) may use a series of structural, or electrical, or digital, or fiber-optic etc., connector(s), or joint(s), or link(s), or seam(s) etc. (E.g., toggles, measured and dimensional male/female connector(s) type(s), plug-in(s) port(s), junction boxes and hook-up(s) point(s), Wiring Harnesses, Wireless connector(s) (E.g., Qi, or PMA, or other) etc., seals, fasteners, sealing materials, insulating materials, anchors elements, mooring elements, adjustable anchor/mooring elements, bracing elements, bracing structures, bracketing elements, platforms and/or other etc., to readily attach, and/or adjust (fixed in-place), or bond, or unify, or connect such a Modular Plastic Road (Piece(s)) onto any existing, or planned, or improvised internal/external desirable traveled surface(s), or roadway(s), or highway(s), or street(s), or path(s), or tarmac(s) and/or other etc.

FIG. 20 (continued)

In one embodiment, such a Modular Plastic Road (Piece(s)) is a measured and dimensional Plane, or Curvature (E.g., Box) having attached, or attachable measured and dimensional transitional curb(s), or ramp(s), or slope(s), or gradient piece(s), or strip(s), or lane(s), or border(s), or edge(s), or boundary, or fringe(s), or skirt(s), or gutter(s) etc., used as an easy access and/or egress (exit) stage, and/or as a visible/non-visible signal point(s), or broadcast point(s) having embedded, or attached digital/magnetic/illumination/optical etc., Sensors, Antennae, Device(s), or Technologies, or Equipment etc., used as a Pre, or Post, or Trigger Operation(s) for an associated and/or non-associated traversing Vehicle(s) (E.g., "On-Off" signals, Communications transmissions, Navigation Signal(s) point(s), Roadway Surface Signal(s), Warnings, Alert(s), Notifications, Messaging etc.). Ideally such a Modular Plastic Road (Piece(s)) are fitted together, piece by piece to form a desired roadway, circuit, travel surface etc. Ideally such Modular Plastic Road (Piece(s)) may use a series of structural, or electrical, or digital, or fiber-optic etc., connector(s), or joint(s), or link(s), or seam(s) etc. (E.g., toggles, measured and dimensional male/female connector(s) type(s), plug-in(s) port(s), junction boxes and hook-up(s) point(s), Wiring Harnesses, Wireless connector(s) (E.g., Qi, or PMA, or other) etc., seals, fasteners, sealing materials, insulating materials, anchors elements, mooring elements, adjustable anchor/mooring elements, bracing elements, bracing structures, bracketing elements, platforms and/or other etc., to readily attach, and/or adjust (fixed in-place), or bond, or unify, or connect such a Modular plastic Road (Piece(s)) onto, and/or within, and/or alongside, and/or as part of any existing, or planned, or improvised internal/external desirable traveled surface(s), or roadway(s), or highway(s), or street(s), or path(s), or tarmac(s) and/or other etc., using known construction methods and materials etc. (E.g., site preparation, grading, leveling, materials etc.), and/or other necessary, or feasible, or useful construction methods and/or material(s) etc.

It is desirable to integrate known heat sink methods ((E.g., Passive (vents, apertures, channels, ducts etc.) to dissipate, move, circulate, exhaust heat build etc., and/or Active (device(s), or technologies, or equipment (electric fans, vacuums, blowers (impellers and nozzles, and piping), actuated gate(s) and/or other device(s), or technologies, or equipment as necessary, or feasible, or useful). It may also be desirable to integrate, or use known heat sink materials, or seals, or sealing materials etc. (E.g., insulation materials, or elements etc. to isolate, insulate, and aid heat dissipation, or protect from heat-build of, or for, or between associated Antenna, or Antennae, or device(s), or technologies, or equipment etc., that are housed within, or associated with such Protective Housing Case(s) (Piece(s)) shaped and functioning as a Modular Plastic Road Assembly Type(s) (Piece(s)) and/or other etc. It is also desirable to integrate electrical heating Device(s), or Technologies, or Equipment to optimally operate and/or function, or use such Antenna, or Antennae and/or associated Device(s), or Technologies, or Equipment etc., and such a Modular Plastic Road Assembly Type(s) (Piece(s)) and/or other etc. (E.g., Surface(s) Internal/External) in extreme temperature variations, or operating thresholds (E.g., Cold, Chill, Winter, Frost, Frozen, Arctic, Ice, Snow etc.).

FIG. 20 (continued)

It is desirable to integrate Internal/External surface(s) sensor(s), actuators etc. (E.g., including but not exhaustive; Pressure, Touch, Magnetic, Digital, Acoustic, Illumination, Optical etc.) that are used for varied operations, functions, purposes, and/or tasks etc. (E.g., triggers "On-Off", or mitigation, or warnings, or alerts, or detection of foreign objects on surface(s), and/or changes in operating thresholds and/or other necessary, or feasible, or useful operations, functions, purposes, and/or tasks etc.) for such internal/external Antenna, or Antennae, and/or associated device(s), or technologies, or equipment etc., and such a Protective Housing Case(s) (Piece(s)) shaped and functioning as a Modular Plastic Road Assembly Type(s) (Piece(s)) and/or other etc. It may also be desirable to integrate an On-Board Diagnostics System (OBD) (E.g., for real-time, near-time, historical diagnostics, and information, and/or for associated/non-associated system(s), Authentication and Authorization, and/or for other necessary, feasible, or useful operations, functions, purposes, and/or tasks etc.).

It is desirable to integrate a Power Management System (PMS) and a Battery Management System (BMS) as is necessary, or feasible, or useful for I/O electricity and/or other necessary, or feasible, or useful electrical, digital, illumination, acoustic, magnetic, electromagnetic, permanent magnet and/or other etc., operations, functions, purposes and/or tasks of, or for, or between such an internal/external Antenna, or Antennae and/or other internal/external associated/non-associated Antenna, or Antennae, device(s), or technologies, or equipment, on, within, alongside, and/or associated with such a Protective Housing Case(s) (Piece(s)) shaped and functioning as a Modular Plastic Road Assembly Type(s) (Piece(s)) and/or other etc., automatically, manually, autonomously (wirelessly), and/or remotely, when in motion and/or stationary.

FIG. 20 (continued)

It is desirable that such Inductive Magnetic Electricity Transmission Antenna, or Antennae, or Pick-up(s) etc., on, of, for, within, surrounding, throughout, and/or between, or associated with such a Protective Housing Case(s) (Piece(s)) shaped and functioning as a Modular Plastic Road Assembly Type(s) (Piece(s)) and/or other etc. and/or a corresponding adjoined and/or adjoining Pneumatic Tire(s), or Non-Pneumatic Tire(s) Assembly Type(s) (i.e., "airless"), and/or a corresponding adjoined, and/or adjoining Vehicle Wheel Assembly Type(s), and a corresponding adjoined, and/or adjoining Vehicle(s) Assembly Type(s) operate, or function, or work with a range of adjustable power settings (E.g., low, medium, high (DC fast charging) for associated electricity I/O device(s), or technologies, or equipment etc.) automatically, manually, autonomously (wirelessly), or remotely, when in motion and/or stationary. It is also desirable that such electricity transfers can be measured, or calculated, or gauged, or determined, or computed, or quantified for Transactional Purposes, and/or other necessary, or feasible, or useful operations, functions, purposes, or tasks. It is desirable that when energized, the operating Antenna, or Antennae have the ability to simultaneously reliably dynamically (automatically) trigger "On-Off", seek, target, synchronize, sequence, move, hop, pattern, interact, integrate, select, transfer, adjust, tune, control, configure, diagnose, measure, calibrate, vibrate, communicate etc., with precision, and in millisecond(s) time frame(s) (+ or -) with matching, and/or opportunistic associated Antenna, or Antennae (i.e., Outside/Inside of such a Modular Plastic Road Assembly Type(s) (Piece(s)) and/or other etc., performing identical operations as other associated internal/external Antenna, or Antennae (Uni-Directionally, Bi-Directionally, Multi-Directionally) with the use of, and/or via associated connectors, circuits, sensors, Devices, or Technologies including, but not exhaustive; Optical, Illumination, Acoustic, Magnetic, Electro-Magnetic, Mechanical, Physical, Digital, Electrical etc., using Authorized and Authenticated modulated frequencies, waves, fields, pulses, vibrations, sounds, thresholds, spectrums, signals, bandwidths etc., when in motion and/or stationary. It is desirable that such Antenna, or Antennae transfer electricity "flux" and/or data bits, and/or signal(s), and/or frequencies etc., simultaneously, and reliably of, and/or for, and/or between other associated Antenna, or Antennae (internal and/or external) when in motion, and/or stationary.

Off Grid or Field

FIG. 20 (continued)

MULTIPLEX VEHICLE WHEEL ASSEMBLY TYPES

CROSS REFERENCE TO RELATED APPLICATION

This application claims benefit of U.S. Provisional Patent Application Ser. No. 63/187,523 filed May 12, 2021, entitled, "Multiplex Vehicle Wheel Assembly Type(s)," the entire disclosure of which is incorporated herein by reference.

FIELD OF THE DISCLOSURE

The present disclosure is generally related to vehicles and more particularly is related to multiplex vehicle wheel assembly types.

BACKGROUND OF THE DISCLOSURE

Electrically-powered vehicles have been present in modern day transportation for decades. Busses, trams, subways, and similar multi-person transport vehicles often use electrical energy to power onboard propulsion systems. These types of transportation systems have a physical connection to an electric supply which is connected to a power source, such that electrical power from the source can be provided through the physical connection and to the vehicle's propulsion system, e.g., electric motors, magnetic levitation, or other types of electrically-powered propulsion systems. For instance, trams and subways may utilize a physical contact to overhead electrical lines positioned above the path of travel of the vehicle, where the physical contact is used to transfer power from a power source, often the grid, to the vehicle. Similarly, rail-based vehicles have been widely used where an electrified rail on which the vehicle travels, or in parallel to a vehicle path of travel, provides constant electrical energy to the vehicle. For instance, rail-based vehicles may include subterranean subway cars and monorails, among others.

In more recent times, electrically-powered automobiles have become commonplace. This emergence is due, in part, to efforts in commerce and society to provide more environmentally friendly means of transport which decrease the reliance on fossil fuels. This shift to using electrical power for the propulsion of automobiles, either in whole with fully electric vehicles, or in part with hybrid vehicles, has been partly enabled by the emergence of more efficient onboard batteries which allow the electric vehicle to have a range long enough for practical use. For instance, many electric vehicles can now travel a few hundred miles with their onboard batteries on a single charge.

Despite these improvements, these electric vehicles must still be charged using tethered connections, e.g., where a conductive wire or power cord is required to physically connect to the vehicle charging system, which are commonly only available in select locations, such as household garages, travel rest areas, and certain shopping venues. Additionally, these tethered connections require sufficient time for the vehicle's onboard batteries to be charged, which can be inconvenient and impractical to many drivers. For example, some electric vehicles charge at a rate of only between 2-44 range miles per hour of charge, which translates into these electric vehicles being impractical for longer trips or situations where the driver does not have time to wait for the vehicle to charge in between segments of a trip. As such, these shortcomings result in a large portion of automobile owners not considering or choosing electric vehicles for their individual transportation, despite their otherwise worthwhile benefits.

Thus, a heretofore unaddressed need exists in the industry to address the aforementioned deficiencies and inadequacies.

SUMMARY OF THE DISCLOSURE

Embodiments of the present disclosure are directed to multiplex vehicle wheel assemblies which can be used to improve various aspects of transportation using vehicles, namely, using wheeled vehicles. Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 20 is a flowchart of a process related to multiplex vehicle wheel assemblies, in accordance with embodiments of the present disclosure.

DETAILED DESCRIPTION

Figure 1:
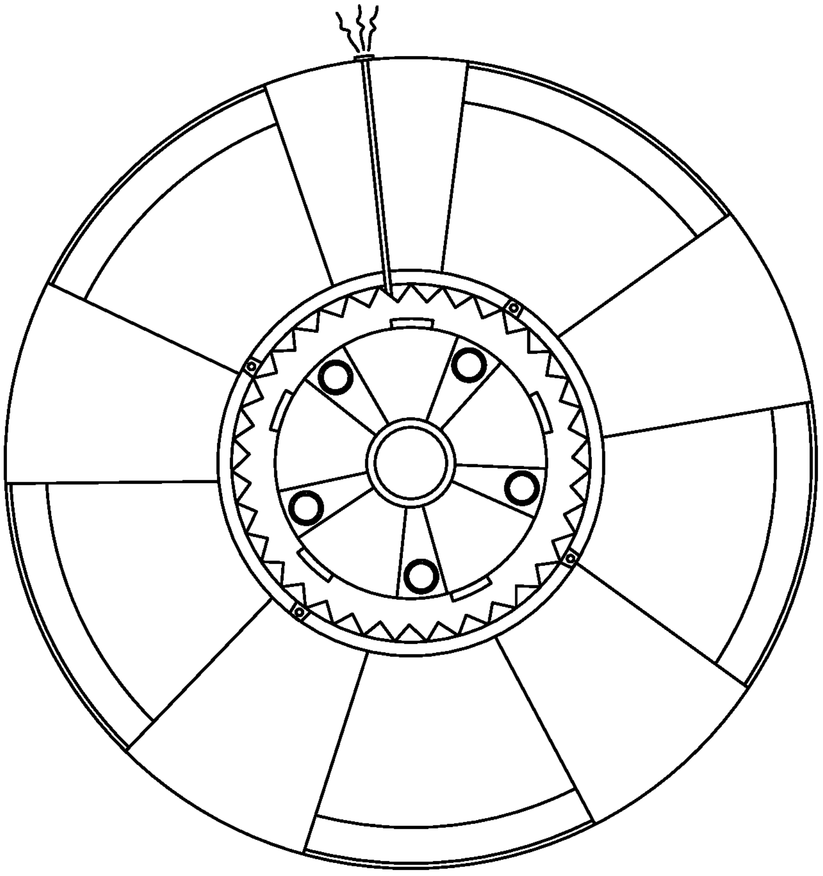
FIGS. 1-19 are various illustrations of a multiplex vehicle wheel assemblies, in accordance with embodiments of the present disclosure.
Figure 2:
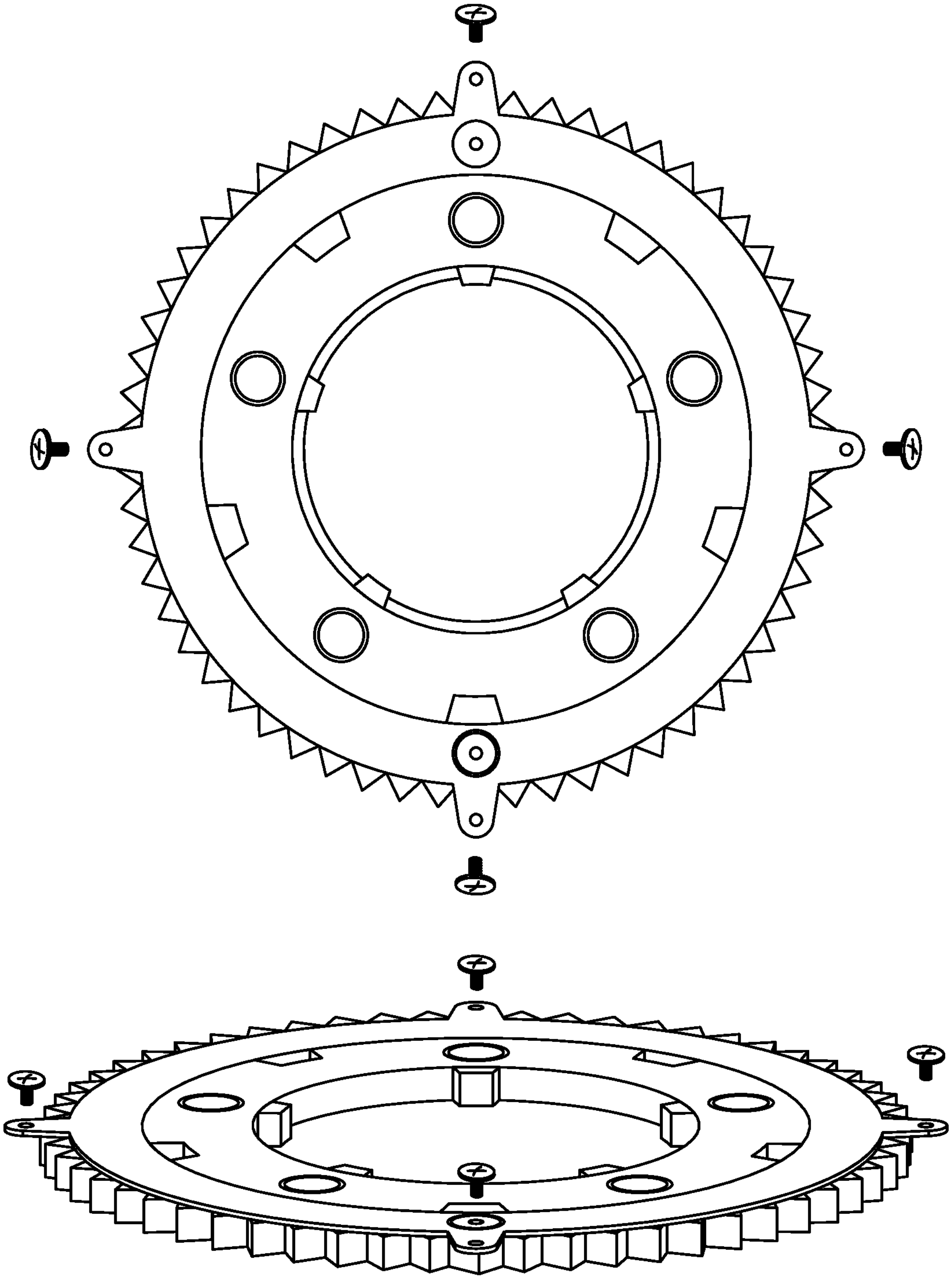
Figure 3:
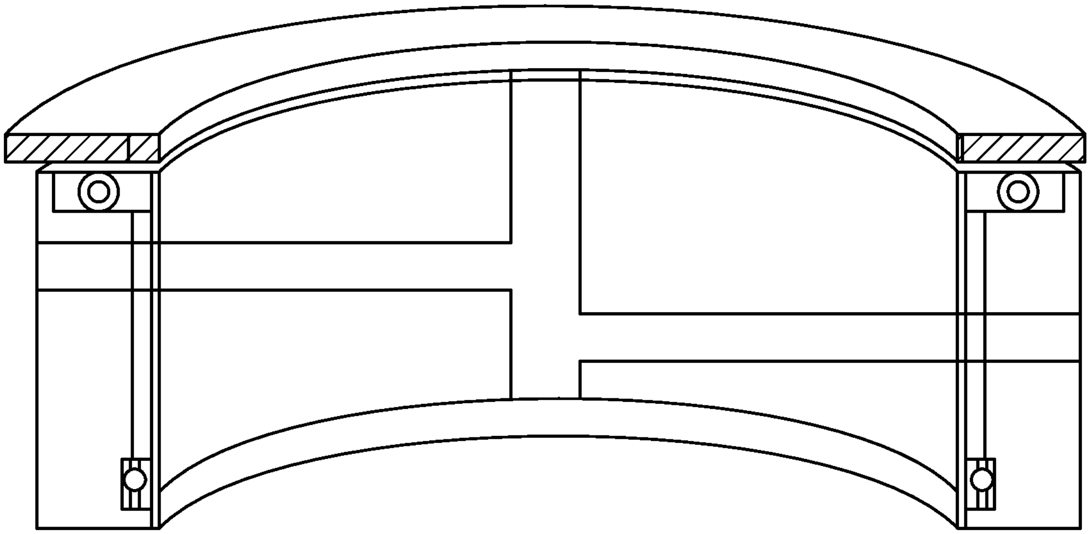
Figure 4:
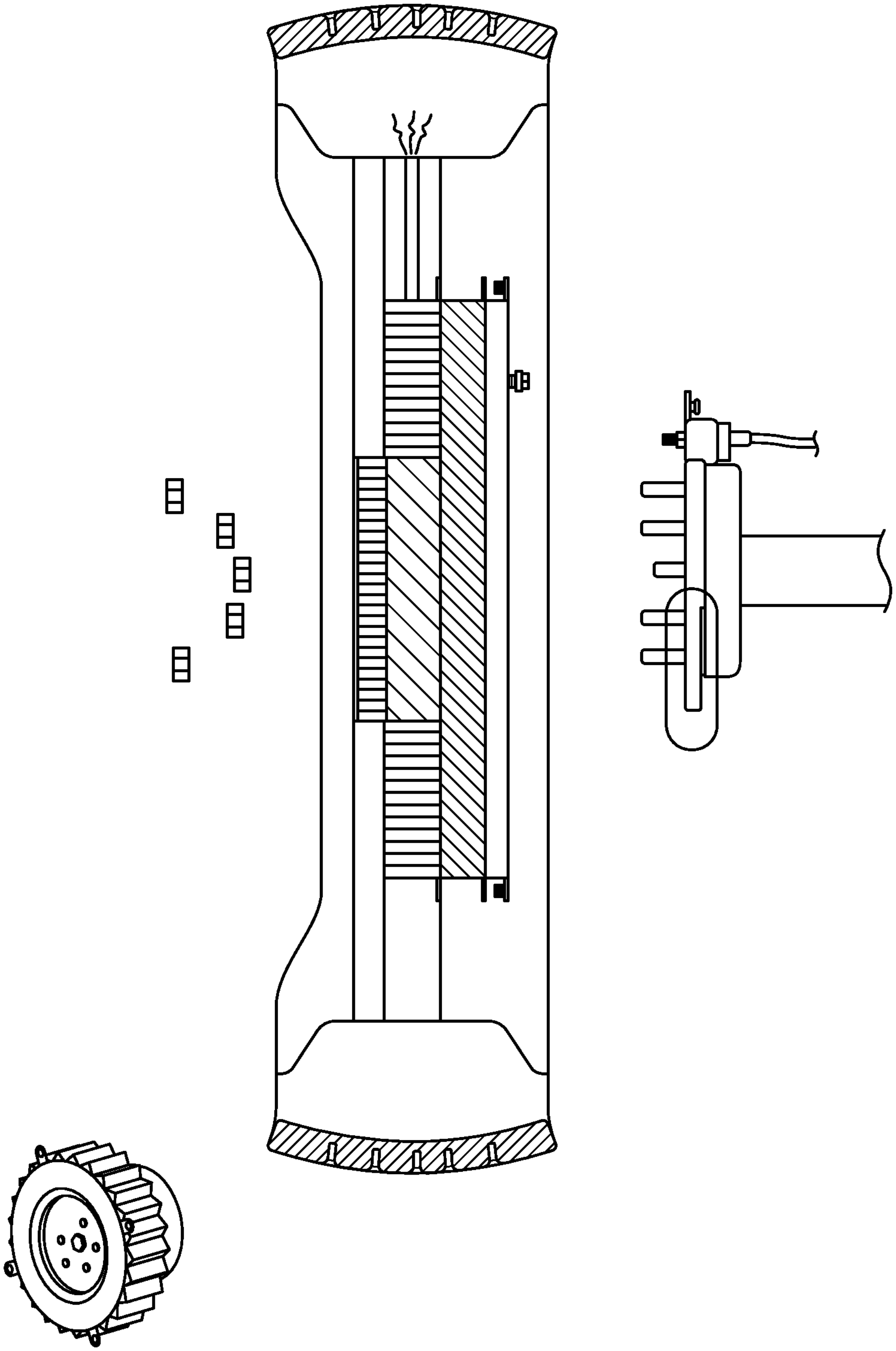
Figure 5:
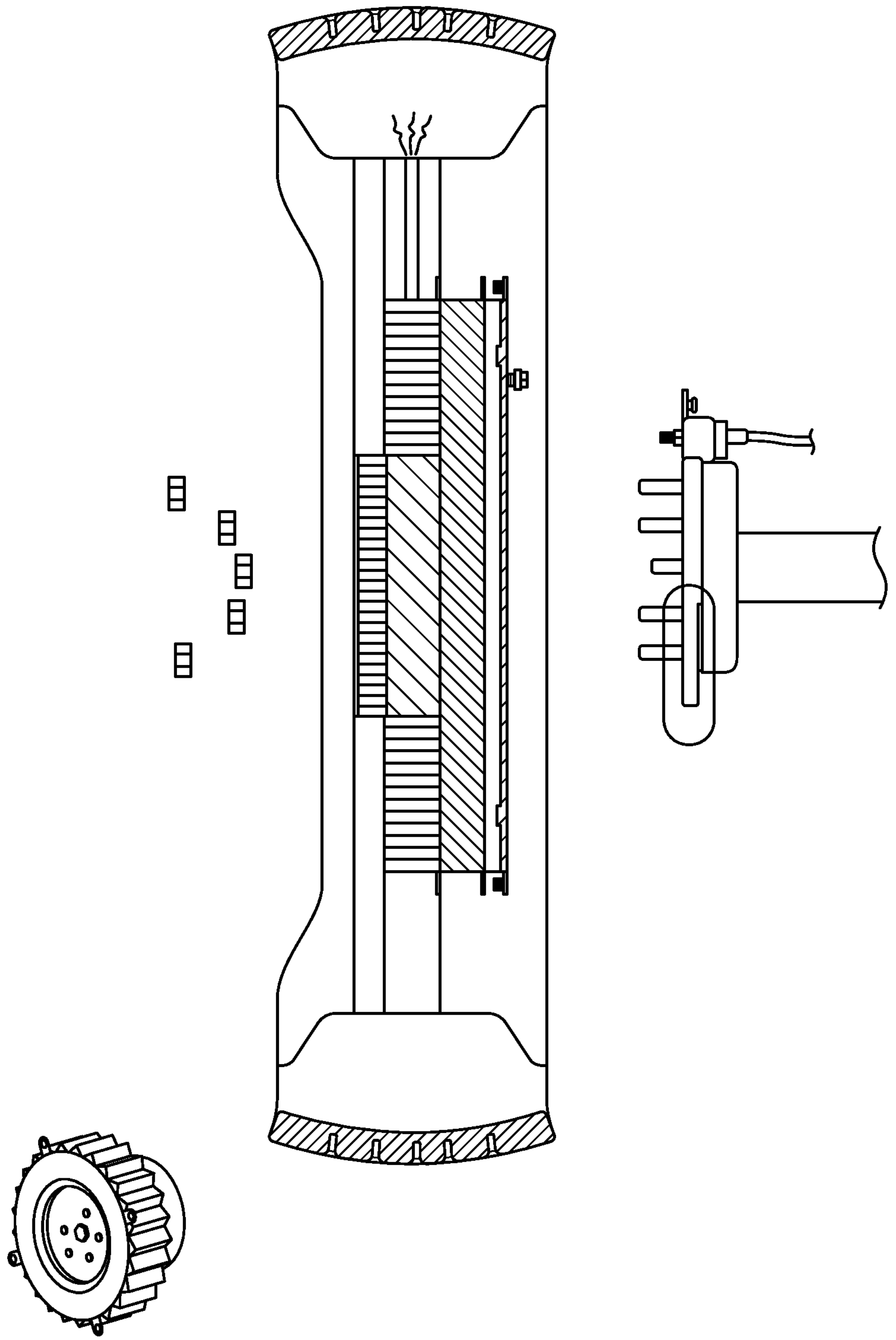
Figure 6:
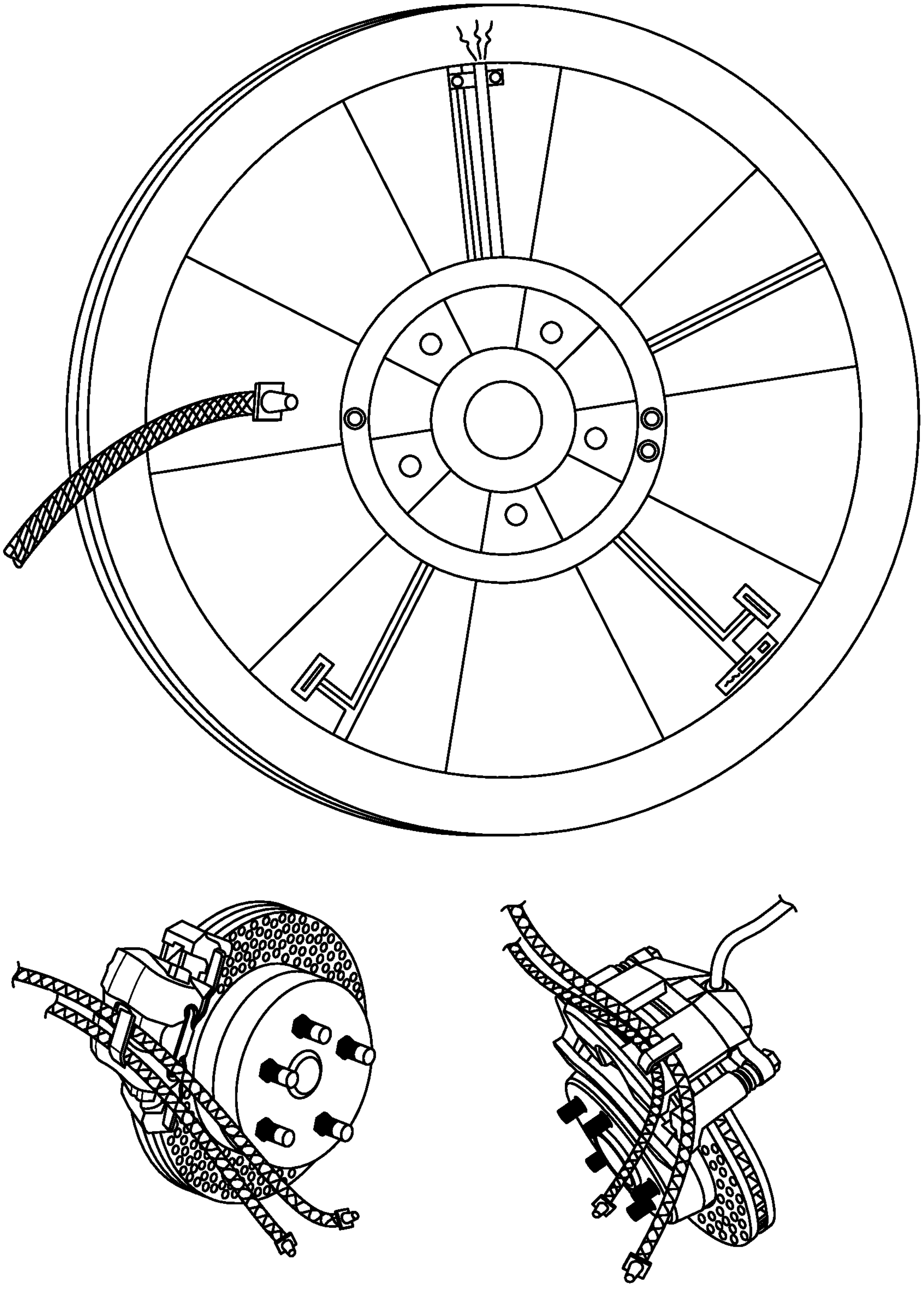
Figure 7:
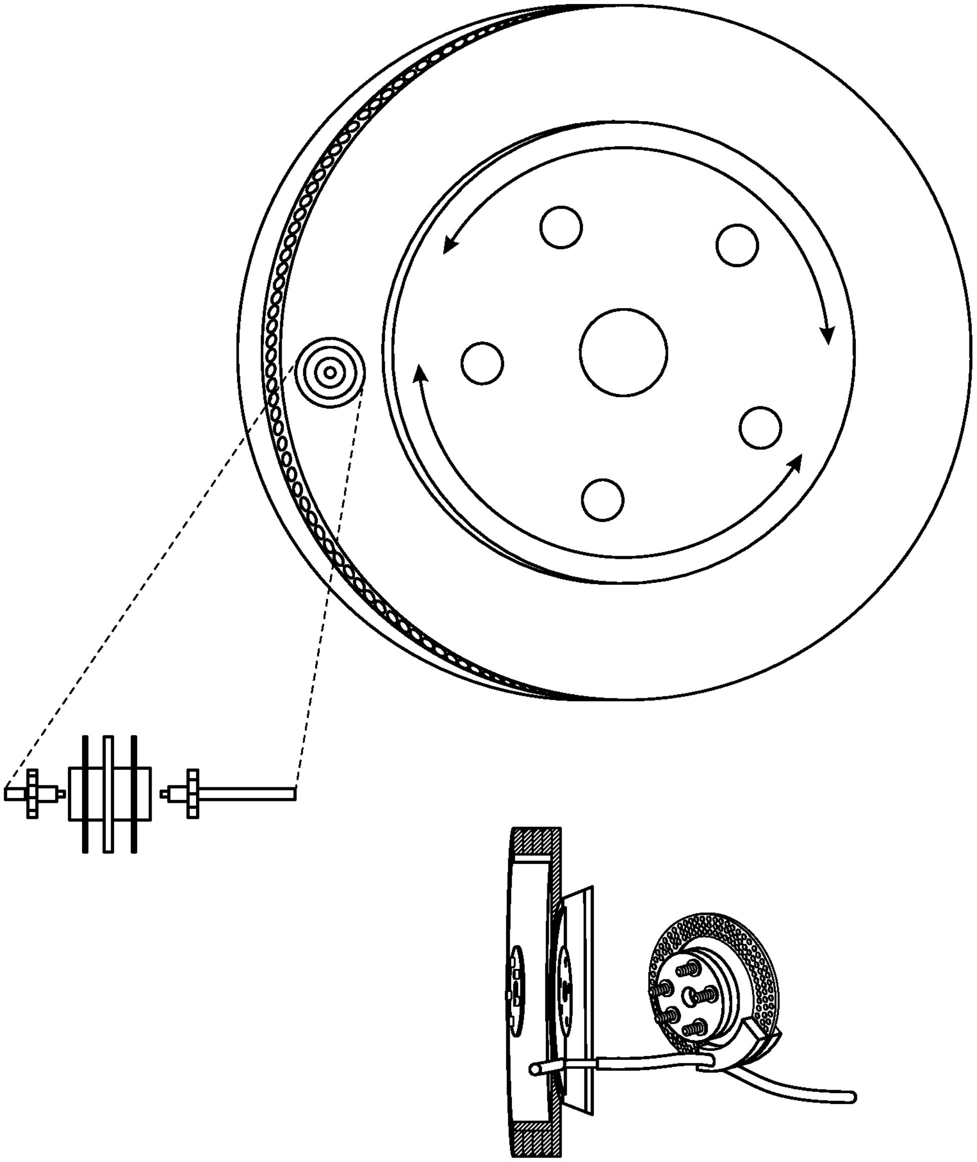
Figure 8:
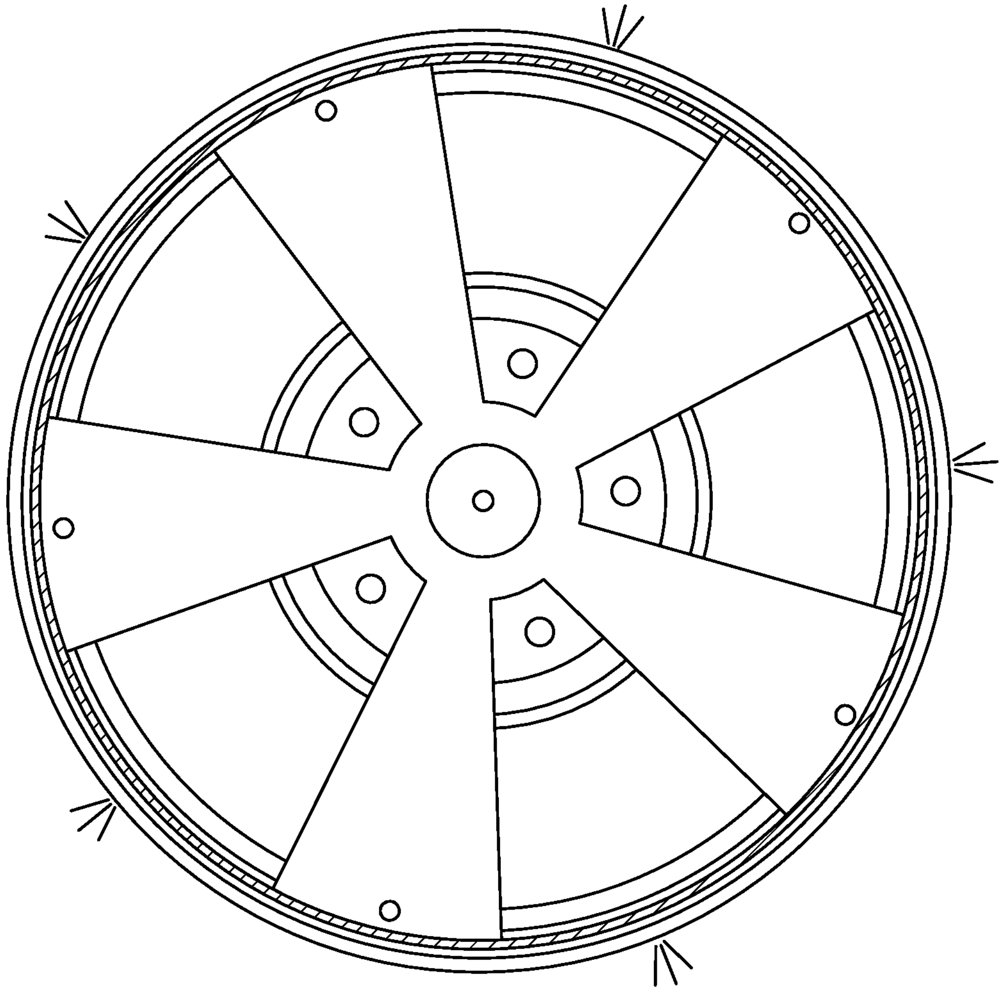
Figure 9:
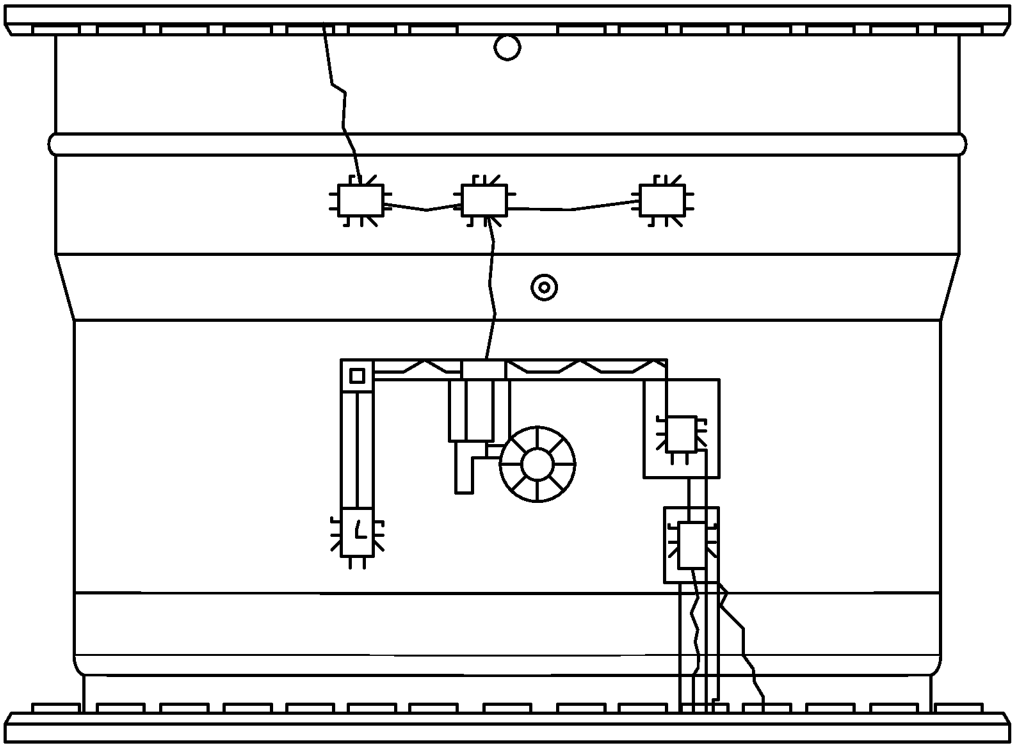
Figure 10:
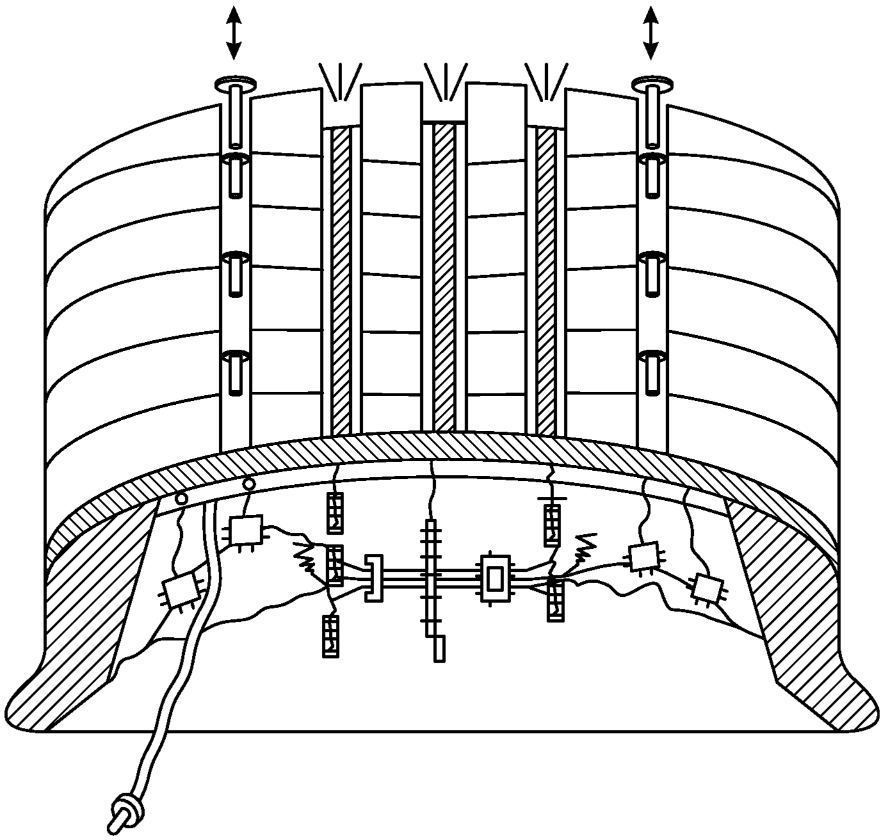
Figure 11:
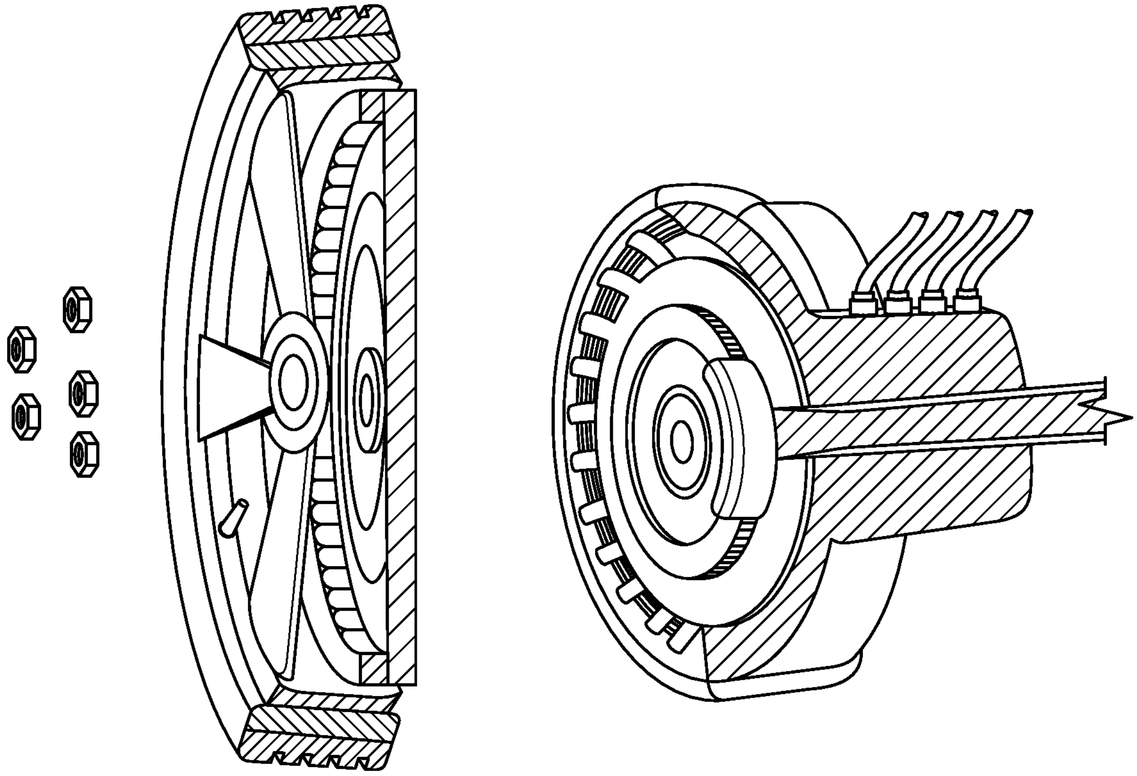
Figure 12:
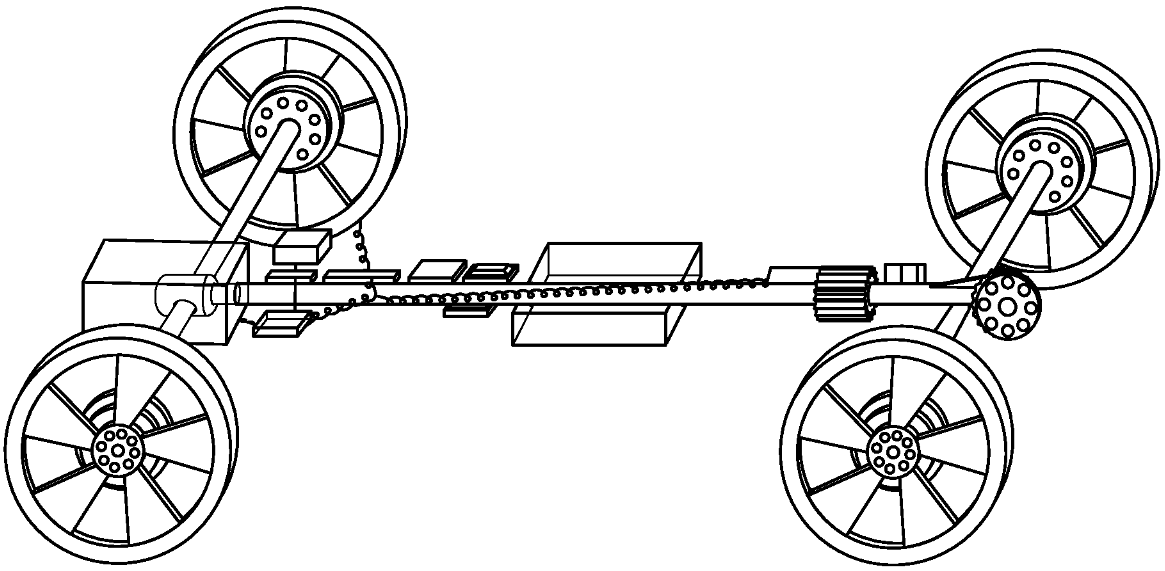
Figure 13:
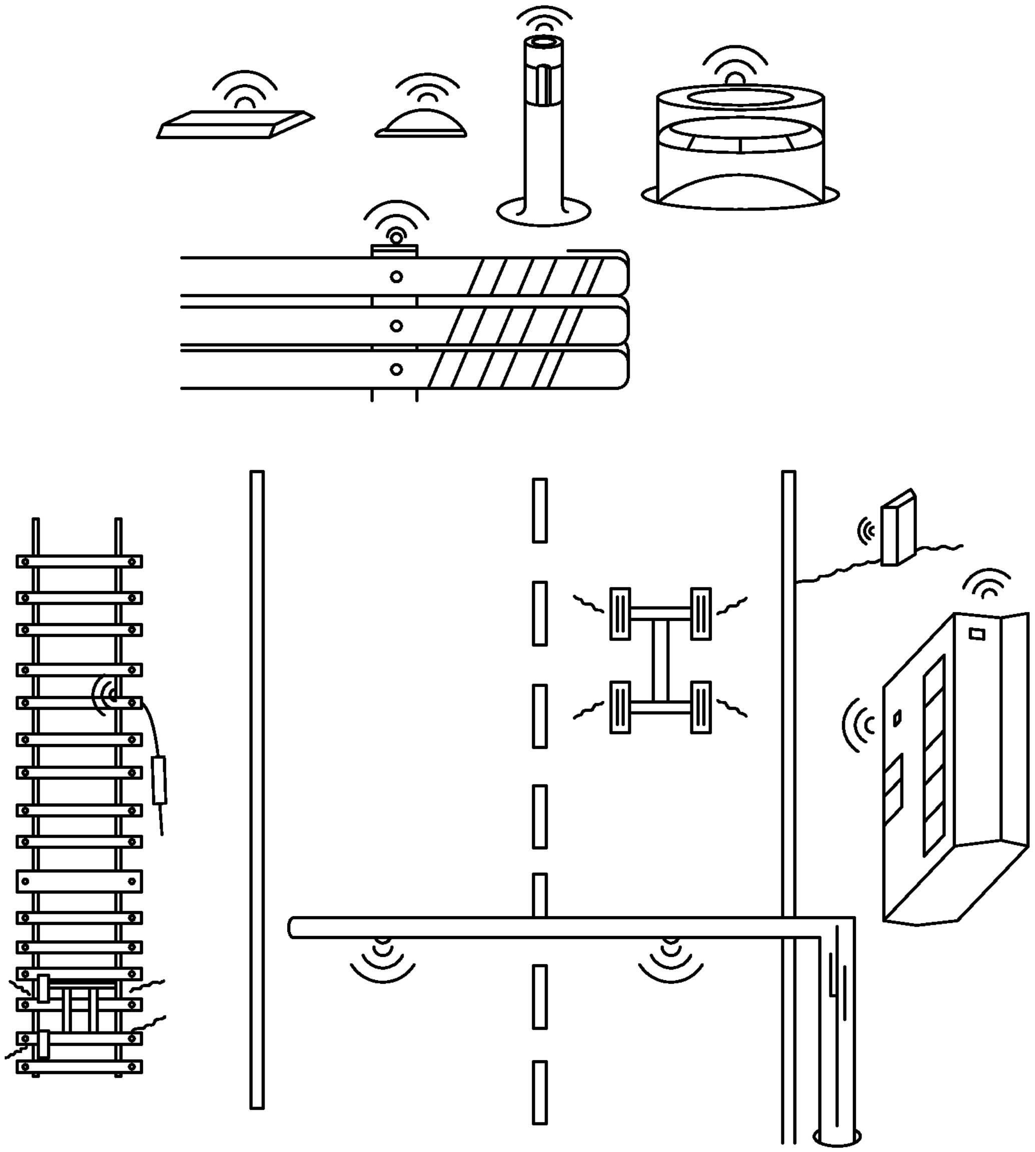
Figure 14:
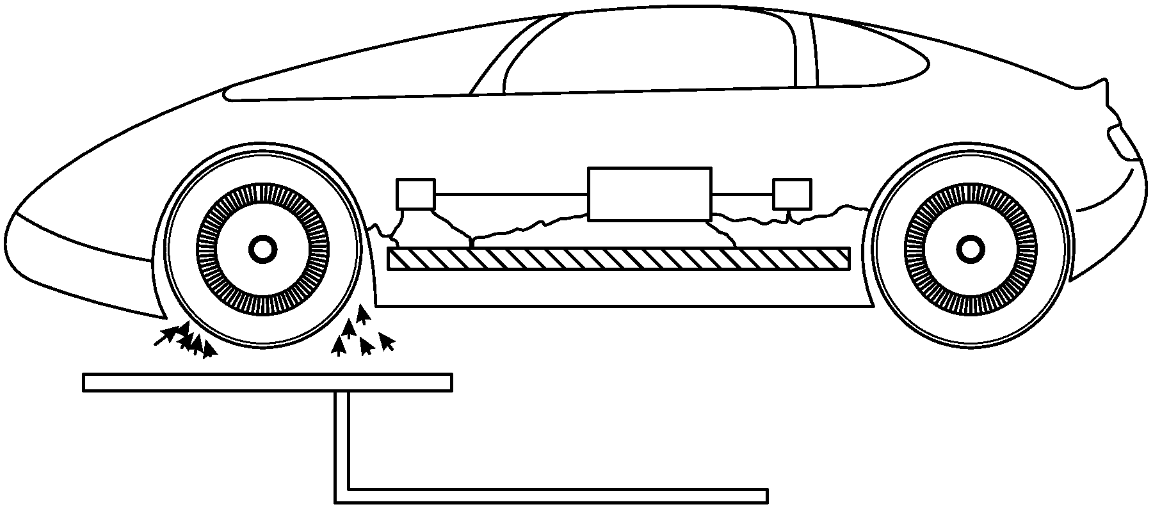
Figure 15:
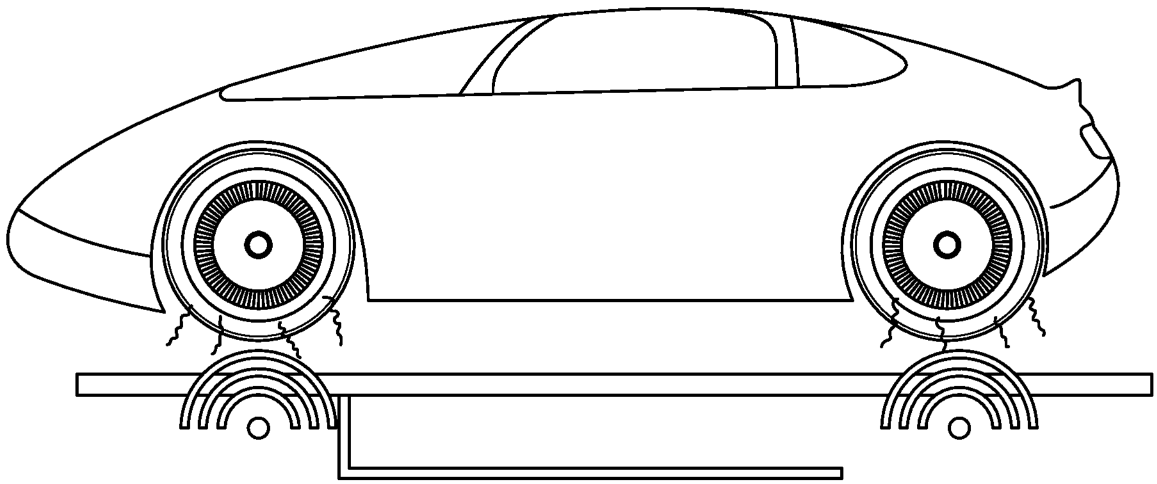
Figure 16:
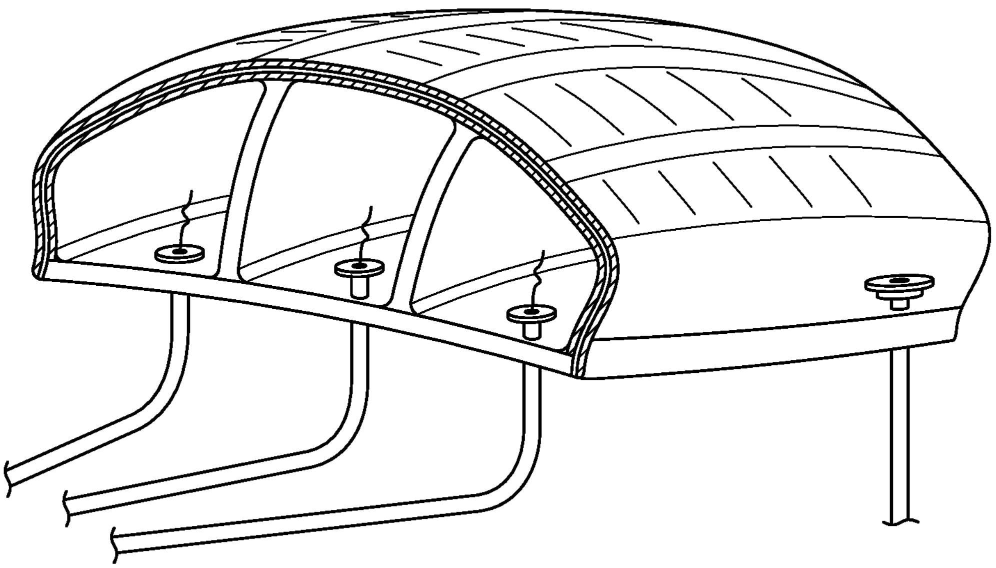
Figure 17:
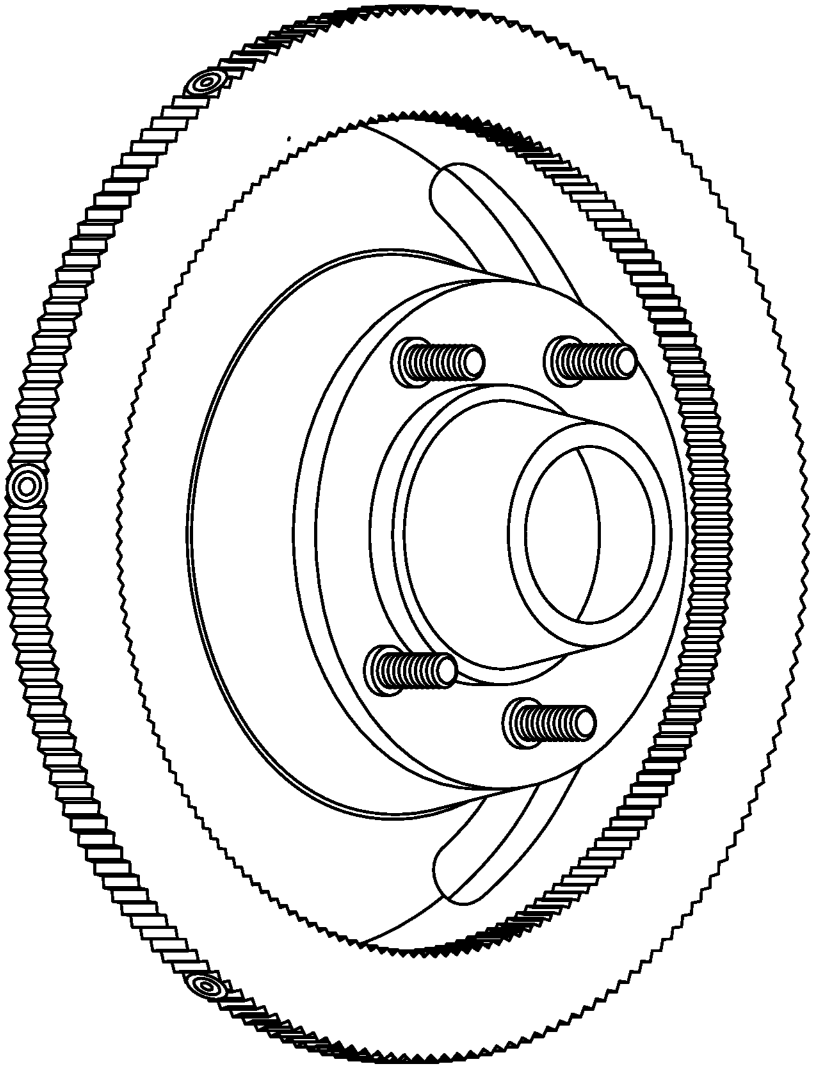
Figure 18:
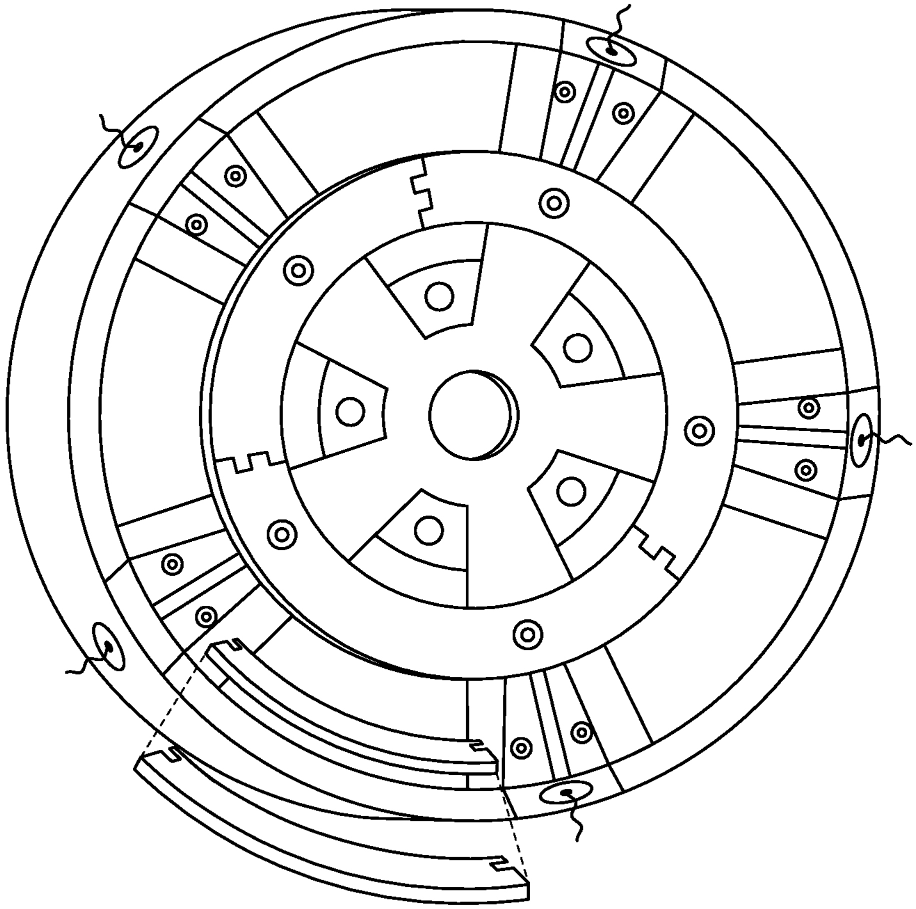
Figure 19:
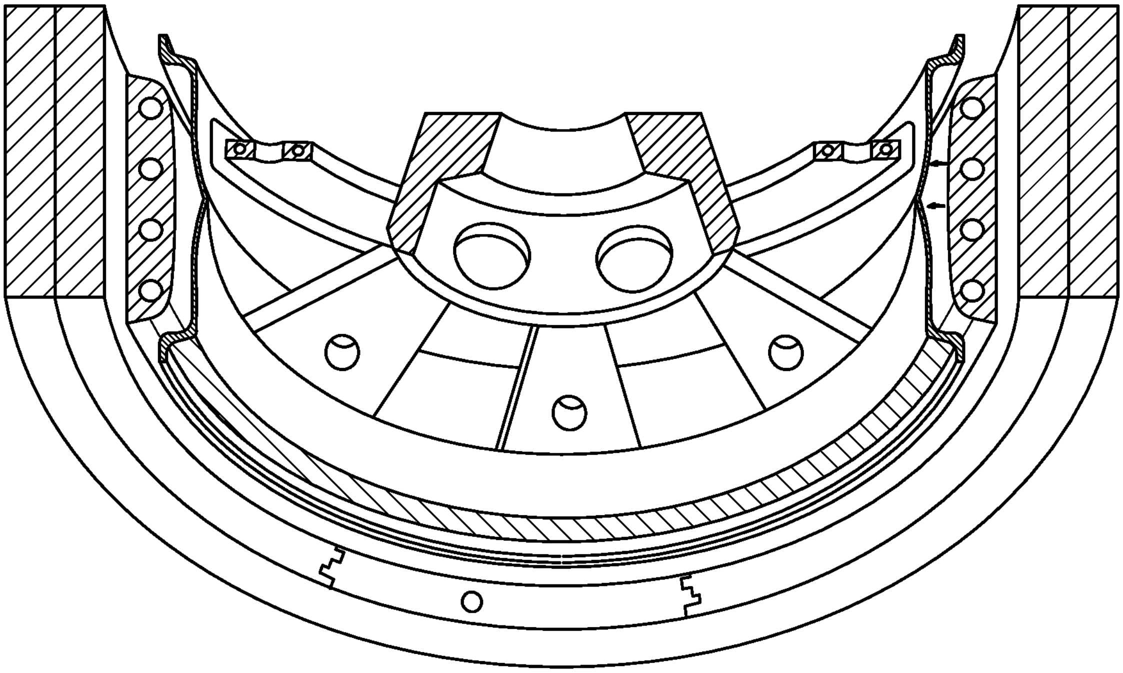

The present invention is directed towards a vehicle wheel assembly type(s), that has, and/or is holding, and/or carrying, and/or operating, and/or functioning, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s), and/or protrusion(s), and/or protective housing case(s) (piece(s)), and/or contour protective housing case(s) (piece(s)) (i.e., "Exoskeleton" assemblage(s)) assembly type(s), of the body (architecture) of such a corresponding adjoined, and/or adjoining, vehicle wheel assembly type(s), for the purpose of, embedding, and/or slotting, and/or positioning, and/or orienting, and/or aligning, and/or assembling, and/or anchoring, and/or mooring, and/or compacting, and/or packaging, and/or organizing, and/or operating, and/or functioning, and/or connecting, and/or securing (fixed) in-place, and/or hooking-up, a specifically, and/or strategically, engineered, designed, fabricated, fashioned, or formed, in-built, inherent, attached, and/or attachable, corresponding adjoined, and/or adjoining (air-tight (sealed), and/or other, ring-shaped (annular), and/or other, flush mounting, and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), ring-shaped (annular) rotary manifold slip-ring wiring harness assembly type(s), and/or other wiring harness assembly type(s), and, associated component(s), part(s), mechanism(s), device(s), system(s), and/or apparatus assembly type(s), that are specifically, and/or strategically, placed within, in, into, on, onto, beneath, between, surrounding, thru, and/or throughout, and/or associated with, the body (architecture) of such a corresponding adjoined, and/or adjoining, vehicle wheel assembly type(s), and, such a corresponding adjoined, and/or adjoining pneumatic tire(s) assembly type(s), and that, when mounted, and/or attached, and/or hooked-up, onto, and/or with, a corresponding adjoined vehicle assembly type(s), that has, and/or is holding, and/or carrying, and/or operating, and/or functioning, and/or integrating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) vehicle junction boxes, and, hook-up(s) point(s) assembly type(s), automated vehicle Central Tire Inflation System (CTIS) assembly type(s), and, associated component(s), part(s), mechanism(s), device(s), system(s), and/or apparatus assembly type(s), is capable of simultaneously reliably, generating, and/or supplying, and/or enabling, and/or facilitating, and/or transferring, and/or transiting, and/or transmitting, and/or receiving, and/or delivering, and/or discharging, and/or depleting, and/or diagnosing, and/or measuring, and/or operating, and/or functioning, and/or using, and/or storing, and/or controlling, and/or managing, and/or monitoring, and/or communicating, and/or recording, and/or working, and/or interacting, and/or integrating, and/or hooking-up (unbroken, and/or unimpeded), a corresponding desired media(s), and/or medium(s) (such as, compressed air, and/or other gases (+ and/or −) for a corresponding attached pneumatic tire(s) chamber(s) assembly type(s)), and/or electricity supply, data, and/or digital signal(s), and/or fluid(s)), and/or other corresponding chosen operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Brief Explanation of Key Component(s)

Rotary Manifold(s) assembly type(s) (aka; Rotary Union(s), Swivel Joint(s) or Rotary Joint(s)) reliably seal and transfer desired media(s), and/or medium(s), such as compressed air, gases, electricity supply, data, digital signal(s), fluid(s), and other media type(s), from stationary source(s) to rotating part(s), and vice versa (unbroken, and/or unimpeded). A Rotary Manifold is a device used to transfer media(s) (such as gases, and/or fluid(s)), under pressure or vacuum from a stationary inlet to a rotating outlet, and vice versa, preserving and isolating the connection(s). A Rotary Manifold functions by connecting a stationary input (supply) to a rotating part, and, vice versa, allowing a moving connection to be preserved and permitting the flow of media(s), and/or medium(s) (i.e., liquid(s), solid(s), and gases, electricity supply, data, and digital signal(s)). A series of internal and external channel(s), aperture(s), area(s), seal(s), bearing(s), and valve(s) enable a Rotary Manifold to lock onto an input valve, while rotating, or spinning, to meet an outlet. In the course of this time, a desired media(s), and/or medium(s) (i.e., gases, and/or fluid(s)), flow into the Rotary Manifold from its supply and are held within the device during its rotations (movements). The gases, and/or fluid(s) exit the Rotary Manifold, when valve openings meet during rotations (movements), allowing additional gas, and/or fluid(s) to flow into, or out of, the Rotary Manifold again for the next rotation. A Rotary Manifold can be customized to increase/decrease PSI and/or RPM for an application use, as well as its channel(s), aperture(s), area(s), valve(s), as required. Often operating, and/or functioning, under high pressure and constant torque(s) (movements), a Rotary Manifold is engineered to rotate around an axis. Rotary Manifold(s) are used in a variety of industries and application(s). The primary component(s) of a Rotary Manifold comprise, but are not exclusive to, namely, a shaft (cap) assembly type(s) (i.e., the component that carries the desired media(s), and/or medium(s), from a stationary source, through the Rotary Manifold into the housing (case), and/or drum, and/or holding vessel, and/or internal area(s)), of the Rotary Manifold. The shaft (cap) may be stationary, while the housing (case) rotates. This is done with the use of ball bearing(s) assembly type(s), and/or another necessary, and/or required, suitable, and/or workable, and/or configurable, means, and/or ways, and/or material(s), and/or equipment assembly type(s), that allows the Rotary manifold shaft (cap), and, the Rotary Manifold housing (case) to assemble together, and, move, and/or remain stationary, independently of one another. The ball bearing(s), and seal(s), are typically assembled around the shaft (cap), as assembled onto, and/or with, the housing (case) assembly type(s) (i.e., the component that holds all the other elements of the Rotary Manifold together). The Rotary Manifold shaft (cap), and, housing (case) has an inlet aperture(s), that is threaded, and/or has a fixed connection(s) point(s) assembly type(s), to which a hose(s), and/or connection(s) point(s) assembly type(s), and/or valve(s) assembly type(s) and/or hook-up(s) line(s) assembly type(s), supplying a desired media(s) and/or medium(s) (such as gases, and/or fluid(s)), is attached. Depending on the application(s), a Rotary Manifold shaft (cap), and housing (case), may also have an outlet aperture(s), a ball bearing(s) assembly type(s), sealed ball bearing(s) assembly type(s), and ball bearing track(s) assembly type(s) (i.e., an important component(s) for a Rotary Manifold to successfully operate, and/or function). A Rotary Manifold can operate, and/or function, with just one bearing, however, most Rotary Manifolds carry multiple bearing(s). Roller bearings such as ball bearings, and tapered roller bearings are common; or non-roller ball bearings such as graphite, and/or bronze bushings, can be used in a Rotary Manifold. The ball bearings are always used to allow either part of the joint, the Shaft (cap), or the Housing (case) to rotate independently. A Rotary Manifold also has a seal(s) assembly type(s) (i.e., a component that is central for a Rotary Manifold to remain air-tight when operating, and/or functioning). The seal(s) prevents a desired media(s), and/or medium(s) (such as gases, and/or fluid(s)), from leaking, and/or escaping outside the Rotary Manifold while in operation. Seal(s) assembly type(s) can vary from O-ring, lip, pusher-type end face mechanical, and, non-pusher type end face mechanical seals, and/or other. Depending on the application, most Rotary Manifolds carry more than one seal. A Rotary Manifold also has, and/or uses sealing material(s), and, fastener(s) assembly type(s), and, a retaining ring assembly type(s), to remain air-tight when operating, and/or functioning. A Rotary Manifold carries specialized internal, and external, seal(s) assembly type(s), and/or joint(s) assembly type(s), and channel(s), aperture(s), and, area(s) assembly type(s), and sealing material(s) to maintain system pressure, and isolate, and insulate each media(s) type(s) path(s). A Rotary manifold is made with an Independent Shaft (cap), and Housing (case) element(s), that are assembled together with the use of a specialized sealed ball bearing(s) assembly type(s) (joint(s)), and, seal(s) assembly type(s), and, other associated component(s), part(s), mechanism(s), device(s), system(s), and/or apparatus assembly type(s), that allow(s) for continuous rotation of either component, and, a simultaneous reliable transit(s), and/or transfer(s) of a desired media(s), and/or medium(s) from a stationary source to a rotating part, and, vice versa. A Rotary Manifold can integrate multiple independent flow channel(s) (passage(s)), and/or aperture(s), and/or area(s) (internal, and/or external, isolated, and/or insulated), for the simultaneously reliable, sealing, and transfer(s), of different type(s) of media(s), and/or medium(s) (such as fluid(s), solid(s), gases, electricity supply, data, and digital signal(s)), from a stationary source(s), to a rotating part(s), and, vice versa (unbroken, and/or unimpeded), when the Rotary Manifold is combined with a Rotary Manifold Slip-Ring Wiring Harness assembly type(s).

The Rotary Manifold Slip-Ring Wiring Harness assembly type(s) (i.e., electrical, and/or digital, joint(s)), in combination with a Rotary Manifold assembly type(s), can simultaneously reliably, transit, and/or transfer, gases, fluid(s), electricity supply, data, and digital signal(s), and, other media(s), and/or medium(s), from a stationary source(s), to a rotating part(s), and vice versa (unbroken, and/or unimpeded). The Rotary Manifold Slip-Ring Wiring Harness can provide continuous and/or intermittent rotation while transmitting electricity supply, data, and digital signal(s), for the purpose of simplifying operation, improving application performance, and eliminating risk of damage to wiring between movable part(s). Typically, a Slip-Ring Wiring Harness consists of a stationary graphite, or metal contact brush, and/or brushes that rub on the outside diameter of a rotating metal ring. As the metal ring turns, the electric current or digital signal is conducted through the stationary brush to the metal ring making a connection. Stacked, and/or additional ring/brush assemblies are added along the rotating axis, and/or another necessary, and/or required, suitable, and/or workable, and/or configurable means, and/or ways, and/or material(s), and/or element(s), and/or equipment assembly type(s) if more than one electrical, and/or digital, and/or other connection assembly type(s) is required. Either the brushes, or the rings are stationary, and the other component rotates. A Wireless Slip-Ring Wiring Harness (i.e., permanent magnet(s), or magnet(s) assembly type(s)) transfer electrical power and data wirelessly via a magnetic field which is created by metal coils placed in the rotating receiver, and the stationary transmitter. A Slip Ring Wiring Harness is used with a Rotary Manifold to function concurrently with the device, commonly referred to as a rotary joint. Slip Rings operate, and/or function, the same for electrical supply, data, and digital signals, as Rotary Manifolds for gases, and/or fluid(s). A Slip Ring Wiring Harness assembly type(s) is often integrated into a Rotary Manifold to transit and/or transfer a desired media(s), and/or medium(s) (i.e., electrical power and/or digital data) from a stationary source(s) to a rotating part(s), and vice versa, in conjunction with other media(s) and/or medium(s) (i.e., gases, and/or fluids), that the Rotary Manifold assembly type(s) provides.

A Vehicle Junction Boxes and Hook-up(s) Point(s) assembly type(s) is a stationary, and/or fixed, and/or rotating, and/or moving, and/or spinning, and/or turning, terminal, that carries specialized internal, and, external, passage(s), channel(s), aperture(s), area(s), wire(s), valve(s), joint(s), socket(s), sensor(s), circuit(s), seal(s), sealing material(s), fastener(s), hose(s), pipe(s) assembly type(s) (isolated, and/or insulated), and/or another necessary, and/or required, suitable, and/or workable, and/or configurable, means, and/or ways, and/or material(s), and/or equipment assembly type(s), used to simultaneously reliably, transit, and/or transfer, and/or connect (unbroken, and/or unimpeded), a desired multiple media(s) and/or medium(s) type(s), when hooked-up with an associated stationary, fixed, moving, rotating, spinning, and/or turning, component(s), part(s), mechanism(s), device(s), system(s), and/or apparatus assembly type(s), of, for, from, into, thru, out of, and/or between, and/or associated with, a corresponding adjoined, and/or adjoining, vehicle wheel assembly type(s) (i.e., a moving part), and, a corresponding adjoined vehicle assembly type(s) (i.e., a stationary source), when in motion, and/or stationary.

A Vehicle Junction Boxes and Hook-up(s) Point(s) assembly type(s) acts as a "bridge" (when assembled together with a Rotary Manifold assembly type(s) (piece(s)), and/or a Rotary Manifold Slip-Ring Wiring Harness assembly type(s), and other component(s), part(s), mechanism(s), device(s), system(s), and/or apparatus assembly type(s) (i.e., comprising, but, not exclusive to, namely; hose(s), tube(s), valve(s), seal(s), sealing material(s), fasteners, wire(s), cabling, transmission line(s), and/or other)), of, for, from, into, thru, out of, and/or between, and/or associated with, a corresponding adjoined vehicle assembly type(s), and, such a corresponding adjoined, and/or adjoining, vehicle wheel assembly type(s), when in motion, and/or stationary.

A Vehicle Junction Boxes and Hook-up(s) Point(s) assembly type(s), simultaneously reliably, connect(s), protect(s), and maintain(s) system pressure (for compressed air, and/or other gases, and/or fluid(s)), and/or electricity supply, data, and, digital signal(s), when assembled together with a Rotary Manifold assembly type(s) (piece(s)), and/or a Rotary Manifold Slip-Ring Wiring Harness assembly type(s), and, an automated vehicle Central Tire Inflation System (CTIS) assembly type(s), and, other component(s), part(s), mechanism(s) device(s), system(s), and/or apparatus assembly type(s), within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

An automated vehicle Central Tire Inflation System (CTIS) assembly type(s), is a system made of a compilation of component(s), part(s), mechanism(s), device(s), system(s), and apparatus assembly type(s) (i.e., comprising, but, not exclusive to, namely; an air compressor, a power source, hose(s), wiring, valve(s), tube(s), joint(s), fastener(s), seal(s), sealing materials assembly type(s), a pressure rated holding vessel(s), an air heater, an air dryer, an air pressure regulator, actuator(s), sensor(s), circuit(s), a CPU, and/or computer, an operating software assembly type(s), and, other associated component(s), part(s), mechanism(s), device(s), system(s), and/or apparatus, and/or equipment assembly type(s) (depending on the specific application), for the purpose of, providing a vehicles' physical operator(s), and/or another necessary, and/or required, suitable, and/or workable, and/or configurable, operating means, and/or ways, and/or material(s) and/or equipment assembly type(s), control, monitoring, replenishing, depleting, and/or other management operation(s), function(s), purpose(s), and/or task(s), relating to air pressure (PSI pounds-per-square inch) in each pneumatic tire(s) assembly type(s), that is mounted, and/or attached and/or hooked-up, onto and/or with, such a vehicle wheel assembly type(s), and, a corresponding adjoined vehicle assembly type(s), when in motion, and/or stationary.

An automated vehicle Central Tire Inflation System (CTIS) assembly type(s) is used to maintain air pressure (PSI) in the attached pneumatic tire(s) chambers assembly type(s) as needed (i.e., by physical manual selection of control(s) prompts), and/or automatically, based on a pre-programmed pneumatic tire specification(s) that is established by a vehicles' physical operator(s) choice(s), and/or a pneumatic tire(s) manufacturer(s) recommendation(s), and/or a vehicle manufacturer(s) operating recommendation(s), and/or governing regulation(s), and/or homologation(s), and/or associated machinery assembly type(s), enhancing safety, operating performance, and, ameliorating carbon emission(s) (C02 output), for, and/or from, a vehicle using such an automated vehicle Central Tire Inflation System(s) (CTIS) assembly type(s).

A benefit of using such an automated vehicle Central Tire Inflation System(s) (CTIS) assembly type(s) includes; greater vehicle control over a variety of surface(s) traveled on by raising, and/or lowering, pneumatic tire chamber pressure (pounds per square inch (PSI)), to alter contact surface of an attached pneumatic tire assembly type(s) tread, or track (i.e., the rubber on its circumference that makes contact with the road, or ground), and, reduction of dust particulates, and muddy sediment(s), when used on unpaved, uneven, and uncharted, gravel, dirt, or agriculture terrain. When applied to paved, or overlaid, surface(s) such an automated vehicle Central Tire Inflation Systems (CTIS) assembly type(s) provide greater fuel economy for a vehicle, by maintaining the correct operating air pressure (PSI), for the attached corresponding pneumatic tire(s) chamber(s) assembly type(s), leading to less fuel, and/or electricity consumption per distance traveled (i.e., naturally aspirated, or electricity motor(s)).

Other obvious benefits include; less wear, and tear, on a vehicles' component(s), part(s), mechanism(s), device(s), system(s), and/or apparatus assembly type(s), and, the vehicles' pneumatic tire(s) tread(s), and, the lowering of carbon emission(s) (Carbon Dioxide C02) output for the vehicle, when attached onto, and/or with, such an automated vehicle Central Tire Inflation System (CTIS) assembly type(s), by maintaining the correct operating air pressure (PSI), for each attached pneumatic tire assembly type(s), providing greater fuel economy when operating a naturally aspirated motor, and/or using less electricity when operating an electrified motor (assuming a carbon output of electricity produced by fossil fuels).

Present-Day Usage

Rotary Manifold(s) assembly type(s), in combination with a Central Tire Inflation System (CTIS) assembly type(s), have been deployed for industrial trucking, military, recreational off-road and other purposeful and specialty vehicles. Various types of these inflation systems have been developed and many are registered through the USPTO and WIPO.

Combination(s) of a Rotary Manifold assembly type(s), and, a Central Tire Inflation System (CTIS) assembly type(s), allow(s) a vehicle operator(s), to control the air pressure (Pounds-per-Square Inch (PSI) + and/or −) of the pneumatic tire(s) that are attached onto the wheels of a vehicle, improving safety, performance, and environmental impact, of the vehicle.

Some of these combined Rotary Manifold assembly type(s), and, Central Tire Inflation Systems (CTIS) assembly type(s), are configured to automatically transfer pressurized air into, or out of, pneumatic tire(s) when so desired, while the vehicle is in motion, while other such system(s) assembly type(s), require the vehicles' physical operator(s) to stop the vehicle, install separate air hose(s) onto the tire valve stem(s) of each vehicle wheel and then start an on-board air compressor system to achieve the same result.

But, the combined Rotary Manifold assembly type(s), and, Central Tire Inflation Systems (CTIS) assembly type(s) that are currently available, suffer from various flaws. A vehicle axels, hubs, wheels, and many other vehicle systems must be extensively modified to accommodate this conventional Rotary Manifold and Central Tire Inflation System (CTIS) assembly type(s) technology. With current combination(s) of Rotary Manifolds and Central Tire Inflation Systems (CTIS) assembly type(s), the aesthetic of the vehicle wheel is greatly diminished, due to the connection point(s) from the vehicle (supply source) into various outwardly mounted, wheel hub Rotary Manifold assemblies, and/or other operational and functional challenges with wheel hub, and/or axel mounted Rotary Manifold assembly type(s) that emerge problematic, to name a few. For most commercial, military and specialty use vehicles, using these combined Rotary Manifold and Central Tire Inflation Systems (CTIS) assembly type(s), these flaws are secondary to their implementation for now.

Novel Method

However, manufacturers, wholesalers, retailers, commercial, and private users of vehicle assembly type(s), having, and/or holding, and/or carrying, present-day vehicle wheel(s), and pneumatic tire(s) assembly type(s), would hail the combination of a conforming, seamlessly designed, enhanced safety, environment ameliorating, performance oriented, aesthetically pleasing, technology driven, Vehicle Wheel assembly type(s), having, and/or holding, and/or carrying, and/or operating, and/or functioning, and/or integrating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s), and/or protrusion(s), and/or protective housing case(s) assembly type(s) (piece(s)), and/or contour protective housing case(s) assembly type(s) (piece(s)) (i.e., "Exoskeleton" assemblage(s)), within, in, into, on, onto, beneath, between, surrounding, thru, and/or throughout, and/or associated with, the body (architecture) of such a corresponding adjoined, and/or adjoining, vehicle wheel assembly type(s), for the purpose of, embedding, and/or slotting, and/or placing, and/or orienting, and/or aligning, and/or assembling, and/or compacting, and/or packaging, and/or protecting, and/or isolating, and/or insulating, and/or using, and/or interacting, and/or integrating, and/or anchoring, and/or mooring, and/or securing (fixed) in-place, and/or hooking-up, a specifically, and/or strategically, engineered, designed, fabricated, fashioned, or formed, in-built, inherent, attached, and/or attachable, corresponding adjoined, and/or adjoining (air-tight (sealed), and/or other, ring-shaped (annular), and/or other, flush mounting, and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) Ring-Shaped (Annular) Rotary Manifold assembly type(s) (piece(s)), Ring-Shaped (Annular) Rotary Manifold Slip-Ring Wiring Harness assembly type(s), and/or other Wiring Harness assembly type(s), Vehicle Junction Boxes, and, Hook-Up(s) Point(s) assembly type(s), automated vehicle Central Tire Inflation System (CTIS) assembly type(s), Vehicle Computer(s) assembly type(s), Software(s) assembly type(s), Operating Program(s) assembly type(s), Vehicle Satellite Antennae system(s) assembly type(s), Vehicle Control(s) system(s) assembly type(s), Magnetic Inductive Electricity Charging, Navigation, Communication(s), Connection Point(s), Hook-up Point(s), and, Transmission(s) assemblage(s), Magnetic Generator(s) assemblage(s), Magnetic Motor(s) assemblage(s), Permanent Magnet(s) Inductive/Conductive assemblage(s), On-Board Diagnostic(s) (OBD) assemblage(s), Lighting, Illumination, and/or LED (Light Emitting Diode(s)) assemblage(s), Wireless Communication(s) (Wi-Fi, NFC, and, other(s)), Radar assemblage(s), Sonar assemblage(s), Camera/Video assemblage(s), Heating/Cooling assemblage(s), Controllable Multi-Chamber(s)/Multi-Functional Pneumatic Tire(s) assemblage(s) and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, such a corresponding adjoined, and/or adjoining pneumatic tire(s) assembly type(s) and, a corresponding adjoined vehicle assembly type(s), and, associated component(s), part(s), mechanism(s), device(s), system(s), and/or apparatus assembly type(s), that when assembled together, and/or hooked-up, and/or connected, and/or interacting, simultaneously reliably, enable, and/or facilitate, and/or supply, and/or receive, and/or generate, and/or control, and/or manage, and/or record, and/or transmit, and/or receive, and/or transit, and/or transfer, and/or store, and/or use, and/or interact, and/or integrate, and/or measure, and/or diagnose, and/or communicate, and/or work, and/or operate, and/or function, and/or hook-up, a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), Automatically (by way of, and/or with the use of, an associated computer(s), software(s), and/or operating system(s)), and/or Manually (by way of, and/or with the use of, a physical operator(s) selection(s) of associated control(s) and, prompt(s), and, an associated computer(s), software(s), and, operating system(s)), and/or Autonomously (wirelessly), and/or Remotely (automatically, by way of, and/or with the use of, an associated computer(s), software(s), and, operating system(s), and associated satellite system(s), spectrum(s), band-width(s) and antennae, and/or by a physical operator(s) selection(s) of associated control(s) and prompt(s)), when in motion, and/or stationary.

Present-Day Vehicle Wheel Design Element(s), and Pneumatic Tire Construction

Rim: The rim is the "outer edges of a vehicle wheel, holding the pneumatic tire wall in place". It makes up the outer circular design of a vehicle wheel of which the inside portion of an attached pneumatic tire faces, and/or is mounted, onto a corresponding adjoined vehicle axel hub assembly. The outside portion of a vehicle wheel is the side that is exposed when mounted onto a corresponding adjoined vehicle axel hub assembly, and, the outside portion of a vehicle wheel rim carries an aperture supporting an air-tight (sealed) compressed air entry passage (air valve and access stem most commonly made up of rubber and metal) that is used to inflate, and/or deplete, air, of an attached pneumatic tire chamber assembly type(s) (if so desired, and/or necessary, and/or required).

Hub: The hub is the center of a vehicle wheel and, generally carries an aperture at its center point. Pressed steel, metal alloy(s), and/or carbon fiber material(s) vehicle wheels are generally, engineered, designed, fabricated, fashioned, and/or formed, with a bolting pattern placed around the center of a vehicle wheel hub (i.e., attachment hole(s) to secure a vehicle wheel onto a corresponding axel hub assembly bolt pattern(s), of a corresponding adjoined vehicle), allowing for easy mounting of a vehicle wheel onto a corresponding bolt pattern of a corresponding adjoined vehicle axel hub assembly type(s).

Spokes: A spoke is one of some number of rods radiating from the center portion of a vehicle wheel (i.e., the hub where the axel connects), connecting the hub with the round traction surface (the rim) of a vehicle wheel. Today's vehicle wheels carry a vast array of spoke designs that are forged, machine milled, water milled and/or other fashion. Alternatively, today's vehicle wheel center(s) (core) are made of modern alloy(s), and/or other substance(s), and, have many design pattern(s), other than the traditional spoke pattern(s). Nevertheless, all these design pattern(s), maintain the same technical purpose as spokes, that is, to reinforce a vehicle wheel rim, as attached to the center hub portion(s) of a vehicle wheel, while maintaining the integrity of the vehicle wheels' circular shape.

Pneumatic Tire: The pneumatic tire is a ring-shaped covering that fits around the rim of a vehicle wheel to protect it, and enable better vehicle performance (ride, safety, energy efficiency), by providing a flexible cushion that absorbs shock while keeping the vehicle wheel in close contact with the ground. Today's vast majority of tires are pneumatic (inflatable structures), comprising a doughnut-shaped body of cords, and wires (made of metal(s), synthetic(s), and/or carbon fiber(s)) encased in rubber, and/or rubber compound(s), and generally filled with compressed air, and/or other gases to form an inflatable cushion. Pneumatic tires are used on many type(s) of vehicle wheels.

Valve stem: A pneumatic tire valve stem is a self-contained valve which opens to admit, and/or evacuate, a gaseous media into, and/or out of, an air-tight chamber (such as compressed air, and/or other gases (+ and/or −), used to inflate a pneumatic tire), and, is then automatically closed, and kept sealed, by the pressure in the air-tight (sealed) pneumatic tire chamber, or by an integrated spring mechanism, or both, to prevent a gaseous media from escaping. The valve relief pin (located within the center portion of most common pneumatic tire valve stems) also acts as a manual evacuate mechanism allowing the compressed air, and/or other gases, to escape when necessary, or if so desired. Some pneumatic tire valve stems have an attached Tire Pressure Monitor System (TPMS) sensor making their mounting position into the aperture(s) of a vehicle wheel rim problematic over time. This is due, for example, to the various torques and forces (use dynamics) acting on a pneumatic tire valve stem from an improperly inflated pneumatic tire and/or improperly installed valve stem. If the pneumatic tire valve stem and attached (TPMS) sensor is incorrectly mounted onto, and/or within, a vehicle wheel rim wall, over time, it could cause pneumatic tire valve stem deformation, and/or dislocation, in and/or around the valve stem, leading to an increased risk of a constant pneumatic tire deflation, and possibly a catastrophic event. Today's pneumatic tire valve stems are commonly located on the outside rim portion of a vehicle wheel (the outside portion(s), and/or area(s) of a vehicle wheel that is visible when mounted onto a corresponding axel hub assembly of a corresponding adjoined vehicle assembly type(s).

1. In its most preferred embodiment, such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, vehicle wheel assembly type(s), is made of, a circular block of hard and durable material (i.e., metal(s), and/or metal(s) alloy(s), and/or composite(s), and/or element(s), and/or material(s), and/or graphene(s), and/or another necessary, and/or required, suitable, and/or workable, and/or configurable, element(s), and/or material(s), and/or means, and/or ways, and/or equipment assembly type(s)), at whose center has bored flush mounting circular hole(s), through which is placed an axel bearing about which the vehicle wheel rotates when a moment is applied by gravity, or torque(s) (movement(s)), to the vehicle wheel about its axis, when such a corresponding adjoined, and/or adjoining, vehicle wheel assembly type(s), is secured (fixed) in-place, vertically (with the use, of corresponding adjoined, and/or adjoining, flush mounting fastener(s) assembly type(s), and/or bolt(s) assembly type(s)), under a load-bearing platform(s) assembly type(s) (i.e., a corresponding adjoined vehicle assembly type(s)). Such a corresponding adjoined, and/or adjoining vehicle wheel assembly type(s) turning on a horizontal axel of a corresponding adjoined vehicle assembly type(s) makes it possible to transport loads, and/or passengers, humans, or creatures. The body (architecture) of such a corresponding adjoined, and/or adjoining, vehicle wheel assembly type(s), is configured as a single piece, and/or two-piece, and/or three-piece, and/or multiple-piece(s) construction and/or another necessary, and/or required, suitable, and/or workable, and/or configurable, means, and/or ways, depending on the application, and/or use(s), and/or platform(s) assembly type(s) of a corresponding adjoined vehicle assembly type(s), and, comprise(s), but, not exclusive to, namely; a Rim, Hub, and Spoke(s), and/or Center, and, specific, and/or strategic, Channel(s), Aperture(s), and/or Area(s), and/or Protrusion(s) assembly type(s), and/or Protective Housing Case(s) (piece(s)) assembly type(s), and/or Contour Protective Housing Case(s) (piece(s)) Assembly type(s) (i.e., "Exoskeleton" assemblage(s)) (architectural element(s)), for the purpose of, structural integrity, and/or rigidity, and/or assembly, and, for the purpose of, true dimension(s), and, for the purpose of, attaching, and/or holding, and/or supporting, and/or operating, and/or functioning, and/or controlling, and/or using, and/or connecting, and/or hooking-up, such a corresponding adjoined, and/or adjoining vehicle wheel assembly type(s), and, a corresponding attached pneumatic tire chamber assembly type(s), and, other necessary, and/or required, suitable, and/or workable, and/or configurable, associated component(s), part(s), mechanism(s), device(s), system(s), apparatus, and/or equipment assembly type(s), and/or operation(s), and/or function(s), and/or purpose(s), and/or task(s) (unbroken, and/or unimpeded), automatically, and/or manually, and/or autonomously (wirelessly), and/or remotely, when such a corresponding adjoined, and/or adjoining, vehicle wheel assembly type(s), is mounted, and/or attached, and/or hooked-up, onto, and/or with, a corresponding adjoined vehicle assembly type(s), and, when in motion, and/or stationary.

2. In its most preferred embodiment, such a corresponding adjoined, and/or adjoining, vehicle wheel assembly type(s), has, and/or is holding, and/or carrying, and/or operating, and/or functioning, and/or integrating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), within, in, into, on, onto, beneath, between, surrounding, thru, and/or throughout, the body (architecture) of such a corresponding adjoined, and/or adjoining, vehicle wheel assembly type(s), for the purpose of, embedding, and/or slotting, and/or holding, and/or compacting, and/or packaging, and/or positioning, and/or orienting, and/or aligning, and/or assembling, and/or integrating, and/or amalgamating, and/or securing (fixed) in-place, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), comprising, but, not exclusive to, namely; a stationary, and/or fixed, and/or moving, and/or rotating, and/or spinning, and/or turning (fixed) ring-shaped (annular) rotary manifold housing (case) assembly type(s) (piece), and, a stationary, and/or fixed, and/or moving, and/or rotating, and/or spinning, and/or turning ring-shaped (annular) rotary manifold shaft (cap) assembly type(s) (piece), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that, when assembled together, are embedded, and/or slotted, and/or held, and/or compacted, and/or packaged, and/or positioned, and/or oriented, and/or aligned, and/or integrated, and/or amalgamated, and/or secured (fixed) in-place, and/or hooked-up, with, and/or within, in, into, on, onto, beneath, between, surrounding, thru, and/or throughout, such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), of the body (architecture) of such a corresponding adjoined, and/or adjoining vehicle wheel assembly type(s), for the purpose of, simultaneously reliably, sending (transmitting), and/or receiving, and/or supplying, and/or enabling, and/or facilitating, and/or implementing, and/or generating, and/or using, and/or storing, and/or transiting, and/or transferring, and/or interacting, and/or integrating, and/or communicating, and/or recording, and/or controlling, and/or managing, and/or monitoring, and/or working, and/or operating, and/or functioning, and/or hooking-up, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s) and/or fluid(s), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary, and, for the purpose of, eliminating, and/or removing, and/or excluding, the outward rim mounted pneumatic tire valve stem(s) assembly type(s), and, the corresponding adjoined, and/or adjoining, valve stem(s) aperture(s) assembly type(s), and/or valve stem(s) mounting hole(s) assembly type(s), from the body (architecture) of such a corresponding adjoined, and/or adjoining, vehicle wheel assembly type(s) (if so desired, and/or necessary, and/or required), getting rid of the potential dangerous issue(s) pertaining to their use (i.e., causing a corresponding attached pneumatic tire(s) chamber(s) assembly type(s), to leak overtime to an underinflated, and/or unsafe, operating condition(s)), and, for the purpose of, an aesthetic, and/or streamline, and/or architectural appearance(s), of such a corresponding adjoined, and/or adjoining vehicle wheel assembly type(s), and, for the purpose of, enhancing safety, and increasing fuel performance, and tire performance, and, reducing carbon emission(s) (Carbon Dioxide (C02)), for a corresponding adjoined vehicle assembly type(s), by maintaining a constant, and/or safe, and/or recommended, and/or measured, tire pressure "Pound(s) per Square Inch" (PSI), for an attached pneumatic tire(s) chamber(s) assembly type(s), automatically, and/or manually, and/or autonomously (wirelessly), and/or remotely, when in motion, and/or stationary.

3. In its most preferred embodiment, such a corresponding adjoined, and/or adjoining, vehicle wheel assembly type(s), has, and/or is holding, and/or carrying, and/or operating, and/or functioning, and/or integrating, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), for the purpose of, slotting, and/or embedding, and/or positioning, and/or orientating, and/or aligning, and/or compacting, and/or packaging, and/or protecting, and/or securing (fixed) in-place, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold housing (case) assembly type(s) (piece), that has, and/or is holding, and/or carrying, and/or integrating, and/or working, and/or interacting, and/or operating, and/or functioning, and/or hooking-up, with a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold shaft (cap) assembly type(s) (piece), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), by way of, and/or with the use of, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) joint(s) assembly type(s) (i.e., those having, and/or holding, and/or carrying, and/or operating, and/or functioning, and/or integrating, and/or interacting, and/or working, and/or hooking-up, sealed ball bearing(s) assembly type(s), and/or ball bearing(s) assembly type(s), and/or ball bearing(s) track(s) assembly type(s). These Ball bearing(s) assembly type(s), are used primarily in machinery having, and/or using shaft(s), and/or track(s) requiring support for low friction rotation(s). Several configurations exist, most notably shielded, and/or sealed bearing(s) assembly type(s). These Ball bearing(s) assembly type(s), are also known as rolling element bearing(s) assembly type(s), and/or anti-friction bearing(s) assembly type(s)), allowing for high-speed(s), and/or continuous rotation(s), and/or a motionless state (without moving), of each corresponding adjoined, and/or adjoining, ring-shaped (annular) rotary manifold assembly type(s) (piece(s)), and, a corresponding adjoined, and/or adjoining, ring-shaped (annular) rotary manifold slip-ring wiring harness assembly type(s), and, other associated component(s), part(s), mechanism(s), device(s), system(s), and/or apparatus assembly type(s) as assembled, and/or hooked-up, and/or when in use. These specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) joint(s) assembly type(s) (i.e., also referred to as a rotary union assembly type(s), swivel joint(s) assembly type(s), rotating joint(s) assembly type(s), or rotating coupling(s) assembly type(s)), are, for the purpose of, facilitating, and/or enabling, the corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s) (i.e., as assembled together with other associated component(s), part(s), mechanism(s), device(s), system(s), and/or apparatus assembly type(s)), to simultaneously reliably seal, transit, and/or transfer, a desired media(s), and/or medium(s), such as compressed air, and/or other gases, electricity supply, data, and/or digital signal(s), and/or fluid(s), and, other media(s), and/or medium(s) (unbroken and/or unimpeded), from a stationary source(s), to a rotating part(s), and vice versa (i.e., of, for, from, into, thru, out of, and/or between, and/or associated with, a corresponding adjoined vehicle assembly type(s), and, such a corresponding adjoined, and/or adjoining, vehicle wheel assembly type(s), and, a corresponding attached pneumatic tire(s) chamber(s) assembly type(s)), preserving, and isolating, the connection(s), when in motion, and/or stationary.

Such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s) (i.e., as assembled together), simultaneously reliably seal, transit, and transfer, a desired media(s), and/or medium(s), such as fluid(s), solid(s), gases, electricity supply, data, and digital signal(s), and/or other media(s), and/or medium(s), of, for, from, into, thru, out of, and/or between, a corresponding adjoined vehicle assembly type(s), and, such a corresponding adjoined, and/or adjoining, vehicle wheel assembly type(s), under pressure(s) or vacuum(s), preserving, and isolating, the connection(s), by way of, and/or with the use of, integrated multiple independent flow channel(s), and/or aperture(s), and/or area(s) assembly type(s) (passage(s), hole(s), and/or place(s)). Such a corresponding adjoined, and/or adjoining, ring-shaped (annular) rotary manifold slip-ring wiring harness assembly type(s), can provide continuous, and/or intermittent, rotation(s), while transmitting electricity supply, data, and digital signal(s), for the purpose of, simplifying operation, improving application performance, and eliminating risk of damage to wiring, and/or transmission line(s) between movable part(s). The primary component(s) of such a corresponding adjoined, and/or adjoining, (fixed) ring-shaped (annular) rotary manifold assembly type(s) (piece(s)) comprise, but, are not exclusive to, namely; a shaft (shaft cap) assembly type(s) (piece), a housing (housing case) assembly type(s) (piece), ball bearing(s) assembly type(s), joint(s) assembly type(s), ball bearing track(s) assembly type(s), seal(s) assembly type(s), sealing material(s), hose(s) assembly type(s), tube(s) assembly type(s), hook-up(s) assembly type(s), fastener(s) assembly type(s), and, a retaining ring assembly type(s), sensor(s) assembly type(s), circuit(s) assembly type(s), wiring assembly type(s), actuator(s) assembly type(s) and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or equipment assembly type(s), of, for, from, into, thru, out of, and/or between, and/or associated with, such a corresponding adjoined, and/or adjoining, vehicle wheel assembly type(s), and, a corresponding adjoined vehicle assembly type(s), that are assembled, and/or put together, by way of, and/or with the use of, a corresponding adjoined, and/or adjoining, fastener(s) assembly type(s), and/or seal(s) assembly type(s), and/or sealing material(s) (i.e., ring-shaped (annular), and/or other, flush mounting, and/or other, air-tight (sealed), and/or other), for the purpose of assembly, and, proximity, and, hooking-up such corresponding adjoined, and/or adjoining, assemblage(s), and, for the purpose of, simultaneously reliably, sending (transmitting), and/or accepting (receiving), and/or applying (implementing), and/or facilitating, and/or generating, and/or using, and/or storing, and/or transiting, and/or transferring, and/or transmitting, and/or receiving, and/or interacting, and/or integrating, and/or communicating, and/or recording, and/or controlling, and/or managing, and/or monitoring, and/or working, and/or operating, and/or functioning, and/or hooking-up, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

4. In its most preferred embodiment, such a corresponding adjoined, and/or adjoining, vehicle wheel assembly type(s), has, and/or is holding, and/or carrying, and/or operating, and/or functioning, and/or integrating, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), that have, and/or are holding, and/or carrying, and/or operating, and/or functioning, and/or working, and/or integrating, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, protective housing casing(s) wall(s) assembly type(s), and/or protective cover(s) assembly type(s), and/or protective housing case(s) assembly type(s) (i.e., spline formed (gear tooth shape(s)) assembly type(s), and/or notched shaped form(s) assembly type(s), and/or smooth form(s) assembly type(s), and/or cog shaped form(s) assembly type(s)), and/or another necessary, and/or required, suitable, and/or workable, and/or configurable, shape(s), and/or form(s) assembly type(s), that has, and/or is holding, and/or carrying, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) protrusion(s) assembly type(s), and/or flange(s) assembly type(s), and/or joint(s) assembly type(s) (with, and/or without a corresponding adjoined, and/or adjoining, aperture(s) assembly type(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) docking, and/or securing, and/or locking, and/or anchoring, and/or bracing, and/or linking, connecting, and/or anchoring, and/or mooring, component(s), part(s), mechanism(s), device(s), system(s), and/or apparatus assembly type(s), comprising, but, not exclusive to, namely; a sealing plug(s) assembly type(s), bolt-on clip(s) assembly type(s), and/or latch assembly type(s), and/or ball-lock mounting assembly type(s), and/or fastener(s) assembly type(s), and/or bolt(s) assembly type(s), and/or screw(s) assembly type(s), and, sealing material(s) (i.e., rubber, and/or synthetic assembly type(s) and/or other sealing compound(s)), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable means, and/or ways, and/or material(s), and/or equipment assembly type(s), for the purpose of, allowing, and/or permitting, and/or enabling, and/or facilitating, such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), to remain locked in-place, and/or shielded in-place, and/or protected in-place, and/or secured (fixed) in-place, as assembled, and/or hooked-up together, when inserted, and/or slotted, and/or embedded, and/or compacted, and/or packaged, and/or positioned, and/or oriented, and/or aligned, and/or hooked-up, with, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), of the body (architecture) of such a corresponding adjoined, and/or adjoining, vehicle wheel assembly type(s) (accordingly, such a corresponding adjoined, and/or adjoining, channel(s) assembly type(s), and/or aperture(s) assembly type(s), and/or area(s) assembly type(s), with, within, in, into, on, onto, beneath, between, surrounding, thru, throughout, and/or associated with, the body (architecture) of such a corresponding adjoined, and/or adjoining, vehicle wheel assembly type(s), has, and/or is made, with matching, and/or corresponding, inbound annular, and/or outbound annular, wall(s), and/or surface(s), and/or (shape(s), and/or form(s)), and/or another necessary, and/or required, suitable, and/or workable, and/or configurable, matching channel(s) assembly type(s), and/or aperture(s) assembly type(s), and/or area(s) assembly type(s), that coordinate, and/or integrate, and/or amalgamate, with such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s) (casing(s), and/or protrusion(s), and/or flange(s), and/or joint(s) assembly type(s)).

5. In its most preferred alternative embodiment, such a corresponding adjoined, and/or adjoining, vehicle wheel assembly type(s), has, and/or is holding, and/or carrying, and/or operating, and/or functioning, and/or working, and/or integrating, and/or interacting, and/or amalgamating, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), shaped, and/or smooth, and/or measured, and/or dimensional, channel(s) assembly type(s), and/or aperture(s) assembly type(s), and/or area(s) assembly type(s), for the purpose of, interlocking, and/or joining, and/or assembling with a corresponding adjoined, and/or adjoining, ring-shaped (annular) rotary manifold housing (case) assembly type(s) (piece), that has, and/or is holding, and/or carrying, and/or operating, and/or functioning, and/or working, and/or amalgamating, and/or hooking-up, identical, corresponding adjoined, and/or adjoining shape(s), and/or measurement(s), and/or dimension(s) (i.e., inner, and/or outer, annular wall(s), and/or protrusion(s), and/or flange(s), and/or joint(s) assembly type(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that have, and/or hold, and/or carry, identical corresponding adjoined, and/or adjoining, shape(s) assembly type(s), and/or measurement(s) assembly type(s), and/or dimension(s) assembly type(s), and/or another necessary, and/or required, suitable, and/or workable, and/or configurable, location(s), and/or channel(s), and/or aperture(s), and/or area(s) assembly type(s), of the corresponding adjoined, and/or adjoining, ring-shaped (annular) rotary manifold housing (case) assembly type(s) (piece), for the purpose of, preventing dangerous, and/or unwanted, oscillation(s), and/or vibration(s), and/or slippage(s), and/or jolt(s), and/or movement(s), and/or wobbling(s), of such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold housing (case) assembly type(s) (piece), and, a ring-shaped (annular) rotary manifold shaft (cap) assembly type(s) (piece), and, a ring-shaped (annular) rotary manifold slip-ring wiring harness assembly type(s) (i.e., as assembled together), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s) (i.e., as assembled with, within, in, into, on, onto, beneath, between, surrounding, thru, and/or throughout, such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), and, a corresponding adjoined, and/or adjoining, vehicle junction boxes and hook-up(s) point(s) assembly type(s)), when, such a corresponding adjoined, and/or adjoining, vehicle wheel assembly type(s), is mounted, and/or attached, and/or hooked-up, onto, and/or with, a corresponding adjoined vehicle assembly type(s), and, when torque(s) (movement(s)) are applied, and/or when in motion, and/or stationary, and, for the purpose of, embedding, and/or slotting, and/or positioning, and/or orienting, and/or aligning, and/or compacting, and/or packaging, and/or securing (fixed) in-place, and/or hooking-up, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold housing (case) assembly type(s) (piece), and, a ring-shaped (annular) rotary manifold shaft (cap) assembly type(s) (piece), and, a ring-shaped (annular) rotary manifold slip-ring wiring harness assembly type(s), and, a corresponding adjoined, and/or adjoining, vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, the body of such a corresponding adjoined, and/or adjoining, vehicle wheel assembly type(s), and, a corresponding adjoined vehicle assembly type(s), when in motion, and/or stationary.

Such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), are assembled together, with other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that are positioned, and/or orientated, and/or aligned, and/or embedded, and/or compacted, and/or packaged, and/or secured (fixed) in-place, and/or hooked-up, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), within, in, into, on, onto, beneath, between, surrounding, thru, and/or throughout, the body (architecture) of such a corresponding adjoined, and/or adjoining, vehicle wheel assembly type(s), for the purpose of, protection, and/or shielding, and/or assembling, and/or hooking-up, such corresponding adjoined, and/or adjoining, assemblage(s), and, for the purpose of, simultaneously reliably, sending (transmitting), and/or receiving, and/or supplying, and/or enabling, and/or facilitating, and/or implementing, and/or generating, and/or using, and/or storing, and/or transiting, and/or transferring, and/or interacting, and/or integrating, and/or communicating, and/or recording, and/or controlling, and/or managing, and/or monitoring, and/or working, and/or operating, and/or functioning, and/or hooking-up, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s) and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

Such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), encircle(s) the center hub hole (aperture), and/or core portion(s), and/or center area(s), and, attachment bolt hole(s), of such a corresponding adjoined, and/or adjoining vehicle wheel assembly type(s) (i.e., inside, and/or backside, portion(s), and/or area(s), and/or the side of such a corresponding adjoined, and/or adjoining, vehicle wheel assembly type(s), that is facing a corresponding adjoined vehicle assembly type(s) wheel hub(s) assembly type(s), and, associated mounting bolt(s) assembly type(s), and/or locking threaded aperture(s) assembly type(s), when such a corresponding adjoined, and/or adjoining vehicle wheel assembly type(s) is mounted, and/or attached, and/or hooked-up, onto, and/or with, a corresponding adjoined vehicle assembly type(s)), and/or another necessary, and/or required, suitable, and/or workable, and/or configurable, placement(s), and/or area(s), and/or means, and/or ways, and/or material(s), and/or equipment assembly type(s) within, in, into, on, onto, beneath, between, surrounding, thru, and/or throughout, the body (architecture) of such a corresponding adjoined, and/or adjoining, vehicle wheel assembly type(s), and, a corresponding adjoined vehicle assembly type(s), for the purpose of, securing (fixed) in-place, and/or protection, and/or shielding, of such corresponding adjoined, and/or adjoining, assemblage(s), and, for the purpose of, proximity, and/or assembly, and/or hooking-up (unbroken, and/or unimpeded), with a corresponding adjoined vehicle assembly type(s), vehicle junction boxes and hook-up(s) point(s) assembly type(s), and, with other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s) (i.e., as assembled together, and, embedded, and/or slotted, and/or positioned, and/or protected, and/or shielded, and/or oriented, and/or aligned, and/or compacted, and/or packaged, and/or secured (fixed) in-place, and/or hooked-up, within in, into, on, onto, beneath, between, surrounding, thru, and/or throughout, a corresponding adjoined, and/or adjoining, channel(s) assembly type(s), and/or aperture(s) assembly type(s), and/or area(s) assembly type(s), of the body (architecture) of such a corresponding adjoined, and/or adjoining, vehicle wheel assembly type(s)), is ideally located, within the back-side (inside) body portion(s), and/or area(s), of the body (architecture) of such a corresponding adjoined, and/or adjoining, vehicle wheel assembly type(s) (i.e., the backside internal, and/or external body portion(s), and/or placement(s), and/or area(s), of such a corresponding adjoined, and/or adjoining, vehicle wheel assembly type(s)), having proximity to a corresponding adjoined vehicle assembly type(s), brake(s) caliper(s) assembly type(s), and/or brake(s) rotor(s) assembly type(s), and/or hub(s) assembly type(s), and/or axel(s) assembly type(s), and/or another necessary, and/or required, suitable, and/or workable, and/or configurable, location(s), and/or place(s), and/or area(s), within, in, into, on, onto, beneath, between, surrounding, thru, and/or throughout, and/or associated with such a corresponding adjoined, and/or adjoining, vehicle wheel assembly type(s), for the purpose of, proximity, and, assembly within, in, into, on, onto, beneath, between, surrounding, thru, and/or throughout, associated component(s), part(s), mechanism(s), device(s), system(s), and/or apparatus assembly type(s) of a corresponding adjoined vehicle assembly type(s), and/or for the purpose of, assembly, and/or hooking up, onto, and/or with, a corresponding adjoined, and/or adjoining, vehicle junction boxes, and, hook-up(s) point(s) assembly type(s), and, an automated vehicle Central Tire Inflation System (CTIS) assembly type(s), and, other associated specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of a corresponding adjoined vehicle assembly type(s), and, such a corresponding adjoined, and/or adjoining, vehicle wheel assembly type(s), when in motion, and/or stationary.

Such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), and, a corresponding adjoined, and/or adjoining, vehicle junction boxes and hook-up(s) point(s) assembly type(s), are secured (fixed) in-place, and/or hooked-up, and/or operate, and/or function with the use of, and/or by way of, and/or via specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) joint(s) assembly type(s), and/or ball bearing(s) assembly type(s), and/or sealed ball bearing(s) assembly type(s), and/or ball bearing track(s) assembly type(s) and/or bracket(s) assembly type(s), and/or mooring(s) assembly type(s), and/or anchor(s) assembly type(s), and/or tie rod(s) assembly type(s), and/or valve(s) assembly type(s), and/or hose(s) assembly type(s), and/or wiring assembly type(s), and/or wiring harness assembly type(s), and/or fastener(s) assembly type(s), and/or seal(s) assembly type(s), and/or sealing material(s), and/or by way of, and/or with the use of, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) channel(s) assembly type(s), and/or aperture(s) assembly type(s), and/or area(s) assembly type(s), within, in, into, on, onto, beneath, between, surrounding, thru, and/or throughout, such a corresponding adjoined, and/or adjoining, ring-shaped (annular) rotary manifold assembly type(s) (piece(s)), and, such a corresponding adjoined, and/or adjoining, ring-shaped (annular) rotary manifold slip-ring wiring harness assembly type(s), and a corresponding adjoined, and/or adjoining vehicle junction boxes and hook-up(s) point(s) assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such corresponding adjoined, and/or adjoining, assemblage(s), and, a corresponding adjoined vehicle assembly type(s), and, such a corresponding adjoined, and/or adjoining, vehicle wheel assembly type(s), and/or another necessary, and/or required, suitable, and/or workable, and/or configurable means, and/or ways, and/or material(s), and/or equipment assembly type(s), for the purpose of, embedding, and/or slotting, and/or anchoring, and/or compacting, and/or packaging, and/or orienting, and/or positioning, and/or securing (fixed) in-place, and/or hooking-up, such corresponding adjoined, and/or adjoining, assemblage(s) (unbroken, and/or unimpeded), as deemed necessary, and/or required, for a corresponding chosen operating, and/or functioning, standard(s), of such corresponding adjoined, and/or adjoining, assemblage(s), and, for the purpose of, proximity, and/or assembly, of such corresponding adjoined, and/or adjoining, assemblage(s) of, for, from, into, thru, out of, and/or between, and/or associated with, such a corresponding adjoined, and/or adjoining vehicle wheel assembly type(s), and, a corresponding adjoined vehicle assembly type(s), and, for the purpose of, simultaneously reliably, sending (transmitting), and/or accepting (receiving), and/or applying (implementing), and/or facilitating, and/or generating, and/or using, and/or storing, and/or transiting, and/or transferring, and/or interacting, and/or integrating, and/or communicating, and/or recording, and/or controlling, and/or managing, and/or monitoring, and/or working, and/or operating, and/or functioning, and/or hooking-up, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

6. In its most preferred embodiment, such a corresponding adjoined, and/or adjoining, vehicle wheel assembly type(s) is mounted, and/or attached, and/or secured (fixed) in-place, and/or hooked-up, onto, and/or with, a corresponding adjoined vehicle assembly type(s) (i.e., with the use of a corresponding adjoined, and/or adjoining, flush mounting, and/or other fastener(s) assembly type(s), and/or bolt(s), and/or sealing material(s), and/or seal(s), assembly type(s)), for the purpose of, assembly, and/or proximity, and/or hooking-up with component(s), part(s), mechanism(s), device(s), system(s), and/or apparatus assembly type(s), within, in, into, on, onto, beneath, between, surrounding, thru, and/or throughout, and/or associated with, the corresponding adjoined vehicle assembly type(s), and, such a corresponding adjoined, and/or adjoining, vehicle wheel assembly type(s), accessed by way of, and/or with the use of, a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s) (i.e., as secured (fixed) in-place within the backside (inside) portion(s), and/or area(s) (internal and/or external) of such a corresponding adjoined, and/or adjoining, vehicle wheel assembly type(s)). Ideally, such a corresponding adjoined, and/or adjoining vehicle wheel assembly type(s) backside (inside) portion(s), and/or area(s), is facing a corresponding adjoined, and/or adjoining, axel(s) assembly type(s), and/or hub(s) assembly type(s), and/or brake(s) assembly type(s), and/or brake rotor(s) assembly type(s), and/or brake(s) caliper(s) assembly type(s), of a corresponding adjoined vehicle assembly type(s), when mounted, and/or attached, and/or (fixed) in-place, and/or hooked-up, onto, and/or with, a corresponding adjoined vehicle assembly type(s), and/or another necessary, and/or required, suitable, and/or workable, and/or configurable, orientation(s), place(s), and/or area(s), and/or means, and/or ways, and/or material(s), and/or equipment assembly type(s) of, for, from, into, thru, out of, and/or between, and/or associated with, such a corresponding adjoined, and/or adjoining, vehicle wheel assembly type(s), and, a corresponding adjoined vehicle assembly type(s), for the purpose of, facilitating, and/or enabling, hooking-up, and/or assembly of, for, from, into, thru, out of, and/or between, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) hook-up(s) point(s) assembly type(s), and/or connection(s) point(s) assembly type(s), and/or connecting(s) assembly type(s), and/or valve(s) assembly type(s), and/or hose(s) assembly type(s), and/or socket(s) assembly type(s), and/or wiring assembly type(s), and/or fastener(s) assembly type(s), and/or mooring(s) assembly type(s), and/or anchoring(s) assembly type(s), and/or bracing(s) assembly type(s), and/or linking(s) assembly type(s) (unbroken, and/or unimpeded), within, in, into, on, onto, beneath, between, surrounding, thru, and/or throughout, and/or associated with, such a (fixed) ring-shaped (annular) rotary manifold assembly type(s) (piece(s)), and, a corresponding adjoined, and/or adjoining, ring-shaped (annular) slip-ring wiring harness assembly type(s), and, a corresponding adjoined vehicle assembly type(s), that has, and/or is holding, and/or carrying, and/or operating, and/or functioning, and/or working, and/or hooking-up, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; a vehicle junction boxes and hook-up(s) point(s) assembly type(s), a corresponding adjoined, and/or adjoining, automated vehicle Central Tire Inflation System (CTIS) assembly type(s), an electrical powered, and/or other power source(s) air compressor(s) assembly type(s), hose(s) assembly type(s), vehicle power source(s) assembly type(s), pressurized air/gas tank(s) assembly type(s), attachable/detachable pressurized air/gas tank(s) assembly type(s), vehicle speed sensor(s) assembly type(s), and/or other vehicle sensor(s) assembly type(s), vehicle circuit(s) assembly type(s), vehicle wiring assembly type(s), vehicle wiring harness assembly type(s), associated vehicle computer(s), associated vehicle software(s) assembly type(s), associated vehicle operating system(s), associated vehicle antennae and satellite system(s) assembly type(s), vehicle Electronic Control Unit (ECU) assembly type(s), vehicle pneumatic control unit assembly type(s), pump(s) assembly type(s), pressure switch assembly type(s), vehicle air compressor(s) assembly type(s), attachable/detachable pressurized air/gas vessel(s) assembly type(s), pressurized air/gas holding receptacle(s) assembly type(s), vehicle air dryer(s) assembly type(s), vehicle electric motor(s) assembly type(s), actuator(s) assembly type(s), circuit(s) assembly type(s), sensor(s) assembly type(s), wiring assembly type(s), hose(s) assembly type(s), conduit(s) assembly type(s), tube(s) assembly type(s), valve(s) assembly type(s), socket(s) assembly type(s), joint(s) assembly type(s), fastener(s) assembly type(s), sealing material(s), vehicle operator control(s) panel(s) assembly type(s), associated vehicle control(s) assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or equipment assembly type(s), that are deemed necessary, and/or required, for a corresponding chosen operating, and/or functioning, standard(s), of such corresponding adjoined, and/or adjoining, assemblage(s), for the purpose of, simultaneously reliably, generating, and/or making, and/or storing, and/or using, and/or operating, and/or functioning, and/or communicating, and/or controlling, and/or managing, and/or monitoring, and/or recording, and/or transiting, and/or transferring, and/or transmitting, and/or receiving, and/or hooking-up, a desired media(s), and/or medium(s) (such as compressed air and/or other gas (+ and/or −) for a corresponding attached pneumatic tire(s) chamber(s) assembly type(s), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of such corresponding adjoined, and/or adjoining assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), has, and/or is holding, and/or carrying, and/or operating, and/or functioning, and/or hooking-up, and/or integrating, and/or securing (fixed) in-place, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that are placed, and/or positioned, and/or orientated, and/or aligned, and/or slotted, and/or embedded, and/or protected, and/or compacted, and/or packaged, and/or secured (fixed) in-place, and/or hooked-up, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), of the body (architecture) of such a corresponding adjoined, and/or adjoining, vehicle wheel assembly type(s) (i.e., ideally, with proximity of the backside, and/or inside portion(s), and/or area(s) (internal, and/or external), and/or another necessary, and/or required, suitable, and/or workable, and/or configurable place(s), and/or area(s), of such a corresponding adjoined, and/or adjoining, vehicle wheel assembly type(s), and/or with proximity, and/or access, of a rim assembly type(s), and/or a rim hole(s), and/or a hub hole, and/or bolt hole(s) (aperture(s)), and/or hub attachment hole pattern(s) (placement(s), and/or spoke(s) assembly type(s)), and/or other corresponding adjoined, and/or adjoining, necessary, and/or required, suitable, and/or workable, and/or configurable, place(s), and/or area(s), of the body (architecture) of such a corresponding adjoined, and/or adjoining, vehicle wheel assembly type(s), that are deemed necessary, and/or required, for a corresponding chosen operating, and/or functioning, standard(s), of such corresponding adjoined, and/or adjoining, assemblage(s), for the purpose of, anchoring, and/or mooring, and/or attaching, and/or assembling, and/or bracing, and/or positioning, and/or orientating, and/or protecting, and/or compacting, and/or packaging, and/or hooking-up, and/or securing (fixed) in-place, such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with the body (architecture) of such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), is ideally situated, and/or located, within, in, into, on, onto, beneath, between, surrounding, thru, and/or throughout, the body (architecture) of such a corresponding adjoined, and/or adjoining, vehicle wheel assembly type(s) (slotted, and/or embedded, and/or compacted, and/or packaged, and/or protected, and/or positioned, and/or orientated, and/or aligned, and/or secured (fixed) in-place, and/or hooked-up, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), of the body (architecture) of such a corresponding adjoined, and/or adjoining, vehicle wheel assembly type(s), in such a manner, for the purpose of, exposing, and/or making available, and/or enabling, and/or facilitating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) connection(s) point(s) assembly type(s), and/or connecting(s) point(s) assembly type(s), and/or hook-up(s) point(s) assembly type(s) and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), of such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), and, for the purpose of, simultaneously reliably, transiting, and/or transferring, and/or evacuating, and/or depleting, and/or hooking-up a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of such corresponding adjoined, and/or adjoining assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), has, and/or is holding, and/or carrying, and/or integrating, and/or operating, and/or functioning, and/or working, and/or hooking-up, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; an attachment(s) assembly type(s), and/or hole(s) assembly type(s), and/or valve(s) assembly type(s), and/or joint(s) assembly type(s), and/or ball bearing(s) assembly type(s), and/or sealed ball bearing(s) assembly type(s), and/or ball bearing(s) track(s) assembly type(s), and/or exhaust valve(s) assembly type(s), and/or socket(s) assembly type(s), and/or receptacle(s) assembly type(s), and/or channel(s) assembly type(s), and/or aperture(s) assembly type(s), and/or area(s) assembly type(s), and/or actuator(s) assembly type(s), and/or wiring assembly type(s), and/or hose(s) assembly type(s), and/or sensor(s) assembly type(s), and/or circuit(s) assembly type(s), and/or plug(s) assembly type(s), and/or socket(s) assembly type(s), and/or hook-up(s) point(s) assembly type(s), and/or fastener(s) assembly type(s), and/or seal(s) assembly type(s), and sealing material(s), and/or fiber optic(s) attachment(s) assembly type(s), and/or transmission line(s) assembly type(s), and/or cabling assembly type(s), and/or digital transmission line(s) assembly type(s), and/or other connection(s) assembly type(s), and/or connecting(s) point(s) assembly type(s), and/or hook-up(s) assembly type(s), and/or hose(s) hook-up(s) assembly type(s), and/or fluid(s) hook-up(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or equipment assembly type(s), that are part of, and/or hooked-up with, and/or associated with, such a corresponding adjoined, and/or adjoining, (fixed) ring-shaped (annular) rotary manifold housing (case) assembly type(s) (piece), and, such a corresponding adjoined, and/or adjoining ring-shaped (annular) rotary manifold shaft (cap) assembly type(s) (piece), and, a corresponding adjoined, and/or adjoining, ring-shaped (annular) rotary manifold slip-ring wiring harness assembly type(s), for the purpose of, facilitating, and/or enabling, hooking-up, a preserved (unbroken, and/or unimpeded), specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) connection(s) assemblage(s), and/or connecting(s) assemblage(s), and/or pathway(s) assemblage(s), and/or path(s) assemblage(s), and/or hook-up(s) assemblage(s), and, for the purpose of, hooking-up, and/or assembly, with other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and, a corresponding adjoined, and/or adjoining, vehicle junction boxes and, hook-up(s) point(s) assembly type(s), and, a corresponding adjoined, and/or adjoining automated vehicle Central Tire Inflation System (CTIS) assembly type(s), that are held, and/or carried, and/or operated, and/or functioned, and/or integrated, and/or controlled, and/or managed, and/or worked, and/or communicated, and/or hooked-up, with, within, in, into, on, onto, beneath, between, surrounding, thru, and/or throughout, and/or associated with, a corresponding adjoined vehicle assembly type(s), and, for the purpose of, simultaneously reliably, generating, and/or transiting, and/or transferring, and/or using, and/or storing, and/or communicating, and/or controlling, and/or monitoring, and/or managing, and/or recording, and/or operating, and/or functioning, and/or transmitting, and/or receiving, and/or delivering, and/or hooking-up, a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of such corresponding adjoined, and/or adjoining assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

7. In its most preferred embodiment, such a corresponding adjoined, and/or adjoining, vehicle wheel assembly type(s), has, and/or is holding, and/or carrying, and/or integrating, and/or operating, and/or functioning, and/or working, and/or interacting, and/or hooking-up, with a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s), comprising, but, are not exclusive to, namely; a (fixed) ring-shaped (annular) rotary manifold assembly type(s) (piece(s)), a ring-shaped (annular) rotary manifold slip-ring wiring harness assembly type(s), a vehicle junction boxes and hook-up(s) point(s) assembly type(s), an automated vehicle Central Tire Inflation System (CTIS) assembly type(s), vessel(s) assembly type(s), high pressure storage tank(s) assembly type(s), pump(s) assembly type(s), valve(s) assembly type(s), channel(s) assembly type(s), aperture(s) assembly type(s), seal(s) assembly type(s), gromet(s) assembly type(s), joint(s) assembly type(s), ball bearing(s) assembly type(s), sealed ball bearing(s) assembly type(s), ball bearing track(s) assembly type(s), fastener(s) assembly type(s), sealing material(s), tie(s) assembly type(s), tube(s) assembly type(s), hose(s) assembly type(s), pipe(s) assembly type(s), sensor(s) assembly type(s), circuit(s) assembly type(s), fiber optic(s) equipment assembly type(s), fiber optic(s) transmission line(s) assembly type(s), cabling assembly type(s), wiring assembly type(s), hook-up(s) assembly type(s), wiring harness assembly type(s), microprocessor(s) assembly type(s), computer(s) assembly type(s), computer software(s) assembly type(s), antennae assembly type(s), satellite equipment assembly type(s), electronic(s) assembly type(s), electric power plant(s) assembly type(s), electric motor(s) assembly type(s), naturally aspirated motor(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, a corresponding adjoined vehicle assembly type(s), and, such a corresponding adjoined, and/or adjoining, vehicle wheel assembly type(s), and/or another necessary, and/or required, suitable, and/or workable, and/or configurable, means, and/or ways, and/or material(s), and/or equipment assembly type(s), for the purpose of, simultaneously reliably, generating, and/or transferring, and/or transiting, and/or transmitting, and/or receiving, and/or controlling, and/or managing, and/or monitoring, and/or communicating, and/or recording, and/or using, and/or storing, and/or interacting, and/or integrating, and/or operating, and/or functioning, and/or working, and/or hooking-up, a desired media(s), and/or medium(s) (such as compressed air, and/or other gases (+ and/or −) for a corresponding attached pneumatic tire(s) chamber(s) assembly type(s), and/or electricity, data, and/or digital signal(s), and/or fluid(s)), and/or other necessary, and/or required corresponding chosen, operation(s), and/or function(s), and/or purpose(s), and/or task(s) (unbroken, and/or unimpeded), of such corresponding adjoined, and/or adjoining assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

8. In its most preferred embodiment, such a corresponding adjoined, and/or adjoining, vehicle wheel assembly type(s), has, and/or is holding, and/or carrying, and/or operating, and/or functioning, and/or integrating, and/or interacting, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped rotary manifold assembly type(s) (piece(s)), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), that is positioned, facing outwardly, from the inside portion(s) (back-side) of such a corresponding adjoined, and/or adjoining, vehicle wheel assembly type(s) (i.e., the side of such a corresponding adjoined, and/or adjoining, vehicle wheel assembly type(s) that attaches onto, and/or is facing, and/or in proximity, of a vehicle hub(s) assembly type(s), and/or vehicle axel hub bolt(s) assembly type(s), and/or vehicle axel assembly type(s), and/or vehicle brake(s) assembly type(s), and/or vehicle brake rotor(s) assembly type(s), and/or vehicle brake caliper(s) assembly type(s), of a corresponding adjoined vehicle assembly type(s)), and/or another necessary, and/or required, suitable, and/or workable, and/or configurable, location(s), and/or placement(s), and/or area(s), and/or means, and/or ways, and/or material(s), and/or equipment assembly type(s), of a corresponding adjoined vehicle assembly type(s), for the purpose of, enabling, and/or facilitating, simultaneous reliable connection(s), and/or connecting(s), and/or pathway(s), and/or path(s), and/or hook-up(s), and/or transit(s), and/or transfer(s), and/or control(s), and/or management(s), and/or storage(s), and/or use(s), and/or interaction(s), and/or transmission(s), and/or reception(s), and/or generation(s), and/or control(s), and/or management(s), and/or monitoring(s), and/or recording(s), of a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, operation(s), and/or function(s), and/or purpose(s), and/or task(s) (unbroken, and/or unimpeded), for a corresponding chosen operating, and/or functioning, standard(s), of such corresponding adjoined, and/or adjoining assemblage(s), of, for, from, into, thru, out of, and/or between, and/or associated with, such a corresponding adjoined, and/or adjoining, vehicle wheel assembly type(s), and, a corresponding adjoined vehicle assembly type(s), that has, and/or is holding, and/or carrying, and/or operating, and/or functioning, and/or working, and/or hooking-up, a corresponding adjoined, and/or adjoining, vehicle junction boxes and hook-up(s) point(s) assembly type(s), and, a corresponding adjoined, and/or adjoining, automated vehicle Central Tire Inflation System (CTIS) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that are positioned within, in, into, on, onto, beneath, between, surrounding, thru, and/or throughout, and/or associated with a corresponding adjoined vehicle assembly type(s), and/or connected, and/or connecting, and/or hooking-up, and/or working, and/or interacting, with other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that are associated, and/or interacting with, the corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

9. In is most preferred embodiment, such a corresponding adjoined, and/or adjoining, vehicle wheel assembly type(s), has, and/or is holding, and/or carrying, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and, associated protective housing case(s) assembly type(s), for the purpose of, a stationary, and/or secured (fixed) in-place, and/or moving, and/or rotating, and/or spinning, and/or turning, connection(s), and/or connecting(s), and/or hook-up(s) (i.e., a bridge), of, for, from, into, thru, out of, and/or between, and/or associated with, such a corresponding adjoined, and/or adjoining, vehicle wheel assembly type(s), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle junction boxes and hook-up(s) point(s) assembly type(s), of a corresponding adjoined vehicle assembly type(s), when in motion, and/or stationary, and, for the purpose of, simultaneously reliably, generating, and/or operating, and/or functioning, and/or transiting, and/or transferring, and/or transmitting, and/or receiving, and/or delivering, and/or discharging, and/or using, and/or storing, and/or communicating, and/or controlling, and/or managing, and/or monitoring, and/or recording, and/or interacting, and/or integrating, and/or working, and/or hooking-up, a desired media(s), and/or medium(s) (such as compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, a corresponding adjoined vehicle assembly type(s), and, such a corresponding adjoined, ad/or adjoining, vehicle wheel assembly type(s), automatically, and/or manually, and/or autonomously (wirelessly), and/or remotely, when in motion, and/or stationary (taking into consideration the media(s) and/or medium(s) type(s), operation(s), function(s), purpose(s), and/or task(s), number of isolated, and/or insulated, flow path(s), temperature(s), speed(s), load(s), and, operating, and/or functioning, environment(s), of such a (fixed) ring-shaped (annular) rotary manifold assembly type(s) (piece(s)), and/or a corresponding adjoined, and/or adjoining, ring-shaped (annular) rotary manifold slip-ring wiring harness assembly type(s), that is embedded, and/or slotted, and/or compacted, and/or packaged, and/or oriented, and/or aligned, and/or positioned, and/or secured (fixed) in-place, and/or hooked-up, within a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), of the body (architecture) of such a corresponding adjoined, and/or adjoining, vehicle wheel assembly type(s)).

10. In its most preferred embodiment, such a corresponding adjoined, and/or adjoining, vehicle wheel assembly type(s), has, and/or is holding, and/or carrying, and/or operating, and/or functioning, and/or interacting, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and, associated protective housing cases(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), with an operating, and/or functioning, parameter(s): 0-10,000+RPM (revolutions-per-minute), operating speed(s): 0-20,000 PSI (pounds per sq. inch) [1,380 BAR] (a BAR is a unit of pressure defined as 100 kilopascals, that is about equal to the atmospheric pressure on Earth at sea level), and/or high performance operating, and/or functioning, parameter(s), pushing the range of 10,000+RPM, and 40,000+PSI [2,760+BAR] (based on a vehicle application (s), need(s), and/or requirement(s)). Preferably, normal environmental and/or media temperature(s) ranging from; 0 to −150° F. to +400° F. [0 to −100° C. to +200° C.], and/or another necessary, and/or required, suitable, and/or workable, and/or configurable operating, and/or functioning, parameter(s), temperature(s), (RPM), (PSI), and/or ways, and/or means, and/or material(s), and/or equipment assembly type(s), for the purpose of, simultaneously reliably generating, and/or transiting, and/or transferring, and/or using, and/or storing, and/or communicating, and/or controlling, and/or managing, and/or interacting, and/or operating, and/or functioning, and/or recording, and/or hooking-up (unbroken, and/or unimpeded), a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other corresponding adjoined, and/or adjoining, operation(s), and/or function(s), and/or purpose(s), and/or task(s) (unbroken, and/or unimpeded), deemed necessary, and/or required, for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

11. In its most preferred embodiment, such a corresponding adjoined, and/or adjoining, vehicle wheel assembly type(s), has, and/or is holding, and/or carrying, and/or operating, and/or functioning, and/or interacting, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and, an associated protective housing case(s) assembly type(s), that has, and/or is holding, and/or carrying, and/or operating, and/or functioning, and/or integrating, and/or interacting, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) independent flow path(s) assembly type(s), and/or passage(s) assembly type(s), and/or channel(s) assembly type(s), and/or aperture(s) assembly type(s), and/or area(s) assembly type(s) and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), for the purpose of, allowing, and/or enabling, and/or facilitating, the unbroken, and/or unimpeded, simultaneously reliable, generating, and/or transiting, and/or transferring, and/or transmitting, and/or receiving and/or interacting, and/or integrating, and/or using, and/or storing, and/or communicating, and/or controlling, and/or managing, and/or monitoring, and/or recording, and/or operating, and/or functioning, and/or hooking-up, of a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

12. In its most preferred embodiment, such a corresponding adjoined, and/or adjoining, vehicle wheel assembly type(s), has, and/or is holding, and/or carrying, and/or operating, and/or functioning, and/or interacting, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), that has, and/or is holding, and/or carrying, and/or operating, and/or functioning, and/or communicating, and/or working, and/or interacting, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; a seal(s) assembly type(s), sealing material(s), fastener(s) assembly type(s), tie(s) assembly type(s), bracing assembly type(s), protective housing case(s) assembly type(s), anchor(s) assembly type(s), hose(s) assembly type(s), tube(s) assembly type(s), pipe(s) assembly type(s), wiring assembly type(s), transmission(s) line(s) assembly type(s), cabling assembly type(s), fiber optic(s) transmission line(s) assembly type(s), sensor(s) assembly type(s), circuit(s) assembly type(s), microprocessor(s) assembly type(s), antennae assembly type(s), O-ring(s) assembly type(s), gasket(s) assembly type(s), joint(s) assembly type(s), ball bearing(s) assembly type(s), sealed ball bearing(s) assembly type(s), ball bearing(s) track(s) assembly type(s), valve(s) assembly type(s), exhaust valve(s) assembly type(s), channel(s) assembly type(s), aperture(s) assembly type(s), area(s) assembly type(s), mooring assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or equipment assembly type(s), for the purpose of, attaching, and/or hooking-up (unbroken, and/or unimpeded), with, within, in, into, on, onto, beneath, between, surrounding, thru, and/or throughout, a corresponding adjoined vehicle assembly type(s), vehicle junction boxes, and hook-up(s) point(s) assembly type(s), and, a corresponding adjoined, and/or adjoining, automated vehicle Central Tire Inflation System (CTIS) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that are held, and/or carried, and/or stored, and/or placed, and/or positioned, and/or oriented, and/or aligned, and/or hooked-up, with, within, in, into, on, onto, beneath, between, surrounding, thru, and/or throughout, and/or associated with, a corresponding adjoined vehicle assembly type(s), and, for the purpose of, simultaneously reliably, generating, and/or using, and/or storing, and/or transmitting, and/or receiving, and/or transiting, and/or transferring, and/or maintaining, and/or operating, and/or functioning, and/or hooking-up, and/or monitoring, and/or controlling, and/or communicating, and/or recording, measurable system pressure(s) (Pounds-per-Square Inch (PSI + and/or −)), for a corresponding attached pneumatic tire(s) chamber(s) assembly type(s), and, for the purpose of, integrating, and/or using, and/or operating, and/or functioning, and/or working, and/or hooking-up, and/or securing (fixed) in-place, and/or protecting, isolated, and/or insulated, air-tight (sealed) and/or other, flush mounting, and/or other, path(s) assembly type(s), and/or pathway(s) assembly type(s), and/or passage(s) assembly type(s), and/or tunnel(s) assembly type(s) and/or channel(s) assembly type(s), and/or aperture(s) assembly type(s), and/or area(s) assembly type(s), that enable, and/or facilitate, the simultaneous reliable, generating, and/or transiting, and/or transferring, transmitting, and/or receiving, and/or operating, and/or functioning, and/or using, and/or storing, and/or controlling, and/or managing, and/or communicating, and/or recording, and/or monitoring, and/or integrating, and/or interacting, and/or working, and/or hooking-up (unbroken, and/or unimpeded), of a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining vehicle wheel assembly type(s), and, a corresponding adjoined vehicle assembly type(s), automatically, and/or manually, and/or autonomously (wirelessly), and/or remotely, when in motion, and/or stationary, when such a corresponding adjoined, and/or adjoining, vehicle wheel assembly type(s), is mounted, and/or attached, and/or hooked-up, onto, and/or with, a corresponding adjoined vehicle assembly type(s).

13. In its most preferred embodiment, such a corresponding adjoined, and/or adjoining, vehicle wheel assembly type(s), has, and/or is holding, and/or carrying, and/or integrating, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), within, in, into, on, onto, beneath, between, surrounding, thru, and/or throughout, the body (architecture) of such a corresponding adjoined, and/or adjoining, vehicle wheel assembly type(s), for the purpose of, mitigating, and/or controlling, and/or managing, and/or protecting, and/or shielding, and/or insulating, and/or isolating, and/or anchoring, and/or bracing, and/or securing (fixed) in-place, and/or operating, and/or functioning, and/or assembling, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), against the adverse effect(s) of high-speed jolt(s), and/or movement(s), and/or vibration(s), and/or oscillation(s), and/or jolt(s), and/or wobbling(s), and/or slippage(s), and/or rotation(s), and/or harsh environment(s), and/or environmental temperature variation(s) (range(s)), as installed, and/or assembled, and/or embedded, and/or slotted, and/or compacted, and/or packaged, and/or positioned, and/or oriented, and/or aligned, and/or held, and/or secured (fixed) in-place, and/or hooked-up, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), within, in, into, on, onto, beneath, between, surrounding, thru, and/or throughout, the body (architecture) of such a corresponding adjoined, and/or adjoining, vehicle wheel assembly type(s), when mounted, and/or attached, and/or hooked-up, onto, and/or with, a corresponding adjoined vehicle assembly type(s), and, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), ring-shaped (annular) rotary manifold slip-ring wiring harness assembly type(s), vehicle junction boxes and hook-up(s) point(s) assembly type(s), associated protective housing case(s) assembly type(s), attach, and/or join, and/or amalgamate, and/or are held, together, at an axis point(s) assembly type(s), and/or joint(s) assembly type(s) by way of, and/or with the use of, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ball bearing(s) assembly type(s), and/or sealed ball bearing(s) assembly type(s), and/or ball bearing(s) track(s) assembly type(s) and/or seal(s) assembly type(s), and/or metal(s) seal(s) assembly type(s), and/or O-ring(s) assembly type(s), and/or fastener(s) assembly type(s), and/or anchoring assembly type(s), and, sealing material(s), and/or channel(s) assembly type(s), and/or aperture(s) assembly type(s), and/or area(s) assembly type(s), and/or flange(s) assembly type(s), and/or protrusion(s) assembly type(s), and/or bracing assembly type(s), and/or anchoring assembly type(s), and/or mooring assembly type(s), and/or another necessary, and/or required, suitable, and/or workable, and/or configurable means, and/or ways, and/or material(s), and/or equipment assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such corresponding adjoined, and/or adjoining, assemblage(s), and/or a corresponding adjoined vehicle assembly type(s), and/or such a corresponding adjoined, and/or adjoining, vehicle wheel assembly type(s), for the purpose of, allowing, and/or enabling, and/or facilitating, and/or hooking-up, a stationary, and/or fixed, and/or moving, and/or rotating, and/or spinning, and/or turning, hook-up(s), and/or use(s) (unbroken, and/or unimpeded), of such corresponding adjoined, and/or adjoining, assemblage(s) as embedded, and/or slotted, and/or compacted, and/or packaged, and/or positioned, and/or protected, and/or oriented, and/or aligned, and/or hooked-up, and/or secured (fixed) in-place, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), and/or component(s), part(s), mechanism(s), device(s), system(s), and/or apparatus assembly type(s), of such corresponding adjoined, and/or adjoining, assemblage(s), and/or of such a corresponding adjoined, and/or adjoining, vehicle wheel assembly type(s), and/or of a corresponding adjoined vehicle assembly type(s), when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), has, and/or is holding, and/or carrying, and/or operating, and/or functioning, and/or working, and/or interacting, and/or amalgamating, and/or integrating, and/or communicating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), for the purpose of proximity, and, assembly, and/or hook-up, and/or mooring, and/or anchoring, with a corresponding adjoined, and/or adjoining, vehicle junction boxes and hook-up(s) point(s) assembly type(s), of a corresponding adjoined vehicle assembly type(s), and, for the purpose of, simultaneously reliably transiting, and/or transferring, and/or hooking-up, compressed air, and/or other gases, electricity supply, and/or digital signal(s), and/or data, and/or fluid(s), and/or other corresponding adjoined, and/or adjoining, operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s) (unbroken, and/or unimpeded) of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary, and, for the purpose of, simultaneously reliably, transiting, and/or transferring, and/or transmitting, and/or receiving, and/or delivering, and/or discharging, and/or operating, and/or functioning, and/or communicating, and/or interacting, and/or integrating, and/or recording, and/or controlling, and/or managing, and/or using, and/or generating, and/or storing, and/or hooking-up, a desired media(s), and/or medium(s) (such as compressed air and/or other gas (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), of, for, from, into, thru, out of, and/or between, and/or associated with such a corresponding adjoined, and/or adjoining vehicle wheel assembly type(s), and, a corresponding adjoined vehicle assembly type(s), automatically, and/or manually, and/or autonomously (wirelessly), and/or remotely, when in motion, and/or stationary.

14. In its most preferred embodiment, such a corresponding adjoined, and/or adjoining, vehicle wheel assembly type(s), has, and/or is holding, and/or carrying, and/or interacting, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a wiring harness assembly type(s), and/or a wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), that is attached, and/or hooked-up, with, and/or onto, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), for the purpose of, holding, and/or carrying, and/or operating, and/or functioning, and/or working, and/or communicating, and/or controlling, and/or interacting, and/or integrating, and/or hooking-up, with, a corresponding adjoined vehicle assembly type(s), that, has, and/or is holding, and/or carrying, and/or generating, and/or transmitting, and/or receiving, and/or using, and/or storing, and/or controlling, and/or communicating, and/or managing, and/or monitoring, and/or recording, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle junction boxes and hook-up(s) point(s) assembly type(s), and, an automated vehicle Central Tire Inflation System (CTIS) assembly type(s), and, an associated vehicle computer(s) assembly type(s), and, an associated vehicle software(s) assembly type(s), and, an associated vehicle operating system(s) assembly type(s), and, an associated vehicle CPU assembly type(s), and, an associated vehicle transmission(s) spectrum(s) assembly type(s), and, an associated vehicle satellite system(s) assembly type(s), and, an associated vehicle antennae assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for from, into, thru, and/or between, and/or associated with, a corresponding adjoined vehicle assembly type(s), and/or such a corresponding adjoined, and/or adjoining, vehicle wheel assembly type(s), when in motion, and/or stationary, and, for the purpose of, simultaneously reliably, transiting, and/or transferring, and/or transmitting, and/or receiving, and/or generating, and/or operating, and/or functioning, and/or interacting, and/or communicating, and/or controlling, and/or managing, and/or using, and/or storing, and/or working, and/or recording, and/or hooking-up, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), is attached, and/or integrated, and/or amalgamated, and/or joined, with, within, in, into, on, onto, beneath, between, surrounding, thru, and/or throughout, a corresponding adjoined, and/or adjoining, (fixed) ring-shaped (annular) rotary manifold assembly type(s) (piece(s)) (i.e., the corresponding adjoined, and/or adjoining, (fixed) ring-shaped (annular) rotary manifold housing (case) assembly type(s) (piece), and, the corresponding adjoined, and/or adjoining, ring-shaped (annular) rotary manifold shaft (cap) assembly type(s) (piece)), by way of, and/or with the use of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) channel(s) assembly type(s), and/or aperture(s) assembly type(s), and/or area(s) assembly type(s), and/or protrusion(s) assembly type(s), and/or flange(s) assembly type(s), and/or track(s) assembly type(s), and/or groove(s) assembly type(s), and/or joint(s) assembly type(s), and/or, ball bearing(s) assembly type(s), and/or sealed ball bearing(s) assembly type(s), and/or ball bearing track(s) assembly type(s), and/or fastener(s) assembly type(s), and/or wiring assembly type(s), and/or transmission lines assembly type(s), and/or cabling assembly type(s), and/or hose(s) assembly type(s), and/or tube(s) assembly type(s), and/or valve(s) assembly type(s), and/or seal(s) assembly type(s), and/or sealing material(s), and/or bracket(s) assembly type(s), and/or bracing(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or equipment assembly type(s), for the purpose of, completing, and/or carrying out, a (unbroken, and/or unimpeded) connection(s), and/or hook-up(s), of, for, from, into, thru, out of, and/or between, and/or associated with, such a corresponding adjoined, and/or adjoining, vehicle wheel assembly type(s), and, a corresponding adjoined vehicle assembly type(s), when in motion, and/or stationary, and, for the purpose of, simultaneously reliably, transiting, and/or transferring, generating, operating, functioning, interacting, communicating, controlling, managing, using, storing, working, recording, and/or hooking-up, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary, and, for the purpose of, proximity to, and/or assembly with, a corresponding adjoined vehicle assembly type(s), corresponding adjoined, and/or adjoining, vehicle junction boxes and hook-up(s) point(s) assembly type(s), and, a corresponding adjoined, and/or adjoining, automated vehicle Central Tire Inflation System (CTIS) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), when such a corresponding adjoined, and/or adjoining, vehicle wheel assembly type(s), is mounted, and/or attached, and/or hooked-up, onto, and/or with, a corresponding adjoined vehicle assembly type(s) (i.e., via, and/or by way of, and/or with the use of, such a corresponding adjoined, and/or adjoining, vehicle junction boxes and hook-up(s) point(s) assembly type(s)), and, for the purpose of, anchoring, and/or mooring, and/or stabilizing, and/or aligning, and/or compacting, and/or packaging, and/or positioning, and/or orienting, and/or hooking-up, such a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), and a corresponding adjoined, and/or adjoining, vehicle junction boxes and hook-up(s) point(s) assembly type(s), when such a corresponding adjoined, and/or adjoining, vehicle wheel assembly type(s), is mounted, and/or attached, and/or hooked-up, and/or secured (fixed) in-place, onto, and/or with, a corresponding adjoined vehicle assembly type(s), and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), has, and/or is holding, and/or carrying, and/or interacting, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that comprise, but, are not exclusive to, namely; an anchoring(s) assembly type(s), mooring(s) assembly type(s), bracing(s) assembly type(s), bracket(s) assembly type(s), wiring assembly type(s), cabling assembly type(s), hose(s) assembly type(s), conduit(s) assembly type(s), channel(s) assembly type(s), aperture(s) assembly type(s), area(s) assembly type(s), protrusion(s) assembly type(s), flange(s) assembly type(s), fastener(s) assembly type(s), mounting(s) assembly type(s), sensor(s) assembly type(s), circuit(s) assembly type(s), electronic(s) assembly type(s), antennae assembly type(s), electrical, and/or digital, and/or other transmission line(s) assembly type(s), cabling assembly type(s), fiber optic transmission line(s) assembly type(s), seal(s) assembly type(s), ball bearing(s) assembly type(s), ball bearing track(s) assembly type(s), sealed ball bearing(s) assembly type(s), joint(s) assembly type(s), valve(s) assembly type(s), connection ring(s) assembly type(s), magnet(s) assembly type(s), permanent magnet(s) assembly type(s), connective brushes assembly type(s), sealing ring(s) assembly type(s), and, sealing material(s), protective housing case(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), and/or another necessary, and/or required, suitable, and/or workable, and/or configurable means, and/or ways, and/or material(s), and/or equipment assembly type(s), for the purpose of, simultaneously reliably, transiting, and/or transferring, and/or transmitting, and/or receiving, and/or generating, and/or using, and/or storing, and/or communicating, and/or controlling, and/or managing, and/or recording, and/or working, and/or interacting, and/or hooking-up, a desired media(s), and/or medium(s) (such as compressed air, and/or other gases (+ and/or −) for a corresponding attached pneumatic tire chamber(s) assembly type(s)), and/or electrical power, and/or data, and/or electricity supply, and/or digital signal(s), and/or fluid(s), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection assembly type(s), and/or other similar working, corresponding, adjoined, and/or adjoining, electrical, and/or digital, and/or magnetic, slip-ring wiring harness assembly type(s), and/or wiring harness assembly type(s), and, a corresponding adjoined, and/or adjoining, (fixed) ring-shaped (annular) rotary manifold assembly type(s) (piece(s)), allow(s), and/or facilitate(s), and/or enable(s), such a corresponding adjoined, and/or adjoining, vehicle wheel assembly type(s), and, a corresponding adjoined vehicle assembly type(s), to simultaneously reliably, transit, and/or transfer, and/or transmit, and/or receive, and/or generate, and/or use, and/or store, and/or communicate, and/or control, and/or manage, and/or record, and/or integrate, and/or work, and/or hook-up, compressed air, and/or other gases, electrical power, and/or digital data, and/or data, and/or electricity supply, and/or digital signal(s), and/or fluid(s), and/or other corresponding chosen, infrared, video, camera, radar, and/or electromagnetic transmission(s) assembly type(s), and/or other corresponding chosen, electrical, and/or digital, and/or other transmission(s) assembly type(s), and/or mode(s), and/or media(s), and/or medium(s) assembly type(s), of, for, from, into, thru, out of, and/or between, and/or associated with, such a corresponding adjoined, and/or adjoining, vehicle wheel assembly type(s), and, a corresponding attached pneumatic tire chamber(s) assembly type(s), and, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s) of, for, from, into, thru, out of, and/or between, and/or associated with, such a corresponding adjoined, and/or adjoining, vehicle wheel assembly type(s), and, a corresponding adjoined vehicle assembly type(s) (unbroken, and/or unimpeded), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), has, and/or is holding, and/or carrying, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) joint(s) assembly type(s), and/or fitting(s) assembly type(s) (i.e., also referred to as electrical rotary joint(s), rotary electrical interface(s), rotary electrical connector(s), and/or swivel(s) joint(s) assembly type(s)), and/or another necessary, and/or required, suitable, and/or workable, and/or configurable, means, and/or ways, and/or material(s), and/or equipment assembly type(s), for the purpose of, facilitating, and/or enabling, and/or allowing, simultaneous reliable transit(s), and/or transfer(s), and/or transmission(s), and/or reception(s), of electrical power, and/or digital data, and/or data, and/or electricity supply, and/or digital signal(s) assembly type(s), and/or other corresponding chosen infrared, and/or video, and/or camera, and/or electromagnetic transmission(s) assembly type(s), and/or other corresponding chosen, electrical, and/or digital, transmission(s), operation(s), and/or function(s), and/or purpose(s), and/or task(s), and/or mode(s), and/or media(s), and/or medium(s) (unbroken, and/or unimpeded), of, for, from, into, thru, out of, and/or between, and/or associated with, such a corresponding adjoined, and/or adjoining, vehicle wheel assembly type(s), and, a corresponding attached pneumatic tire chamber(s) assembly type(s), and, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, such a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), are customizable for an application use(s) when connected with, and/or onto, a corresponding adjoined, and/or adjoining, (fixed) ring-shaped (annular) rotary manifold assembly type(s) (piece(s)) (i.e., a corresponding adjoined, and/or adjoining, (fixed) ring-shaped (annular) rotary manifold housing (case) assembly type(s) (piece), and, a corresponding adjoined, and/or adjoining, ring-shaped (annular) rotary manifold shaft (cap) assembly type(s) (piece)), and, a corresponding adjoined, and/or adjoining, vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), for the purpose of, simultaneously reliably transmitting, and/or transferring, and/or transiting, and/or receiving, electrical power, and/or electricity supply, and/or digital signal(s), and/or data, and/or digital data, and/or other media(s), and/or medium(s), of, for, from, into, thru, out of, and/or between, a stationary, and/or moving, and/or rotating, and/or spinning, and/or turning, component(s), part(s), mechanism(s), device(s), system(s), and/or apparatus assembly type(s), and/or structure(s), and/or assemblage(s) (unbroken, and/or unimpeded), of, for, from, into, thru, out of, and/or between, and/or associated with, such a corresponding adjoined, and/or adjoining, vehicle wheel assembly type(s), and, a corresponding adjoined vehicle assembly type(s), with continuity, automatically, and/or manually, and/or autonomously (wirelessly), and/or remotely, when in motion, and/or stationary, and, for the purpose of, simultaneously reliably, transiting, and/or transferring, and/or transmitting, and/or receiving, and/or generating, and/or operating, and/or functioning, and/or interacting, and/or communicating, and/or controlling, and/or managing, and/or using, and/or storing, and/or working, and/or recording, and/or hooking-up, a desired media(s), and/or medium(s) (such as compressed air, and/or other gases for inflating, and/or deflating (+ and/or −), a corresponding attached pneumatic tire chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), and other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) electrical, and/or digital, component(s), part(s), mechanism(s), device(s), system(s), and/or apparatus assembly type(s), within, in, into, on, onto, beneath, between, surrounding, thru, and/or throughout, and/or associated with, such assemblage(s), and/or a corresponding adjoined vehicle assembly type(s), and/or such a corresponding adjoined, and/or adjoining, vehicle wheel assembly type(s), provide(s), and/or enable(s), and/or facilitate(s), a continuous, and/or intermittent, and/or alternating, and/or moving, and/or rotating, and/or spinning, and/or turning, and/or stationary mode(s), of operating, and/or functioning, while simultaneously reliably, transmitting, and/or transiting, and/or transferring, and/or receiving, electrical power, and/or digital data, and/or data, and/or electricity supply, and/or digital signal(s), and/or other necessary, and/or required, electrical, and/or digital, and/or electromagnetic, and/or fiber optic transmission(s), and/or other, electrical, and/or digital, operation(s), and/or function(s), and/or purpose(s), and/or task(s) (unbroken and/or unimpeded), of, for, from, into, thru, out of, and/or between, and/or associated with, such a corresponding adjoined, and/or adjoining, vehicle wheel assembly type(s), and, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, such a corresponding adjoined, and/or adjoining, vehicle wheel assembly type(s), and, a corresponding adjoined vehicle assembly type(s), for the purpose of, eliminating risk(s) of electrical damage(s) (i.e., overheating, and/or surging, and/or shorting, and/or overloading, and/or tearing, and/or fraying, and/or splitting, and/or eroding, and/or sparking, and/or arcing, and/or fire, and, other type(s) of electrical, and/or digital, damage(s)), of, for, from, into, thru, out of, and/or between, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of such a corresponding adjoined, and/or adjoining, ring-shaped (annular) rotary manifold slip-ring wiring harness assembly type(s), and, a corresponding adjoined, and/or adjoining, (fixed) ring-shaped (annular) rotary manifold assembly type(s) (piece(s)), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), when operating, and/or functioning, automatically, and/or manually, and/or autonomously (wirelessly), and/or remotely, and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), comprise, but, are not exclusive to, namely; a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) wire assembly type(s), conductor(s) assembly type(s), magnet(s) assembly type(s), permanent magnet(s) assembly type(s), ring(s) assembly type(s), pressure spring(s) assembly type(s), joint(s) assembly type(s), ball bearing(s) assembly type(s), sealed ball bearing(s) assembly type(s), ball bearing track(s) assembly type(s), electrical plug(s) assembly type(s), electrical socket(s) assembly type(s), fastener(s) assembly type(s), transmission line(s) assembly type(s), fiber optic transmission line(s) assembly type(s), sensor(s) assembly type(s), circuit(s) assembly type(s), antennae assembly type(s), actuator(s) assembly type(s), electrical wiring assembly type(s), fastener(s) assembly type(s), seal(s) assembly type(s), insulation assembly type(s), sealing material(s) assembly type(s), gromet(s) assembly type(s), channel(s) assembly type(s), aperture(s) assembly type(s), area(s) assembly type(s), conduit assembly type(s), and/or anchoring assembly type(s), and/or hook-up(s) assembly type(s), and/or mooring assembly type(s), and/or bracing assembly type(s), and/or bracket(s) assembly type(s), and/or protrusion(s) assembly type(s), and/or flange(s) assembly type(s), and/or associated protective housing case assembly type(s) (having shaped, and/or smooth, and/or measured, and/or dimensional, casing wall(s), and/or casing(s), and/or casing covering(s), channel(s), and/or aperture(s), and/or area(s), and/or protrusion(s), and/or flange(s) (with, and/or without corresponding aperture(s) assembly type(s))), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/ or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s) (depending on an application(s), and/or purpose(s)), and/or another necessary, and/or required, suitable, and/or workable, and/or configurable, means, and/or ways, and/or material(s), and/or equipment assembly type(s), for the purpose of, communicating, and/or joining, and/or amalgamating, and/or integrating, and/or hooking-up seamlessly, with a corresponding adjoined, and/or adjoining, (fixed) ring-shaped (annular) rotary manifold assembly type(s) (piece(s)), and, a corresponding adjoined, and/or adjoining, vehicle junction boxes and hook-up(s) point(s) assembly type(s), and, for the purpose of, simultaneously reliably, sending (transmitting), and/or receiving, and/or implementing, and/or generating, and/or using, and/or storing, and/or transiting, and/or transferring, and/or interacting, and/or communicating, and/or recording, and/or controlling, and/or managing, and/or working, and/or operating, and/or functioning, and/or hooking-up, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/ or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), are for the purpose of, interacting, and/or communicating, and/or providing, and/or facilitating, and/or enabling, and/or hooking-up, a corresponding adjoined, and/or adjoining, electrical, and/or digital, wiring assembly type(s), and/or cabling assembly type(s), and/or fiber-optic line(s) assembly type(s), and/or camera transmission line(s) assembly type(s), and/or radar transmission line(s) assembly type(s), and/or other transmission line(s) assembly type(s), and/or hook-up point(s) assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s) (unbroken and/or unimpeded) when in motion, and/or stationary, and, for the purpose of, managing, and/or controlling, and/or protecting, electrical, and/or digital, operating, and/or functioning, parameter(s), including, total circuit(s), and/or amp(s), and voltage per circuit(s), and/or connected sensor(s), and/or connected component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), are customizable, for the purpose of, integrating, and/or amalgamating, and/or joining, and/or hooking-up with a corresponding adjoined, and/or adjoining, (fixed) ring-shaped (annular) rotary manifold assembly type(s) (piece(s)), and, a corresponding adjoined, and/or adjoining, vehicle junction boxes and hook-up(s) point(s) assembly type(s), and, other associated component(s), part(s), mechanism(s), device(s), system(s), and/or apparatus assembly type(s) of such a corresponding adjoined, and/or adjoining vehicle wheel assembly type(s), and, a corresponding adjoined vehicle assembly type(s), and, for the purpose of, simultaneous reliable transit(s), and/or transfer(s), and/or transmission(s), and/or reception(s), of fluid(s), and/or compressed air, and/or pressurized gases, and/or electrical power, and/or data, and/or electricity supply, and/or digital signal(s), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), ideally operate, and/or function, to: 176° F.+[80° C.+], with wiring lead(s) rated to 221° F.+[105° C.+] depending on application(s), installation(s), continuous cooling factor(s), and/or environmental factor(s). However, engineering tolerance(s), and/or limit(s) of temperature(s), operating speed(s), and/or other in-built, inherent, attached, and/or attachable, technical attribute(s), and/or aspect(s), and/or element(s), of associated material(s), and/or equipment assembly type(s), and/or corresponding adjoined, and/or adjoining, component(s), part(s), mechanism(s), device(s), system(s), and/or apparatus assembly type(s), are customizable to meet, and/or exceed, specific, and/or strategic, and/or necessary, and/or required, application(s) requirement(s), when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, a ring-shaped (annular) rotary manifold slip-ring wiring harness assembly type(s), and/or an electrical, and/or digital, wiring harness assembly type(s), electrical, and/or digital, wiring connection(s) assembly type(s), and/or other similar working, electrical, and/or digital, and/or magnetic, slip-ring wiring harness assembly type(s), and/or wiring harness assembly type(s), comprise, but, are not exclusive to, namely; metal(s), magnet(s), permanent magnet(s), plastic(s), synthetic(s) material(s), polymer(s), rubber material(s), composite(s), graphite(s), and/or another necessary, and/or required, suitable, and/or workable, and/or configurable, element(s), and/or compound(s), and/or means, and/or ways, and/or material(s) and/or equipment assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), depending on a necessary, and/or required, corresponding application(s), and/or use(s), and/or operating, and/or functioning, standard(s), and/or environment(s), of such a corresponding adjoined, and/or adjoining, vehicle wheel assembly type(s), and, a corresponding adjoined vehicle assembly type(s), when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), and/or a corresponding adjoined, and/or adjoining, electrical, and/or digital, wiring harness assembly type(s), and/or a corresponding adjoined, and/or adjoining, electrical, and/or digital, wiring connection(s) assembly type(s), and/or other similar working, corresponding, adjoined, and/or adjoining, electrical, and/or digital, and/or magnetic, slip-ring wiring harness assembly type(s), and/or wiring harness assembly type(s), is assembled, and/or integrated, and/or amalgamated, and/or hooked-up, with, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, a vehicle junction boxes and hook-up(s) point(s) assembly type(s), for the purpose of, facilitating, and/or enabling, and/or allowing, a simultaneous reliable, transit(s), and/or transfer(s), and/or transmission(s), and/or reception(s), and/or operation(s), and/or function(s), and/or purposes(s), and/or task(s) (unbroken, and/or unimpeded), of electrical power, and/or data, and/or digital data, and/or electricity supply, and/or digital signal(s), and/or infrared signal(s), and/or video signal(s), and/or camera signal(s), and/or electromagnetic signal(s), and/or fiber optic fiber optic(s) signal(s), and/or wireless communication(s), and/or spectrum(s), and/or band-width(s), and/or another necessary, and/or required, suitable, and/or workable, and/or configurable media(s), and/or medium(s), of, for, from, into, thru, out of, and/or between, and/or associated with, such a corresponding adjoined, and/or adjoining, vehicle wheel assembly type(s), and, a corresponding adjoined and/or adjoining pneumatic tire(s) assembly type(s), and, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary, and, for the purpose of, simultaneously reliably, linking, and/or connecting, and/or working, and/or transiting, and/or transferring, and/or transmitting, and/or receiving, and/or communicating, and/or operating, and/or functioning, and/or controlling, and/or managing, and/or using, and/or storing, and/or hooking-up, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

15. In its most preferred embodiment, such a corresponding adjoined, and/or adjoining, vehicle wheel assembly type(s), has, and/or is holding, and/or carrying, and/or operating, and/or functioning, and/or integrating, and/or amalgamating, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s), assembly type(s), for the purpose of, accommodating, and/or installing, and/or shielding, and/or protecting, and/or anchoring, and/or mooring, and/or embedding, and/or slotting and/or compacting, and/or packaging, and/or positioning, and/or orienting, and/or aligning, and/or hooking-up, and/or securing (fixed) in-place, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold housing (case) assembly type(s) (piece), and, a ring-shaped (annular) rotary manifold shaft (cap) assembly type(s) (piece), and/or a ring-shaped (annular) rotary manifold slip-ring wiring harness assembly type(s), and, a vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; a hose(s) assembly type(s), tube(s) assembly type(s), conduit(s) assembly type(s), cable(s) assembly type(s), electrical wiring assembly type(s), fiber-optic(s) transmission line(s) assembly type(s), transmission line(s) assembly type(s), sensor(s) assembly type(s), circuit(s) assembly type(s), antennae assembly type(s), microprocessor(s) assembly type(s), channel(s) assembly type(s), aperture(s) assembly type(s), valve(s) assembly type(s), joint(s) assembly type(s), seal(s) assembly type(s), sealing material(s), washer(s) assembly type(s), gromet(s) assembly type(s), fastener(s) assembly type(s), tie(s) assembly type(s) and, other associated, specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of such a corresponding adjoined, and/or adjoining, vehicle wheel assembly type(s), and, a corresponding adjoined vehicle assembly type(s), and, for the purpose of, simultaneously reliably, transiting, and/or transferring, and/or transmitting, and/or receiving, and/or delivering, and/or discharging, and/or operating, and/or functioning, and/or communicating, and/or interacting, and/or integrating, and/or controlling, and/or managing, and/or recording, and/or using, and/or generating, and/or storing, and/or hooking-up, a desired media(s), and/or medium(s) (such as compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), of, for, from, into, thru, out of, and/or between, and/or associated with, such a corresponding adjoined, and/or adjoining vehicle wheel assembly type(s), and, a corresponding adjoined vehicle assembly type(s), automatically, and/or manually, and/or autonomously (wirelessly), and/or remotely, when in motion, and/or stationary.

16. In its most preferred embodiment, such a corresponding adjoined, and/or adjoining, vehicle wheel assembly type(s) has, and/or is holding, and/or carrying, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) passage(s) assembly type(s), and/or path(s) assembly type(s), and/or conduit(s) assembly type(s), and/or junction(s) assembly type(s), and/or intersection(s) assembly type(s), and/or hook-up(s) point(s) assembly type(s), and/or link(s) assembly type(s), and/or tunnel(s) assembly type(s), and/or passageway(s) assembly type(s), and/or receptacle(s) assembly type(s), and/or channel(s) assembly type(s), and/or aperture(s) assembly type(s), and/or area(s) assembly type(s), and/or hook-up(s) assembly type(s), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) connection(s) point(s) assembly type(s), and/or connecting(s) point(s) assembly type(s), and/or hook-up(s) assembly type(s), and/or junction(s) assembly type(s), and/or junction box assembly type(s), and/or interchange(s) assembly type(s), and/or joint(s) assembly type(s), and/or another necessary, and/or required, suitable, and/or workable, and/or configurable, means, and/or ways, and/or material(s), and/or equipment assembly type(s), for the purpose of, enabling, and/or facilitating, and/or allowing, a 90° degree (angle(s)), and/or other necessary, and/or required, suitable, and/or workable, and/or configurable, orientation(s), and/or positioning(s), and/or direction(s), and/or ways, and/or angle(s) of such corresponding adjoined, and/or adjoining, path(s), and/or passageway(s), and/or channel(s), and/or aperture(s), and/or area(s) assemblage(s), within, in, into, on, onto, beneath, between, surrounding, thru, and/or throughout, the body (architecture) of such a corresponding adjoined, and/or adjoining, vehicle wheel assembly type(s), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), (fixed) ring-shaped (annular) rotary manifold assembly type(s) (piece(s)), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), ring-shaped (annular) rotary manifold slip-ring wiring harness assembly type(s), and, a corresponding attached pneumatic tire(s) chamber(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), and, for the purpose of, unbroken, and/or unimpeded, route(s), and/or path(s), and/or direction(s), and/or control(s), and/or management(s), of flow(s), and/or transfer(s), and/or transit(s), of a desired media(s), and/or medium(s) (such as compressed air and/or other gases (+ and/or −), for a corresponding attached pneumatic tire(s) chamber(s) assembly type(s), and/or electricity supply, data, and/or digital signal(s), and/or fluid(s)), and/or other corresponding adjoined, and/or adjoining operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

17. In its most preferred embodiment, such a corresponding adjoined, and/or adjoining, vehicle wheel assembly type(s), has, and/or is holding, and/or is carrying, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), for the purpose of, embedding, and/or slotting, and/or holding, and/or carrying, and/or packaging, and/or compacting, and/or positioning, and/or orienting, and/or aligning, and/or protecting, and/or shielding, and/or securing (fixed) in-place, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s), comprising, but, not exclusive to, namely; a (fixed) ring-shaped (annular) rotary manifold assembly type(s) (piece(s)), a ring-shaped (annular) rotary manifold slip-ring wiring harness assembly type(s), a vehicle junction boxes and hook-up point(s) assembly type(s), an automated vehicle Central Tire Inflation System (CTIS) assembly type(s), an associated computer system assembly type(s), an associated software(s) assembly type(s), an associated operating system assembly type(s), an associated software(s) application(s) (program(s)) assembly type(s), and associated, and/or (unique) software program(s) assembly type(s), associated control(s) assembly type(s), associated control(s) dashboard(s) assembly type(s), associated instrument(s) panel(s) assembly type(s), associated control console(s) assembly type(s), associated control panel(s) assembly type(s), associated switches assembly type(s), associated fastener(s) assembly type(s), bolt(s) assembly type(s), screw(s) assembly type(s), anchor assembly type(s), bracket(s) assembly type(s), casing cover(s) assembly type(s), protective housing case(s) assembly type(s), seal(s) assembly type(s), gasket(s) assembly type(s), O-ring(s) assembly type(s), metal(s) sealing ring(s) assembly type(s), sealing ring(s) assembly type(s), sealing material(s), insulation material(s), valve(s) assembly type(s), nozzle(s) assembly type(s), control valve(s) assembly type(s), hose(s) assembly type(s), tube(s), assembly type(s), pipe(s) assembly type(s), electrical wiring junction boxes assembly type(s), and/or junction boxes assembly type(s), and/or electric wiring assembly type(s), and/or electric wiring harness assembly type(s), and/or circuit(s) assembly type(s), and/or sensor(s) assembly type(s), and/or microprocessor(s) assembly type(s), and/or fiber-optic transmission line(s) assembly type(s), and/or video cable(s) assembly type(s), and/or digital transmission line(s) assembly type(s), and/or electrical cable(s) assembly type(s), electrical generator(s) assembly type(s), and/or electrical motor(s) assembly type(s), and/or electromotive generator(s)/electric motor(s) (combined) assembly type(s), and/or electrical and/or video, and/or digital junction box assembly type(s), and/or an electricity transformer(s) assembly type(s), and/or electricity (AC-DC) converter(s) assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning, and/or blinking, and/or flashing, and/or illuminating) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), and, for the purpose of, facilitating, and/or enabling, and/or allowing, a simultaneous reliable, seamless passage(s), and/or flow(s), and/or transit(s), and/or transfer(s) (unbroken, and/or unimpeded), of a desired media(s), and/or medium(s) (such as, compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and, and/or autonomously (wirelessly), and/or remotely, when in motion, and/or stationary.

18. In its most preferred embodiment, such a corresponding adjoined, and/or adjoining, vehicle wheel assembly type(s), has, and/or is holding, and/or carrying, and/or operating, and/or functioning, and/or integrating, and/or interacting, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s), assembly type(s), and/or compartment(s) assembly type(s), and/or vessel(s) assembly type(s), and/or pathway(s) assembly type(s), and/or passage(s) assembly type(s), and/or tunnel(s) assembly type(s), for the purpose of, embedding, and/or slotting, and/or anchoring, and/or bracing, and/or mooring, and/or positioning, and/or orienting, and/or aligning, and/or protecting, and/or shielding, and/or compacting, and/or packaging, and/or hooking-up, and/or assembling, and/or securing (fixed) in-place, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold housing (case) assembly type(s) (piece), and, ring-shaped (annular) rotary manifold shaft (cap) assembly type(s) (piece), and/or a ring-shaped (annular) rotary manifold slip-ring wiring harness assembly type(s), and, a vehicle junction boxes and hook-up(s) point(s) assembly type(s), with the use of, and/or by way of, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) fastener(s) assembly type(s), and/or bolt(s) assembly type(s), and/or screw(s) assembly type(s), and/or seal(s) assembly type(s), and/or sealing material(s), and/or bracket(s) assembly type(s), and/or bracing assembly type(s), and/or mooring assembly type(s), and/or anchoring assembly type(s), and/or strap(s) assembly type(s), and/or harnesses assembly type(s), and/or ties assembly type(s), and/or joint(s) assembly type(s), and/or ball bearing(s) assembly type(s), and/or ball bearing(s) fastener(s) assembly type(s), and/or sealed ball bearing(s) assembly type(s), and/or ball bearing track(s) assembly type(s), and/or valve(s) assembly type(s), and/or socket(s) assembly type(s), and/or wiring assembly type(s), and/or plug(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), apparatus assembly type(s), and/or associated protective housing case(s) assembly type(s), of, for, from, into, thru, out of, and/or between, and/or associated with, such a corresponding adjoined, and/or adjoining, vehicle wheel assembly type(s), and, a corresponding adjoined vehicle assembly type(s), and, for the purpose of, proximity, and/or assembling, and/or linking, and/or operating, and/or functioning, and/or connecting, and/or attaching, and/or interacting, and/or communicating, and/or controlling, and/or managing, and/or generating, and/or integrating, and/or using, and/or storing, and/or recording, and/or working, and/or hooking-up a desired media(s), and/or medium(s) (i.e., compressed air, gases, electricity, digital signal(s), and/or fluid(s)), of, for, from, into, thru, out of, and/or between, and/or associated with, such a corresponding adjoined, and/or adjoining vehicle wheel assembly type(s), and, a corresponding adjoined vehicle assembly type(s), that has, and/or is holding, and/or carrying, and/or operating, and/or functioning, and/or working, and/or interacting, and/or communicating, and/or generating, and/or using, and/or storing, and/or controlling, and/or managing, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle junction boxes, and, hook-up(s) point(s) assembly type(s), and, an automated vehicle Central Tire Inflation System (CTIS) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and, for the purpose of, simultaneously reliably, generating, and/or operating, and/or functioning, and/or transiting, and/or transferring, and/or using, and/or storing, and/or controlling, and/or managing, and/or communicating, and/or working, and/or interacting, and/or integrating, and/or recording, and/or hooking-up, a desired media(s), and/or medium(s) (such as, compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

19. In its most preferred embodiment, such a corresponding adjoined, and/or adjoining, vehicle wheel assembly type(s), has, and/or is holding, and/or carrying, and/or operating, and/or functioning, and/or interacting, and/or integrating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), that has, and/or is holding, and/or carrying, and/or operating, and/or functioning, and/or interacting, and/or integrating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) protective housing casing (outer annular, and/or inner annular wall(s)) assembly type(s), that is made of, and/or consist(s) of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, shape(s), and/or form(s), and/or pattern(s), and/or smooth, wall(s) assembly type(s), and/or channel(s) assembly type(s), and/or aperture(s) assembly type(s), and/or area(s) assembly type(s), and/or passageway(s) assembly type(s), and/or tunnel(s) assembly type(s), and/or path(s) assembly type(s), and/or vessel(s) assembly type(s), and/or compartment(s) assembly type(s), and/or seal(s) assembly type(s), and/or sealing material(s), and/or protrusion(s) assembly type(s), and/or flange(s) assembly type(s) (with, and/or without, a corresponding adjoined, and/or adjoining, aperture(s) assembly type(s)), and/or joint(s) assembly type(s), and/or ball bearing(s) assembly type(s), and/or ball bearing(s) track(s) assembly type(s), and/or sealed ball bearing(s) assembly type(s), and/or connecting valve(s) assembly type(s), and/or connection(s) assembly type(s), and/or hook-up(s) assembly type(s), and/or hose(s) assembly type(s), and/or tube(s) assembly type(s) that is applied within, in, into, on, onto, beneath, between, surrounding, thru, and/or throughout, a specific and/or strategic, portion(s), and/or area(s), of such a protective housing casing (outer annular, and/or inner annular wall(s)) assembly type(s), and/or protective housing casing structure(s) assembly type(s), and/or protective housing casing(s) assembly type(s), for the purpose of, shielding, and/or protecting, and/or assembling, and/or securing (fixed) in-place, and/or hooking-up, a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), and, a corresponding adjoined, and/or adjoining, vehicle junction boxes and hook-up(s) point(s) assembly type(s), and, other associated component(s), part(s) mechanism(s), device(s), system(s), and/or apparatus assembly type(s), within, in, into, on, onto, beneath, between, surrounding, thru, and/or throughout, and/or associated with, such a corresponding adjoined, and/or adjoining vehicle wheel assembly type(s), and, a corresponding adjoined vehicle assembly type(s), and, for the purpose of, allowing, and/or facilitating, and/or enabling, such an corresponding adjoined, and/or adjoining, (fixed) ring-shaped (annular) rotary manifold housing (case) assembly type(s) (piece), to insert, and/or embed, and/or slot, and/or compact, and/or package, and/or position, and/or orient, and/or align, and/or hook-up, and/or moor, and/or anchor, and/or dock, and/or secure (fixed) in-place, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), of the body (architecture) of such a corresponding adjoined, and/or adjoining, vehicle wheel assembly type(s), and, for the purpose of assembly, and/or proximity of such corresponding adjoined, and/or adjoining, ring-shaped (annular) rotary manifold (piece(s)) assemblage(s), and, a corresponding adjoined, and/or adjoining, ring-shaped (annular) rotary manifold slip-ring wiring harness assemblage(s), and, a corresponding adjoined, and/or adjoining, vehicle junction boxes and hook-up(s) point(s) assembly type(s), together (i.e., connecting, and/or hooking-up, internally, and/or externally), with the use of, and/or by way of, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) fastener(s) assembly type(s), and/or seal(s) assembly type(s), and/or joint(s) assembly type(s), and/or sealing material(s), and/or wiring assembly type(s), and/or hose(s) assembly type(s), and/or socket(s) assembly type(s), and/or plug(s) assembly type(s), and/or valve(s) assembly type(s), and/or connection(s) assembly type(s), and/or hook-up(s) assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or associated protective housing case(s) assembly type(s), of, for, from, into, thru, and/or between, and/or associated with such a corresponding adjoined, and/or adjoining, vehicle wheel assembly type(s), and, a corresponding adjoined vehicle assembly type(s), and, for the purpose of isolated, and/or insulated, and/or measured, and/or dimensional flow path(s), and/or passageway(s) for a desired media(s), and/or medium(s) (unbroken, and/or unimpeded), and, for the purpose of, preventing slipping, unintended, and/or unwanted moving, and/or movement(s), and/or vibration(s), and/or oscillating, and/or wobbling, and/or jolting, and/or slipping, of such corresponding adjoined, and/or adjoining, assemblage(s), when such a corresponding adjoined, and/or adjoining, vehicle wheel assembly type(s), is mounted, and/or attached, onto, and/or with, a corresponding adjoined vehicle assembly type(s), and, associated corresponding adjoined, and/or adjoining, assemblage(s), and, when, directional torque is applied (when in motion), and/or stationary.

20. In its most preferred embodiment, such a corresponding adjoined, and/or adjoining, vehicle wheel assembly type(s), has, and/or is holding, and/or carrying, and/or operating, and/or functioning, and/or integrating, and/or interacting, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), that has, and/or is holding, and/or carrying, and/or interacting, and/or integrating, and/or working, and/or operating, and/or functioning, and/or hooking-up, with the use of, and/or by way of, an specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, protrusion(s) assembly type(s), and/or flange(s) assembly type(s) (with, and/or without, a corresponding adjoined, and/or adjoining, aperture(s) assembly type(s)), and, that are specifically, and/or strategically, placed with, within, in, into, on, onto, beneath, between, surrounding, thru, and/or throughout, such a corresponding adjoined, and/or adjoining, protective housing case(s) assembly type(s), and/or protective housing casing(s) assembly type(s), of a ring-shaped (annular) rotary manifold assembly type(s) (piece(s)), and/or a corresponding adjoined, and/or adjoining ring-shaped (annular) rotary manifold slip-ring wiring harness assembly type(s), for the purpose of, securing (fixed) in-place, and/or hooking-up, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) channel(s) assembly type(s), and/or aperture(s) assembly type(s), and/or area(s) assembly type(s), of such corresponding adjoined, and/or adjoining, assemblage(s), and, of the body (architecture) of such a corresponding adjoined, and/or adjoining, vehicle wheel assembly type(s), and, a corresponding adjoined, and/or adjoining, vehicle junction boxes and hook-up(s) point(s) assembly type(s), when such a corresponding adjoined, and/or adjoining, vehicle wheel assembly type(s), is mounted, and/or attached, and/or hooked-up, onto, and/or with, a corresponding adjoined vehicle assembly type(s), and, for the purpose of, preventing unintended, and/or unwanted, slipping, vibrating, oscillating, moving, wobbling, jolting, and/or movement(s), of such a corresponding adjoined, and/or adjoining, assemblage(s), when such a corresponding adjoined, and/or adjoining, vehicle wheel assembly type(s), is mounted, and/or attached, and/or hooked-up, onto, and/or with, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), when, directional torque is applied (when in motion), and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, protrusion(s) assembly type(s), and/or flange(s) assembly type(s) (with, and/or without, a corresponding adjoined, and/or adjoining, aperture(s) assembly type(s)), are positioned, and/or placed, and/or located, and/or arranged, within, in, into, on, onto, beneath, between, surrounding, thru, and/or throughout, a specific, and/or strategic, corresponding adjoined, and/or adjoining, portion(s), and/or area(s), of such a corresponding adjoined, and/or adjoining, (fixed) ring-shaped (annular) rotary manifold assembly type(s) (piece(s)) and/or a corresponding adjoined, and/or adjoining, ring-shaped (annular) rotary manifold slip-ring wiring harness assembly type(s) protective housing case(s) assembly type(s), and/or protective housing casing(s) assembly type(s), for the purpose of assembly, and/or proximity, and/or hooking-up, together, and/or with, within, in, into, on, onto, beneath, between, surrounding, thru, and/or throughout a corresponding adjoined, and/or adjoining, vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and, for the purpose of, preventing unintended, and/or unwanted, oscillating, slipping, vibrating, moving, wobbling, jolting, and/or movement(s), of such a corresponding adjoined, and/or adjoining, assemblage(s), when such a corresponding adjoined, and/or adjoining, vehicle wheel assembly type(s), is mounted, and/or attached, and/or assembled, and/or hooked-up, onto, and/or with, a corresponding adjoined vehicle assembly type(s), and, when, directional torque is applied (when in motion), and/or stationary, and, for the purpose of, providing a corresponding adjoined, and/or adjoining, flush, and/or level, and/or even, and/or true, and/or aligned, positioning, and/or mounting, and/or mooring, and/or anchoring, and/or embedding, and/or slotting, and/or compacting, and/or packaging, and/or hooking-up, and/or securing (fixed) in-place, of such a corresponding adjoined, and/or adjoining, (fixed) ring-shaped (annular) rotary manifold assembly type(s) (piece(s)), and/or a corresponding adjoined, and/or adjoining, ring-shaped (annular) rotary manifold slip-ring wiring harness assembly type(s), with, within, in, into, on, onto, beneath, between, surrounding, thru, and/or throughout, the body (architecture) of such a corresponding adjoined, and/or adjoining, vehicle wheel assembly type(s), and, a corresponding adjoined, and/or adjoining, vehicle junction boxes, and hook-up(s) point(s) assembly type(s), of a corresponding adjoined vehicle assembly type(s) (i.e., with the use of, and/or by way of, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) joint(s) assembly type(s), bolt(s) assembly type(s), and/or screw(s) assembly type(s), and/or fastener(s) assembly type(s), and/or valve(s) assembly type(s), and/or wiring harness assembly type(s), and/or hose(s) assembly type(s), and/or tube(s) assembly type(s), and/or connection point(s) assembly type(s), and/or hook-up(s) assembly type(s), and/or gromet(s) assembly type(s), and/or seal(s) assembly type(s), and/or sealing materials, and/or spacer(s) assembly type(s), bushing(s) assembly type(s), and/or washer(s) assembly type(s), O-ring(s) assembly type(s), and/or channel(s) assembly type(s), and/or aperture(s) assembly type(s), and/or area(s) assembly type(s), and, component(s), part(s), mechanism(s), device(s), system(s), and/or apparatus assembly type(s)), and/or another necessary, and/or required, suitable, and/or workable, and/or configurable, means, and/or ways, and/or material(s), and/or equipment assembly type(s), that are associated with, such corresponding adjoined, and/or adjoining, assemblage(s), and/or that complete assembly, and/or hooking-up, of such corresponding adjoined, and/or adjoining, assemblage(s), and, for the purpose of a (unbroken, and/or unimpeded) simultaneously reliable connection(s), and/or connecting(s), of a desired media(s), and/or medium(s) (i.e., compressed air, gases, electricity supply, data, digital signal(s), fluid(s)) of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when, in motion, and/or stationary.

21. In its most preferred embodiment, such a corresponding adjoined, and/or adjoining, vehicle wheel assembly type(s), has, and/or is holding, and/or carrying, and/or integrating, and/or interacting, and/or operating and/or functioning, and/or working, and/or communicating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), for the purpose of, hooking-up, and/or linking, and/or assembly (unbroken, and/or unimpeded), with a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle connection(s) point(s) assembly type(s), and/or vehicle connecting(s) point(s) assembly type(s), and/or vehicle hook-ups point(s) assembly type(s), and/or other vehicle connection(s) assembly type(s), and/or vehicle hook-up(s) assembly type(s), of, for, from, into, thru, and/or between, and/or associated with a corresponding adjoined vehicle assembly type(s), that emanate from, and/or are held, and/or carried, and/or protected, and/or shielded by, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle connection(s) protective housing case(s) assembly type(s), and/or vehicle connecting(s) protective housing case(s) assembly type(s), and/or vehicle hook-up(s) protective housing case(s) assembly type(s), and/or vehicle junction boxes, and, hook-up(s) point(s) assembly type(s), and/or another necessary, and/or required, suitable, and/or workable, and/or configurable, means, and/or ways, and/or material(s), and/or equipment assembly type(s), of, for, from, into, thru, out of, and/or between, and/or associated with, such a corresponding adjoined, and/or adjoining, vehicle wheel assembly type(s), and, a corresponding vehicle assembly type(s), and, that is ideally located, and/or positioned, and/or situated, within, in, into, on, onto, between, beneath, surrounding, thru, and/or throughout, a corresponding adjoined vehicle assembly type(s), axel(s) assembly type(s), and/or hub(s) assembly type(s), and/or brake(s) rotor(s) assembly type(s), and/or brake(s) assembly type(s), and/or brake caliper(s) assembly type(s), and/or steering arm(s) assembly type(s), and/or strut(s) assembly type(s), and/or suspension component(s), part(s), mechanism(s), device(s), system(s), and/or apparatus assembly type(s), and/or wheel well(s) assembly type(s), and/or another necessary, and/or required, suitable, and/or workable, and/or configurable, placement(s), and/or area(s), means, and/or ways, and/or material(s), and/or equipment assembly type(s), of a corresponding adjoined vehicle assembly type(s), for the purpose of, a proximity, and/or assembly transit point(s) assembly type(s), and/or transfer point(s) assembly type(s), and/or hook-up point(s) assembly type(s), and/or bridge(s) assembly type(s) (unbroken, and/or unimpeded), of, for, from, into, thru, out of, and/or between, and/or associated with, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s) (unbroken, and/or unimpeded), when in motion, and/or stationary, and, for the purpose of, amalgamating, and/or integrating, and/or anchoring, and/or mooring, and/or assembling, and/or packaging, and/or stabilizing, and/or orienting, and/or positioning, and/or aligning, and/or securing (fixed) in-place, and/or hooking-up, a corresponding adjoined, and/or adjoining, (fixed) ring-shaped (annular) rotary manifold assembly type(s) (piece(s)), and/or a ring-shaped (annular) rotary manifold slip-ring wiring harness assembly type(s) (as secured (fixed) in-place, within, in, into, on, onto, beneath, between, surrounding, thru, and/or throughout, such a corresponding adjoined, and/or adjoining, vehicle wheel assembly type(s)), when, mounted, and/or attached, onto, and/or with a corresponding adjoined vehicle assembly type(s), and, for the purpose of, preventing unintended, and/or unwanted, slipping, oscillating, vibrating, moving, wobbling, jolting, and/or movement(s), of such an corresponding adjoined, and/or adjoining, assemblage(s) when such a corresponding adjoined, and/or adjoining, vehicle wheel assembly type(s), is mounted, and/or attached, and/or hooked-up, onto, and/or with, a corresponding adjoined vehicle assembly type(s), and, when, directional torque is applied (when in motion), and/or stationary, and, for the purpose of, simultaneously reliably, transiting, and/or transferring, and/or generating, and/or using, and/or storing, and/or communicating, and/or controlling, and/or managing, and/or recording, and/or operating, and/or functioning, and/or working, and/or hooking-up, a desired media(s), and/or medium(s) (such as, compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle protective housing case(s) assembly type(s), and/or vehicle junction boxes assembly type(s), and/or vehicle intersection(s) assembly type(s), and/or vehicle hook-up(s) case(s) assembly type(s), and/or vehicle junction boxes and hook-up(s) point(s) assembly type(s), and/or vehicle bridge(s) assembly type(s) also has, and/or is holding, and/or carrying, and/or protecting, and/or operating, and/or functioning, and/or working, and/or integrating, and/or interacting, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; a channel(s) assembly type(s), aperture(s) assembly type(s), area(s) assembly type(s), compartment(s) assembly type(s), vessel(s) assembly type(s), passageway(s) assembly type(s), path(s) assembly type(s), joint(s) assembly type(s), swivel joint(s) assembly type(s), connection(s) point(s) assembly type(s), connecting(s) point(s) assembly type(s), hook-up(s) point(s) assembly type(s), bracing point(s) assembly type(s), anchoring point(s) assembly type(s), mooring point(s) assembly type(s), protrusion(s) assembly type(s), and/or flange(s) assembly type(s) (with, and/or without, a corresponding adjoined, and/or adjoining, aperture(s) assembly type(s)), associated protective housing case(s) assembly type(s), fastener(s) assembly type(s), seal(s) assembly type(s), sealing material(s), O-ring(s) assembly type(s), valve(s) assembly type(s), hose(s) assembly type(s), pipe(s) assembly type(s), tube(s) assembly type(s), wire(s) assembly type(s), transmission line(s) assembly type(s), fiber-optic line(s) assembly type(s), plug(s) assembly type(s), socket(s) assembly type(s), circuit(s) assembly type(s), sensor(s) assembly type(s), computer(s) assembly type(s), actuator(s) assembly type(s), antennae assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, ways, and/or means, and/or material(s), and/or equipment assembly type(s) within, in, into, on, onto, beneath, between, surrounding, thru, and/or throughout, and/or associated with, such a corresponding adjoined, and/or adjoining, vehicle protective housing case(s) assembly type(s), and/or vehicle junction boxes assembly type(s), and/or vehicle intersection(s) assembly type(s), and/or vehicle hook-up(s) case(s) assembly type(s), and/or vehicle junction boxes and hook-up(s) point(s) assembly type(s), and/or vehicle bridge(s) assembly type(s), and/or another necessary, and/or required, suitable, and/or workable, and/or configurable, means, and/or ways, and/or material(s), and/or equipment assembly type(s), for the purpose of, linking, and/or positioning, and/or orienting, and/or aligning, and/or stabilizing, and/or bracing, and/or anchoring, and/or protecting, and/or shielding, and/or combining, and/or compacting, and/or packaging, and/or amalgamating, and/or integrating, and/or interacting, and/or bridging, and/or securing (fixed) in-place, and/or communicating, and/or hooking-up (unbroken, and/or unimpeded), other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary, comprising, but, not exclusive to, namely; an automated vehicle Central Tire Inflation System (CTIS) assembly type(s), associated computer(s) assembly type(s), associated software(s) assembly type(s), associated (unique) software(s) assembly type(s), associated operating system(s) assembly type(s), associated instrument panel(s), associated control console(s) assembly type(s), associated switches assembly type(s), associated power system(s) assembly type(s), associated motor(s) assembly type(s), associated batteries assembly type(s), associated illumination(s) assembly type(s), associated generator(s) assembly type(s), hose(s) assembly type(s), tube(s) assembly type(s), pipe(s) assembly type(s), wire(s) assembly type(s), wiring assembly type(s), cable(s) assembly type(s), transmission line(s) assembly type(s), fiber-optic(s) transmission line(s) assembly type(s), valve(s) assembly type(s), seal(s) assembly type(s), O-ring(s) assembly type(s), fastener(s) assembly type(s), sealing material(s), motor(s) assembly type(s), electromotive generator(s)/electric motor(s) assembly type(s), pump(s) assembly type(s), compressor(s) assembly type(s), batteries assembly type(s), vessel(s) assembly type(s), microprocessor(s) assembly type(s), control(s) assembly type(s), control(s) panel(s) assembly type(s), actuator(s) assembly type(s), sensor(s) assembly type(s), circuit(s) assembly type(s), antennae assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s), and, for the purpose of, simultaneous reliable, transit(s), and/or transfer(s), and/or use(s) and/or hook-up(s), of a desired media(s), and/or medium(s) (such as, compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle protective housing case(s) assembly type(s), and/or vehicle junction boxes assembly type(s), and/or vehicle intersection(s) assembly type(s), and/or vehicle hook-up(s) case(s) assembly type(s), and/or vehicle junction boxes and hook-up(s) point(s) assembly type(s), and/or vehicle bridge(s) assembly type(s), component(s), part(s), mechanism(s), device(s), and/or apparatus assembly type(s), and, protective casing(s) structure(s) (outer wall(s), and/or inner wall(s)) assembly type(s), and/or another necessary, and/or required, suitable, and/or workable, and/or configurable, vehicle protective housing case(s) assembly type(s), and/or vehicle junction boxes assembly type(s), and/or vehicle intersection(s) assembly type(s), and/or vehicle hook-up(s) case(s) assembly type(s), and/or vehicle junction boxes and hook-up(s) point(s) assembly type(s), and/or vehicle bridge(s) assembly type(s), are made of a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and, channel(s) assembly type(s), and/or aperture(s) assembly type(s), and/or area(s) assembly type(s), that comprise, but, are not exclusive to, namely; metal(s) assembly type(s), metal alloy(s) assembly type(s), composite(s) assembly type(s), graphene assembly type(s), vulcanized rubber(s) assembly type(s), element(s) assembly type(s), material(s) assembly type(s), plastic(s) assembly type(s), synthetic(s) material(s), and/or another necessary, and/or required, suitable, and/or workable, and/or configurable material(s), and/or element(s), and/or composite(s) and/or means, and/or ways, and/or equipment assembly type(s), for the purpose of, compactness (i.e., miniaturization), and, for the purpose of, reduced weight (i.e., light weight (reduced mass)), and, for the purpose of, solidity (i.e., strength), and, for the purpose of, durability, and, for the purpose of, resistance to extreme environmental condition(s), and, for the purpose of, wear, and tear, and, for the purpose of, reliability, and, for the purpose of, form (aesthetic), and, for the purpose of, functionality, and, for the purpose of, heat, and/or cold, air, and/or gases, and/or fluid(s) use(s), and, for the purpose of, electricity transit(s), and/or transfer(s), and/or electricity supply, and, for the purpose of, digital signal(s), and/or other transmission(s) use(s), and, for the purpose of, protection, and, for the purpose of, safety, and, for the purpose of, air-tight (sealed), isolated, and/or insulated, passageways, channel(s), aperture(s), and/or area(s) assembly type(s), and, for the purpose of, simultaneously reliably, operating, and/or functioning, and/or transiting, and/or transferring, and/or generating, and/or using, and/or storing, and/or controlling, and/or communicating, and/or managing, and/or hooking-up (unbroken, and/or unimpeded) seamlessly, a desired media(s), and/or medium(s) (such as, compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle protective housing case(s) assembly type(s), and/or vehicle junction boxes assembly type(s), and/or vehicle intersection(s) assembly type(s), and/or vehicle hook-up(s) case(s) assembly type(s), and/or vehicle junction boxes and hook-up(s) point(s) assembly type(s), and/or vehicle bridge(s) assembly type(s), is embedded, and/or slotted, and/or held, and/or anchored, and/or moored, and/or amalgamated, and/or integrated, and/or tethered, and/or compacted, and/or packaged, and/or positioned, and/or protected, and/or oriented, and/or aligned, and/or secured (fixed) in-place, and/or hooked-up, with, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), that are part of, and/or with, within, in, into, on, onto, beneath, between, surrounding, thru, and/or throughout, a corresponding adjoined, and/or adjoining, ring-shaped (annular) rotary manifold assembly type(s) (piece(s)), and/or a corresponding adjoined, and/or adjoining, ring-shaped (annular) rotary manifold slip-ring wiring harness assembly type(s), and/or associated component(s), part(s), mechanism(s), device(s), system(s), and/or apparatus assembly type(s) (as assembled together, and, positioned, and/or oriented, and/or aligned, and/or compacted, and/or packaged, and/or embedded, and/or slotted, and/or secured (fixed) in-place, and/or hooked-up, within, in, into, on, onto, beneath, between, surrounding, thru, and/or throughout, the body (architecture) of such a corresponding adjoined and/or adjoining, vehicle wheel assembly type(s)), for the purpose of, integrating, and/or hooking-up, and/or amalgamating (seamlessly) a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) connection(s) assembly type(s), and/or connecting(s) assembly type(s), and/or hook-up(s) assembly type(s), of, for, from, into, thru, out of, and/or between, and/or associated with, such a corresponding adjoined, and/or adjoining, vehicle wheel assembly type(s), and, a corresponding adjoined vehicle assembly type(s) (unbroken, and/or unimpeded), when in motion, and/or stationary, and, for the purpose of, unifying, and/or assembling, and/or hooking-up, a corresponding adjoined, and/or adjoining, (fixed) ring-shaped (annular) rotary manifold assembly type(s) (piece(s)), and/or a corresponding adjoined, and/or adjoining, ring-shaped (annular) rotary manifold slip-ring wiring harness assembly type(s), with a corresponding adjoined, and/or adjoining, vehicle protective housing case(s) assembly type(s), and/or vehicle junction boxes assembly type(s), and/or vehicle intersection(s) assembly type(s), and/or vehicle hook-up(s) case(s) assembly type(s), and/or vehicle junction boxes and hook-up(s) point(s) assembly type(s), and/or vehicle bridge(s) assembly type(s), to operate, and/or function, seamlessly (unbroken, and/or unimpeded), of, for, from, into, thru, out of, and/or between, a corresponding adjoined vehicle assembly type(s), and, such a corresponding adjoined, and/or adjoining, vehicle wheel assembly type(s), and, for the purpose of, simultaneously reliably, operating, and/or functioning, and/or transiting, and/or transferring, transmitting, and/or receiving, and/or generating, and/or using, and/or storing, and/or controlling, and/or communicating, and/or managing, and/or monitoring, and/or recording, and/or integrating, and/or interacting, and/or working, and/or hooking-up (unbroken, and/or unimpeded) seamlessly, a desired media(s), and/or medium(s) (such as, compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and, and/or autonomously (wirelessly), and/or remotely, when in motion, and/or stationary.

22. In its most preferred embodiment, such a corresponding adjoined, and/or adjoining, vehicle wheel assembly type(s) has, and/or is holding, and/or carrying, and/or operating, and/or functioning, and/or interacting, and/or integrating, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; a ring-shaped (annular) rotary manifold assembly type(s) (piece(s)), a ring-shaped (annular) rotary manifold slip-ring wiring harness assembly type(s), a vehicle junction boxes and hook-up(s) point(s) assembly type(s), an automated vehicle Central Tire Inflation System (CTIS) assembly type(s), hose(s) assembly type(s), tube(s) assembly type(s), pipe(s) assembly type(s), pump(s) assembly type(s), channel(s) assembly type(s), aperture(s) assembly type(s), area(s) assembly type(s), vessel(s) assembly type(s), compartment(s) assembly type(s), vessel(s) assembly type(s), passageway(s) assembly type(s) tunnel(s) assembly type(s), path(s) assembly type(s), valve(s) assembly type(s), conduit(s) assembly type(s), wiring assembly type(s), cable(s) assembly type(s), and, transmission line(s) assembly type(s), plug(s) assembly type(s), socket(s) assembly type(s), sensor(s) assembly type(s), circuit(s) assembly type(s), actuator(s) assembly type(s), junction boxes assembly type(s), intersection(s) assembly type(s), joint(s) assembly type(s), hook-up(s) assembly type(s), and, antennae assembly type(s), computer(s) assembly type(s), computer software assembly type(s), associated (unique) computer software(s) assembly type(s), associated instrument panel(s) assembly type(s), associated control(s) console(s) assembly type(s), associated switches assembly type(s), illumination assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that are embedded, and/or held, and/or slotted, and/or compacted, and/or packaged, and/or protected, and/or positioned, and/or oriented, and/or aligned, and/or hooked-up, and/or secured (fixed) in-place, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), within, in, into, on, onto, beneath, between, surrounding, thru, and/or throughout, and/or associated with, the body (architecture) of such a corresponding adjoined, and/or adjoining, vehicle wheel assembly type(s), and/or such corresponding adjoined, and/or adjoining, assemblage(s), for the purpose of, a proximity, and/or assembly, connection(s) point(s), and/or connecting point(s), and/or hook-up point(s), with, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold housing (case) assembly type(s) (piece), and, ring-shaped (annular) rotary manifold shaft (cap) assembly type(s) (piece), and/or rotary manifold slip-ring wiring harness assembly type(s), and, vehicle junction boxes and hook-up(s) point(s) assembly type(s), and, for the purpose of linking, and/or assembling, and/or hooking-up, with other, necessary, and/or required, specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that are held, and/or carried, and/or operated, and/or functioned, and/or controlled, and/or hooked-up, by, a corresponding adjoined vehicle assembly type(s), and, such a corresponding adjoined, and/or adjoining, vehicle wheel assembly type(s), and, for the purpose of, simultaneously reliably, operating, and/or functioning, and/or generating, and/or using, and/or storing, and/or interacting, and/or working, and/or transiting, and/or transferring, and/or transmitting, and/or receiving, and/or managing, and/or monitoring, and/or communicating, and/or controlling, and/or hooking-up, a desired media(s), and/or medium(s) (such as, compressed air and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and, and/or autonomously (wirelessly), and/or remotely, when in motion, and/or stationary.

23. In its most preferred embodiment, such a corresponding adjoined, and/or adjoining, vehicle wheel assembly type(s) has, and/or is holding, and/or carrying, and/or operating, and/or functioning, and/or interacting, and/or integrating, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) ring-shaped (annular) rotary manifold slip-ring wiring harness assembly type(s), that, when assembled together, is positioned, and/or embedded, and/or slotted, and/or held, and/or protected, and/or shielded, and/or packaged, and/or secured (fixed) in-place, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), within, in, into, on, onto, beneath, between, surrounding, thru, throughout, the body (architecture) of such a corresponding adjoined, and/or adjoining, vehicle wheel assembly type(s) (i.e., the inner portion(s) (back-side) of such a corresponding adjoined, and/or adjoining, vehicle wheel assembly type(s)), and/or another necessary, and/or required, suitable, and/or workable, and/or configurable place(s), and/or area(s), of the body (architecture) of such a corresponding adjoined, and/or adjoining, vehicle wheel assembly type(s), in such a manner, and/or way, as to face, and/or be in front of, and/or be opposite of, and/or proximity, and/or be integrated, and/or amalgamated, and/or hooked-up, with, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle connection(s) point(s) assembly type(s), and/or vehicle connecting point(s) assembly type(s), and/or vehicle hook-up point(s) assembly type(s), of a corresponding adjoined vehicle assembly type(s), that are held, and/or carried, and/or assembled, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) protective vehicle housing case(s) assembly type(s), and/or vehicle junction boxes assembly type(s), and/or vehicle protective casing(s) assembly type(s), and/or vehicle intersection case(s) assembly type(s), and/or vehicle junction boxes and hook-up(s) point(s) assembly type(s), of a corresponding adjoined vehicle assembly type(s), for the purpose of, protection, and/or shielding, and/or organization, and/or minimization, and/or compacting, and/or packaging, and/or positioning, and/or orientating, and/or aligning, and/or proximity, and/or anchoring, and/or bracing, and/or mooring, and/or hooking-up, and/or securing (fixed) in-place, of a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s) (i.e., the associated connection(s) point(s) assembly type(s), and/or connecting(s) point(s) assembly type(s), and/or hook-up(s) point(s) assembly type(s)), of, for, from, into, thru, out of, and/or between, and/or associated with, a corresponding adjoined vehicle assembly type(s), and, such a corresponding adjoined, and/or adjoining, vehicle wheel assembly type(s), and, for the purpose of, preventing unwanted, and/or unintended, slipping, wobbling, oscillating, vibrating, jolting, moving, and/or movement(s), of such a corresponding adjoined, and/or adjoining, assemblage(s) (unbroken, and/or unimpeded), when such a corresponding adjoined, and/or adjoining, vehicle wheel assembly type(s), is mounted, and/or attached, onto, and/or with, a corresponding adjoined vehicle assembly type(s), and, when, directional torque is applied (when in motion), and/or stationary, and/or for other necessary, and/or required, operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), automatically, and/or manually, and/or autonomously (wirelessly), and/or remotely, of, for, from, into, thru, out of, and/or between, and/or associated with, such a corresponding adjoined, and/or adjoining, vehicle wheel assembly type(s), and, a corresponding adjoined vehicle assembly type(s), when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) protective vehicle housing case(s) assembly type(s), and/or vehicle junction boxes assembly type(s), and/or vehicle protective casing(s) assembly type(s), and/or vehicle intersection case(s) assembly type(s), and/or vehicle junction boxes and hook-up(s) point(s) assembly type(s), and/or vehicle hook-up(s) case(s) assembly type(s), of a corresponding adjoined vehicle assembly type(s), is ideally part of, and/or amalgamated, and/or integrated, with, within, in, into, on, onto, beneath, between, behind, surrounding, thru, and/or throughout, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle axel hub(s) assembly type(s), and/or vehicle hub(s) assembly type(s), and/or vehicle brake rotor(s) assembly type(s), and/or vehicle brake(s) assembly type(s), and/or vehicle brake caliper(s) assembly type(s), and/or another necessary, and/or required, suitable, and/or workable, and/or configurable, place(s), and/or area(s), and/or means, and/or ways, and/or material(s), and/or equipment assembly type(s), within, in, into, on, onto, beneath, between, surrounding, thru, and/or throughout, and/or associated with, a corresponding adjoined vehicle assembly type(s), for the purpose of, linking, and/or connecting, and/or hooking up, and/or operating, and/or bridging, and/or functioning, and/or transiting, and/or transferring, and/or working, and/or using, and/or integrating, and/or interacting, and/or assembling, with a corresponding adjoined, and/or adjoining, ring-shaped (annular) rotary manifold assembly type(s) (piece(s)), and/or a corresponding adjoined, and/or adjoining, ring-shaped (annular) rotary manifold slip-ring wiring harness assembly type(s), of such a corresponding adjoined, and/or adjoining, vehicle wheel assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), and, for the purpose of, simultaneously reliably, transiting, and/or transferring, and/or interacting, and/or generating, and/or operating, and/or functioning, and/or interacting, and/or using, and/or storing, and/or working, and/or controlling, and/or communicating, and/or recording, and/or managing, and/or monitoring, and/or hooking-up (unbroken, and/or unimpeded), a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, corresponding adjoined, and/or adjoining, operation(s), and/or function(s), and/or purpose(s), and/or task(s) (unbroken, and/or unimpeded), for a corresponding operating, and/or functioning, standard(s), of such corresponding adjoined, and/or adjoining, assemblage(s) (automatically, and/or manually, and/or autonomously (wirelessly), and/or remotely), of, for, from, into, thru, out of, and/or between, and/or associated with, such a corresponding adjoined, and/or adjoining, vehicle wheel assembly type(s), and, a corresponding adjoined vehicle assembly type(s), when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle hook-up(s) point(s) assembly type(s), and/or vehicle junction boxes assembly type(s), and/or vehicle protective housing case(s) assembly type(s), and/or vehicle hook-up case(s) assembly type(s), and/or vehicle connection(s) point(s) assembly type(s), and/or vehicle connecting(s) point(s) assembly type(s), and/or vehicle intersection(s) assembly type(s), and/or vehicle anchoring(s) point(s) assembly type(s), and/or vehicle mooring(s) point(s) assembly type(s), and/or vehicle bracing(s) assembly type(s), and/or vehicle housing case(s), and hook-up point(s) assembly type(s), and/or vehicle junction boxes and hook-up(s) point(s) assembly type(s), and/or another necessary, and/or required, suitable, and/or workable, and/or configurable, bridging, and/or linking, and/or stabilizing, and/or anchoring, assemblage(s), and/or means, and/or ways, and/or material(s), and/or equipment assembly type(s), of, for, from, into, thru, out of, and/or between, and/or associated with, such a corresponding adjoined, and/or adjoining, vehicle wheel assembly type(s), and, a corresponding adjoined vehicle assembly type(s), are specifically, and/or strategically, placed, and/or positioned, and/or oriented, and/or compacted, and/or packaged, and/or secured (fixed) in-place, and/or situated, and/or integrated, and/or amalgamated, and/or hooked-up, within, in, to, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle axel hub(s) assembly type(s), and/or vehicle hub(s) assembly type(s), and/or vehicle brake rotor(s) assembly type(s), and/or vehicle brake(s) assembly type(s), and/or vehicle brake(s) caliper(s) assembly type(s), and/or another necessary, and/or required, suitable, and/or workable, and/or configurable, place(s), and/or area(s), and/or means, and/or ways, and/or material(s), and/or equipment assembly type(s), of, for, from, into, thru, out of, between, and/or associated with, a corresponding adjoined vehicle assembly type(s) that has, and/or is holding, and/or carrying, and/or interacting, and/or operating, and/or functioning, and/or working, and/or controlling, and/or generating, and/or using, and/or storing, and/or communicating, and/or managing, and/or hooking-up, a corresponding adjoined, and/or adjoining, automated vehicle Central Tire Inflation System (CTIS) assembly type(s), and, other, specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), for the purpose of, providing, and/or facilitating, and/or enabling, a stabilizing, and/or anchoring, and/or shielding, and/or protecting, and/or housing of such corresponding adjoined, and/or adjoining, connection(s), and/or linking(s), and/or hook-up(s), and/or operation(s), and/or function(s), and/or purpose(s), and/or task(s) (unbroken, and/or unimpeded) of associated corresponding adjoined, and/or adjoining, component(s), part(s), mechanism(s), device(s), system(s), and/or apparatus assemblage(s), of, for, from, into, thru, out of, and/or between, and/or associated with, a corresponding adjoined vehicle assembly type(s), and, such a corresponding adjoined, and/or adjoining, vehicle wheel assembly type(s), and, for the purpose of, providing, and/or facilitating, and/or allowing, and/or enabling, an unbroken, and/or unimpeded, passageway(s), and/or link(s), and/or hook-up(s), of, for, from, into, thru, out of, and/or between, and/or associated with, such a corresponding adjoined, and/or adjoining, vehicle wheel assembly type(s), and, a corresponding adjoined vehicle assembly type(s), when in motion, and/or stationary, and, for the purpose of, simultaneously reliably, transiting, and/or transferring, and/or transmitting, and/or receiving, and/or interacting, and/or controlling, and/or using, and/or storing, and/or generating, and/or operating, and/or functioning, and/or communicating, and/or managing, and/or recording, and/or monitoring, and/or working, and/or hooking-up, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other corresponding adjoined, and/or adjoining, operation(s), and/or function(s), and/or purpose(s), and/or task(s) (unbroken, and/or unimpeded), that are deemed necessary, and/or required, for a corresponding operating, and/or functioning, standard(s), of such corresponding adjoined, and/or adjoining assemblage(s), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle protective housing case(s) assemblage(s), and/or vehicle junction boxes assemblage(s), and/or vehicle intersection(s) assemblage(s), and/or vehicle hook-up(s) case assembly type(s), and/or vehicle junction boxes and hook-up(s) point(s) assembly type(s), and/or another necessary, and/or required, suitable, and/or workable, and/or configurable, bridging, and/or linking, and/or stabilizing, and/or anchoring, and/or mooring assemblage(s), means, and/or ways, and/or material(s), and/or equipment assembly type(s), of, for, from, into, thru, out of, and/or between, and/or associated with, a corresponding adjoined vehicle assembly type(s), and, such a corresponding adjoined, and/or adjoining vehicle wheel assembly type(s) consists of, specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; valve(s) assembly type(s), fastener(s) assembly type(s), channel(s) assembly type(s), aperture(s) assembly type(s), area(s) assembly type(s), tunnel(s) assembly type(s), passageway(s) assembly type(s), path(s) assembly type(s), vessel(s) assembly type(s), compartment(s) assembly type(s), clip(s) assembly type(s), tube(s) assembly type(s), conduit(s) assembly type(s), hose(s) assembly type(s), pipe(s) assembly type(s), receptacle(s) assembly type(s), sensor(s) assembly type(s), circuit(s) assembly type(s), mechanism(s) assembly type(s), device(s) assembly type(s), system(s) assembly type(s), electronic(s) assembly type(s), antennae assembly type(s), actuator(s) assembly type(s), sealing material(s), seal(s) assembly type(s), connection(s) point(s) assembly type(s), connecting(s) point(s) assembly type(s), connecting joint(s) assembly type(s), joint(s) assembly type(s), junction box assembly type(s), cable(s) assembly type(s), transmission line(s) assembly type(s), wiring assembly type(s), wire(s) assembly type(s), socket(s) assembly type(s), plug(s) assembly type(s), joint(s) assembly type(s), ball bearing(s) assembly type(s), ball bearing(s) track(s) assembly type(s), sealed bearing(s) assembly type(s), seal(s) assembly type(s), sealing material(s), wiring harnesses assembly type(s), attachment rod(s) assembly type(s), and/or bracing(s) assembly type(s), bracket(s) assembly type(s), mooring(s) assembly type(s), anchoring(s) assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and, channel(s) assembly type(s), and/or aperture(s) assembly type(s), and/or area(s) assembly type(s), and/or another necessary, and/or required, suitable, and/or workable, and/or configurable, means, and/or ways, and/or material(s), and/or equipment assembly type(s), deemed necessary, and/or required, for the purpose of, a corresponding chosen operating, and/or functioning, standard(s), of such corresponding adjoined, and/or adjoining, connection(s), and/or connecting(s), and/or linking(s), and/or securing(s), and/or anchoring(s) and/or hook-up(s), and/or junction boxes, and/or intersection(s), and/or protective housing case(s) assemblage(s), of, for, from, into, thru, out of, and/or between, and/or associated with, such a corresponding adjoined, and/or adjoining, vehicle wheel assembly type(s), and, a corresponding adjoined vehicle assembly type(s), and, for the purpose of, simultaneously reliably, generating, and/or transiting, and/or transferring, and/or transmitting, and/or receiving, and/or controlling, and/or managing, and/or monitoring, and/or operating, and/or functioning, and/or working, and/or interacting, and/or integrating, and/or communicating, and/or recording and/or hooking-up, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, operation(s) and/or function(s), and/or purpose(s), and/or task(s) (unbroken, and/or unimpeded), for a corresponding chosen operating and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle connection(s) point(s) assembly type(s), and/or vehicle connecting(s) point(s) assembly type(s), and/or vehicle hook-up(s) point(s) assembly type(s), and/or vehicle protective housing case(s) assembly type(s), and/or vehicle junction boxes and hook-up(s) point(s) assembly type(s), and/or vehicle hook-up(s) assembly type(s), and/or vehicle intersection(s) assembly type(s), and/or vehicle bracket(s) assembly type(s), and/or vehicle bracing assembly type(s), and/or vehicle anchor(s) assembly type(s), and/or vehicle mooring(s) assembly type(s), of, for, from, into, thru, out of, and/or between, and/or associated with, such a corresponding adjoined, and/or adjoining, vehicle wheel assembly type(s), and, a corresponding adjoined vehicle assembly type(s), is ideally, positioned, and/or mounted, and/or attached, and/or secured, within, in, into, on, onto, beneath, between, surrounding, thru, and/or throughout, a corresponding adjoined vehicle assembly type(s), brake rotor(s) assembly type(s), and/or brake disc(s) assembly type(s), and/or brake(s) assembly type(s), brake caliper(s) assembly type(s), and/or hub(s) assembly type(s), and/or axel(s) assembly type(s), and/or steering system(s) assembly type(s), and/or suspension system(s) assembly type(s), and/or vehicle structure(s), assembly type(s), and/or another necessary, and/or required, suitable, and/or workable, and/or configurable, placement(s), and/or area(s), and/or means, and/or ways, and/or material(s), and/or equipment assembly type(s), within, in, into, on, onto, beneath, between, surrounding, thru, and/or throughout, and/or associated with, a corresponding adjoined vehicle assembly type(s), for the purpose of, orienting, and/or positioning, and/or aligning, and/or attaching, and/or stabilizing, and/or securing (fixed) in-place, and/or hooking-up, a corresponding adjoined, and/or adjoining, (fixed) ring-shaped (annular) rotary manifold assembly type(s) (piece(s)), and/or a corresponding adjoined, and/or adjoining, ring-shaped (annular) rotary manifold slip-ring wiring harness assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s) (unbroken, and/or unimpeded), and, for the purpose of, preventing, and/or mitigating, unwanted, and/or unneeded, oscillation(s), and/or vibration(s), and/or wobbling(s), and/or jolt(s), and/or slipping(s), and/or moving(s), and/or movement(s), of such corresponding adjoined, and/or adjoining, assemblage(s), caused by directional torque (movement(s)) that is applied to such a corresponding adjoined, and/or adjoining, vehicle wheel assembly type(s), when mounted, and/or attached, and/or secured (fixed) in-place, and/or connected, and/or hooked-up, with, and/or onto, a corresponding adjoined vehicle assembly type(s) (i.e., when in motion), and, for the purpose of, hook-up(s), and/or connection(s), and/or connecting(s), and/or pathway(s), and/or transit(s), and/or transfer(s), and/or bridge(s) (unbroken, and/or unimpeded), of specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), when in motion, and/or stationary, and, for the purpose of, simultaneously reliably, generating, and/or supplying, and/or enabling, and/or facilitating, and/or transiting, and/or transferring, and/or transmitting, and/or receiving and/or operating, and/or functioning, and/or communicating, and/or controlling, and/or managing, and/or monitoring, and/or recording, and/or using, and/or storing, and/or working, and/or interacting, and/or integrating, and/or hooking-up, a desired media(s), and/or medium(s) (such as compressed air, and/or other gases (+ and/or −) for inflating, and/or deflating, a corresponding attached pneumatic tire(s) chamber(s) assembly type(s), and/or electricity supply, data, and/or digital signal(s), and/or fluid(s)), and/or other operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining assemblage(s), of, for, from, into, thru, out of, and/or between, and/or associated with, such a corresponding adjoined, and/or adjoining, vehicle wheel assembly type(s), and, a corresponding vehicle assembly type(s), automatically, and/or manually, and/or autonomously (wirelessly), and/or remotely, when in motion, and/or stationary.

24. In its most preferred embodiment, such a corresponding adjoined, and/or adjoining, vehicle wheel assembly type(s), has, and/or is holding, and/or carrying, and/or interacting, and/or operating, and/or functioning, and/or communicating, and/or integrating, and/or working, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) automated vehicle Central Tire Inflation System (CTIS) assembly type(s), via, and/or by way of, and/or with the use of a corresponding adjoined, and/or adjoining, vehicle junction boxes and hook-up(s) point(s) assembly type(s), and, a corresponding adjoined, and/or adjoining, (fixed) ring-shaped (annular) rotary manifold assembly type(s) (piece(s)), and, a corresponding adjoined, and/or adjoining, ring-shaped (annular) slip-ring wiring harness assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or equipment assembly type(s), that is held, and/or carried, and/or embedded, and/or slotted, and/or positioned, and/or oriented, and/or aligned, and/or shielded, and/or protected, and/or compacted, and/or packaged, and/or installed, and/or assembled, and/or integrated, and/or hooked-up, with, within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), for the purpose of, simultaneously reliably, generating, and/or supplying, and/or enabling, and/or facilitating, and/or transferring, and/or transiting, and/or transmitting, and/or receiving, and/or delivering, and/or discharging, and/or depleting, and/or operating, and/or functioning, and/or using, and/or storing, and/or controlling, and/or managing, and/or monitoring, and/or communicating, and/or recording, and/or working, and/or interacting, and/or integrating, and/or hooking-up (unbroken, and/or unimpeded), a corresponding desired media(s), and/or medium(s) (such as, compressed air, and/or other gases (+ and/or −) for inflating, and/or deflating, a corresponding attached pneumatic tire(s) chamber(s) assembly type(s)), and/or electricity supply, data, and/or digital signal(s), and/or fluid(s)), and/or other corresponding chosen operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) automated vehicle Central Tire Inflation System (CTIS) assembly type(s), has, and/or is holding, and/or carrying, and/or operating, and/or functioning, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), protective housing case(s), and/or apparatus assembly type(s), comprising, but, not exclusive to, namely; an electrical powered air compressor(s) assembly type(s), vehicle power source(s) assembly type(s), compressed air/gas tank(s) assembly type(s), vehicle speed sensor(s) assembly type(s), and/or other vehicle sensor(s) assembly type(s), vehicle circuit(s) assembly type(s), vehicle wiring assembly type(s), vehicle wiring harness assembly type(s), vehicle Electronic Control Unit (ECU) assembly type(s), vehicle pneumatic control unit assembly type(s), pressure switch assembly type(s), vehicle air compressor(s) assembly type(s), and/or pump(s) assembly type(s), attachable/detachable, vehicle mounted pre-filled pressurized air/gas tank(s) assembly type(s), and/or attachable/detachable, vehicle mounted pressurized air/gas holding vessel(s) assembly type(s), and/or attachable/detachable vehicle mounted pressurized air/gas reservoir(s) assembly type(s), vehicle air dryer(s) assembly type(s), vehicle electric motor(s) assembly type(s), actuator(s) assembly type(s), valve(s) assembly type(s), hose(s) assembly type(s), tube(s) assembly type(s), joint(s) assembly type(s), socket(s) assembly type(s), fastener(s) assembly type(s), and, channel(s) assembly type(s), and, aperture(s) assembly type(s), and, area(s) assembly type(s), seal(s) assembly type(s), sealing material(s), and, vehicle operator control(s) panel(s) assembly type(s), vehicle control(s) assembly type(s), associated vehicle control(s) assembly type(s), associated computer(s) assembly type(s), associated software(s) assembly type(s), associated operating system(s) assembly type(s), vehicle antennae assembly type(s), control(s) assembly type(s), control panel(s) assembly type(s), associated control(s) equipment assembly type(s), sensor(s) assembly type(s), and, circuit(s) assembly type(s), associated switches assembly type(s), wiring assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), that are deemed necessary, and/or required, for a corresponding chosen operating, and/or functioning, standard(s), of such corresponding adjoined, and/or adjoining, assemblage(s), and/or another necessary, and/or required, suitable, and/or workable, and/or configurable, means, and/or ways, and/or element(s) and/or material(s), and/or equipment assembly type(s), for the purpose of, simultaneously reliably, supplying, and/or enabling, and/or facilitating, and/or generating, and/or making, and/or storing, and/or using, and/or operating, and/or functioning, and/or communicating, and/or controlling, and/or managing, and/or monitoring, and/or recording, and/or transiting, and/or transferring, and/or transmitting, and/or receiving, and/or interacting, and/or integrating, and/or working, and/or protecting, and/or shielding, and/or hooking-up, a desired media(s), and/or medium(s) (such as compressed air and/or other gas (+ and/or −) for inflating, and/or deflating, a corresponding attached pneumatic tire(s) chamber(s) assembly type(s)), and/or electricity supply, and/or data, and/or digital signal(s), and/or fluid(s), and/or other necessary, and/or required, corresponding chosen operation(s), and/or function(s), and/or purpose(s), and/or task(s) (unbroken, and/or unimpeded), of such corresponding adjoined, and/or adjoining assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) automated vehicle Central Tire Inflation System (CTIS) assembly type(s), and, associated component(s) assembly type(s), part(s) assembly type(s), mechanism(s) assembly type(s), device(s) assembly type(s), system(s) assembly type(s), apparatus assembly type(s), associated protective housing case(s) assembly type(s), associated pressurized vessel(s) assembly type(s), associated attachable/detachable pressurized tank(s) assembly type(s), associated bracket(s) assembly type(s), associated bracing assembly type(s), associated fastener(s) assembly type(s), associated seal(s) assembly type(s), and, associated sealing material(s), and/or other associated component(s), part(s), mechanism(s), device(s), system(s), and/or apparatus assembly type(s) are made with the use of; metal(s) assembly type(s), metal alloy(s) assembly type(s), composite(s) assembly type(s), graphene(s) assembly type(s), element(s) assembly type(s), vulcanized rubber(s) assembly type(s), rubber assembly type(s), synthetic material(s) assembly type(s), plastic(s) assembly type(s), and/or another necessary, and/or required, suitable, and/or workable, and/or configurable means, and/or ways, and/or element(s), and/or composite(s), and/or material(s), and/or equipment assembly type(s), for the purpose of, the simultaneous reliable production, and/or monitoring, and/or management, and/or storage, and/or transit, and/or transfer, and/or use, and/or operation, and/or function, and/or protection, and/or shielding, and/or hooking-up, and/or depletion, of pressurized air, and/or gas (PSI + and/or −), for a corresponding attached pneumatic tire(s) chamber(s) assembly type(s), that is mounted, and/or attached, and/or hooked-up onto, and/or with, such a corresponding adjoined, and/or adjoining, vehicle wheel assembly type(s), and, a corresponding adjoined vehicle assembly type(s), that has, and/or is holding, and/or carrying, and/or operating, and/or functioning, and/or hooking-up, such a corresponding adjoined, and/or adjoining, automated vehicle Central Tire Inflation System (CTIS) assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) automated vehicle Central Tire Inflation System (CTIS) assembly type(s), has, and/or is holding, and/or carrying, and/or operating, and/or functioning, and/or integrating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) protective housing case(s) assembly type(s), that has, and/or is holding, and/or carrying, and/or operating, and/or functioning, and/or integrating, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s), assembly type(s), and/or area(s) assembly type(s), and/or protrusion(s) assembly type(s), and/or flange(s) assembly type(s) (with, and/or without, associated aperture(s) assembly type(s) for a corresponding adjoined, and/or adjoining fastener(s) assembly type(s), and/or seal(s) assembly type(s), and/or sealing material(s)), and/or other seal(s) assembly type(s), and/or sealing material(s), and/or fastener(s) assembly type(s), and/or another necessary, and/or required, suitable, and/or workable, and/or configurable, means, and/or ways, and/or material(s), and/or equipment assembly type(s) within, in, into, on, onto, beneath, between, surrounding, thru, and/or throughout, and/or associated with, such a corresponding adjoined, and/or adjoining, protective housing case(s) assembly type(s) of a corresponding adjoined, and/or adjoining, automated vehicle Central Tire Inflation System (CTIS) assembly type(s), for the purpose of, proximity, and/or assembly, and/or hooking-up (unbroken, and/or unimpeded) with, within, in, into, on, onto, beneath, between, surrounding, thru, and/or throughout other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), when in motion, and/or stationary, and, for the purpose of, shielding, and/or protection, and/or hooking-up of associated pressurized air/gas holding vessel(s) assembly type(s), and/or attachable/detachable pressurized air/gas tank(s) assembly type(s), and, associated component(s), part(s), mechanism(s), device(s), system(s), and/or apparatus assembly type(s), and, for the purpose of, cooling, and/or dispersing built-up heat of associated motor(s) assembly type(s), and/or associated equipment assembly type(s), and, for the purpose of, isolating, and, insulating, media(s), and/or medium(s) (i.e., compressed air, gases, or electricity supply, digital signal(s), and/or fluid(s)), and/or other operation(s), function(s), purpose(s), and/or task(s), for a corresponding chosen operating, and/or functioning standard(s) of such corresponding adjoined, and/or adjoining, assemblage(s), when assembled, and/or held, and/or carried, and/or hooked-up, with other associated component(s), part(s), mechanism(s), device(s), system(s), and/or apparatus assembly type(s), within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and, when in motion, and/or stationary.

Such a corresponding adjoined, and/or adjoining automated vehicle Central Tire Inflation System (CTIS) assembly type(s), and other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) associated component(s), part(s), mechanism(s), device(s), system(s), and/or apparatus assembly type(s), of such a corresponding adjoined, and/or adjoining, automated vehicle Central Tire Inflation System (CTIS) assembly type(s), and, a corresponding adjoined vehicle assembly type(s), and, such a corresponding adjoined, and/or adjoining, vehicle wheel assembly type(s), supply, and/or facilitate, and/or enable, and/or generate, and/or control, and/or manage, and/or transit, and/or transfer, and/or hook-up, compressed air (i.e., pressurized air), and/or other gases (i.e., pressurized nitrogen), to a corresponding attached pneumatic tire chamber(s) assembly type(s), that is mounted, and/or attached, and/or hooked-up, onto, and/or with, such a corresponding adjoined, and/or adjoining, vehicle wheel assembly type(s). Ideally, the compressed air (pressurized air), and/or other gases (pressurized nitrogen) produced, and/or managed, and/or hooked-up, and/or associated with such a corresponding adjoined, and/or adjoining automated vehicle Central Tire Inflation System (CTIS) assembly type(s) travel(s) through a supply line(s), and is held, and/or retained, and/or hooked-up, onto, and/or within, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle mounted storage vessel(s) assembly type(s) (i.e., pressurized air tank(s) assembly type(s)) (ready for use), and/or a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) attachable/detachable pre-charged, and/or pre-filled, vehicle mounted pressurized air/gas tank(s) assembly type(s), and/or attachable/detachable, vehicle mounted pressurized air/gas canister(s) assembly type(s), containing pressurized air, and/or pressurized nitrogen gas (ready for use) when installed onto, and/or with, the automated vehicle Central Tire Inflation System (CTIS) assembly type(s) as assembled, and/or hooked-up, within, into, on, onto, beneath, between, surrounding, thru, and/or throughout, a corresponding adjoined vehicle assembly type(s). Ideally, prior to delivery, the air, and/or gas, flow(s) through a supply line(s) (i.e., a corresponding adjoined, and/or adjoining, associated hose(s) assembly type(s), and/or tube(s) assembly type(s)), and is dried, and filtered (removing moister content, and unwanted particulate(s), and/or impurities), through the use of, and/or by way of, a corresponding adjoined, and/or adjoining, electric dryer, and filter assembly type(s) (i.e., air dryer(s) assembly type(s)) if necessary, and/or required, before supplying the pressurized air, and/or gas, to a corresponding attached pneumatic tire(s) chamber(s) assembly type(s) (as mounted, and/or attached onto, and/or with, such a corresponding adjoined, and/or adjoining, vehicle wheel assembly type(s)). Ideally, the pressurized dried, and purified air, and/or gas, then flow(s) into a corresponding adjoined, and/or adjoining, control box assembly type(s), that regulates the pressurized air Pounds per Square Inch (PSI) rate (+ and/or −), to a corresponding chosen pre-set pressure amount for a corresponding attached pneumatic tire(s) chamber(s) assembly type(s) desired air pressure (PSI), the regulated pressurized air, and/or gas, flow(s) through a supply line(s) into the ring-shaped (annular) rotary manifold assembly type(s) (piece(s)), and, a corresponding adjoined, and/or adjoining, ring-shaped (annular) rotary manifold slip-ring wiring harness assembly type(s), and other associated component(s), part(s), mechanism(s), device(s), and/or apparatus assembly type(s), and, associated channel(s) assembly type(s), and/or associated aperture(s) assembly type(s), and/or associated area(s) assembly type(s) (as secured (fixed) in-place, within, in, into, on, onto, beneath, between, thru, and/or throughout, the body (architecture) of such a corresponding adjoined, and/or adjoining, vehicle wheel assembly type(s)), by way of, and/or with the use of, and/or via, a corresponding adjoined, and/or adjoining, vehicle junction boxes, and, hook-up(s) point(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), before reaching the corresponding attached pneumatic tire(s) chamber(s) assembly type(s), that is mounted onto, and/or with such a corresponding adjoined, and/or adjoining, vehicle wheel assembly type(s). Ideally, production, transit, transfer, use, and/or depletion, of the pressurized air, and/or gas, for a corresponding adjoined, and/or adjoining, pneumatic tire(s) assembly type(s), and/or electricity, and/or digital signal(s), and/or associated fluid(s), and/or other necessary, and/or required, operation(s), and/or function(s), and/or purpose(s), and/or task(s) of associated component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), is controlled, and/or monitored, and/or managed, and/or communicated, and/or hooked-up, from, and/or with the use of, and/or via a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) vehicle digital communication(s) assembly type(s), and/or vehicle control(s), and/or vehicle control(s) panel(s) assembly type(s), and/or vehicle microprocessor(s), and/or vehicle computer(s) assembly type(s), and/or vehicle software(s) assembly type(s), and/or another necessary, and/or required, suitable, and/or workable, and/or configurable, and/or associated, electrical, and/or digital control(s) assembly type(s), and/or communication(s) assembly type(s), and/or device(s) assembly type(s), and/or apparatus assembly type(s), and/or means, and/or ways, and/or element(s), and/or material(s), and/or equipment assembly type(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary, for the purpose of, enabling, and/or facilitating, controlling, and/or communicating, and/or diagnosing, and/or using, and/or hooking-up, with a corresponding adjoined, and/or adjoining, ring-shaped (annular) rotary manifold assembly type(s) (piece(s)), and/or a corresponding adjoined, and/or adjoining, ring-shaped (annular) rotary manifold slip-ring wiring harness assembly type(s), and, a corresponding adjoined, and/or adjoining, vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus type(s), within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s), and, for the purpose of, simultaneously reliably, controlling, and/or communicating, and/or generating, and/or transiting, and/or transferring, and/or transmitting, and/or receiving, and/or operating, and/or functioning, and/or managing, and/or monitoring, and/or recording, and/or using, and/or storing, and/or integrating, and/or interacting, and/or hooking-up, a desired media(s), and/or medium(s) (such as compressed air and/or other gas (+ and/or −) for a corresponding attached pneumatic tire(s) chamber(s) assembly type(s)), and/or electricity supply, data, and/or digital signal(s), and/or fluid(s), and/or other necessary, and/or required, corresponding chosen operation(s), and/or function(s), and/or purpose(s), and/or task(s) (unbroken, and/or unimpeded), of such corresponding adjoined, and/or adjoining assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

25. In its most preferred embodiment, such a corresponding adjoined, and/or adjoining, vehicle wheel assembly type(s), has, and/or is holding, and/or carrying, and/or interacting, and/or integrating, and/or operating, and/or functioning, and/or communicating, and/or managing, and/or hooking-up, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) automated Vehicle to Vehicle Wheel to Everything (V2VW2X), and/or Vehicle Wheel to Vehicle to Everything (VW2V2X), control(s) system(s) assembly type(s), and/or automated vehicle communication(s), navigation(s), transmission(s) system(s) assembly type(s), and/or automated vehicle microprocessor(s) control(s) assembly type(s), and/or on-board vehicle computer(s) assembly type(s), and/or associated vehicle computer(s) system(s) assembly type(s), and/or associated Vehicle to Vehicle Wheel to Everything (V2VW2X), and/or Vehicle Wheel to Vehicle to Everything (VW2V2X) communication(s), navigation(s), transmission(s) system(s) assembly type(s), and/or associated Vehicle to Vehicle Wheel to Everything (V2VW2X), and/or Vehicle Wheel to Vehicle to Everything (VW2V2X) software(s) assemblage(s), and/or sensor(s) assembly type(s), and/or circuit(s) assembly type(s), and/or actuator(s) assembly type(s), and/or antennae assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), and, associated component(s), part(s), mechanism(s), device(s), system(s), and/or apparatus assembly type(s), and/or another necessary, and/or required, suitable, and/or workable, and/or configurable, ways, and/or means, and/or element(s), and/or material(s), and/or equipment assembly type(s) for the purpose of, simultaneously reliably, enabling, and/or permitting, and/or facilitating, and/or interacting, and/or operating, and/or functioning, and/or working, and/or communicating, and/or managing, and/or monitoring, and/or controlling, and/or recording, and/or diagnosing, and/or connecting, and/or using, and/or storing, and/or transferring, and/or transiting, and/or transmitting, and/or receiving, and/or generating, and/or hooking-up, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such an automated Vehicle to Vehicle Wheel to Everything (V2VW2X), and/or Vehicle Wheel to Vehicle to Everything (VW2V2X) control(s) system(s) assembly type(s), and/or associated control(s) system(s) assembly type(s), and/or automated vehicle communication, navigation, transmission(s) system(s) assembly type(s), and/or automated vehicle microprocessor(s) control(s) assembly type(s), and/or on-board vehicle computer(s) assembly type(s), and/or associated vehicle computer(s) system(s) assembly type(s), and/or associated Vehicle to Vehicle Wheel to Everything (V2VW2X), and/or Vehicle Wheel to Vehicle to Everything (VW2V2X) communication, navigation, transmission(s) system(s) assembly type(s), and/or associated Vehicle to Vehicle Wheel to Everything (V2VW2X), and/or Vehicle Wheel to Vehicle to Everything (VW2V2X) software(s) assemblage(s), and/or sensor(s) assembly type(s), and/or circuit(s) assembly type(s), and/or actuator(s) assembly type(s), and/or antennae assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), operate, and/or function, and/or engage, and/or diagnose, and/or actuate, and/or examine, and/or interpret, and/or understand, and/or convert, and/or research, and/or record, and/or translate, and/or comprehend, and/or read, and/or react, and/or interact, and/or decipher, and/or follow, and/or understand, and/or work, and/or transmit, and/or transfer, and/or translate, and/or receive, and/or share, and/or hook-up, digital instruction(s), and/or digital signal(s), and/or digital data, and/or data, and/or telemetry, and/or information (real time, and/or historical), by way of, and/or with the use of, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) vehicle control(s) assembly type(s) (i.e., by a physical operator(s) touch), and/or vehicle control(s) panel(s) assembly type(s) (i.e., by a physical operator(s) touch), and/or vehicle dashboard(s) assembly type(s) (i.e., by a physical operator(s) touch), and/or touch screen control(s) assembly type(s) (i.e., by a physical operator(s) touch), and/or voice activated-operating control(s) assembly type(s) (i.e., by a physical operator(s) touch, and/or vocal sound(s)), and/or a vehicles' physical operator(s) interface(s) assembly type(s) (i.e., by a physical operator(s) touch, and/or vocal sound(s), and/or visual que(s) (sight activated selection(s)), and/or digital, electrical, magnetic machine(s) vehicle control(s) assemblage(s), and/or another necessary, and/or required, suitable, and/or workable, and/or configurable, means, and/or ways, and/or element(s), and/or composite(s), and/or material(s), and/or equipment assembly type(s) internally, and/or externally (as assembled on-board a corresponding adjoined vehicle assembly type(s), that has, and/or is holding, and/or carrying, and/or operating, and/or functioning, and/or hooking-up, such a corresponding adjoined, and/or adjoining, vehicle wheel assembly type(s)), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) vehicle control(s) assembly type(s), component(s), part(s), mechanism(s), device(s), system(s), and/or apparatus assembly type(s) (i.e., outside of, but, associated with, a corresponding adjoined vehicle assembly type(s), and, such a corresponding adjoined, and/or adjoining, vehicle wheel assembly type(s)), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), via, and/or by way of, and/or with the use of, a corresponding adjoined, and/or adjoining, ring-shaped (annular) rotary manifold assembly type(s) (piece(s)), and, a corresponding adjoined, and/or adjoining, ring-shaped (annular) rotary manifold slip-ring wiring harness assembly type(s), and/or other wiring harness assembly type(s), and, a corresponding adjoined, and/or adjoining, vehicle junction boxes, and hook-up(s) point(s) assembly type(s), and/or wiring assembly type(s), and/or cabling assembly type(s), and/or transmission line(s) assembly type(s), and/or antennae assembly type(s), and/or sensor(s) assembly type(s), and/or circuit(s) assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, an/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or element(s), and/or software assembly type(s), and/or computer(s) assembly type(s), and/or transmission signal(s) assembly type(s), and/or receiver(s) assembly type(s), and/or antennae assembly type(s), and/or sensor(s) assembly type(s), and/or circuit(s) assembly type(s), and/or equipment assembly type(s), of, for, from, into, thru, out of, and/or between, and/or associated with, such a corresponding adjoined, and/or adjoining, vehicle wheel assembly type(s), and, a corresponding vehicle assembly type(s), automatically, and/or manually, and/or autonomously (wirelessly), and/or remotely, when in motion, and/or stationary, for the purpose of, simultaneously reliably, enabling, and/or permitting, and/or connecting, and/or measuring, and/or facilitating, and/or interacting, and/or operating, and/or functioning, and/or working, and/or communicating, and/or managing, and/or monitoring, and/or controlling, and/or recording, and/or diagnosing, and/or using, and/or storing, and/or transferring, and/or transiting, and/or transmitting, and/or receiving, and/or generating, and/or hooking-up, of a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such an automated Vehicle to Vehicle Wheel to Everything (V2VW2X), and/or Vehicle Wheel to Vehicle to Everything (VW2V2X), control(s) system(s) assembly type(s), and/or automated vehicle digital communication, navigation, transmission(s) system(s) assembly type(s), and/or automated vehicle microprocessor(s) control(s) assembly type(s), and/or on-board vehicle computer(s) assembly type(s), and/or associated vehicle computer(s) system(s) assembly type(s), and/or associated Vehicle to Vehicle Wheel to Everything (V2VW2X), and/or Vehicle Wheel to Vehicle to Everything (VW2V2X) communication, navigation, transmission(s) system(s) assembly type(s), and/or associated Vehicle to Vehicle Wheel to Everything (V2VW2X), and/or Vehicle Wheel to Vehicle to Everything (VW2V2X) software(s) assemblage(s), and/or sensor(s) assembly type(s), and/or circuit(s) assembly type(s), and/or actuator(s) assembly type(s), and/or antennae assembly type(s), and, other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) control(s) assemblage(s), and/or communication(s) assemblage(s), and/or component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), are for the purpose of, simultaneously reliably, hooking-up, and/or operating, and/or functioning, and/or interacting, and/or working, and/or communicating, and/or controlling, and/or managing, and/or recording, and/or diagnosing, and/or using, and/or storing, and/or generating, and/or interacting, and/or integrating, and/or transiting, and/or transferring, and/or transmitting, and/or receiving, digital instruction(s), and/or digital data, and/or data, and/or telemetry, and/or information, of, and/or for, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary, by way of, and/or with the use of, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; a ring-shaped (annular) rotary manifold assembly type(s) (piece(s)), a ring-shaped (annular) rotary manifold slip-ring wiring harnesses assembly type(s), wiring harnesses assembly type(s), wires(s) assembly type(s), inductive/conductive electrical, communication, navigation transmission, charging assemblage(s), cable(s) assembly type(s), transmission line(s) assembly type(s), fiber optic line(s) assembly type(s), hose(s) assembly type(s), tube(s) assembly type(s), channel(s) assembly type(s), aperture(s) assembly type(s), area(s) assembly type(s), tunnel(s) assembly type(s), passageway(s) assembly type(s), path(s) assembly type(s), vessel(s) assembly type(s), compartment(s) assembly type(s), joint(s) assembly type(s), ball bearing(s) assembly type(s), sealed ball bearing(s) assembly type(s), ball bearing track(s) assembly type(s), valve(s) assembly type(s), O-ring(s) assembly type(s), seal(s) assembly type(s), locking ring(s) assembly type(s), fastener(s) assembly type(s), gromet(s) assembly types), metal ring(s) assembly type(s), protective housing case(s) assembly type(s), hook-up(s) point(s) assembly type(s), anchoring(s) assembly type(s), mooring(s) assembly type(s), bracket(s) assembly type(s), brace(s) assembly type(s), tie-rod(s) assembly type(s), control arm(s) assembly type(s), tie(s) assembly type(s), circuit(s) assembly type(s), sensor(s) assembly type(s), actuator(s) assembly type(s), a vehicle junction boxes and hook-up(s) point(s) assembly type(s), a vehicle hook-up(s) point(s) assembly type(s), an automated vehicle Central Tire Inflation System (CTIS) assembly type(s), satellite equipment assembly type(s), wireless equipment assembly type(s), antennae assembly type(s), digital microprocessor(s) assembly type(s), digital instruction(s) assembly type(s), software system(s) assembly type(s), spectrum(s) assembly type(s), band-width(s), field(s), wave(s), pulse(s) assembly type(s), micro-wave(s) spectrum(s) assembly type(s), laser-light assembly type(s), radar(s) assembly type(s), digital software assembly type(s), digital cloud software system(s) assembly type(s), digital cloud software(s) assembly type(s), Artificial Intelligence (AI) system(s), and/or software(s) assembly type(s), Digital Cloud Computing equipment assembly type(s), electrical battery assembly type(s), electricity generator(s) assembly type(s), plug-in electricity supply assembly type(s), other associated power source(s) assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) computer(s), software(s), instruction(s), transmitter(s), transponder(s), receiver(s), pick-up(s), control(s), radar(s), spectrum(s), band-width(s), frequencies, magnetic field(s), wave(s), pulse(s), radio frequencies (RF), wireless communication, navigation, transmission, charging signal(s), Wi-Fi, Near Field Communication(s) (NFC) component(s), part(s), mechanism(s), device(s), system(s), and/or apparatus assembly type(s), and/or another necessary, and/or required, suitable, and/or workable, and/or configurable, electrical, and/or digital, and/or magnetic, and/or permanent magnet, and/or electromagnetic assembly type(s), and/or other, component(s), part(s), mechanism(s), device(s), system(s), apparatus assembly type(s), means, and/or ways, and/or element(s), and/or material(s), and/or equipment assembly type(s), of, for, from, into, thru, out of, and/or between, and/or associated with, a corresponding adjoined vehicle assembly type(s), and, such a corresponding adjoined, and/or adjoining, vehicle wheel assembly type(s), when in motion, and/or stationary.

Such an automated Vehicle to Vehicle Wheel to Everything (V2VW2X), and/or Vehicle Wheel to Vehicle to Everything (VW2V2X), control(s) system(s) assembly type(s), and/or automated vehicle communication, navigation, transmission(s) system(s) assembly type(s), and/or automated vehicle microprocessor(s) control(s) assembly type(s), and/or on-board vehicle computer(s) assembly type(s), and/or associated vehicle computer(s) system(s) assembly type(s), and/or associated Vehicle to Vehicle Wheel to Everything (V2VW2X), and/or Vehicle Wheel to Vehicle to Everything (VW2V2X) communication, navigation, transmission(s) system(s) assembly type(s), and/or associated Vehicle to Vehicle Wheel to Everything (V2VW2X), and/or Vehicle Wheel to Vehicle to Everything (VW2V2X) software(s) assemblage(s), and/or sensor(s) assembly type(s), and/or circuit(s) assembly type(s), and/or actuator(s) assembly type(s), and/or antennae assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning), component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), is ideally regulated, and/or ordered, and/or measured, and/or prescribed, and/or run, and/or manipulated, and/or directed, and/or managed, and/or commanded, and/or supervised, and/or influenced, and/or limited, and/or constrained, and/or monitored, and/or checked, and/or inspected, and/or overseen, and/or hooked-up, by way of, and/or with the use of, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) vehicle control(s) cabin assembly type(s), and/or a vehicle control(s) cluster(s) assembly type(s), and/or a vehicle control(s) dashboard(s) assembly type(s), and/or a vehicle control(s) panel(s) assembly type(s), and/or associated digital, electrical, magnetic vehicle control(s) assembly type(s), and/or associated digital, electrical, magnetic vehicle communication(s) device(s) assembly type(s) and/or associated vehicle diagnostic(s) equipment assembly type(s), and/or associated computer system(s) assembly type(s), and/or associated Cloud Based Computing system(s) assembly type(s), and/or Artificial Intelligence (AI) system(s) assembly type(s), and/or associated software(s) assembly type(s), and/or associated digital operating system(s) assembly type(s), and/or associated digital language(s) assembly type(s), and/or associated digital coding assembly type(s), and/or associated Cloud Based Computing digital operating system(s) assembly type(s), and/or associated spectrum(s) assembly type(s), and/or associated band-width(s), and/or associated wave-length(s), and/or associated signal(s), and/or associated transmission(s), and/or associated magnetic communication(s), navigation(s), transmission(s), inductive charging signal(s), field(s), wave(s), pulse(s) assembly type(s), and/or associated laser-light system(s) assembly type(s), and/or associated radar system(s) assembly type(s), and/or associated sonar system(s) assembly type(s), and/or associated antennae assembly type(s), and/or associated transponder(s) assembly type(s), and/or associated transmitter(s) assembly type(s), and/or associated receiver(s) assembly type(s), and/or other specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or element(s), and/or composite(s), and/or material(s), and/or equipment assembly type(s), that are part of, and/or interact with, and/or operate, and/or function on behalf of, such a corresponding adjoined vehicle assembly type(s), and, such a corresponding adjoined, and/or adjoining, vehicle wheel assembly type(s), and, associated component(s), part(s), mechanism(s), device(s), system(s), and/or apparatus assembly type(s) thereof, for the purpose of, simultaneously reliably, carrying-out, and/or executing, and/or relaying, and/or communicating, and/or transiting, and/or transferring, and/or transmitting, and/or receiving, and/or generating, and/or using, and/or storing, and/or operating, and/or functioning, and/or interacting, and/or connecting, and/or controlling, and/or managing, and/or measuring, and/or diagnosing, and/or recording, and/or working, and/or hooking-up, digital data, and/or digital instruction(s), and/or digital, electrical, magnetic signal(s), and/or data, and/or digital information, and/or telemetry (real time, and/or historical), of, for, from, into, thru, out of, and/or between, and/or associated with, a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), that are part of, and/or interact with, and/or operate on behalf of, such a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary, and, for the purpose of, simultaneously reliably, carrying-out, and/or executing, and/or relaying, and/or communicating, and/or connecting, and/or transiting, and/or transferring, and/or transmitting, and/or receiving, and/or generating, and/or using, and/or storing, and/or operating, and/or functioning, and/or diagnosing, and/or measuring, and/or interacting, and/or controlling, and/or managing, and/or recording, and/or monitoring, and/or working, and/or hooking-up, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, corresponding operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

Such an automated Vehicle to Vehicle Wheel to Everything (V2VW2X), and/or Vehicle Wheel to Vehicle to Everything (VW2V2X), digital, electrical, magnetic control(s) system(s) assembly type(s), and/or automated vehicle communication, navigation, transmission(s) system(s) assembly type(s), and/or automated vehicle microprocessor(s) control(s) assembly type(s), and/or on-board vehicle computer(s) assembly type(s), and/or associated vehicle computer(s) system(s) assembly type(s), and/or associated Vehicle to Vehicle Wheel to Everything (V2VW2X), and/or Vehicle Wheel to Vehicle to Everything (VW2V2X) communication, navigation, transmission(s) system(s) assembly type(s), and/or associated Vehicle to Vehicle Wheel to Everything (V2VW2X), and/or Vehicle Wheel to Vehicle to Everything (VW2V2X) software(s) assemblage(s), and/or sensor(s) assembly type(s), and/or circuit(s) assembly type(s), and/or actuator(s) assembly type(s), and/or antennae assembly type(s), and/or automated vehicle control(s) assembly type(s), and/or an automated vehicle control panel(s) assembly type(s), and/or an automated vehicle control(s) interface(s) assembly type(s), and/or an automated vehicle digital, electrical, magnetic control(s) assemblage(s), and/or an automated vehicle communication(s), navigation(s), transmission(s) assemblage(s), and/or a Vehicle to Vehicle Wheel to Everything (V2VW2X), and/or Vehicle Wheel to Vehicle to Everything (VW2V2X) software(s) assemblage(s), and/or Vehicle to Vehicle Wheel to Everything (V2VW2X), and/or Vehicle Wheel to Vehicle to Everything (VW2V2X) microprocessor(s) assemblage(s), and/or associated software(s) assembly type(s), and/or associated computer(s) assembly type(s), and/or Cloud-Based Computing system(s) software(s) assembly type(s), and/or associated operating system(s) assembly type(s), and/or associated Artificial Intelligence (AI) operating system(s) assembly type(s) and/or Cloud-Based Computer(s) assembly type(s), and/or associated communication(s) spectrum(s) assembly type(s), and/ or associated band-width(s) assembly type(s), and/or associated signal(s), and/or associated frequencies, and/or magnetic field(s), wave(s), and/or pulse(s) assembly type(s), and/or another necessary, and/or required, suitable, workable, configurable, and/or associated, communication(s), and/or control(s), and/or means, and/or ways, and/or element(s), and/or composite(s), and/or material(s), and/or equipment assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) control(s), and/or communication(s), and/or navigation(s), and/or transmission(s), and/or inductive charging component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), are for the purpose of, simultaneously reliably, generating, and/or connecting, and/or communicating, and/or interacting, and/or integrating, and/or controlling, and/or managing, and/or measuring, and/or diagnosing, and/or recording, and/or monitoring, and/or operating, and/or functioning, and/or transiting, and/or working, and/or transferring, and/or transmitting, and/or receiving, and/or storing, and/or using, and/or hooking-up, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), with the use of, and/or by way of, digital data assembly type(s), and/or data assembly type(s), and/or digital information assembly type(s), and/or digital data instruction(s) assembly type(s), and/or digital program(s) assembly type(s), and/or digital programming assembly type(s), and/or associated magnetic inductive connection(s), signal(s), assembly type(s) and, the associated power (electricity) source(s) assembly type(s), that is applied to operate, and/or function, and/or engage, and/or diagnose, and/or actuate, and/or examine, and/or interpret, and/or understand, and/or convert, and/or research, and/or record, and/or translate, and/or comprehend, and/or read, and/or react, and/or interact, and/or decipher, and/or follow, and/or understand, and/or work, and/or control, and/or hook-up, such corresponding adjoined, and/or adjoining, assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary, and, for the purpose of, simultaneously reliably, carrying-out, and/or executing, and/or relaying, and/or communicating, and/or transiting, and/or transferring, and/or transmitting, and/or receiving, and/or generating, and/or using, and/or storing, and/or operating, and/or functioning, and/or interacting, and/or controlling, and/or managing, and/or recording, and/or monitoring, and/or working, and/or hooking-up, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, corresponding operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a corresponding digital data, and/or digital information, and/or data (real time, and/or historical), is part of, and/or interact(s) with, and/or upon, and/or operate(s), and/or function(s), and/or hook(s)-up, on behalf of, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), by way of, and/or with the use of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) antennae assembly type(s), and/or software(s) assembly type(s), and/or Cloud-Based Computing software system(s) assembly type(s), and/or (Unique) software assembly type(s), and/or operating system(s) assembly type(s), and/or Artificial Intelligence (AI) software(s) system(s) assembly type(s), and/or digital instruction(s) assembly type(s), and/or electronic, and/or digital, and/or radio-wave, and/or micro wave, and/or laser light, and/or frequency, and/or magnetic field(s), wave(s), pulse(s), signal(s), and/or spectrum(s), and/or signal(s) transmission(s) assembly type(s), and/or radar assembly type(s), and/or Global Position System(s) (GPS) assembly type(s), and/or ground based navigation system(s) assembly type(s), and/or Satellite(s) assembly type(s) and/or Quantum Accelerometer compass assembly type(s), and/or altimeter(s) assembly type(s), and/or sensor(s) assembly type(s), and/or circuit(s) assembly type(s), and/or computer-on-chip(s) assembly type(s), and/or chip-set(s) assembly type(s), and/or computer chip(s) assembly type(s), and/or digital hand-held device(s) assembly type(s), and/or digital mobile device(s) assembly type(s), and/or connected corresponding digital device(s) assembly type(s), and/or digital diagnostic device(s) assembly type(s) (i.e., such as a corresponding adjoined, and/or adjoining, digital electronic(s) assembly type(s), and/or digital smartphone(s) assembly type(s), and/or digital tablet(s) computer(s) assembly type(s), and/or digital electronic(s) device(s) assembly type(s), and/or digital laptop(s) computer(s) assembly type(s)), and/or other associated digital computer(s) assembly type(s), and/or digital electronic(s) diagnostic device(s) assembly type(s), laser navigation system(s) assembly type(s), digital navigation system(s) assembly type(s), signal(s) assembly type(s), and/or antennae assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or element(s), and/or composite(s), and/or material(s), and/or equipment assembly type(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), for the purpose of, simultaneously reliably relaying, and/or transmitting, and/or receiving, and/or recording, and/or interacting, and/or calculating, and/or managing, and/or measuring, and/or controlling, and/or communicating, and/or monitoring, and/or diagnosing, and/or operating, and/or functioning, and/or working, and/or generating, and/or connecting, and/or using, and/or storing, and/or transiting, and/or transferring, and/or holding, and/or working and/or integrating, and/or hooking-up, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)) and, other necessary, and/or required, automated corresponding chosen control(s), and/or prompt(s), and/or instigation(s), and/or selection(s), and/or other operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, their corresponding adjoined, and/or adjoining, associated assemblage(s), automatically, and/or manually, and/or autonomously (wirelessly), and/or remotely, when in motion, and/or stationary, and, for the purpose of, invoking, and/or instigating, and/or using, and/or hooking-up, such digital data, and/or digital information, and/or data, and/or digital, electrical, magnetic instruction(s), of, for, from, into, thru, out of, and/or between, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), by way of, and/or via, a corresponding adjoined vehicle assembly type(s), physical operator(s), and/or other user(s) (E.g., trained diagnostic technician(s), and/or other physical user(s), and/or associated equipment assembly type(s) mode(s)), as selected, and/or programmed, and/or implemented, automatically, and/or manually, and/or autonomously (wirelessly), and/or remotely (i.e., with and/or without, an operator(s) and/or other user(s) physical prompt(s), and/or input(s)), when in motion, and/or stationary.

26. In its most preferred embodiment, such a corresponding adjoined, and/or adjoining, vehicle wheel assembly type(s), has, and/or is holding, and/or carrying, and/or integrating, and/or interacting, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or other associated electrical, and/or digital, and/or magnetic, and/or permanent magnet, and/or electromagnetic assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, other necessary, and/or required, suitable, and/or workable, and/or configurable, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), that are positioned, and/or embedded, and/or slotted, and/or compacted, and/or packaged, and/or oriented, and/or assembled, and/or aligned, and/or isolated, and/or insulated, and/or structured, and/or placed, and/or positioned, and/or amalgamated, and/or connected, and/or communicated, and/or hooked-up, and/or secured (fixed) in-place, with, within, in, into, on, onto, beneath, between, surrounding, thru, and/or throughout, and/or outside of, but, associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), for the purpose of, electronically, and/or digitally, and/or magnetically registering, and/or generating, and/or transiting, and/or transferring, and/or recording, and/or implementing, and/or integrating, and/or controlling, and/or communicating (transmitting and/or receiving), and/or managing, and/or diagnosing, and/or relaying, and/or interacting, and/or hooking-up digital information, and/or data, and/or digital data instruction(s) (real time, and/or near time, and/or historical), and/or other necessary, and/or required, corresponding chosen electrical, and/or digital, and/or magnetic (data) use(s), and/or operation(s), and/or function(s) and/or purpose(s), and/or task(s) (unbroken, and/or unimpeded), of, for, from, into, thru, out of, and/or between, and/or associated with, and/or by way of, and/or via, a physical operator(s) selection(s), and/or other physical user(s), and/or associated equipment assembly type(s) mode(s), and/or service technician(s), electrical, and/or digital, and/or magnetic control(s), and/or diagnostic system(s) assembly type(s), and/or autonomous (wireless) electrical, and/or digital, and/or magnetic equipment, control(s), and/or diagnostic system(s) assembly type(s), of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) associated, component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s) (unbroken, and/or unimpeded), automatically, and/or manually, and/or autonomously (wirelessly), and/or remotely, when in motion, and/or stationary, and, for the purpose of causing, and/or facilitating, and/or enabling, such corresponding adjoined, and/or adjoining, electrical, and/or digital, and/or magnetic assemblage(s), and/or other corresponding adjoined, and/or adjoining, associated electrical, and/or digital, and/or magnetic assemblage(s), and/or other associated corresponding adjoined, and/or adjoining, assemblage(s), of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), to simultaneously reliably act, and/or react to, and/or implement, and/or receive, and/or capture, and/or record, and/or communicate, and/or diagnose, and/or summarize, and/or operate, and/or function, and/or transfer, and/or transmit, and/or transit, and/or analyze, and/or measure, and/or connect, and/or control, and/or hook-up, real time, and/or near time, digital data, and/or data, and/or signal(s), and/or transmission(s), and/or information (telemetry), and/or recorded digital data, and/or information (historical), of, and/or pertaining to, a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)) and/or other necessary, and/or required, corresponding chosen operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary, and, for the purpose of, simultaneously reliably, transmitting, and/or receiving, and/or implementing, and/or communicating, and/or interacting, and/or integrating, and/or recording, and/or transiting, and/or transferring, and/or using, and/or storing, and/or generating, and/or controlling, and/or managing, and/or operating, and/or recording, and/or measuring, and/or diagnosing, and/or analyzing, and/or functioning, and/or working, and/or hooking-up, electrical, and/or digital data, and/or data, and/or digital, and/or magnetic signal(s) and/or other, information, and/or instruction(s), and/or action(s), and/or reaction(s), and/or summarization(s) (real time, and/or near time (telemetry), and/or registered (historical) data, of satellite communication(s), and/or other electronic, and/or digital, and/or magnetic transmissions(s), and/or spectrum(s), and/or bandwidth(s), and/or signal(s), and/or wave(s), and/or field(s), and/or pulse(s), and/or frequencies, and/or other electrical, and/or digital, and/or laser light, and/or radar, transmission(s) (transmitting and/or receiving), providing real time, and/or near time, data, and/or information (telemetry), and/or registered (historical) data, and/or information (recorded) data, and/or instruction(s), and/or action(s) (i.e., such as air pressure(s) (PSI), and/or vehicle wheel alignment(s), and/or tread performance, and/or other performance dynamic(s), and safety information of, and/or for such a corresponding adjoined, and/or adjoining pneumatic tire(s) (chamber(s)) assembly type(s), and/or other associated component(s), part(s), mechanism(s), device(s), and/or apparatus assembly type(s)), and/or other corresponding measurement(s), and/or data, and/or information(s), and/or instruction(s), and/or recording(s), and/or summarization(s), and/or diagnostic(s), that are deemed necessary, and/or required, for a corresponding chosen operating, and/or functioning, standard(s), of such corresponding adjoined, and/or adjoining assemblage(s), of, for, from, into, thru, out of, and/or between, and/or associated with, a corresponding adjoined vehicle assembly type(s), and, such a corresponding adjoined, and/or adjoining, vehicle wheel assembly type(s), that has, and/or is holding, and/or carrying, and/or operating, and/or functioning, and/or integrating, and/or interacting, and/or hooking-up, such a corresponding adjoined, and/or adjoining pneumatic tire(s) tire(s) assembly type(s) (i.e., with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) camber sensor(s) assembly type(s), and/or caster sensor(s) assembly type(s), and/or toe sensor(s) assembly type(s), and/or pneumatic tire pressure (PSI) Tire Pressure Monitor System(s) (TPMS) sensor(s) assembly type(s), temperature sensor(s) assembly type(s), balance sensor(s) assembly type(s), tread wear sensor(s) assembly type(s), heating, and/or cooling sensor(s) assembly type(s), inductive pick-up(s) assemblage(s), navigation, communication, transmission, signaling assemblage(s), protective housing case(s), contour protective housing case(s) (i.e., "Exoskeleton" assemblage(s)), On-Board Diagnostic (OBD) assemblage(s)), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) sensor(s), circuit(s), actuator(s), component(s), part(s), mechanism(s), device(s), system(s), and/or apparatus assembly type(s), of, for, from, into, thru, out of, and/or between, and/or associated with, such a corresponding adjoined, and/or adjoining vehicle wheel assembly type(s), and, such a corresponding adjoined vehicle assembly type(s), and, such a corresponding adjoined, and/or adjoining pneumatic tire(s) assembly type(s) (unbroken, and/or unimpeded), automatically, and/or manually, and/or autonomously (wirelessly), and/or remotely, when in motion, and/or stationary, and, for the purpose of, a corresponding chosen operating, and/or functioning standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding vehicle assembly type(s), and, such a corresponding adjoined, and/or adjoining pneumatic tire(s) assembly type(s) (i.e., such as real-time information, and/or data (telemetry) and/or historical information, and/or data (recorded) E.g. synopsis of measurable event(s) by second(s), minute(s), hour(s), day(s), week(s), month(s) and/or year(s), and/or use(s), and/or digital audit(s), and/or record(s), and/or performance, and/or handling, characteristic(s), and/or such a corresponding adjoined, and/or adjoining pneumatic tire(s) assembly type(s) air pressure(s) (PSI), temperature(s), camber, caster, toe measurement(s), and/or other diagnostic(s), and/or performance information(s)), and/or other corresponding chosen electrical, and/or digital, and/or magnetic, and/or analytical, and/or investigative, operation(s), and/or function(s), and/or purpose(s), and/or task(s), and/or information(s), and/or data properties, that are deemed necessary, and/or required, of, for, from, into thru, out of, and/or between, and/or associated with, such corresponding adjoined, and/or adjoining, assemblage(s), for a corresponding chosen operating, and/or functioning, standard(s), of such corresponding adjoined, and/or adjoining, assemblage(s), of, for, from, into, thru, out of, and/or between, and/or outside of, but, associated with, a corresponding adjoined vehicle assembly type(s), and, such a corresponding adjoined, and/or adjoining vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s) (unbroken, and/or unimpeded), automatically, and/or manually, and/or autonomously (wirelessly), and/or remotely, when in motion, and/or stationary, and, for the purpose of, real-time, and/or near-time, and/or historical diagnostic information, and/or data, and/or digital, electrical, magnetic signal(s) and/or transmission(s) (dynamically) of, for, from, into, thru, out of, and/or between, and/or associated with, a corresponding adjoined vehicle assembly type(s) physical operator(s), and/or associated vehicle physical technician(s), and/or other associated human, and/or electrical, and/or digital, and/or magnetic, and/or computer vehicle control assemblage(s), and/or technician(s), and/or operating system(s), and/or operating mode(s), automatically, and/or manually, and/or autonomously (wirelessly), and/or remotely, when in motion, and/or stationary.

27. In its most preferred embodiment, such a corresponding adjoined, and/or adjoining, vehicle wheel assembly type(s), has, and/or is holding, and/or carrying, and/or integrating, and/or interacting, and/or working, and/or operating, and/or functioning, and/or hooking-up, with a corresponding adjoined vehicle assembly type(s), and, a corresponding adjoined, and/or adjoining, (fixed) ring-shaped (annular) rotary manifold assembly type(s) (piece(s)), and, a corresponding adjoined, and/or adjoining, ring-shaped (annular) rotary manifold slip-ring wiring harness assembly type(s), and/or other wiring harness assembly type(s), and, a corresponding adjoined, and/or adjoining, vehicle junction boxes and hook-up(s) point(s) assembly type(s), and, a corresponding adjoined, and/or adjoining, automated vehicle Central Tire Inflation System (CTIS) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from into, thru, out of, and/or between, and/or associated with, such a corresponding adjoined, and/or adjoining, vehicle wheel assembly type(s), and, a corresponding adjoined vehicle assembly type(s), with the use of, and/or by way of, a specifically, and/or strategically, engineered, designed, fabricated, fashioned, or formed, in-built, inherent, attached, and/or attachable, corresponding adjoined, and/or adjoining, electronic, and/or digital, and/or data, and/or magnetic coding language(s) assembly type(s), and/or software(s) assembly type(s), and/or software(s) operating system(s) assembly type(s), and/or Artificial Intelligence (AI) software(s), and/or operating system(s) assembly type(s), and/or associated spectrum(s) assembly type(s), and/or associated band-width(s) assembly type(s), and/or associated laser light transmission(s) assembly type(s), and/or associated radar system(s) assembly type(s), and/or associated Global Positioning System(s) (GPS) assembly type(s), and/or associated satellite system(s) assembly type(s), and/or associated ground based navigation system(s) assembly type(s), and/or associated computer system(s) assembly type(s), and/or another necessary, and/or required, suitable, and/or workable, and/or configurable, communication means, and/or ways, and/or element(s), and/or composite(s), and/or material(s) and/or equipment assembly type(s), that is, programmed, and/or collected, and/or recoded, and/or recorded and/or processed, and/or accessed, and/or actuated, and/or operated, and/or functioned, and/or purposed, and/or tasked, and/or hooked-up, and/or analyzed, and/or diagnosed, and/or implemented, and/or communicated (transmitted (sent), and/or received (accepted)), via, and/or by way of, and/or with the use of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) wireless controller(s) assembly type(s), and/or computer control(s) assembly type(s), and/or computer control panel(s) assembly type(s), and/or computer(s) assembly type(s), and/or associated (CPU's) assembly type(s), and/or associated sensor(s) assembly type(s), and/or associated circuit(s) assembly type(s), and/or associated microprocessor(s) assembly type(s), and/or associated satellite(s) assembly type(s), and/or associated Computer Cloud system(s), associated sonar(s) system(s) assembly type(s), and/or associated band-width(s) assembly type(s), and/or associated frequencies assembly type(s), and/or associated spectrum(s) assembly type(s), and/or associated magnetic field(s), wave(s), and/or pulse(s) assembly type(s), and/or associated radar(s) system(s) assembly type(s), and/or associated ground based navigation system(s) assembly type(s), and/or associated antennae assembly type(s), and/or direct wired connection(s) assembly type(s), and/or direct wired connecting(s) assembly type(s), and/or direct wired hook-up(s) assembly type(s), and/or wiring assembly type(s), and/or transmission line(s) assembly type(s), and/or cabling assembly type(s), and/or fiber-optic(s) assembly type(s), and/or associated electricity power system(s) assembly type(s), and/or an ring-shaped (annular) rotary manifold assembly type(s) (piece(s)), and/or a ring-shaped (annular) slip-ring wiring harness assembly type(s), and/or other wiring harness assembly type(s), and/or a vehicle junction boxes and hook-up(s) point(s) assembly type(s), and/or other necessary, and/or required, suitable, and/or workable, and/or configurable, associated electrical, and/or digital, and/or magnetic, and/or infrared, and/or fiber-optic, and/or laser light, and/or sonar assemblage(s), and/or other necessary, and/or required, suitable, and/or workable, and/or configurable digital, electrical, magnetic mean(s), and/or ways, and/or device(s), and/or material(s), and/or element(s), and/or equipment assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electrical, and/or digital, and/or infrared, and/or fiber-optic, and/or laser light, and/or magnetic, and/or sonar component(s), part(s), mechanism(s), device(s), system(s), apparatus assembly type(s), and/or another necessary, and/or required, suitable, and/or workable, and/or configurable, means, and/or ways, and/or material(s), and/or element(s), and/or equipment assembly type(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary, for the purpose of, simultaneously reliably, carrying-out, and/or executing, and/or relaying, and/or communicating, and/or transiting, and/or transferring, and/or transmitting, and/or receiving, and/or generating, and/or using, and/or storing, and/or operating, and/or functioning, and/or interacting, and/or controlling, and/or managing, and/or measuring, and/or analyzing, and/or diagnosing, and/or depleting, and/or evacuating, and/or recording, and/or monitoring, and/or working, and/or connecting, and/or hooking-up, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other necessary, and/or required, corresponding operation(s), and/or function(s), and/or purpose(s), and/or task(s) (unbroken, and/or unimpeded), for a corresponding chosen operating, and/or functioning, standard(s), of such corresponding adjoined, and/or adjoining, assemblage(s), of, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s) automatically, and/or manually, and/or autonomously (wirelessly), and/or remotely, when in motion, and/or stationary, and, for the purpose of, a corresponding chosen operating, and/or functioning standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s)

assembly type(s), and, a corresponding adjoined vehicle assembly type(s), and associated component(s), part(s), mechanism(s), device(s), system(s), and/or apparatus assembly type(s) (such as real-time information, and/or data (telemetry) and/or historical information, and/or data (recorded) (E.g., synopsis of measurable event(s) by second(s), minute(s), hour(s), day(s), week(s), month(s) and/or year(s), and/or use(s), and/or digital audit(s), and/or record(s), and/or performance, and/or handling, characteristic(s), and/or a corresponding attached pneumatic tire(s) chamber(s) assembly type(s) pressure(s) (PSI), temperature(s), camber, caster, toe measurement(s), and/or other diagnostic(s), and/or performance information(s)), and/or other corresponding chosen electrical, and/or digital, and/or magnetic, and/or analytical, and/or investigative, operation(s), and/or function(s), and/or purpose(s), and/or task(s), and/or information(s), and/or data properties, that are deemed necessary, and/or required, of, for, from, into, thru, out of, and/or between, and/or associated with, such corresponding adjoined, and/or adjoining, assemblage(s), for a corresponding chosen operating, and/or functioning, standard(s), of such corresponding adjoined, and/or adjoining, assemblage(s), of, for, from, into, thru, out of, and/or between, and/or outside of, but, associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and associated component(s) part(s), mechanism(s), device(s), system(s), and/or apparatus assembly type(s) (unbroken, and/or unimpeded), automatically, and/or manually, and/or autonomously (wirelessly), and/or remotely, when in motion, and/or stationary, and, for the purpose of, real-time, and/or near-time, and/or historical diagnostic information, and/or other necessary, and/or required, operation(s), function(s), purpose(s), and/or task(s) for an associated vehicle physical operator(s), and/or associated vehicle physical technician(s), and/or other associated human, and/or non-human, and/or machine, and/or electrical, and/or digital, and/or magnetic vehicle operator(s), and/or technician(s) and/or operating system(s), and/or vehicle controller(s) assemblage(s), and/or operating mode(s), and/or control assemblage(s), and/or equipment assembly type(s) of, for, from, into, thru, out of, and/or between, and/or associated with, such a corresponding adjoined, and/or adjoining, vehicle wheel assembly type(s), and, a corresponding adjoined vehicle assembly type(s), and, such a corresponding adjoined, and/or adjoining, pneumatic tire(s) (chamber(s)) assembly type(s), and, associated component(s), part(s), mechanism(s), device(s), system(s), and/or apparatus assembly type(s), automatically, and/or manually, and/or autonomously (wirelessly), and/or remotely, when mounted, and/or attached, and/or hooked-up onto, and/or with, a corresponding adjoined vehicle assembly type(s), and, when in motion, and/or stationary.

28. In its most preferred embodiment, such a corresponding adjoined, and/or adjoining, vehicle wheel assembly type(s), that is mounted, and/or attached, and/or hooked-up onto, and/or with a corresponding adjoined vehicle assembly type(s), that has, and/or is holding, and/or carrying, and/or integrating, and/or operating, and/or functioning, and/or working, and/or interacting, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), comprising, but, are not exclusive to, namely; a (fixed) ring-shaped (annular) rotary manifold assembly type(s) (piece(s)), a ring-shaped (annular) slip-ring wiring harness assembly type(s), a vehicle junction boxes and hook-up(s) point(s) assembly type(s), an automated vehicle Central Tire Inflation System (CTIS) assembly type(s), a protective housing case(s) assembly type(s), and/or a contour protective housing case(s) assembly type(s) (i.e., "Exoskeleton" assemblage(s)), an associated vehicle intersection protective housing case(s) assembly type(s), an associated vehicle hook-up(s) protective housing case(s) assembly type(s), an associated hook-up(s) point(s) assembly type(s), valve(s) assembly type(s), hose(s) assembly type(s), tube(s) assembly type(s), channel(s) assembly type(s), tunnel(s) assembly type(s), passageway(s) assembly type(s), path(s) assembly type(s), conduit(s) assembly type(s), aperture(s) assembly type(s), receptacle(s) assembly type(s), container(s) assembly type(s), reservoir(s) assembly type(s), cylinder(s) assembly type(s), tank(s) assembly type(s), attachable/detachable tank(s) assembly type(s), and/or seal(s) assembly type(s), sealing material(s), meter(s) assembly type(s), indicator(s) assembly type(s), gauge(s) assembly type(s), air compressor(s) assembly type(s), electric automated digital control(s) assembly type(s), electric batteries assembly type(s), re-generative electrical power technologies assembly type(s), re-generative electrical brake(s) power generation technologies assembly type(s), electrical solar panel(s) assembly type(s), solar electrical power generation technologies assembly type(s), electrical transformer(s) assembly type(s), electrical exchanger(s) assembly type(s), electrical motor(s) assembly type(s), electrical wiring assembly type(s), electrical wiring harness assembly type(s), circuit(s) assembly type(s), sensor(s) assembly type(s), digital computer hardware assembly type(s), digital device(s) assembly type(s), antennae assembly type(s), video equipment assembly type(s), video transmission(s) line(s) assembly type(s), infrared equipment assembly type(s), radar equipment assembly type(s), laser light system(s) assembly type(s), infrared transmission(s) line(s) assembly type(s), radar transmission(s) line(s) assembly type(s), electrical lighting (illumination) equipment assembly type(s), computer (digital) software assembly type(s), computer (digital) programing language(s) assembly type(s), navigation system(s) assembly type(s), satellite capable electronic(s) assembly type(s), electronic signaling assembly type(s), electrical sensor(s) assembly type(s), digital sensor(s) assembly type(s), micro-processor(s) assembly type(s), electrical power generating technologies assembly type(s), electric battery(s) assembly type(s), electric battery technologies assembly type(s), electric storage assembly type(s), electric storage equipment assembly type(s), electric generator(s) assembly type(s), electric air-compressor(s) assembly type(s), electromotive, and/or electric generator(s)/electric motor(s) (combined) assembly type(s), air compressor(s) equipment assembly type(s), pump(s) assembly type(s), compressed air filter(s) assembly type(s), compressed air drier(s) assembly type(s), electrical switches assembly type(s), electrical activated button(s) assembly type(s), electrical digital controller(s) assembly type(s), electrical digital control panel(s) assembly type(s), electrical computerized (digital) touch-screen control(s) panel(s) assembly type(s), fastener(s) assembly type(s), tying material(s) assembly type(s), and/or bracket(s) assembly type(s), and/or brace(s) assembly type(s), automated valve(s) assembly type(s), air pressure relief vent(s) assembly type(s), electronic control unit(s) (ECU) assembly type(s), pneumatic control unit(s) assembly type(s), automated control(s) assembly type(s), automated, and/or manual operator(s) and/or user(s) control panel(s) assembly type(s), speed sensor(s) assembly type(s), automated sensor(s) assembly type(s), automated pressure switch assembly type(s), automated pressure gauge(s) assembly type(s), automated pressure protection valve(s) assembly type(s), automated cut-off valve(s) assembly type(s), multiple pressurized air/gas source(s) assembly type(s), multiple pressurized air/gas system(s) assembly type(s), automated pressurized air compressor(s) assembly type(s), filter(s) assembly type(s), air filter(s) assembly type(s), compressed air filter(s)/drier(s) assembly type(s), compressed air drier(s) assembly type(s), socket(s) assembly type(s), threaded aperture(s) assembly type(s), flush mounting fastener(s) assembly type(s), plug(s) assembly type(s), butterfly valve(s) assembly type(s), conduit(s) assembly type(s), housing(s) case(s) assembly type(s), harness assembly type(s), electrical harnesses assembly type(s), electrical plug(s) assembly type(s), electrical material(s) assembly type(s), electrical-digital sensor(s) assembly type(s), other digital sensor(s) assembly type(s), electric actuator(s) assembly type(s), digital actuator(s) assembly type(s), actuator(s) assembly type(s), electrical power source(s) assembly type(s), power source(s) assembly type(s), electrical storage battery(s) assembly type(s), electric battery assembly type(s), lithium-ion batteries assembly type(s), rechargeable electric batteries assembly type(s), fuel cell(s) assembly type(s), capacitor(s) assembly type(s), rechargeable fuel cell(s) assembly type(s), compressed air and/or other gases storage tank(s) assembly type(s), vessel(s) assembly type(s), electrical conduit(s) assembly type(s), insulated hose(s) assembly type(s), fitting(s) assembly type(s), vehicle brake caliper housing(s) assembly type(s), multi-source(s) electrical power assembly type(s), electrical motor(s) assembly type(s), motor(s) assembly type(s), engine(s) assembly type(s), electric generator(s) assembly type(s), permanent magnet electrical generator(s)/motor(s) (combined) assembly type(s), storage vessel(s) assembly type(s), electrical pump(s) assembly type(s), electrical wiring assembly type(s), digital transmission line(s) assembly type(s), electrical cable(s) assembly type(s), electrical socket(s) assembly type(s), permanent magnet inductive pick-up(s), plug(s), socket(s), hook-up(s), connection(s) assemblages, permanent magnet(s) inductive/conductive assemblage(s), magnetic communication, navigation, transmission charging, signaling assemblage(s), electrical actuator(s) assembly type(s), electrical battery power assembly type(s), electrical hard-wire connection(s) assembly type(s), wireless (antennae) connection(s) assembly type(s), electrical, and/or digital, sensor(s) assembly type(s), electrical, and/or digital circuit(s) assembly type(s), electrical, and/or digital, computer(s) assembly type(s), CPU's assembly type(s), electrical, and/or digital, microprocessor(s) assembly type(s), digital software assembly type(s), digital instruction(s) assembly type(s), digital coding assembly type(s), spectrum(s) assembly type(s), band-width(s) assembly type(s), radar(s) assembly type(s), fiber optic transmission(s) assembly type(s), electrical, and/or digital, and/or magnetic control(s) assembly type(s), electrical, and/or digital, and/or magnetic antennae assembly type(s), and/or other digital, electrical, magnetic associated component(s), part(s), mechanism(s), device(s), system(s), and/or apparatus assembly type(s), and/or another necessary, and/or required, suitable, and/or workable, and/or configurable, means, and/or ways, and/or material(s), and/or element(s), and/or composite(s), and/or equipment assembly type(s), within, in, into, on, onto, beneath, between, surrounding, thru, and/or throughout, and/or associated with, a corresponding adjoined vehicle assembly type(s), and, such a corresponding adjoined, and/or adjoining vehicle wheel assembly type(s), and, such a corresponding adjoined, and/or adjoining pneumatic tire(s) assembly type(s), for the purpose of, simultaneously reliably, generating, and/or transiting, and/or transferring, and/or transmitting, and/or receiving, and/or using, and/or storing, and/or interacting, and/or recording, and/or managing, and/or monitoring, and/or controlling, and/or communicating, and/or launching, and/or implementing, and/or operating, and/or functioning, and/or working, and/or interacting, and/or integrating, and/or hooking-up, a desired media(s), and/or medium(s) (such as compressed air, and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s) automatically, and/or manually, and/or autonomously (wirelessly), and/or remotely, when in motion, and/or stationary.

29. In its most preferred embodiment, such a corresponding adjoined, and/or adjoining, vehicle wheel assembly type(s), has, and/or is holding, and/or carrying, and/or integrating, and/or amalgamating, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s), and/or protrusion(s) assembly type(s), for the purpose of, assembling, and/or embedding, and/or slotting, and/or compacting, and/or organizing, and/or orienting, and/or aligning, and/or positioning, and/or anchoring, and/or mooring, and/or isolating, and/or insulating, and/or sealing, and/or protecting, and/or operating, and/or functioning, and/or securing (fixed) in-place, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), and/or ring-shaped (annular) rotary-manifold slip-ring wiring harness assembly type(s), and/or other wiring harness assembly type(s), and, a vehicle junction boxes and hook-up(s) point(s) assembly type(s), and/or connection point(s) assembly type(s), and, for the purpose of, supporting, and/or maintaining, and/or upholding, and/or assembling, and/or anchoring, and/or mooring, and/or securing (fixed) in-place a stationary, and/or fixed, and/or rotating, and/or moving, and/or spinning, and/or turning, hook-up(s) assembly type(s), and/or connection(s) assembly type(s), and/or connecting(s) assembly type(s), and/or linking(s) assembly type(s), and/or assembling(s) (unbroken, and/or unimpeded), of, for, from, into, thru, out of, and/or between, and/or associated with, a corresponding adjoined, and/or adjoining, automated vehicle Central Tire Inflation System (CTIS) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s) and/or apparatus assembly type(s), within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and associated component(s), part(s), mechanism(s), device(s), system(s), and/or apparatus assembly type(s), and, for the purpose of, simultaneously reliably, sending (transmitting), and/or receiving, and/or implementing, and/or generating, and/or using, and/or storing, and/or transiting, and/or transferring, and/or interacting, and/or integrating, and/or depleting, and/or evacuating, and/or communicating, and/or measuring, and/or diagnosing, and/or analyzing, and/or connecting, and/or recording, and/or controlling, and/or managing, and/or monitoring, and/or working, and/or operating, and/or functioning, and/or hooking-up, a desired media(s), and/or medium(s) (such as compressed air, and/or other gases, for inflating, and/or deflating (+ and/or −), a corresponding attached pneumatic tire(s) chamber(s) assembly type(s), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s) automatically, and/or manually, and/or autonomously (wirelessly), and/or remotely, when in motion, and/or stationary, and, for the purpose of, governance, by international, and/or world-wide, and/or country specific law(s), and/or unified state(s) law(s), and/or state(s) law(s), and/or regulation(s) and/or standard(s), and/or other governance, and/or homologation, and, for the purpose of, providing better, and/or longer, and/or safer, pneumatic tire performance, wear, and, handling characteristic(s), for a corresponding attached pneumatic tire(s) (chamber(s)) assembly type(s), while simultaneously, reducing the use of fossil fuel(s), and/or electric power (production, and/or consumption), and, lowering Carbon Dioxide (C02) emission(s), for a corresponding adjoined vehicle assembly type(s), and, other necessary, and/or required, operation(s), and/or function(s), and/or purpose(s), and/or task(s) (dynamically), automatically, and/or manually, and/or autonomously (wirelessly), and/or remotely, when in motion, and/or stationary for a corresponding adjoined vehicle assembly type(s), that has, and/or is holding, and/or carrying, and/or interacting, and/or operating, and/or functioning, and/or working, and/or using, and/or controlling, and/or managing, and/or communicating, and/or hooking-up, such a corresponding adjoined, and/or adjoining, vehicle wheel assembly type(s).

Other and further features and advantages will be apparent from the following description(s) of a presently preferred alternative embodiment(s) of the invention, given for the purpose of disclosure, and taken in conjunction with the accompanying drawings.

Alternative Embodiments of the Invention

1. In its most preferred alternative embodiment, such a corresponding adjoined, and/or adjoining, vehicle wheel assembly type(s) has, and/or is holding, and/or carrying, and/or operating, and/or functioning, and/or integrating, and/or amalgamating, and/or interacting, and/or working, and/or hooking-up, a specifically, and/or strategically, engineered, designed, fabricated, fashioned, or formed, (fixed) ring-shaped (annular) rotary manifold housing (case) assembly type(s) (piece), that is in-built, and/or inherent, and/or integral, to the body (architecture) of such a corresponding adjoined, and/or adjoining, vehicle wheel assembly type(s), for the purpose of, proximity, and/or attachment, and/or assembly, and/or hooking-up, with, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), ring-shaped (annular) rotary manifold shaft (cap) assembly type(s) (piece), and, a ring-shaped (annular) rotary manifold slip-ring wiring harness assembly type(s), and, a vehicle junction boxes and hook-up(s) point(s) assembly type(s), of such a corresponding adjoined, and/or adjoining, vehicle wheel assembly type(s), and, a corresponding adjoined vehicle assembly type(s) (unbroken, and/or unimpeded), when in motion, and/or stationary, and, for the purpose of, compactness, and/or miniaturization, and/or protection, and/or placement, and/or orientation, and/or alignment, and/or packaging, and/or assembly, and/or operating, and/or functioning, and/or interacting, and/or proximity, and/or hooking-up, of such a corresponding adjoined, and/or adjoining, (fixed) ring-shaped (annular) rotary manifold shaft (cap) assembly type(s) (piece), and, a corresponding adjoined, and/or adjoining, ring-shaped (annular) rotary manifold slip-ring wiring harness assembly type(s), and a corresponding adjoined, and/or adjoining, vehicle junction boxes and hook-up(s) point(s) assembly type(s) (as assembled together), and, for the purpose of, stabilization, and/or anchoring, and/or aligning, and/or hooking-up (unbroken, and/or unimpeded), of a corresponding adjoined, and/or adjoining, ring-shaped (annular) rotary manifold shaft (cap) assembly type(s) (piece), and, a corresponding adjoined, and/or adjoining, ring-shaped (annular) rotary manifold slip-ring wiring harness assembly type(s) and, a corresponding adjoined, and/or adjoining, vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), of such a corresponding adjoined, and/or adjoining, vehicle wheel assembly type(s), and, a corresponding adjoined vehicle assembly type(s), when in motion, and/or stationary, and, for the purpose of, simultaneously reliably, generating, and/or linking, and/or connecting, and/or transiting, and/or transferring, and/or transmitting, and/or receiving, and/or working, and/or communicating, and/or operating, and/or functioning, and/or integrating, and/or interacting, and/or controlling, and/or managing, and/or recording, and/or using, and/or storing, and/or hooking-up (unbroken, and/or unimpeded), a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, a corresponding adjoined vehicle assembly type(s), that has, and/or is holding, and/or carrying, and/or operating, and/or functioning, and/or interacting, and/or working, and/or communicating, and/or controlling, and/or managing, and/or generating, and/or using, and/or hooking-up, a corresponding adjoined, and/or adjoining, vehicle junction boxes and hook-up(s) point(s) assembly type(s), and, a corresponding adjoined, and/or adjoining, automated vehicle Central Tire Inflation System (CTIS) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), that comprise, but, are not exclusive to, namely; an electric motor(s) assembly type(s), generator(s) assembly type(s), power source(s) assembly type(s), motor(s) assembly type(s), electric air compressor(s) assembly type(s), storage vessel(s) assembly type(s) (for compressed air, and/or other gases), high pressure holding tank(s) assembly type(s) (for compressed air, and/or other gases), battery(s) assembly type(s), hose(s) assembly type(s), connecting valve(s) assembly type(s), valve(s) assembly type(s), wiring assembly type(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), (fixed) ring-shaped (annular) rotary manifold housing (case) assembly type(s) (piece), and/or (fixed) ring-shaped (annular) rotary manifold vessel assembly type(s), and/or (fixed) ring-shaped (annular) rotary manifold receptacle(s) assembly type(s) (i.e., in-built, inherent, and/or formed, as part of the body (architecture) of such a corresponding adjoined, and/or adjoining, vehicle wheel assembly type(s)), has, and/or is holding, and/or carrying, and/or operating, and/or functioning, and/or integrating, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), channel(s), assembly type(s), and/or aperture(s) assembly type(s), and/or area(s) assembly type(s), and/or tunnel(s) assembly type(s), and/or passageway(s) assembly type(s), and/or path(s) assembly type(s), and/or compartment(s) assembly type(s), and, component(s), part(s), mechanism(s), device(s), system(s), and/or apparatus assembly type(s), comprising, but, not exclusive to, namely; ball bearing(s) assembly type(s), sealed ball bearing(s) assembly type(s), ball bearing track(s) assembly type(s), joint(s) assembly type(s), valve(s) assembly type(s), actuator(s) assembly type(s), independent fluid passage(s) assembly type(s), seal(s) assembly type(s), slip-ring integration area(s) assembly type(s), fastener(s) assembly type(s), and, sealing material(s), and/or another necessary, and/or required, suitable, and/or workable, and/or configurable, means, and/or ways, and/or material(s), and/or equipment assembly type(s), that is positioned, and/or placed, and/or situated, within, in, into, on, onto, beneath, between, surrounding, thru, and/or throughout, the body (architecture) of such an in-built, and/or inherent, and/or integrated, and/or amalgamated, corresponding adjoined, and/or adjoining, (fixed) ring-shaped (annular) rotary manifold housing (case) assembly type(s) (piece), of the body (architecture) of such a corresponding adjoined, and/or adjoining, vehicle wheel assembly type(s), in such a manner, as to surround the hub hole assembly type(s), and/or hub aperture(s) assembly type(s), and, hub bolt(s) hole(s) pattern(s) assembly type(s), and/or hub bolt(s) hole(s) area(s) assembly type(s), and/or another necessary, and/or required, suitable, and/or workable, and/or configurable, portion(s), and/or area(s), and/or place(s), and/or means, and/or ways, and/or element(s), and/or equipment assembly type(s), of the body (architecture) of such a corresponding adjoined, and/or adjoining, vehicle wheel assembly type(s), for the purpose of, embedding, and/or slotting, and/or compacting, and/or minimizing, and/or shielding, and/or protecting, and/or packaging, and/or orienting, and/or aligning, and/or fitting, and/or proximity, and/or securing (fixed) in-place, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), ring-shaped (annular) rotary manifold shaft (cap) assembly type(s) (piece), and, a corresponding adjoined, and/or adjoining, ring-shaped (annular) rotary manifold slip-ring wiring harness assembly type(s), and, a vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined, vehicle assembly type(s), when in motion, and/or stationary, and, for the purpose of, allowing fluid(s), and/or compressed air, and/or gases, and/or data, and/or digital signal(s), and/or electricity supply, to transit, and/or transfer, and/or transmit, and/or enter, and/or exit, and/or hook-up, such a corresponding adjoined, and/or adjoining, vehicle wheel assembly type(s), and, a corresponding adjoined vehicle assembly type(s), and, other associated component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), simultaneously reliably (unbroken, and/or unimpeded), automatically, and/or manually, and/or autonomously (wirelessly), and/or remotely, when in motion, and/or stationary, and, for the purpose of, maintaining system pressure(s), and, isolating, fluid(s), and/or compressed air, and/or gases, and/or electricity supply, and/or digital signal(s), and/or data, and/or other desirable media(s), and/or medium(s), path(s), and/or passage(s), and/or passageways(s), of, for, from, into, thru, out of, and/or between, and/or associated with such an in-built, and/or inherent, corresponding adjoined, and/or adjoining, (fixed) ring-shaped (annular) rotary manifold housing case assembly type(s), of the body (architecture) of such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary, and, for the purpose of, facilitating, and/or enabling, and/or allowing, other corresponding chosen operation(s), and/or function(s), and/or purpose(s), and/or task(s) (i.e., unbroken, and/or unimpeded, based on application(s) need(s), and/or requirement(s)), for a corresponding chosen operating, and/or functioning, standard(s), of such corresponding adjoined, and/or adjoining, assemblage(s), of, for, from, into, thru, out of, and/or between, and/or associated with such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a corresponding adjoined, and/or adjoining, vehicle wheel assembly type(s) body (architecture), has, and/or is holding, and/or carrying, and/or operating and/or functioning, and/or integrating, and/or amalgamation, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), (fixed) ring-shaped (annular) rotary manifold housing (case) assembly type(s) (piece), and/or (fixed) ring-shaped (annular) rotary manifold vessel assembly type(s), and/or (fixed) ring-shaped (annular) rotary manifold receptacle(s) assembly type(s) (i.e., that is in-built, inherent, and/or formed, as part of the body (architecture) of such a corresponding adjoined, and/or adjoining, vehicle wheel assembly type(s)), is made with the use of; metal(s) assembly type(s), and/or metal(s) alloy(s) assembly type(s), and/or composite(s) assembly type(s), and/or graphene(s) assembly type(s), and/or element(s) assembly type(s), and/or material(s) assembly type(s), and/or plastic(s) assembly type(s), and/or synthetic(s) assembly type(s), and/or another necessary, and/or required, suitable, and/or workable, and/or configurable, means, and/or ways, and/or element(s), and/or substance(s), and/or equipment assembly type(s), for the purpose of, an application(s), need(s), and/or use(s), and/or customization(s), and/or requirement(s), and/or applied load(s), and/or number of fluid passage(s), and/or fluid(s) passage size, and/or compressed air, and/or other gases pressure(s), and/or fluid type(s), and/or temperature(s), and/or transmission line(s), and/or cabling(s), and/or wiring(s) and/or speed(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s), when in motion, and/or stationary, and, for the purpose of, a corresponding chosen operating and/or functioning, standard(s), of such a corresponding adjoined, and/or adjoining, vehicle wheel assembly type(s), and, assemblage(s), when, mounted, and/or attached, and/or hooked-up, onto, and/or with, a corresponding adjoined vehicle assembly type(s), when in motion, and/or stationary, and, for the purpose of, simultaneously reliably, generating, and/or linking, and/or connecting, and/or transiting, and/or transferring, and/or transmitting, and/or receiving, and/or working, and/or communicating, and/or operating, and/or functioning, and/or integrating, and/or interacting, and/or controlling, and/or managing, and/or monitoring, and/or recording, and/or using, and/or storing, and/or hooking-up (unbroken, and/or unimpeded), a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a corresponding adjoined, and/or adjoining, vehicle wheel assembly type(s) body (architecture), has, and/or is holding, and/or carrying, and/or operating, and/or functioning, and/or working, and/or integrating, and/or hooking-up, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), for the purpose of, interacting, and/or integrating, and/or hooking-up, and/or securing (fixed) in-place, and/or anchoring, and/or mooring, and/or linking, and/or operating, and/or functioning, and/or working, with such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), (fixed) ring-shaped (annular) housing (case) assembly type(s) (piece), and/or (fixed) ring-shaped (annular) rotary manifold vessel assembly type(s), and/or (fixed) ring-shaped (annular) rotary manifold receptacle(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), within, in, into, on, onto, beneath, between, surrounding, thru, and/or throughout, and/or associate with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), (fixed) ring-shaped (annular) rotary manifold housing (case) assembly type(s) (piece), and/or (fixed) ring-shaped (annular) rotary manifold vessel assembly type(s), and/or (fixed) ring-shaped (annular) rotary manifold receptacle(s) assembly type(s) (i.e., that is in-built, inherent, and/or part of, and/or integral, of the body (architecture) of such an corresponding adjoined, and/or adjoining, vehicle wheel assembly type(s)), has identical, internal, and/or external, attribute(s), and/or technical competencies, and/or reliabilities, as that of an attachable, and/or detachable corresponding adjoined, and/or adjoining, (fixed) ring-shaped (annular) rotary manifold housing (case) assembly type(s) (piece), for the purpose of, simultaneously reliably, generating, and/or transiting, and/or transferring, and/or transmitting, and/or receiving, and/or integrating, and/or interacting, and/or operating, and/or functioning, and/or controlling, and/or communicating, and/or managing, and/or monitoring, and/or using, and/or storing, and/or working, and/or hooking-up (unbroken, and/or unimpeded), a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary, when hooked-up with other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s).

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), (fixed) ring-shaped (annular) rotary manifold housing (case) assembly type(s) (piece), and/or (fixed) ring-shaped (annular) rotary manifold vessel assembly type(s), and/or (fixed) ring-shaped (annular) rotary manifold receptacle(s) assembly type(s), and, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), channel(s) assembly type(s), and/or aperture(s) assembly type(s), and/or area(s) assembly type(s), of the body (architecture) of such a corresponding adjoined, and/or adjoining, vehicle wheel assembly type(s), are entirely built within, and/or as part of, and/or in-built, and/or inherent, and/or fixed within, in, into, on, onto, beneath, between, surrounding, thru, and/or throughout, the body (architecture) of such a corresponding adjoined, and/or adjoining, vehicle wheel assembly type(s), for the purpose of compactness, and/or proximity, and/or protection, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), ring-shaped (annular) rotary manifold shaft (cap) assembly type(s) (piece), and/or a ring-shaped (annular) rotary manifold slip-ring wiring harness assembly type(s), and, a corresponding adjoined, and/or adjoining, vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined vehicle assembly type(s), when in motion, and/or stationary, and, for the purpose of, simultaneously reliably, generating, and/or transiting, and/or transferring, and/or transmitting, and/or receiving, and/or integrating, and/or interacting, and/or operating, and/or functioning, and/or controlling, and/or communicating, and/or managing, and/or monitoring, and/or using, and/or storing, and/or working, and/or hooking-up (unbroken, and/or unimpeded), a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

2. In its most preferred alternative embodiment, such a corresponding adjoined, and/or adjoining, vehicle wheel assembly type(s), has, and/or is holding, and/or carrying, and/or operating, and/or functioning, and/or integrating, and/or amalgamating, and/or interacting, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) (fixed) ring-shaped (annular) rotary manifold assembly type(s) (piece(s)), and/or ring-shaped (annular) rotary manifold slip-ring wiring harness assembly type(s), and/or slip-ring wiring harness assembly type(s), and/or wiring harness assembly type(s), that is assembled, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) adaptor, and/or attachment, and/or bridging, and/or connecting, mount, or base, or pedestal, or stand, or frame, or plate, or bracketing, or bracing, architecture assembly type(s), and/or protective housing (case) assembly type(s), and/or another necessary, and/or required, suitable, and/or workable, and/or configurable, means, and/or ways, and/or material(s), and/or equipment assembly type(s), for the purpose of, holding, and/or carrying, and/or assembling, and/or orienting, and/or positioning, and/or aligning, and/or protecting, and/or securing (fixed) in-place, and/or hooking-up, a corresponding adjoined, and/or adjoining (fixed) ring-shaped (annular) rotary manifold assembly type(s) (piece(s)), and/or ring-shaped (annular) rotary manifold slip-ring wiring harness assembly type(s), and/or slip-ring wiring harness assembly type(s), and/or wiring harness assembly type(s), of, for, from, into, thru, out of, and/or between, and/or associated with, such a corresponding adjoined, and/or adjoining, vehicle wheel assembly type(s), and, a corresponding adjoined vehicle assembly type(s), when in motion, and/or stationary, and, for the purpose of, placing, and/or positioning, and/or attaching, and/or hooking-up, a corresponding adjoined, and/or adjoining, (fixed) ring-shaped (annular) rotary manifold assembly type(s) (piece(s)), and/or a ring-shaped (annular) rotary manifold slip-ring wiring harness assembly type(s), and/or a slip-ring wiring harness assembly type(s), and/or a wiring harness assembly type(s), onto, and/or with, a corresponding adjoined vehicle assembly type(s), wheel hub assembly type(s), via, and/or by way of, and/or with the use of the corresponding adjoined, and/or adjoining, wheel hub assembly type(s), bolt(s) pattern(s) assembly type(s) (i.e., by inserting the corresponding adjoined, and/or adjoining, adaptor, and/or attachment, and/or bridging, and/or connecting, mount, or base, or pedestal, or stand, or plate, or frame, or bracketing, or bracing, architecture assembly type(s), or protective housing (case) assembly type(s) (having corresponding aperture(s) assembly type(s)), through the corresponding adjoined vehicle assembly type(s), wheel hub assembly type(s), bolt(s) pattern(s) assembly type(s), until a portion(s), and/or area(s), are resting flush against the corresponding adjoined, and/or adjoining, vehicle wheel hub assembly type(s) protective casing assembly type(s), corresponding adjoined, and/or adjoining, surface(s) with, and/or without, corresponding adjoined, and/or adjoining (flush mounting and/or other), channel(s) assembly type(s), and/or aperture(s) assembly type(s), and/or area(s) assembly type(s), and/or protrusion(s) assembly type(s), and/or flange(s) assembly type(s), and/or fastener(s) assembly type(s), and/or seal(s) assembly type(s), and/or sealing material(s), and/or adaptor(s) assembly type(s)), and, secured (fixed) in-place, between such a corresponding adjoined, and/or adjoining, vehicle wheel assembly type(s), and, a corresponding adjoined, and/or adjoining, vehicle junction boxes and hook-up(s) point(s) assembly type(s), that is assembled with, within, in, into, on, onto, beneath, between, surrounding, thru, and/or throughout, a corresponding adjoined vehicle assembly type(s), brake rotor(s) assembly type(s), and/or brake caliper(s) assembly type(s), and/or hub(s) assembly type(s), by mounting, and/or attaching, and/or hooking-up, a corresponding adjoined, and/or adjoining, bolt(s), and/or fastener(s) assembly type(s) (flush mounting, and/or other), of such a corresponding adjoined, and/or adjoining, vehicle wheel assembly type(s), and/or another necessary, and/or required, suitable, and/or workable, and/or configurable, means, and/or ways, and/or material(s), and/or equipment assembly type(s), and, for the purpose of, assembly, and/or proximity, and/or securing (fixed) in-place, and/or hooking-up, of such a corresponding adjoined, and/or adjoining, adaptor, and/or attachment, and/or bridging, and/or connecting, mount, or base, or pedestal, or stand, or frame, or plate, or bracketing, or bracing, architecture assembly type(s), and/or protective housing (case) assembly type(s), and, associated connection(s) point(s) assembly type(s), and/or hook-up(s) point(s) assembly type(s) (unbroken, and/or unimpeded), of, for, from, into, thru, out of, and/or between, and/or associated with, such a corresponding adjoined, and/or adjoining, vehicle wheel assembly type(s), and, a corresponding adjoined, and/or adjoining, (fixed) ring-shaped (annular) rotary manifold assembly type(s) (piece(s)), and/or a corresponding adjoined, and/or adjoining, ring-shaped (annular) rotary manifold slip-ring wiring harness assembly type(s), and/or a corresponding adjoined, and/or adjoining, slip-ring wiring harness assembly type(s), and/or a corresponding adjoined, and/or adjoining, wiring harness assembly type(s), and, a corresponding adjoined, and/or adjoining, vehicle junction boxes and hook-up(s) point(s) assembly type(s), and, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning), component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining vehicle wheel assembly type(s), and, a corresponding adjoined vehicle assembly type(s), when in motion, and/or stationary.

Such a corresponding adjoined, and/or adjoining, adaptor, and/or attachment, and/or bridging, and/or connecting, mount, or base, or pedestal, or stand, or frame, or plate, or bracketing, or bracing, architecture assembly type(s), and/or protective housing (case) assembly type(s), has, and/or is holding and/or carrying, and/or operating, and/or functioning, and/or integrating, and/or amalgamating, and/or interacting, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) channel(s) assembly type(s), and/or aperture(s) assembly type(s), and/or area(s) assembly type(s), and/or joint(s) assembly type(s), and/or protrusion(s) assembly type(s) (with, and/or without corresponding aperture(s) assembly type(s)), and/or flange(s) assembly type(s) (with, and/or without, aperture(s) assembly type(s), and/or fastener(s) assembly type(s), and/or seal(s) assembly type(s), and/or sealing material(s), and/or another necessary, and/or required, suitable, and/or workable, and/or configurable, means, and/or ways, and/or material(s), and/or equipment assembly type(s), for the purpose of, embedding, and/or slotting, and/or holding, and/or positioning, and/or orienting, and/or aligning, and/or assembling, and/or compacting, and/or packaging, and/or securing (fixed) in-place, and/or hooking-up, a (fixed) ring-shaped (annular) rotary manifold assembly type(s) (piece(s)), and/or ring-shaped (annular) rotary manifold slip-ring wiring harness assembly type(s), and/or slip-ring wiring harness assembly type(s), and/or wiring harness assembly type(s), and, associated component(s), part(s), mechanism(s), device(s), system(s), and/or apparatus assembly type(s) with, within, in, into, on, onto, beneath, between, surrounding, thru, and/or throughout, the body (architecture) of such a corresponding adjoined, and/or adjoining, vehicle wheel assembly type(s), and, other associated component(s), part(s), mechanism(s), device(s), system(s), and/or apparatus, and/or valve(s), and/or superfluous valve(s), and/or hook-up(s) assembly type(s), of such a corresponding adjoined, and/or adjoining vehicle wheel assembly type(s), and, a corresponding adjoined vehicle assembly type(s), and, for the purpose of assembly, and, proximity, with a corresponding adjoined, and/or adjoining, vehicle junction boxes and hook-up(s) point(s) assembly type(s), of a corresponding adjoined vehicle assembly type(s), and, for the purpose of, simultaneously reliably, generating, and/or transiting, and/or transferring, and/or transmitting, and/or receiving, and/or operating, and/or functioning, and/or using, and/or relating, and/or integrating, and/or interacting, and/or communicating, and/or controlling, and/or monitoring, and/or recording, and/or expelling, and/or working, and/or hooking-up, a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other necessary, and/or required, operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

Such a corresponding adjoined, and/or adjoining, (fixed) ring-shaped (annular) rotary manifold assembly type(s) (piece(s)), and/or ring-shaped (annular) rotary manifold slip-ring wiring harness assembly type(s), and/or slip-ring wiring assembly type(s), and/or wiring harness assembly type(s) (as assembled, and/or hooked-up, onto, and/or with, such a corresponding adjoined, and/or adjoining, adaptor, and/or attachment, and/or bridging, and/or connecting, mount, or base, or pedestal, or stand, or frame, or plate, or bracketing, or bracing, architecture assembly type(s), and/or protective housing (case) assembly type(s), insert, and/or slot-in, and/or onto, and/or through a corresponding adjoined vehicle assembly type(s), wheel hub(s) assembly type(s), and bolt(s) pattern(s) assembly type(s)), and secure (fixed) in-place, between such a corresponding adjoined, and/or adjoining, vehicle wheel assembly type(s), and, a corresponding adjoined vehicle assembly type(s), vehicle junction boxes and hook-up point(s) assembly type(s), when, such a corresponding adjoined, and/or adjoining, vehicle wheel assembly type(s), is mounted, and/or attached, and/or secured (fixed) in-place, and/or hooked-up, onto, and/or with, the corresponding adjoined vehicle assembly type(s), wheel hub(s) assembly type(s), and bolt(s) pattern(s) assembly type(s), and/or another necessary, and/or required, suitable, and/or workable, and/or configurable, means, and/or ways, and/or material(s), and/or equipment assembly type(s), for the purpose of securing (fixed) in-place, such assemblage(s), when mounted, and/or attached, and/or hooked-up, onto, and/or with a corresponding adjoined vehicle assembly type(s), and, such a corresponding adjoined, and/or adjoining, vehicle wheel assembly type(s), and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) adaptor, and/or attachment, and/or bridging, and/or connecting, mount, or base, or pedestal, or stand, or frame, or plate, or bracketing, or bracing, architecture assembly type(s), and/or protective housing (case) assembly type(s) is made with the use of, and/or with; metal(s) assembly type(s), and/or metal alloy(s) assembly type(s), and/or composite(s) assembly type(s), and/or graphene assembly type(s), and/or element(s) assembly type(s), and/or rubber assembly type(s), and/or vulcanized rubber assembly type(s), and/or synthetic(s) assembly type(s), and/or plastic(s) assembly type(s), and/or channel(s) assembly type(s), and/or aperture(s) assembly type(s), and/or area(s) assembly type(s), and/or protrusion(s) assembly type(s), and/or flange(s) assembly type(s) and/or fastener(s) assembly type(s), and/or seal(s) assembly type(s), and/or sealing material(s), and/or another necessary, and/or required, suitable, and/or workable, and/or configurable, material(s), and/or element(s), and/or composition(s), and/or means, and/or ways, and/or equipment assembly type(s), for the purpose of, having, and/or holding, and/or carrying, and/or protecting, a corresponding adjoined, and/or adjoining, (fixed) ring-shaped (annular) rotary manifold assembly type(s) (piece(s)), and/or ring-shaped (annular) rotary manifold slip-ring wiring harness assembly type(s), and/or slip-ring wiring assembly type(s), and/or wiring harness assembly type(s), and, for the purpose of, securing (fixed) in-place, and/or hooking-up, a corresponding adjoined, and/or adjoining, (fixed) ring-shaped (annular) rotary manifold assembly type(s) (piece(s)), and/or ring-shaped (annular) rotary manifold slip-ring wiring harness assembly type(s), and/or slip-ring wiring assembly type(s), and/or wiring harness assembly type(s), between such a corresponding adjoined, and/or adjoining, vehicle wheel assembly type(s), and, a corresponding adjoined vehicle assembly type(s), vehicle junction boxes and hook-up point(s) assembly type(s), and, for the purpose of, assembly, and/or proximity, of, for, from, into, thru, out of, and/or between, and/or associated with, a corresponding adjoined, and/or adjoining, connection(s) point(s) assembly type(s), and/or hook-up(s) point(s) assembly type(s), with, within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s), when in motion, and/or stationary, and, for the purpose of, a simultaneously reliable connection(s) of a desired media(s), and/or medium(s) (i.e., pressurized air, and/or gases, and/or electricity supply, and/or data, and/or digital signal(s), and/or fluid(s)) unbroken, and/or unimpeded, of, for, from, into, thru, out of, and/or between, and/or associated with, such a corresponding adjoined vehicle wheel assembly type(s), and, a corresponding adjoined vehicle assembly type(s), when in motion, and/or stationary.

The simultaneously reliable connection(s), and/or hook-up(s), and/or transit(s), and/or transfer(s), and/or control(s), and/or use(s) of a desired media(s), and/or medium(s) (i.e., pressurized air, and/or other gases, electricity supply, data, digital signal(s) and/or fluid(s), and/or other (unbroken, and/or unimpeded)), of, for, from, into, thru, out of, and/or between, and/or associated with, such a corresponding adjoined vehicle wheel assembly type(s), and, an corresponding attached pneumatic tire(s) assembly type(s), and, a corresponding adjoined vehicle assembly type(s), via the (fixed) ring-shaped (annular) rotary manifold assembly type(s) (piece(s)), and/or ring-shaped (annular) rotary manifold slip-ring wiring harness assembly type(s), and/or slip-ring wiring harness assembly type(s), and/or other wiring harness assembly type(s) (i.e., as secured (fixed) in-place, within, in, into, on, onto, beneath, between, surrounding, thru, and/or throughout, the corresponding adjoined, and/or adjoining, adaptor, and/or attachment, and/or bridging, and/or connecting, mount, and/or base, and/or pedestal, and/or stand, and/or frame, and/or plate, and/or bracketing, and/or bracing, architecture assembly type(s), and/or protective housing (case) assembly type(s), and, a corresponding adjoined vehicle assembly type(s)), is by way of, and/or with the use of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) valve(s) assembly type(s), and/or hose(s) assembly type(s), and/or tube(s) assembly type(s), and/or conduit(s) assembly type(s), and/or wire(s) assembly type(s), and/or transmission line(s) assembly type(s), and/or wiring harness assembly type(s), and/or fiber optic line(s) assembly type(s), and/or plug(s) assembly type(s), and/or socket(s) assembly type(s), and/or connector(s) assembly type(s), and/or connecting(s) assembly type(s), and/or fastener(s) assembly type(s), and/or seal(s) assembly type(s), and/or sealing material(s), and/or component(s), and/or part(s), and/or mechanism(s), and/or device(s), and/or system(s), and/or apparatus assembly type(s), and/or another necessary, and/or required, suitable, and/or workable, and/or configurable, means, and/or ways, and/or material(s), and/or equipment assembly type(s), of, for, from, into, thru, out of, and/or between, and/or associated with, such a corresponding adjoined, and/or adjoining, vehicle wheel assembly type(s), and, a corresponding adjoined vehicle assembly type(s), and, associated assemblage(s), for the purpose of, assembly onto, and/or with, an existing traditional valve stem(s) assembly type(s), and/or superfluous pneumatic tire(s) valve stem(s) assembly type(s) (i.e., as may be located, and/or placed within, in, into, on, onto, beneath, between, surrounding, thru, and/or throughout the outer rim portion(s), and/or area(s) of such a corresponding adjoined, and/or adjoining vehicle wheel assembly type(s), and/or another necessary, and/or required, suitable, and/or workable, and/or configurable place(s), and/or area(s) of such a corresponding adjoined, and/or adjoining vehicle wheel assembly type(s) for necessity, and/or as required, and/or as ordained by law), and/or other corresponding adjoined, and/or adjoining, channel(s) assembly type(s), and/or aperture(s) assembly type(s), and/or area(s), and/or connection(s) point(s) assembly type(s), within, in, into, on, onto, beneath, between, surrounding, thru, and/or throughout, and/or associated with, such a corresponding adjoined, and/or adjoining, vehicle wheel assembly type(s), and/or another necessary, and/or required, suitable, and/or workable, and/or configurable, means, and/or ways, and/or element(s), and/or material(s), and/or equipment assembly type(s), of, for, from, into, thru, out of, and/or between, and/or associated with, such a corresponding adjoined, and/or adjoining, vehicle wheel assembly type(s), and, a corresponding adjoined vehicle assembly type(s), and, a (fixed) ring-shaped (annular) rotary manifold assembly type(s) (piece(s)), and/or a ring-shaped (annular) rotary manifold slip-ring wiring harness assembly type(s), and/or a slip-ring wiring harness assembly type(s), and/or other wiring harness assembly type(s), and associated component(s), part(s), mechanism(s), device(s), system(s), and/or apparatus assembly type(s) (i.e., as secured (fixed) in-place, within, in, into, on, onto, beneath, between, surrounding, thru, and/or throughout, an corresponding adjoined, and/or adjoining, adaptor, and/or attachment, and/or bridging, and/or connecting, mount, or base, or pedestal, or stand, or frame, or plate, or bracketing, or bracing, architecture assembly type(s), and/or protective housing (case) assembly type(s)) that is placed, and/or inserted, and/or secured (fixed) in-place, and/or hooked-up, between such a corresponding adjoined, and/or adjoining, vehicle wheel assembly type(s), and, a corresponding vehicle junction boxes and/or hook-up(s) point(s), and/or another necessary, and/or required, suitable, and/or workable, and/or configurable place(s), and/or area(s), and/or means, and/or ways, and/or material(s) and/or equipment assembly type(s) of, for, from, into, thru, out of, and/or between, and/or associated with, a corresponding adjoined vehicle assembly type(s), and, such a corresponding adjoined, and/or adjoining, vehicle wheel assembly type(s), when such a corresponding adjoined, and/or adjoining vehicle wheel assembly type(s) is mounted, and/or attached, and/or hooked-up, onto, and/or with, the corresponding vehicle assembly type(s), wheel hub(s) assembly type(s), and bolt(s) pattern(s) assembly type(s), and, for the purpose of, simultaneously reliably, generating, and/or transiting, and/or transferring, and/or transmitting, and/or receiving, and/or operating, and/or functioning, and/or using, and/or relating, and/or integrating, and/or interacting, and/or communicating, and/or controlling, and/or monitoring, and/or recording, and/or expelling, and/or working, and/or hooking-up, a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other necessary, and/or required, operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, a corresponding adjoined vehicle assembly type(s), automatically, and/or manually, and/or autonomously (wirelessly), and/or remotely, when in motion, and/or stationary.

3. In its most preferred alternative embodiment, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, a corresponding adjoined, and/or adjoining protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, associated component(s), part(s), mechanism(s), device(s), system(s), and/or apparatus assembly type(s) has, and/or is holding, and/or carrying, and/or operating, and/or functioning, and/or integrating, and/or amalgamating, and/or interacting, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) ring-shaped (annular) rotary manifold slip-ring wiring harness assembly type(s), and/or an electrical, and/or digital, and/or fiber-optic, and/or magnetic wiring harness assembly type(s), and/or a permanent magnet(s) inductive wiring harness assembly type(s), and/or a multi-passage(s) wiring harness assembly type(s), and/or slip-ring wiring harness assembly type(s), and/or wiring harness assembly type(s), and/or magnetic inductive connection(s) assembly type(s), and/or magnetic inductive hook-up point(s) assembly type(s) (i.e., independently, with, and/or without a corresponding adjoined, and/or adjoining, (fixed) ring-shaped (annular) rotary manifold assembly type(s) (piece(s)), for the purpose of, simultaneously reliably, receiving, and/or generating, and/or transmitting, and/or transferring, and/or transiting, and/or depleting, and/or controlling, and/or using, and/or communicating, and/or recording, and/or measuring, and/or diagnosing, and/or operating, and/or functioning, and/or storing, and/or connecting, and/or hooking-up, a corresponding electrical charge, and/or electricity supply, and/or magnetic inductive electricity, communication(s), navigation(s), and/or transmission(s) assembly type(s), and/or data, and/or digital data signal(s), and/or another associated operation(s), and/or function(s), and/or purpose(s), and/or task(s) for a chosen corresponding operating, and/or functioning standard(s) by way of, and/or with the use of, wire(s) assembly type(s), and/or transmission line(s) assembly type(s), and/or circuit(s) assembly type(s) and/or fiber-optic line(s) assembly type(s), and/or actuator(s) assembly type(s), and/or magnet(s), permanent magnet(s), and/or electromagnet(s) assembly type(s) inductive pick-up(s), conductor(s), rectifier(s), invertor(s), capacitor(s), generator(s), motor(s), gear(s), gearboxes assemblage(s), and/or batteries assembly type(s), and/or associated electricity power grid(s) and/or plug(s) assembly type(s), and/or socket(s) assembly type(s), and/or hook-up point(s) assembly type(s), and/or cabling assembly type(s), and/or computer(s) assembly type(s), and/or software(s) assembly type(s), and/or Artificial Intelligence (AI) system(s) assembly type(s), and/or Cloud Based Computing system(s) assembly type(s), and/or associated satellite system(s) assembly type(s), and/or ground-based navigation/communication/transmission(s) system(s) assembly type(s), and/or associated antennae, transmitter(s), receiver(s) assembly type(s), and, other associated component(s), part(s), mechanism(s), device(s), system(s), and/or apparatus assembly type(s), and/or another necessary, and/or required, suitable, and/or workable, and/or configurable means, and/or ways, and/or element(s), and/or composite(s), and/or material(s), and/or equipment assembly type(s) of, for, from, into, thru, out of, and/or between, and/or associated with, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated electricity, and/or digital, and/or magnetic, permanent magnet, and/or electromagnetic (i.e., inductive/conductive) assemblage(s), and, associated spectrum(s), band-width(s), frequencies, wave(s), pulse(s), field(s), and/or other, automatically, and/or manually, and/or autonomously (wirelessly), and/or remotely, when in motion, and/or stationary, and, for the purpose of, simultaneously reliably, generating, and/or transiting, and/or transferring, and/or transmitting, and/or receiving, and/or operating, and/or functioning, and/or using, and/or relating, and/or integrating, and/or interacting, and/or communicating, and/or controlling, and/or monitoring, and/or managing, and/or measuring, and/or diagnosing, and/or storing, and/or recording, and/or working, and/or connecting, and/or hooking-up, a desired media(s), and/or medium(s) (i.e., electricity supply, data, and/or digital signal(s)), and/or other necessary, and/or required, electrical, and/or digital, and/or data, and/or other media(s), and/or medium(s), operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

4. In its most preferred alternative embodiment, such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and associated component(s), part(s), mechanism(s), device(s), system(s), and/or apparatus assembly type(s), has, and/or is holding, and/or carrying, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) added, and/or auxiliary, and/or supplementary, and/or superfluous, pneumatic tire valve stem(s) assembly type(s), and, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional) added, and/or auxiliary, and/or supplementary, and/or superfluous, channel(s) assembly type(s), and/or aperture(s) assembly type(s), and/or area(s), and/or protrusion(s), and/or area(s), and/or place(s), and/or passage(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or element(s), and/or composite(s), and/or material(s), and/or equipment assembly type(s), for the purpose of, providing an additional, and/or superfluous, sealable, and/or adjustable, reserve air valve(s), and/or passageway(s), for compressed air, and/or other gases (+ and/or −) into, thru, and/or out of, and/or between a corresponding attached pneumatic tire(s) chamber(s) assembly type(s), and, for the purpose of, legal, and/or regulatory, compliance, and/or homologation, and/or other operation(s), and/or function(s), and/or purpose(s), and/or task(s), for a necessary, and/or required, operating, and/or functioning, standard(s), of a corresponding adjoined vehicle assembly type(s), and, such a corresponding adjoined, and/or adjoining, vehicle wheel assembly type(s), and/or such a corresponding adjoined, and/or adjoining pneumatic tire(s) assembly type(s), and/or a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., “Exoskeleton” assemblage(s)), and, associated component(s), part(s), mechanism(s), device(s), system(s), and/or apparatus assembly type(s) when, such a corresponding adjoined, and/or adjoining, vehicle wheel assembly type(s), is mounted and/or attached, and/or hooked-up onto, and/or with, a corresponding adjoined vehicle assembly type(s), and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other (stationary, and/or fixed, and/or moving, and/or rotating, and/or spinning, and/or turning), added, and/or auxiliary, and/or supplementary, and/or superfluous, and/or reserve, pneumatic tire valve stem(s) assembly type(s), and, channel(s) assembly type(s), and/or aperture(s) assembly type(s), and/or area(s), passageways, and/or place(s) assembly type(s), and, associated component(s), part(s), mechanism(s), device(s), system(s), and/or apparatus assembly type(s), is situated, and/or positioned, and/or set, and/or sited, and/or embedded, and/or oriented, and/or compacted, and/or packaged, and/or slotted, and/or hooked-up, and/or secured (fixed) in-place, within, in, into, on, onto, beneath, between, surrounding, thru, and/or throughout, a specific, and/or strategic, portion(s), and/or location(s), and/or area(s), within, in, into, on, onto, beneath, between, surrounding, thru, and/or throughout, and/or associated with the outside rim structure(s), and/or rim assembly type(s) of such a corresponding adjoined, and/or adjoining vehicle wheel assembly type(s), and/or another necessary, and/or required, suitable, and/or workable, and/or configurable, portion(s), and/or place(s), and/or area(s), and/or section(s), and/or architecture assemblage(s) of the body of such a corresponding adjoined, and/or adjoining, vehicle wheel assembly type(s) (i.e., the outer rim portion(s), and/or another necessary, and/or required, suitable, and/or workable, and/or configurable, portion(s), and/or place(s), and/or area(s), of such a corresponding adjoined, and/or adjoining, vehicle wheel assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., “Exoskeleton” assemblage(s)), and associated component(s), part(s), mechanism(s), device(s), system(s), and/or apparatus assembly type(s), that is exposed, and/or hidden, when such a corresponding adjoined, and/or adjoining, vehicle wheel assembly type(s), is mounted, and/or attached, and/or hooked-up onto, and/or with, a corresponding adjoined vehicle assembly type(s)), for the purpose of, making available a necessary, and/or required, additional, and/or reserve, and/or superfluous, air valve(s), and/or passageway(s), for compressed air, and/or other gases (+ and/or −), to flow into, thru, and/or out of, and/or between a corresponding attached pneumatic tire(s) chamber(s) assembly type(s) by a manual, and/or automated mean(s) (i.e., hooking-up the reserve air valve stem(s), and/or passageway(s), to an outside, and/or attached air compressor(s) assembly types), and/or other associated pressurized air source(s) assembly type(s), and, manually, and/or automatically filling, and, measuring, and/or deflating, a desired media(s), and/or medium(s), such as compressed air, and/or other gases (+ and/or −), for a corresponding attached pneumatic tire(s) chamber(s) assembly type(s), when, such a corresponding adjoined, and/or adjoining, vehicle wheel assembly type(s), and, a corresponding adjoined vehicle assembly type(s) is in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) auxiliary, and/or supplementary, and/or superfluous, and/or reserve, pneumatic tire valve stem(s) assembly type(s), is built as a self-contained air valve(s) assembly type(s), that open(s) to manually admit, and/or evacuate, a gaseous media(s), and/or medium(s) (such as compressed air and/or other gases (+ and/or −), into, thru, and/or out of, and/or between a corresponding air-tight (sealed) pneumatic tire chamber assembly type(s), by way of, and/or with the use of, an additional, and/or reserve, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional) passageway(s) assembly type(s), and/or channel(s) assembly type(s), and/or aperture(s) assembly type(s), and/or area(s), and/or place(s) assembly type(s), within, in, into, on, onto, beneath, between, surrounding, thru, and/or throughout, and/or of, the body (architecture) of such a corresponding adjoined, and/or adjoining, vehicle wheel assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., “Exoskeleton” assemblage(s)), and associated component(s), part(s), mechanism(s), device(s), system(s), and/or apparatus assembly type(s), that is kept sealed, and/or retained, by a manually evacuating, air pressure valve(s) assembly type(s), and/or by an integrated spring/locking pin (air valve relief pin) mechanism assembly type(s), that is located within such a pneumatic tire valve stem(s) assembly type(s), and/or another necessary, and/or required, suitable, and/or workable, and/or configurable means, and/or ways, and/or element(s), and/or composite(s), and/or material(s), and/or equipment assembly type(s), for the purpose of preventing compressed air, and/or other gaseous media(s), and/or medium(s), from escaping, the corresponding attached pneumatic tire(s) chamber(s) assembly type(s), unless, and/or until, purposefully, manually, and/or automatically deflated by physically depressing the corresponding adjoined spring pin (air valve relief pin), and/or by way of, and/or with the use of, other necessary, and/or required, suitable, and/or workable, and/or configurable, means, and/or ways, and/or material(s), and/or equipment assembly type(s).

Such a corresponding adjoined, and/or adjoining auxiliary, and/or supplementary, and/or superfluous, and/or reserve, pneumatic tire valve stem(s) assembly type(s), comprise(s), but, is not exclusive to, namely; metal(s) assembly type(s), and/or plastic(s) assembly type(s), and/or synthetic(s) material(s) assembly type(s), and/or polymer(s) assembly type(s), and/or rubber material(s) assembly type(s), and/or composite(s) assembly type(s), and/or graphene(s) assembly type(s), and/or actuator(s), and/or circuit(s), and/or sensor(s), and/or valve(s) assembly type(s), and/or wiring assembly type(s), and/or wiring harness assembly type(s), and/or magnetic inductive electricity connection(s) assembly type(s), and/or hose(s) assembly type(s), and/or tube(s) assembly type(s), and/or micro-computer(s) assembly type(s) (i.e., computer on chip(s) assembly type(s), and/or another necessary, and/or required, suitable, and/or workable, and/or configurable, element(s), and/or compound(s), and/or composite(s), and/or means, and/or ways, and/or material(s), and/or equipment assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), that are deemed necessary, and/or required, for a corresponding chosen operating, and/or functioning standard(s), of such corresponding adjoined, and/or adjoining, assemblage(s), within, in, into, on, onto, beneath, between, surrounding, thru, and/or throughout, and/or associated with, the body (architecture), of such a corresponding adjoined, and/or adjoining, vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and associated component(s), part(s), mechanism(s), device(s), system(s), and/or apparatus assembly type(s) and, a corresponding adjoined vehicle assembly type(s), and, associated component(s), part(s), mechanism(s), device(s), system(s), and/or apparatus assembly type(s), when in motion, and/or stationary.

5. In its most preferred alternative embodiment, such a vehicle wheel assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, such a corresponding adjoined, and/or adjoining pneumatic tire(s) assembly type(s), and, associated component(s), part(s), mechanism(s), device(s), system(s), and/or apparatus assembly type(s), has, and/or is holding, and/or carrying, and/or interacting, and/or integrating, and/or amalgamating, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or LED (Light-Emitting Diode) lighting assembly type(s), and/or illumination assembly type(s), and/or electrical inductive connection(s) assembly type(s), and/or inductive electricity hook-up(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) electrical, and/or digital, component(s), part(s), mechanism(s), device(s), system(s), and/or apparatus assembly type(s), that are specifically and/or strategically, positioned, and/or placed, and/or oriented, and/or embedded, and/or slotted, and/or compacted, and/or packaged, and/or secured (fixed) in-place, and/or hooked-up, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s), and/or protrusion(s) assembly type(s), and/or any other necessary, and/or required, suitable, and/or workable, and/or configurable location(s) of the body (architecture) of such a corresponding adjoined, and/or adjoining vehicle wheel assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, such a corresponding adjoined, and/or adjoining pneumatic tire(s) assembly type(s), and, associated component(s), part(s), mechanism(s), device(s), system(s), and/or apparatus assembly type(s) (i.e., the outside, and/or inside portion(s), and/or area(s), and/or other necessary, and/or required, location(s)) of such a corresponding adjoined, and/or adjoining, vehicle wheel assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and associated component(s), part(s), mechanism(s), device(s), system(s), and/or apparatus assembly type(s), that are visible, and/or usable, when such a corresponding adjoined, and/or adjoining, vehicle wheel assembly type(s), is mounted, and/or attached, and/or secured (fixed) in-place, and/or hooked-up onto, and/or with, a corresponding adjoined vehicle assembly type(s)), in such a way, and/or manner, and/or configuration(s), and/or orientation(s), and/or placement(s), as to be visible, and/or conspicuous, and/or utilitarian when illuminated, and/or operating, and/or functioning, and/or connecting, and/or working, and/or communicating, and/or hooking-up, with a corresponding adjoined vehicle assembly type(s), that has, and/or is holding, and/or carrying, and/or operating, and/or functioning, and/or working, and/or hooking-up, other associated, and/or connected, and/or interacting specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting, illumination, and/or LED (Light-Emitting Diode(s) assemblage(s)) lighting assembly type(s), and/or illumination assembly type(s), and/or electrical inductive connection(s) assembly type(s), and/or inductive electricity hook-up(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), that are positioned, and/or oriented, and/or embedded, and/or slotted, and/or packaged, and/or hooked-up, and/or secured (fixed) in-place, within, in, into, on, onto, beneath, between, surrounding, thru, and/or throughout, and/or associated with, the body (architecture) of the corresponding adjoined vehicle assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and associated component(s), part(s), mechanism(s), device(s), system(s), and/or apparatus assembly type(s), and, such a corresponding adjoined, and/or adjoining vehicle wheel assembly type(s), and, such a corresponding adjoined, and/or adjoining pneumatic tire(s) assembly type(s), for the purpose of, enhanced safety, and/or visibility, and/or conspicuity, and/or utility, for a corresponding adjoined vehicle assembly type(s), when in motion, and/or stationary, and, for the purpose of operating, and/or functioning, such corresponding adjoined, and/or adjoining, lighting, illumination, and/or LED (Light-Emitting Diode(s)) assemblage(s), in harmony with a corresponding adjoined vehicle assembly type(s), governed by international, and/or world-wide, and/or country specific law(s), and/or unified state(s) law(s), and/or state(s) law(s), and/or regulation(s), and/or standard(s), and/or homologation, and/or other governance deemed necessary, and/or required, for a corresponding chosen operating, and/or functioning, standard(s), of such corresponding adjoined, and/or adjoining, vehicle lighting assemblage(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or LED (Light-Emitting Diode(s)) lighting assembly type(s), and/or illumination assembly type(s), operate, and/or function, and/or communicated, and/or integrate, and/or hook-up, and/or are controlled (unbroken, and/or unimpeded), automatically, and/or manually (i.e., by a corresponding adjoined vehicle operator(s) physical selection(s), and/or other associated physical, digital, electrical, magnetic, operator(s), and/or equipment assembly type(s) selection(s), autonomously (wirelessly), and/or remotely), when such a corresponding adjoined, and/or adjoining, vehicle wheel assembly type(s), is attached, and/or mounted, and/or hooked-up onto, and/or with, a corresponding adjoined vehicle assembly type(s), and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or LED (Light-Emitting Diode(s)) lighting assembly type(s), and/or illumination assembly type(s), operate, and/or function, and/or integrate, and/or hook-up, and/or are controlled (unbroken, and/or unimpeded), automatically, and/or manually, and/or autonomously (wirelessly), and/or remotely, with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/ or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), and/or a ring-shaped (annular) rotary manifold slip-ring wiring harness assembly type(s), and/or other wiring harness assembly type(s), and, a vehicle junction boxes and hook-up(s) point(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, associated component(s), part(s), mechanism(s), device(s), system(s), and/or apparatus assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning), component(s), part(s), mechanism(s), device(s), system(s), and/or apparatus assembly type(s), of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and associated component(s), part(s), mechanism(s), device(s), system(s), and/or apparatus assembly type(s), and, a corresponding adjoined vehicle assembly type(s), and, associated component(s), part(s), mechanism(s), device(s), system(s), and/or apparatus assembly type(s), for the purpose of enhanced safety, and/or visibility, and/or conspicuity, and/or operating, and/or functioning, and/or directional use(s), and/or other intention(s), and/or another necessary, and/or required, operation(s), and/or function(s), and/or purpose(s), and/or task(s), for a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or lighting (lamp(s)) assembly type(s), and/or LED (Light-Emitting Diode(s)) lighting assembly type(s), and/or illumination assembly type(s), are for the purpose of, operating, and/or functioning, as a corresponding vehicle turn signal indicator(s) lighting assembly type(s), and/or corresponding vehicle hazard indicator(s) lighting assembly type(s), and/or corresponding reduced visibility vehicle safety lighting assembly type(s), and/or corresponding day time, and/or night time, vehicle running lighting (enhanced visibility lighting) assembly type(s), and/or other corresponding adjoined, and/or adjoining, vehicle safety lighting assembly type(s), and/or other corresponding vehicle operating lighting assembly type(s), and/or other corresponding vehicle lighting modality assembly type(s), for a corresponding adjoined vehicle assembly type(s), and, such a corresponding adjoined, and/or adjoining vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, associated component(s), part(s), mechanism(s), device(s), system(s), and/or apparatus assembly type(s), and, for the purpose of, greater visibility, and/or conspicuity, and/or safety, and/or other utility of, for, from, into, thru, out of, and/or between, and/or associated with, a corresponding adjoined vehicle assembly type(s), and such associated assemblage(s), with respect to the corresponding adjoined vehicle assembly type(s), presence, and/or position(s), and/or direction(s) of travel, and/or change(s) of direction(s), and/or deceleration(s), and/or other necessary, and/or required, and/or suitable, and/or workable, and/or configurable, operating, and/or functioning, operation(s), function(s), intension(s), purpose(s), and/or task(s) of the corresponding adjoined vehicle assembly type(s), that are deemed necessary, and/or required, for a corresponding chosen operating, and/or functioning standard(s), of such corresponding adjoined, and/or adjoining, vehicle lighting assemblage(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) component(s), part(s), mechanism(s), device(s), system(s), and/or apparatus assembly type(s), of a corresponding adjoined vehicle assembly type(s), and, such a corresponding adjoined, and/or adjoining, vehicle wheel assembly type(s), and, a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or lighting (lamp(s)) assembly type(s), and/or LED (Light-Emitting Diode(s)) lighting assembly type(s), and/or illumination assembly type(s), and/or magnetic inductive electrical connection(s) assembly type(s), and/or inductive hook-up(s) assembly type(s), and, other associated component(s), part(s), mechanism(s), device(s), system(s), and/or apparatus assembly type(s), as positioned, and/or embedded, and/or slotted, and/or compacted, and/or packaged, and/or orientated, and/or hooked-up, and/or secured (fixed) in-place, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning), channel(s) assembly type(s), and/or aperture(s) assembly type(s), and/or area(s), and/or protrusion(s), and/or passageway(s), and/or section(s), and/or place(s) assembly type(s), of the body (architecture) of such a corresponding adjoined, and/or adjoining, vehicle wheel assembly type(s), and, a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, other associated component(s), part(s), mechanism(s), device(s), system(s), and/or apparatus assembly type(s) (i.e., the outside portion(s), and/or area(s), and/or section(s), and/or place(s), and/or other useful location(s) that are visible, and/or utilitarian, when such a corresponding adjoined, and/or adjoining, vehicle wheel assembly type(s) is mounted, and/or attached, and/or secured (fixed) in-place, onto, and/or with, a corresponding adjoined vehicle assembly type(s)), and/or another necessary, and/or required, suitable, and/or workable, and/or configurable portion(s), and/or area(s), and/or section(s), and/or place(s), of the body (architecture) of such a corresponding adjoined, and/or adjoining, vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, associated component(s), part(s), mechanism(s), device(s), system(s), and/or apparatus assembly type(s), are for the purpose of, providing, and/or enabling, and/or facilitating, such corresponding adjoined, and/or adjoining, lighting assemblage(s) (i.e., within, in, into, on, onto, beneath, between, surrounding, thru, and/or throughout, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s)), to light, and/or burn, and/or illuminate steadily, and/or blink, and/or flash, in unison, and/or other corresponding chosen vehicle lighting (i.e., operating, and/or functioning, and/or safety modalities), depending on their intended, and/or regulated, operation(s), and/or function(s), and/or purpose(s), and/or task(s), and/or other necessary, and/or required, operation(s), and/or function(s), intension(s), purpose(s), and/or task(s) of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely), when in motion, and/or stationary.

Ideally, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or lighting (lamp(s)) assembly type(s), and/or LED (Light-Emitting Diode(s)) lighting assembly type(s), and/or illumination assembly type(s), are fitted in pair(s), and/or another suitable, and/or workable, and/or configurable installation(s) (depending on the corresponding adjoined vehicle assembly type(s), (E.g., left side, and/or right side, or other useful location(s), and/or configuration(s) of such a corresponding adjoined, and/or adjoining, vehicle wheel assembly type(s), and, such a corresponding adjoined, and/or adjoining pneumatic tire(s) assembly type(s), and, such a corresponding adjoined, and/or adjoining, protective housing case(s) assembly type(s) (piece(s)), and/or such a corresponding adjoined, and/or adjoining, contour protective housing case(s) assembly type(s) (piece(s)) (i.e., "Exoskeleton" assemblage(s)), and, associated component(s), part(s), mechanism(s), device(s), system(s), and/or apparatus assembly type(s), ideally, placed within specific, and/or strategic, location(s), and/or area(s), and/or another necessary, and/or required, and/or suitable, and/or workable, and/or configurable location(s), of the body (architecture) of such a corresponding adjoined, and/or adjoining, vehicle wheel assembly type(s), and, such a corresponding adjoined, and/or adjoining pneumatic tire(s) assembly type(s), though, some corresponding adjoined vehicle assembly type(s), may have singular, and/or multiple, corresponding adjoined, and/or adjoining, pair(s) of such corresponding adjoined, and/or adjoining, vehicle wheel assembly type(s)), and/or another necessary, and/or required, suitable, and/or workable, and/or configurable, means, and/or ways, and/or material(s), and/or element(s), and/or composite(s), and/or equipment assembly type(s), for the purpose of enhanced safety, and/or visibility, and/or conspicuity, and/or other utility, for a corresponding adjoined vehicle assembly type(s), automatically, and/or manually, and/or autonomously (wirelessly), and/or remotely, when in motion, and/or stationary.

Such a corresponding adjoined, and/or adjoining, vehicle wheel assembly type(s), and, such a corresponding adjoined, and/or adjoining pneumatic tire(s) assembly type(s) has, and/or is holding, and/or carrying, and/or operating, and/or functioning, and/or interacting, and/or integrating, and/or working, and/or controlling, and/or communicating, and/or hooking-up, a singular, and/or multiple specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning, and/or blinking, and/or flashing, and/or flickering, and/or glowing) superfluous vehicle electric powered, and/or digitally controlled, lighting assembly type(s), and/or lighting (lamp(s)) assembly type(s), and/or LED (Light-Emitting Diode(s)) lighting assembly type(s), and/or illumination assembly type(s), depending on a corresponding adjoined vehicle assembly type(s), necessary, and/or required, operating, and/or functioning, standard(s), and/or need(s). However, regulation(s) and/or intended use, and/or operation(s), and/or necessary, and/or required, operation(s), and/or function(s), and/or purpose(s), and/or task(s), imposed thereof, govern the quantity, and/or color(s), and/or type(s), and/or amount(s), and/or assemblage(s), and/or use(s), of such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, corresponding adjoined, and/or adjoining, lighting assembly type(s), and/or lighting (lamp(s)) assembly type(s), and/or LED (Light-Emitting Diode(s)) lighting assembly type(s), and/or illumination assembly type(s) (as installed within, in, into, on, onto, beneath, between, surrounding, thru, and/or throughout, and/or associated with the body (architecture) of such a corresponding adjoined, and/or adjoining, vehicle wheel assembly type(s), and, a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s))), and, associated component(s), part(s), mechanism(s), device(s), system(s), and/or apparatus assembly type(s), and, when in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, corresponding adjoined, and/or adjoining, lighting assembly type(s), and/or lighting (lamp(s)) assembly type(s), and/or LED (Light-Emitting Diode(s)) lighting assembly type(s), and/or illumination assembly type(s), and/or magnetic inductive electricity connection(s), and/or inductive hook-up(s) assembly type(s), and, associated component(s), part(s), mechanism(s), devices, system(s), and/or apparatus assembly type(s) (i.e., as installed within, in, into, on, onto, beneath, between, surrounding, thru, and/or throughout, and/or associated with the body (architecture) of such a corresponding adjoined, and/or adjoining, vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s), and, associated component(s), part(s), mechanism(s), device(s), system(s), and/or apparatus assembly type(s)), emit(s) white, and/or amber, and/or red color(s) and/or any other corresponding, necessary, and/or required, suitable, and/or workable, and/or configurable, color(s) governed by international, and/or world-wide, and/or country specific law(s), and/or unified state(s) law(s), and/or state(s) law(s), and/or regulation(s), and/or standard(s), and/or homologation, and/or other governance deemed necessary, and/or required, for a corresponding chosen operating, and/or functioning, standard(s), of such corresponding adjoined, and/or adjoining, vehicle lighting assemblage(s), for the purpose of, enhanced safety, and/or visibility, and/or conspicuity, and/or utility, and/or other necessary, and/or required operation(s), and/or function(s), and/or purpose(s), and/or task(s), and/or intention(s), of a corresponding adjoined vehicle assembly type(s), automatically, and/or manually, and/or autonomously (wirelessly), and/or remotely, when in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or lighting (lamp(s)) assembly type(s), and/or LED (Light-Emitting Diode(s)) lighting assembly type(s), and/or illumination assembly type(s) of such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s), and, associated component(s), part(s), mechanism(s), device(s), system(s), and/or apparatus assembly type(s)), emit(s), and/or burn(s), and/or light(s), and/or produce(s), a corresponding chosen candela rate(s), and/or lumen-luminous flux (i.e., measure of quantity of visible light emitted by a source per unit of time), and/or visible light, and/or color light output, and/or other corresponding chosen measured emitted light intensities, and/or other SI photometry (i.e., International System of Units of the science of measurement of light) quantities, that is governed by international, and/or world-wide, and/or country specific law(s), and/or unified state(s) law(s), and/or state(s) law(s), and/or regulation(s) and/or standard(s) and/or homologation, and/or other governance deemed necessary, and/or required, for a corresponding chosen operating, and/or functioning, standard(s) of such corresponding adjoined, and/or adjoining, lighting assemblage(s), for the purpose of, enhanced safety, and/or visibility, and/or conspicuity, and/or utility, and/or another necessary, and/or required, operation(s), and/or function(s), and/or purpose(s), and/or task(s), and/or intention(s), for a corresponding adjoined vehicle assembly type(s), automatically, and/or manually, and/or autonomously (wirelessly), and/or remotely, when in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, vehicle lighting assembly type(s), and/or lighting (lamp(s)) assembly type(s), and/or LED (Light-Emitting Diode(s)) lighting assembly type(s), and/or illumination assembly type(s) (i.e., as installed within, in, into, on, onto, beneath, between, surrounding, thru, and/or throughout, and/or associated with), a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s), and/or protrusion(s), and/or passageway(s), and/or section(s), and/or place(s) assembly type(s), and/or other useful location(s) of the body (architecture) of such a corresponding adjoined, and/or adjoining, vehicle wheel assembly type(s), and, a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., “Exoskeleton” assemblage(s)), and, associated component(s), part(s), mechanism(s), device(s), system(s), and/or apparatus assembly type(s) (i.e., the outside visible portion(s), and/or area(s), and/or another necessary, and/or required, suitable, and/or workable, and/or configurable, and/or utilitarian portion(s), and/or area(s), and/or location(s) of the body (architecture) of such a corresponding adjoined, and/or adjoining, vehicle wheel assembly type(s), and/or such a corresponding adjoined, and/or adjoining pneumatic tire(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., “Exoskeleton” assemblage(s)), and, associated component(s), part(s), mechanism(s), device(s), system(s), and/or apparatus assembly type(s), when such a corresponding adjoined, and/or adjoining, vehicle wheel assembly type(s) is mounted, and/or attached, and/or secured (fixed) in-place, and/or hooked-up, onto, and/or with, a corresponding adjoined vehicle assembly type(s)), comprise, but, are not exclusive to, namely; metal(s) assembly type(s), and/or metal alloy(s) assembly type(s), and/or plastic(s) assembly type(s), and/or synthetic(s) material(s) assembly type(s), and/or polymer(s) assembly type(s), and/or rubber material(s) assembly type(s), and/or composite(s) assembly type(s), and/or element(s) assembly type(s), and/or graphene(s) assembly type(s), and/or graphite(s) assembly type(s), and/or wire(s) assembly type(s), and/or wiring harness assembly type(s), and/or circuit(s) assembly type(s), and/or sensor(s) assembly type(s), and/or magnetic inductive connection(s), and/or magnetic inductive hook-up(s) assembly type(s), and/or inductive hook-up(s) assembly type(s), and/or channel(s) assembly type(s), and/or aperture(s) assembly type(s), and/or area(s) assembly type(s), and/or protrusion(s) assembly type(s), and/or fastener(s) assembly type(s), and/or gromet(s) assembly type(s), and/or anchor(s) assembly type(s), and/or protective housing case(s) assembly type(s), and/or bracket(s) assembly type(s), and/or seal(s) assembly type(s), and/or sealing material(s) assembly type(s), and/or sensor(s) assembly type(s), and/or electric, and/or digital, light bulb(s) assembly types, and/or LED (Light-Emitting Diode(s)) assembly type(s), and/or a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., “Exoskeleton” assemblage(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) component(s), part(s), mechanism(s), device(s), system(s), and/or apparatus assembly type(s), of such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), and/or another necessary, and/or required, suitable, and/or workable, and/or configurable, means, and/or ways, and/or material(s), and/or element(s), and/or composite(s), and/or equipment assembly type(s), for the purpose of, governance by international, and/or world-wide, and/or country specific law(s), and/or unified state(s) law(s), and/or state(s) law(s), and/or regulation(s), and/or standard(s), and/or homologation, and/or other governance, and, for the purpose of, necessary, and/or required, application(s), and/or use(s), and/or utility, and/or operating, and/or functioning standard(s) of such corresponding adjoined, and/or adjoining, electrical, and/or digital, vehicle lighting assemblage(s), and, for the purpose of assembly, and, for the purpose of hook-up, and, for the purpose of, connection(s) (unbroken, and/or unimpeded), and, for the purpose of control, and, for the purpose of navigation, and, for the purpose of, communication, and, for the purpose of transmission, and, for the purpose of, enhanced safety, and/or visibility, and/or conspicuity, and/or utility, and/or other necessary, and/or required, operation(s), and/or function(s), and/or purpose(s), and/or task(s), and/or signaling, and/or intention(s), for the corresponding adjoined vehicle assembly type(s), automatically, and/or manually, and/or autonomously (wirelessly), and/or remotely, when in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or lighting (lamp(s)) assembly type(s), and/or LED (Light-Emitting Diode(s)) lighting assembly type(s), and/or illumination assembly type(s), and/or magnetic inductive electricity connection(s) assemblage(s), and/or inductive hook-up(s) assemblage(s), and, associated component(s), part(s), mechanism(s), device(s), system(s), and/or apparatus assembly type(s) (as installed within, in, into, on, onto, beneath, between, surrounding, thru, and/or throughout, and/or associated with, the body (architecture) of such a corresponding adjoined, and/or adjoining, vehicle wheel assembly type(s), and, a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, a corresponding adjoined vehicle assembly type(s), and, associated component(s), part(s), mechanism(s), device(s), system(s), and/or apparatus assembly type(s)), are held, and/or positioned, and/or embedded, and/or slotted, and/or compacted, and/or packaged, and/or oriented, and/or hooked-up, and/or secured (fixed) in-place, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional) channel(s) assembly type(s), and/or aperture(s) assembly type(s), and/or area(s) assembly type(s), and/or protrusion(s) assembly type(s), and/or passageway(s) assembly type(s), and/or section(s) assembly type(s), and/or place(s) assembly type(s), and/or other useful location(s), with the use(s), and/or via, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (flush mounting) fastener(s), gromet(s), clip(s), tie(s), seal(s) assembly type(s), sealing material(s), plug(s), socket(s), wiring harnesses, receptacle(s), sealing material(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, a corresponding adjoined vehicle assembly type(s), and, associated component(s), part(s), mechanism(s), device(s), system(s), and/or apparatus assembly type(s), for the purpose of, enhanced safety, and/or visibility, and/or conspicuity, and/or signaling, and/or other utility, and/or another necessary, and/or required, operation(s), and/or function(s), and/or purpose(s), and/or task(s), and/or intention(s), for a corresponding adjoined vehicle assembly type(s), automatically, and/or manually, and/or autonomously (wirelessly), and/or remotely, when in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning, and/or blinking, and/or flashing, and/or flickering, and/or glowing) vehicle electric powered, and/or digitally controlled, lighting assembly type(s), and/or lighting (lamp(s)) assembly type(s), and/or LED (Light-Emitting Diode(s)) lighting assembly type(s), and/or illumination assembly type(s), and/or magnetic inductive electrical connection(s) assemblage(s), and/or inductive hook-up(s) assemblage(s), and, associated component(s), part(s), mechanism(s), device(s), system(s), and/or apparatus assembly type(s) (i.e., as installed within, in, into, on, onto, beneath, between, surrounding, thru, and/or throughout, and/or associated with), the body (architecture) of such a corresponding adjoined, and/or adjoining, vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s))), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning, and/or blinking, and/or flashing, and/or flickering, and/or glowing) electrical, and/or digital, component(s), part(s), mechanism(s), device(s), system(s), and/or apparatus assembly type(s), of, for, from, into, out of, and/or between, and/or associated with, the body (architecture) of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), are for the purpose of, operating, and/or functioning, and/or hooking-up such vehicle electric powered, and/or digitally controlled, lighting assemblage(s), as deemed necessary, and/or required, for a corresponding chosen operating, and/or functioning, standard(s), of such corresponding adjoined, and/or adjoining, lighting assemblage(s), of such a corresponding adjoined, and/or adjoining, vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, a corresponding adjoined vehicle assembly type(s), and, other associated component(s), part(s), mechanism(s), device(s), system(s), and/or apparatus assembly type(s), with continuity, automatically, and/or manually, and/or autonomously (wirelessly), and/or remotely, when in motion, and/or stationary, and, for the purpose of, legal, and/or regulatory, and/or safety, and/or visibility, and/or conspicuity, and/or utility, and/or operating, and/or functioning, and/or signaling, and/or navigation, and/or communication, and/or transmission enhancement(s), and/or compliance(s), and/or use(s) of, for, from, into, thru, out of, and/or between, and/or associated with a corresponding adjoined vehicle assembly type(s), and, such a corresponding adjoined, and/or adjoining, vehicle wheel assembly type(s), and, such a pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and, associated component(s), part(s), mechanism(s), device(s), system(s), and/or apparatus assembly type(s) automatically, and/or manually, and/or autonomously (wirelessly), and/or remotely, when in motion, and/or stationary.

6. In its most preferred alternative embodiment, such a corresponding adjoined, and/or adjoining, vehicle wheel assembly type(s), has, and/or is holding, and/or carrying, and/or operating, and/or functioning, and/or working, and/or integrating, and/or interacting, and/or amalgamating, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) electromotive assemblage(s), and/or a similar working, permanent magnet(s) electromotive/electric motor (combined) assemblage(s), and/or permanent magnet(s) inductive/conductive assemblage(s), and, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), and/or a ring-shaped (annular) rotary manifold slip-ring wiring harness assembly type(s), and/or other wiring harness assembly type(s), and/or magnetic, and/or permanent magnet, and/or electromagnetic connection(s), or hook-up(s) assemblage(s), and, a vehicle junction boxes, and hook-up(s) point(s) assembly type(s), and, associated protective housing case(s) assemblage(s) (piece(s)), and/or associated contour protective housing case(s) assemblage(s) (piece(s)) (i.e., "Exoskeleton" assemblage(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or element(s), and/or composite(s), and/or equipment assembly type(s), within, in, into, on, onto, beneath, between, surrounding, thru, and/or throughout, and/or associated with such a corresponding adjoined, and/or adjoining, vehicle wheel assembly type(s), and/or such a corresponding adjoined, and/or adjoining, pneumatic tire(s) assembly type(s), and, a corresponding adjoined vehicle assembly type(s), and, associated component(s), part(s), mechanism(s), device(s) system(s), and/or apparatus assembly type(s), for the purpose of, generating, and/or making, and/or exciting, and/or transiting, and/or transferring, and/or transmitting, and/or receiving, and/or using, and/or operating, and/or functioning, and/or cooling, and/or diagnosing, and/or integrating, and/or interacting, and/or communicating, and/or controlling, and/or managing, and/or measuring, and/or recording, and/or storing, and/or working, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s) (i.e., by way of, and/or with the use of, and/or via associated magnetic, and/or permanent magnet, and/or electromagnetic signal(s), field(s), pulse(s), wave(s), spectrum(s), frequencies, band(s), vibration(s) and/or other) and/or another necessary, and/or required, suitable, and/or workable, and/or configurable, magnetic, and/or permanent magnet, and/or electromagnetic, and/or other operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding adjoined, and/or adjoining, pneumatic tire(s) assembly type(s), and, a corresponding adjoined vehicle assembly type(s), and, associated component(s), part(s), mechanism(s), device(s), system(s), and/or apparatus assembly type(s), and, associated protective housing case(s) assembly type(s) (piece(s)), and/or associated contour protective housing case(s) assembly type(s) (piece(s)) (i.e., "Exoskeleton" (outer skeleton) assemblage(s)) automatically, and/or manually, and/or autonomously (wirelessly), and/or remotely, when in motion, and/or stationary, and, for the purpose of, simultaneously reliably, generating, and/or linking, and/or connecting, and/or transiting, and/or transferring, and/or transmitting, and/or receiving, and/or working, and/or communicating, and/or operating, and/or functioning, and/or integrating, and/or interacting, and/or controlling, and/or managing, and/or diagnosing, and/or measuring, and/or recording, and/or using, and/or storing, and/or hooking-up (unbroken, and/or unimpeded), a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), apparatus, assembly type(s), and/or protective housing case(s) assembly type(s) (piece(s)), and/or contour protective housing case(s) assembly type(s) (piece(s)) automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) electromotive assemblage(s), and/or a similar working, permanent magnet(s) electromotive/electric motor (combined) assemblage(s), and/or permanent magnet(s) inductive/conductive assemblage(s), and, other associated component(s), part(s), mechanism(s), device(s), system(s), and/or apparatus assembly type(s), has, and/or is held, and/or carried, and/or encased, and/or shielded, and/or protected, and/or assembled, and/or configured, and/or hooked-up, by way of, and/or with the use of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" assemblage(s)), and, associated component(s), part(s), mechanism(s), device(s), system(s), and/or apparatus assembly type(s) comprising, but, not exclusive to, namely; a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), and/or a ring-shaped (annular) rotary manifold slip-ring wiring harness assembly type(s), and/or other wiring harness assembly type(s), and, a vehicle junction boxes, and hook-up(s) point(s) assembly type(s), and, channel(s) assembly type(s), and, aperture(s) assembly type(s), and, area(s) assembly type(s), and, protrusion(s) assembly type(s), and, tunnel(s) assembly type(s), and, pathway(s) assembly type(s), and, vessel(s) assembly type(s), and, wire(s) assembly type(s), and, wiring harness assembly type(s), and/or permanent magnet inductive pick-up(s), and/or permanent magnet conductive assemblage(s), and, hose(s) assembly type(s), and, valve(s) assembly type(s), and, sensor(s) assembly type(s), and, circuit(s) assembly type(s), and, actuator(s) assembly type(s), and, capacitor(s) assembly type(s), and, cabling assembly type(s), and, transmission line(s) assembly type(s), and, plug(s) assembly type(s), and, seal(s) assembly type(s), and, sealing material(s), and, hook-up point(s) assembly type(s), and, "QI" or "PMA" magnetic inductive hook-up(s), and/or magnetic inductive pick-up(s) assembly type(s), and, fastener(s) assembly type(s), and, joint(s) assembly type(s), and, ball bearing(s) assembly type(s), and, sealed ball bearing(s) assembly type(s), and, ball bearing(s) track(s) assembly type(s), and/or Passive, and/or Active Near Field Communication(s) (NFC) assemblage(s), Wi-Fi, assemblage(s), and/or Bluetooth assemblage(s) (i.e., associated software(s), and/or hardware(s), and/or chip(s) assemblage(s) (E.g., Secure Element Chip(s) containing Security Data; Secure Element Identifier (SEID) for secure transaction(s), and/or other multi-tiered security protocol(s) or equipment assemblage(s), and, associated antennae, or transponder(s) assemblage(s), and/or another necessary, and/or required, suitable, and/or workable, and/or configurable means, and/or ways, and/or material(s), and/or equipment assemblage(s), and/or in a combination with one another E.g., "Bootstrapping" for conducting secure Communication(s), and/or Navigation(s), and/or other necessary, and/or required, operation(s), and/or function(s), and/or purpose(s), and/or task(s) (unbroken and/or unimpeded) automatically, and/or manually, and/or autonomously (wirelessly), and/or remotely, when in motion, and/or stationary), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s)), and/or another necessary, and/or required, suitable, and/or workable, and/or configurable means, and/or ways, and/or material(s), and/or equipment assembly type(s), for the purpose of, shielding, and/or protecting, and/or, transiting, and/or transmitting, and/or transferring, and/or receiving, and/or distributing, and/or measuring, and/or diagnosing, and/or using, and/or assembling, and/or operating, and/or functioning, and/or controlling, and/or hooking-up, such corresponding adjoined, and/or adjoining, permanent magnet(s) electromotive assemblage(s), and/or similar working, permanent magnet(s) electromotive/electric motor (combined) assemblage(s), and/or permanent magnet inductive/conductive assemblage(s) (i.e., as installed, and/or assembled, within, in, into, on, onto, beneath, between, surrounding, thru, and/or throughout, and/or associated with such a corresponding adjoined, and/or adjoining, electromotive, and/or similar working, electromotive/electric motor (combined) assemblage(s), and/or permanent magnet(s) induction/conductive assemblage(s) protective housing case(s) assembly type(s) (piece(s)), and/or contour protective housing case(s) assembly type(s) (piece(s)) of, for, from, into, thru, out of, and/or between, and/or associated with, such a corresponding adjoined, and/or adjoining, vehicle wheel assembly type(s), and such a corresponding adjoined, and/or adjoining pneumatic tire(s) assembly type(s) and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electromotive, and/or electromotive/electric motor (combined) assemblage(s), and/or permanent magnet(s) inductive/conductive assemblage(s), are joined, and/or fitted, and/or integrated, and/or amalgamated, and/or secured (fixed) in-place, and/or hooked-up, together, within, in, into, on, onto, beneath, between, surrounding, thru, and/or throughout, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) protective housing case(s) assembly type(s) (piece(s)), and/or contour protective housing case(s) assembly type(s) (piece(s)), and/or swivel joint(s) assembly type(s), and, a ball bearing track(s) assembly type(s), and, ball bearing(s) assembly type(s), and, ring(s) assembly type(s), and/or ball bearing track(s) assembly type(s), and/or permanent magnet(s) inductive electricity connection(s) point(s) assembly type(s), and/or electricity connection(s) point(s) assembly type(s), and, fastener(s) assembly type(s), and, seal(s) assembly type(s), and, sealing material(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), that are embedded, and/or fitted, and/or slotted, and/or packaged, and/or compacted, and/or positioned, and/or oriented, and/or aligned, and/or configured, and/or assembled, and/or secured (fixed) in-place, and/or hooked-up, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, internal, and/or external, channel(s) assembly type(s), and/or aperture(s) assembly type(s), and/or area(s) assembly type(s), of the body (architecture) of such a corresponding adjoined, and/or adjoining, electromotive, and/or electromotive/electric motor (combined) assemblage(s), and/or permanent magnet(s) inductive/conductive assemblage(s) protective housing case(s) assembly type(s) (piece(s)) (i.e., a housing (case) assembly type(s) (piece), and, a corresponding adjoined, and/or adjoining, shaft (cap) assembly type(s) (piece), and/or other architecture(s) assemblage(s)), and/or another necessary, and/or required, suitable, and/or workable, and/or configurable, means, and/or ways, and/or material(s), and/or equipment assembly type(s), for the purpose of, attaching, and/or assembling, and/or organizing, and/or stabilizing, and/or securing (in-place), and/or hooking-up, such a stationary protective housing (case) assembly type(s) (piece), and, a corresponding adjoined, and/or adjoining, (stationary, and/or moving, and/or turning, and/or spinning and/or rotating) protective housing case(s) assembly type(s) shaft (cap) assembly type(s) (piece), and/or other protective housing case(s) architecture(s) assemblage(s) with, within, in, into, on, onto, beneath, between, surrounding, thru, and/or throughout, and/or associated with, such a corresponding adjoined, and/or adjoining, vehicle wheel assembly type(s), and/or such a corresponding adjoined, and/or adjoining pneumatic tire(s) assembly type(s), and/or a corresponding adjoined vehicle assembly type(s), and, for the purpose of, enabling, and/or allowing, and/or facilitating, generating, and/or making, and/or exciting, and/or transiting, and/or transferring, and/or transmitting, and/or receiving, and/or using, and/or operating, and/or functioning, and/or cooling, and/or communicating, and/or controlling, and/or measuring, and/or diagnosing, and/or managing, and/or storing, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s) (automatically, and/or manually, and/or autonomously (wirelessly), and/or remotely), of, for, from, into, thru, out of, and/or between, and/or associated with, such corresponding adjoined, and/or adjoining, assemblage(s), when attached, and/or hooked-up with, and/or onto, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" assemblage(s)) also has, and/or is holding, and/or carrying, and/or operating, and/or functioning, and/or hooking-up, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s) assembly type(s), and/or casing wall(s) assembly type(s), and/or casing(s), and/or contour casing(s) assembly type(s), and/or protrusion(s) assembly type(s), and/or flange(s) assembly type(s) (inner annular, and/or outer annular, and/or other area(s), and/or place(s)), for the purpose of hooking-up, and/or packaging, and/or assembling, and/or configuring, and/or holding, and/or compacting, and/or embedding, and/or slotting, and/or positioning, and/or orienting, and/or aligning, and/or securing (fixed) in-place, with, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) identical, and/or interlocking, shaped, and/or smooth, and/or measured, and/or dimensional, channel(s) assembly type(s), and/or aperture(s) assembly type(s), and/or area(s), and/or place(s) assembly type(s), within, in, into, on, onto, beneath, between, surrounding, thru, and/or throughout, and/or associated with, such a corresponding adjoined, and/or adjoining, vehicle wheel assembly type(s), and/or such a corresponding adjoined, and/or adjoining pneumatic tire(s) assembly type(s), and, a corresponding adjoined vehicle assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, the body of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s) (unbroken, and/or unimpeded) when, in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) has, and/or is holding, and/or carrying, and/or working, and/or integrating, and/or hooking-up, separate, but, adjoined, casing(s) assembly type(s) (piece(s)) (i.e., a corresponding adjoined, and/or adjoining, (piece(s)), that is secured (fixed) in-place, and/or another corresponding adjoined, and/or adjoining, (piece(s)) that is stationary, and/or moving, and/or rotating, and/or spinning, and/or turning), with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) joint(s) assembly type(s), and/or toggle(s) assembly type(s), and/or ball bearing(s) assembly type(s), and/or sealed ball bearing(s) assembly type(s), and/or ball bearing(s) track(s) assembly type(s), and/or connection point(s) assembly type(s), and/or hook-up(s) point(s) assembly type(s), and/or socket(s) assembly type(s), and/or plug(s) assembly type(s), and/or mooring(s) assembly type(s), and/or seal(s) assembly type(s), and/or sealing materials, and/or fastener(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and, channel(s) assembly type(s), and, aperture(s) assembly type(s), and/or area(s) assembly type(s), and, protrusion(s) assembly type(s), and/or another necessary, and/or required, suitable, and/or workable, and/or configurable means, and/or ways, and/or element(s), and/or composite(s), and/or material(s), and/or equipment assembly type(s), for the purpose of, protection, and/or assembly, and/or configuration, and/or insulation, and/or isolation, and/or hook-up(s) and/or proximity, and/or alignment, and/or securing (fixed) in-place of such corresponding adjoined, and/or adjoining, permanent magnet(s) electromotive assemblage(s), and/or similar working, permanent magnet(s) electromotive/electric motor (combined) assemblage(s), and/or permanent magnet(s) inductive/conductive assemblage(s), and, for the purpose of, enabling, and/or allowing, and/or facilitating, generating, and/or making, and/or exciting, and/or transiting, and/or transferring, and/or transmitting, and/or receiving, and/or using, and/or operating, and/or functioning, and/or cooling, and/or communicating, and/or controlling, and/or managing, and/or measuring, and/or diagnosing, and/or reading, and/or recording, and/or storing, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s) (automatically, and/or manually, and/or autonomously (wirelessly), and/or remotely), of, for, from, into, thru, out of, and/or between, and/or associated with, such corresponding adjoined, and/or adjoining, permanent magnet(s) electromotive assemblage(s), and/or similar working, permanent magnet(s) electromotive/electric motor (combined) assemblage(s), when attached with, within, in, into, on, onto, beneath, between, surrounding, thru, and/or throughout, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s) mechanism(s), device(s), system(s), and/or apparatus assembly type(s) when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnetic, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., “Exoskeleton” assemblage(s)) is ideally, embedded, and/or slotted, and/or held, and/or anchored, and/or moored, and/or packaged, and/or compacted, and/or positioned, and/or oriented, and/or configured, and/or assembled, and/or aligned, and/or fitted, and/or secured (fixed) in-place, and/or hooked-up, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s) assembly type(s), and/or place(s) assembly type(s), and/or protrusion(s) assembly type(s), of the body (architecture) of such a corresponding adjoined, and/or adjoining, vehicle wheel assembly type(s), and/or such a corresponding adjoined, and/or adjoining pneumatic tire(s) assembly type(s), and/or within, in, into, on, onto, beneath, between, surrounding, thru, and/or throughout, and/or associated with, and/or amalgamated with a corresponding adjoined vehicle assembly type(s), rotor case(s) assembly type(s), and/or rotor housing(s), and/or hub(s) assembly type(s), and/or axel(s) assembly type(s), and/or brake caliper(s) assembly type(s), and/or another necessary, and/or required, suitable, and/or workable, and/or configurable, place(s), and/or area(s), and/or configuration(s), and/or means, and/or ways, and/or material(s) and/or equipment assembly type(s), of, for, from, into, thru, out of, and/or between, and/or associated with, a corresponding adjoined vehicle assembly type(s), and, such a corresponding adjoined, and/or adjoining, vehicle wheel assembly type(s), and/or such a corresponding adjoined, and/or adjoining pneumatic tire(s) assembly type(s), for the purpose of, enabling, and/or allowing, and/or facilitating, and/or generating, and/or using, and/or making, and/or exciting, and/or receiving, and/or transmitting, and/or storing, and/or transiting, and/or transferring, and/or using, and/or operating, and/or functioning, and/or cooling, and/or connecting, and/or communicating, and/or controlling, and/or recording, and/or measuring, and/or diagnosing, and/or managing, and/or hooking-up (unbroken, and/or unimpeded) magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s) (automatically, and/or manually, and/or autonomously (wirelessly), and/or remotely), of, for, from, into, thru, out of, and/or between, and/or associated with, such corresponding adjoined, and/or adjoining, assemblage(s), when attached with, within, in, into, on, onto, beneath, between, surrounding, thru, and/or throughout, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s) and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) shaft (cap) (piece(s)), is ideally exposed outwardly, from its (fixed) position, as placed, and/or oriented, and/or integrated, and/or assembled, with, within, in, into, on, onto, beneath, between, surrounding, thru, and/or throughout, and/or associated with a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" assemblage(s)) and/or another necessary, and/or required, suitable, and/or workable, and/or configurable, means, and/or way(s), and/or element(s), and/or composite(s), and/or material(s), and/or equipment assembly type(s), for the purpose of, attaching, and/or embedding, and/or slotting, and/or compacting, and/or packaging, and/or positioning, and/or insulating, and/or isolating, and/or proximity, and/or aligning, and/or assembling, and/or configuring, and/or fitting, and/or mooring, and/or orienting, and/or hooking-up, and/or securing (fixed) in-place, within, in, into, on, onto, beneath, between, surrounding, thru, and/or throughout, and/or associated with a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), shaped, and/or smooth, and/or measured, and/or dimensional, channel(s) assembly type(s), and/or aperture(s) assembly type(s), and/or area(s) assembly type(s), and/or place(s) assembly type(s), and/or protrusion(s) assembly type(s) of such a corresponding adjoined, and/or adjoining, vehicle wheel assembly type(s) (i.e., in such a manner, as to not obstruct the center hub hole, and/or hub bolt hole(s) pattern(s) assembly type(s), of such a corresponding adjoined, and/or adjoining, vehicle wheel assembly type(s)), and, ideally, secured (fixed) in-place, and/or hooked-up, by way of, and/or with the use of, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) joint(s) assembly type(s), ball bearing(s) assembly type(s), sealed ball bearing(s) assembly type(s), ball bearing(s) track(s) assembly type(s), connection(s) assembly type(s), plug(s) assembly type(s), socket(s) assembly type(s), fastener(s) assembly type(s), seal(s) assembly type(s), and/or other component(s), part(s), mechanism(s), device(s), system(s), and/or apparatus assembly type(s), and, sealing material(s)), and/or another necessary, and/or required, suitable, and/or workable, and/or configurable, means, and/or ways, and/or element(s), and/or composite(s), and/or material(s), and/or equipment assembly type(s), and, for the purpose of minimizing, and/or abating, unwanted, and/or dangerous, vibration(s), and/or oscillation(s), and/or movement(s), that cause electrical shortage(s), and/or heat build, and/or electric sparking, and/or other electrical calamities, and/or irregularities, of, for, from, into, thru, out of, and/or between, and/or associated with, such electrical, and/or electricity, and/or electric, electromotive, and/or similar working, electromotive/electric motor (combined) assemblage(s), and/or permanent magnet(s) inductive/conductive assemblage(s), when such a corresponding adjoined, and/or adjoining, vehicle wheel assembly type(s), and/or such a corresponding adjoined, and/or adjoining pneumatic tire(s) assembly type(s) is attached onto, and/or with, such a corresponding adjoined, and/or adjoining, electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), that is also being held, and/or carried, and/or anchored, and/or moored, and/or integrated, and/or amalgamated, and/or aligned, and/or positioned, and/or oriented, and/or hooked-up, with, within, in, into, on, onto, beneath, between, surrounding, thru, and/or throughout, and/or associated with a corresponding adjoined vehicle assembly type(s), rotor housing(s) assembly type(s), rotor(s) assembly type(s), hub(s) assembly type(s), and/or axel(s) assembly type(s), and/or brake(s) caliper(s) assembly type(s), and/or another necessary, and/or required, suitable, and/or workable, and/or configurable, placement(s), means, and/or ways, and/or material(s) and/or equipment assembly type(s), with, within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and/or such a corresponding adjoined, and/or adjoining pneumatic tire(s) assembly type(s), for the purpose of, enabling, and/or allowing, and/or facilitating, generating, and/or making, and/or exciting, and/or transiting, and/or transferring, and/or transmitting, and/or receiving, and/or using, and/or operating, and/or functioning, and/or cooling, and/or communicating, and/or controlling, and/or managing, and/or measuring, and/or diagnosing, and/or storing, and/or hooking-up (unbroken, and/or unimpeded) magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s) (automatically, and/or manually, and/or autonomously (wirelessly), and/or remotely), of, for, from, into, thru, out of, and/or between, and/or associated with such corresponding adjoined, and/or adjoining, assemblage(s), when mounted, and/or attached, and/or hooking-up with, and/or onto, a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), when in motion, and/or stationary.

Such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), has, and/or is holding, and/or carrying, and/or operating, and/or functioning, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive protective housing case(s) assembly type(s) (piece(s)), that has, and/or is holding, and/or carrying, and/or operating, and/or functioning, and/or hooking-up, an corresponding adjoined, and/or adjoining, exposed, outward facing, electromotive, and/or similar working electromotive/electric motor (combined), and/or permanent magnet(s) inductive/conductive assemblage(s) protective housing case(s) assembly type(s) shaft (cap) (piece(s)), and/or other associated specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with such an electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, a corresponding adjoined vehicle assembly type(s), and, such a corresponding adjoined, and/or adjoining, vehicle wheel assembly type(s), and/or such a corresponding adjoined, and/or adjoining pneumatic tire(s) assembly type(s), for the purpose of, enabling, and/or allowing, and/or facilitating, and/or generating, and/or storing, and/or diagnosing, and/or measuring and/or making, and/or exciting, and/or transiting, and/or transferring, and/or transmitting, and/or receiving, and/or using, and/or operating, and/or functioning, and/or cooling, and/or communicating, and/or recording, and/or controlling, and/or managing, and/or storing, and/or working, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s) (automatically, and/or manually, and/or autonomously (wirelessly), and/or remotely), of, for, from, into, thru, out of, and/or between, and/or associated with, such corresponding adjoined, and/or adjoining, electromotive, and/or similar working, electromotive/electric motor (combined) assemblage(s), and/or permanent magnet(s) inductive/conductive assemblage(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet inductive/conductive assemblage(s) protective housing case(s) assembly type(s) shaft (cap) (piece(s)), is stationary, and/or rotating, and/or moving, and/or spinning, and/or turning, with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) joint(s) assembly type(s), and/or ball bearing(s) assembly type(s), and/or sealed ball bearing(s) assembly type(s), and/or ball bearing(s) ring(s) assembly type(s), and/or ball bearing(s) track(s) assembly type(s), and/or seal(s) assembly type(s), and/or connection(s) point(s) assembly type(s), and/or socket(s) assembly type(s), and/or plug(s) assembly type(s), and/or wiring assembly type(s), and/or wiring harness assembly type(s), and/or flange(s) assembly type(s), and/or protrusion(s) assembly type(s), and/or anchor(s) assembly type(s), and/or mooring(s) assembly type(s), and/or fastener(s) assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), for the purpose of, enabling, and/or facilitating, and/or operating, and/or functioning, and/or using, and/or hooking-up a stationary, and/or rotating, and/or turning, and/or spinning, and/or moving, action(s), and/or operation(s), and/or function(s), and/or purpose(s), and/or task(s) of a corresponding adjoined, and/or adjoining, permanent magnet(s) electromotive, and/or similar working, electromotive/electric motor (combined) rotor(s) assembly type(s), upon, and/or between, a corresponding adjoined, and/or adjoining, (fixed) opposing permanent magnet(s) electromotive, and/or similar working, electromotive/electric motor (combined) stator(s) assembly type(s), and/or armatures(s) assembly type(s) (i.e., as assembled, and/or operating, and/or functioning, and/or hooking-up, within, in, into, on, onto, beneath, between, surrounding, thru, and/or throughout, and/or associated with such a corresponding adjoined, and/or adjoining, electromotive, and/or similar working, electromotive/electric motor (combined) assemblage(s) protective housing case(s) assembly type(s) (piece(s))), and/or other interaction(s) of, for, from, into, thru, and/or between, and/or associated with, such permanent magnet(s) inductive/conductive assemblage(s) (E.g., magnetic inductive electrical charging of a corresponding batteries assembly type(s), and/or communication(s), and/or navigation, and/or other operation(s), function(s), purpose(s), and/or task(s)), and, for the purpose of, generating, and/or creating, and/or receiving, and/or transiting, and/or transmitting, and/or transferring, and/or making, and/or hooking-up, magnetic interacting(s), and/or magnetic excitement(s), of, for, from, into, thru, out of, and/or between, and/or associated with such a corresponding adjoined, and/or adjoining, electromotive assemblage(s), and/or similar working, electromotive/electric motor (combined) assemblage(s), and/or permanent magnet(s) inductive/conductive assemblages producing magnetic electricity flux (i.e., when a conductor(s) is placed in a changing magnetic field, moving the electron(s), and, generating an electricity current, and/or when an inductive pick-up(s) assemblage(s) is interacting, and/or in proximity with an associated conductive assemblage(s), and other associated component(s), part(s), mechanism(s), device(s), system(s), and/or apparatus assembly type(s)), automatically, and/or manually, and/or autonomously (wirelessly), and/or remotely, when such a corresponding adjoined, and/or adjoining, vehicle wheel assembly type(s), and, such a corresponding adjoined, and/or adjoining pneumatic tire(s) assembly type(s) is mounted, and/or attached, and/or hooked-up onto, and/or with, a corresponding adjoined vehicle assembly type(s), and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnet, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" assemblage(s)) has, and/or is holding, and/or operating, and/or functioning, and/or integrating, and/or amalgamating, and/or carrying, and/or shielding, and/or insulating, and/or isolating, and/or operating, and/or functioning, and/or communicating, and/or protecting, and/or packaging, and/or compacting, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) electromotive assemblage(s), and/or a similar working, permanent magnet(s) electromotive/electric motor (combined) assemblage(s), and/or permanent magnet(s) inductive/conductive assemblage(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, protective housing case(s) assembly type(s) (piece(s)), and/or contour protective housing case(s) assembly type(s) (piece(s)), for the purpose of, generating, and/or creating, and/or making, and/or transiting, and/or transferring, and/or using, and/or storing, and/or communicating, and/or controlling, and/or connecting, and/or managing, and/or recording, and/or working, and/or insulating, and/or isolating, and/or protecting, and/or operating, and/or functioning, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other electrical, and/or digital, and/or magnetic operation(s), and/or function(s), and/or purpose(s), and/or task(s) automatically, and/or manually, and/or autonomously (wirelessly), and/or remotely, of, for, from, into, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), when in motion, and/or stationary.

Such magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other associated electrical, and/or digital, and/or magnetic operation(s), and/or function(s), and/or purpose(s), and/or task(s) (E.g., magnetic/electricity connection(s), and/or transfer(s) of, for, from, into, thru, out of, and/or between associated component(s), part(s), mechanism(s), device(s), system(s), and/or apparatus assembly type(s)) is occurring by way of, and/or with the use of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) permanent magnet(s) electromotive, and/or similar working electromotive/electric motor (combined) rotor(s) assembly type(s), and/or stator(s) assembly type(s), and/or armature(s) assembly type(s), and/or other permanent magnet(s) inductive/conductive assemblage(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s) (i.e., as assembled, and/or configured, and/or attached, and/or hooked-up, with, within, in, into, on, onto, beneath, between, surrounding, thru, and/or throughout, and/or associated with, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" assemblage(s)), and, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), and/or another necessary, and/or required, suitable, and/or workable, and/or configurable means, and/or ways, and/or material(s), and/or element(s), and/or composite(s), and/or equipment assembly type(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s) (i.e., those associated assemblage(s) that have and/or hold, and/or operate, and/or function, and/or integrate, and/or hook-up permanent magnet(s) assemblage(s)) and, a corresponding adjoined vehicle assembly type(s), for the purpose of, generating, and/or creating, and/or making, and/or transiting, and/or transferring, and/or transmitting, and/or receiving, and/or using, and/or storing, and/or communicating, and/or controlling, and/or managing, and/or recording, and/or working, and/or operating, and/or functioning, and/or working, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other associated electricity, and/or digital, and/or magnetic, and/or other operation(s), and/or function(s), and/or purpose(s), and/or task(s) (unbroken, and/or unimpeded), automatically, and/or manually, and/or autonomously (wirelessly), and/or remotely, of, for, from, into, thru, out of, and/or between, and/or associated with such a corresponding adjoined, and/or adjoining, electromotive assemblage(s), and/or a similar working, electromotive/electric motor (combined) assemblage(s), and/or permanent magnet(s) inductive/conductive assemblage(s), and, a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), when in motion, and/or stationary, and, for the purpose of, generating, and/or making, and/or using, and/or hooking-up a magnetic exciting(s), and/or magnetic interacting(s), and/or magnetic inductive electricity charging for an associated corresponding adjoined, and/or adjoining batteries assembly type(s), and/or an associated capacitor(s) assemblage(s) of, for, from, into, thru, out of, between, and/or upon, and/or associated with, such a corresponding adjoined, and/or adjoining, electromotive, and/or similar working, electromotive/electric motor (combined) permanent magnet(s) assembly type(s), and, a corresponding adjoined, and/or adjoining, electromotive, and/or similar working, electromotive/electric motor (combined) opposing permanent magnet(s) assembly type(s), caused by the movement(s), and/or torque(s), of, and/or upon, and/or between, such corresponding adjoined, and/or adjoining, electromotive permanent magnet(s) assemblage(s), and/or similar working, electromotive/electric motor (combined) permanent magnet(s) assemblage(s), and/or permanent magnet(s) inductive/conductive assemblage(s) as attached, and/or hooked-up, within, in, into, on, onto, beneath, between, surrounding, thru, and/or throughout, and/or associated with such a corresponding adjoined, and/or adjoining, electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s) and, a corresponding adjoined vehicle assembly type(s), and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or other protective housing case(s) assembly type(s) (i.e. contour, and/or other form fitting architecture(s) assembly type(s)), has, and/or is holding, and/or carrying, and/or operating, and/or functioning, and/or working, and/or hooking-up, a corresponding adjoined, and/or adjoining, permanent magnet(s) rotor(s) assembly type(s), and, a corresponding adjoined, and/or adjoining, opposing permanent magnet(s) stator(s) assembly type(s), and, a corresponding adjoined, and/or adjoining, opposing permanent magnet(s) armature(s) assembly type(s), and/or permanent magnet(s) inductive/conductive assemblage(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), for the purpose of, generating, and/or creating, and/or making, and/or using, and/or storing, and/or hooking-up magnetic interacting(s), and/or magnetic excitement(s), and/or magnetic inductive electricity charging for a corresponding adjoined, and/or adjoining, batteries assembly type(s), and/or a corresponding adjoined, and/or adjoining, capacitor(s) assembly type(s) of, for, from, into, thru, out of, and/or between, and/or associated with, such a corresponding adjoined, and/or adjoining, electromotive assemblage(s), and/or similar working electromotive/electric motor (combined) assemblage(s), and/or permanent magnet(s) inductive/conductive assemblage(s) (i.e., as attached, and/or hooked-up, with, and/or onto, and/or associated with such a corresponding adjoined, and/or adjoining vehicle wheel assembly type(s), and/or associated braking assemblage(s), and/or brake(s) assembly type(s), and, such a corresponding adjoined, and/or adjoining pneumatic tire(s) assembly type(s), and a corresponding adjoined vehicle assembly type(s)), producing, using, transferring, storing, and/or hooking-up magnetic electricity flux, and/or magnetic inductive charging automatically, and/or manually, and/or autonomously (wirelessly), and/or remotely, when such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), are in motion, and/or stationary (i.e., when a conductor(s) is placed, and/or interacting in a changing magnetic field(s) assembly type(s), moving the electron(s), and, generating and/or transferring an electricity current).

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electromotive permanent magnet(s) assemblage(s), and/or a similar working, electromotive/electric motor (combined) permanent magnet(s) assemblage(s), and/or permanent magnet(s) inductive/conductive assemblage(s) comprise, but, are not exclusive to, namely; a ring-shaped (annular) rotary permanent magnet(s) electricity generator(s) assembly type(s), and/or a permanent magnet(s) direct-drive permanent magnet(s) rotary electricity generator(s) assembly type(s), and/or a permanent magnet(s) rotary electricity generating turbine assembly type(s), and/or an axial flux permanent magnet(s) electricity generator(s)/motor(s) (combined) assembly type(s), and/or an axial flux permanent magnet(s) electricity generator(s) assembly type(s), and/or a permanent magnet(s) electricity generating dynamo assembly type(s), and/or a permanent magnet(s) electricity generating magneto(s) assembly type(s), and/or a permanent magnet(s) synchronous electricity generator assembly type(s), and/or a permanent magnet(s) alternator(s) assembly type(s), and/or permanent magnet(s) inductive/conductive assemblage(s), and/or permanent magnet(s) inductive charging assemblage(s), and/or permanent magnet(s) charging conductor(s) assemblage(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) magnetic electromotive assemblage(s), and/or similar working, magnetic electromotive/electric motor (combined) assemblage(s), and/or permanent magnet(s) inductive/conductive assemblage(s) and/or another necessary, and/or required, suitable, and/or workable, and/or configurable, means, and/or ways, and/or material(s), and/or element(s), and/or composite(s) and/or equipment assembly type(s) that has, and/or is holding, and/or carrying, and/or operating, and/or functioning, and/or working, and/or interacting, and/or hooking-up, by way of, and/or with the use of, a corresponding adjoined, and/or adjoining, magnet(s) assembly type(s), and/or permanent magnet(s) assembly type(s), and/or electromagnet(s) assembly type(s), and/or ferrous magnet(s) assembly type(s) (i.e., ferrous metal(s) that contain a large enough iron content to create enough domain(s) for a magnetic field to act on, and attract), for the purpose of, emitting such magnetic field(s), that can be used in various configuration(s) to produce, and/or generate electricity flux, and/or inductive electricity charging. Depending on the type of magnet(s) assembly type(s) used, a rotating magnetic electricity generator(s) assembly type(s), and/or other electricity transfer(s) assemblage(s) (i.e., inductive/conductive and/or vice versa), can have these magnet(s) assembly type(s), placed, and/or configured, in various, and/or different location(s), and/or ways (isolated, and/or insulated), and, generate electricity in different ways, and/or by different means (i.e., Magnetic generated electricity, comes from rotating magnetic electricity generator(s) assembly type(s), that use, and/or incorporate, a moving, and, fixed magnetic field(s) to produce, and/or generate, electricity flux, and/or magnetic inductive electricity charging. Magnetic electricity generator(s) assembly type(s), work by rotating coils of wire(s) through a magnetic field(s), and/or by way of, and/or with the use of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) magnet(s), and/or permanent magnet(s), and/or an electromagnet(s) assembly type(s). When the conducting coil(s) move through the magnetic field(s), the electrons in the wire(s) move, creating an electricity current. Such magnetic electricity generator(s) assembly type(s), and/or permanent magnet(s) inductive/conductive assemblage(s) are made-up of coils of wire that are exposed to a changing magnetic field(s), or are stationary, and/or around a shaft and/or axis with rotating magnet(s) assembly type(s). In whichever case, the coil(s) of wire are exposed to the changing magnetic field(s) created by the movement(s) of, and/or nearness (i.e., proximity) of such magnet(s) assembly type(s). Such magnet(s) assembly type(s) can be magnet(s), permanent magnet(s), and/or electromagnet(s) assembly type(s)).

Such magnet, and/or permanent magnet(s), assembly type(s) are predominantly used in smaller electricity generator(s) assembly type(s), and/or inductive/conductive charging pick-up(s) assemblage(s) (i.e., those that fit, and/or assembled, and/or hooked-up, within, in, into, on, onto, beneath, between, surrounding, thru, and/or throughout, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s)), for the purpose of, offering a more compact user application(s), to maximize efficiencies, and reduce weight, and, for the purpose of, advantage, over electromagnet(s) assemblage(s), in that they don't require an electrical power supply. When such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) magnet, and/or permanent magnet(s) assembly type(s), are used in a magnetic electricity generator(s), and/or alternator(s) assembly type(s), and/or electricity charging assemblage(s) (i.e., electromotive assemblage(s), and/or similar working, electromotive/electric motor (combined) assemblage(s), and/or permanent magnet(s) inductive/conductive assemblage(s)), a fixed, and/or turning, and/or rotating, and/or moving, and/or spinning source (i.e., such a corresponding adjoined, and/or adjoining, vehicle wheel assembly type(s), and, such a corresponding adjoined, and/or adjoining pneumatic tire(s) assembly type(s), that is attached with, within, in, into, on, onto, beneath, between, surrounding, thru, and/or throughout and/or associated with such an electromotive assemblage(s), and/or similar working, electromotive/electric motor (combined) assemblage(s), and/or permanent magnet(s) inductive/conductive assemblage(s), and, that is also attached with, within, in, into, on, onto, beneath, between, surrounding, thru, and/or throughout, and/or associated with, a corresponding adjoined vehicle assembly type(s), producing torque(s) (motion(s), and/or stationary) to create, and/or emit, and/or make, and/or pick-up and/or generate the electricity flux, and/or inductive electricity charging when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnet, and/or permanent magnet, and/or electromagnetic assembly type(s), and/or other, (stationary, and/or fixed, and/or moving, and/or rotating, and/or spinning, and/or turning) electromotive permanent magnet(s) rotor(s) assembly type(s), and/or similar working, electromotive/electric motor (combined) permanent magnet(s) rotor(s) assembly type(s), and/or permanent magnet(s) inductive/conductive assemblage(s) within, in, into, on, onto, beneath, between, surrounding, thru, and/or throughout, and/or associated with the body (architecture) of such a corresponding adjoined, and/or adjoining vehicle wheel assembly type(s), and, a corresponding adjoined, and/or adjoining pneumatic tire(s) assembly type(s) and/or a corresponding vehicle assembly type(s) are used, and/or essential, for the purpose of converting mechanical energy into sustainable electrical energy, and/or converting sustainable electrical energy into mechanical energy, through the continuous rotational interaction(s) (movement(s), and/or torque(s) of such a corresponding adjoined, and/or adjoining, vehicle wheel assembly type(s), with, and/or upon, and/or between, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnet, and/or permanent magnet, and/or electromagnetic assembly type(s), and/or other, (stationary, and/or fixed, and/or moving, and/or rotating, and/or spinning, and/or turning) electromotive, and/or similar working electromotive/electric motor (combined) opposing permanent magnet(s) stator(s) assembly type(s), and/or an electromotive, and/or similar working, electromotive/electric motor (combined) opposing permanent magnet(s) armature(s) assembly type(s), having, and/or holding, and/or carrying, and/or operating, and/or functioning, and/or hooking-up, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnet, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s) (i.e., as assembled, and/or held, and/or carried, and/or shielded, and/or hooked-up, within, in, into, on, onto, beneath, between, surrounding, thru, and/or throughout, and/or associated with, a corresponding adjoined, and/or adjoining, electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) that is held by, and/or carried by, and/or hooking-up with, within, in, into, on, onto, beneath, between, surrounding, thru, and/or throughout, and/or associated with a corresponding adjoined vehicle assembly type(s), and/or such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), for the purpose of, generating, and/or using, and/or transferring, and/or transiting, and/or transmitting, and/or storing, and/or measuring, and/or managing, and/or controlling, and/or recording, and/or diagnosing, and/or communicating, and/or cooling, and/or hooking-up magnetic electricity flux, and/or sustainable electrical power, and/or sustainable electricity supply, and/or sustainable electric driven propulsion, and/or inductive electricity charging for a corresponding batteries assembly type(s), and/or electrical capacitor(s) assemblage(s) of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" assemblage(s)) has, and/or hold(s), and/or carries, and/or use(s), and/or amalgamate(s), and/or operate(s), and/or function(s), and/or hook(s)-up a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s) assembly type(s), and, protrusion(s), and/or flange(s) assembly type(s), and/or wall(s) assembly type(s), and/or casing cover(s) assembly type(s), and/or casing(s) assembly type(s) (inner annular, and/or outer annular, and/or other, and/or with, and/or without, flush mounting hole(s), and/or aperture(s) assembly type(s)), for the purpose of, securing (fixed) in-place, and/or slotting, and/or embedding, and/or positioning, and/or orienting, and/or assembling, and/or insulating, and/or isolating, and/or integrating, and/or compacting, and/or diagnosing, and/or communicating, and/or controlling, and/or integrating, and/or interacting, and/or packaging, and/or anchoring, and/or organizing, and/or protecting, and/or aligning, and/or mooring, and/or anchoring, and/or connecting, and/or hooking-up, such a corresponding adjoined, and/or adjoining, electromotive permanent magnet(s) assemblage(s), and/or similar working, electromotive/electric motor (combined) permanent magnet(s) assemblage(s), and/or permanent magnet(s) inductive/conductive assemblage(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s) (with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) joint(s) assembly type(s), and/or fastener(s) assembly type(s), seal(s) assembly type(s), and, sealing material(s), and/or inductive electrical connection(s) point(s) assembly type(s), and/or electrical plug(s) assembly type(s), and/or electrical socket(s) assembly type(s), and/or wiring assembly type(s), and/or wiring harness assembly type(s), and/or AC/DC electricity rectifier(s) assembly type(s), and/or electrical inverter(s) assembly type(s), and/or another necessary, and/or required, suitable, and/or workable, and/or configurable, means, and/or ways, and/or material(s), and/or element(s), and/or composite(s), and/or equipment assembly type(s), within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, channel(s) assembly type(s), and/or aperture(s) assembly type(s), and/or area(s), and/or place(s), and/or protrusion(s) assembly type(s), of the body (architecture) of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, for the purpose of, generating, and/or making, and/or transiting, and/or transmitting, and/or receiving, and/or transferring, and/or operating, and/or functioning, and/or using, and/or storing, and/or controlling, and/or connecting, and/or managing, and/or measuring, and/or diagnosing, and/or communicating, and/or cooling, and/or hooking-up magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other associated electricity, and/or digital, and/or magnetic, and/or other operation(s), function(s), purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when assembled, and/or attached, and/or attaching, and/or interacting together, and/or with one another, and/or in proximity of one another, and, in motion, and/or stationary, and, for the purpose of, running, and/or operating, and/or functioning, and/or transiting, and/or transferring, and/or transmitting, and/or receiving, and/or generating, and/or using, and/or storing, and/or communicating, and/or controlling, and/or connecting, and/or measuring, and/or diagnosing, and/or cooling, and/or integrating, and/or managing, and/or recording, and/or working, and/or hooking-up, a corresponding chosen electrical, and/or electric, and/or electricity actuated operation(s), and/or function(s), and/or purpose(s), and/or task(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated protective housing case(s) assembly type(s), and/or contour protective housing case(s) assembly type(s) (i.e., "Exoskeleton" assemblage(s)) that have, and/or are holding, and/or carrying, and/or operating, and/or functioning, and/or working, and/or controlling, and/or communicating, and/or using, and/or storing, and/or isolating, and/or insulating, and/or organizing, and/or aligning, and/or protecting, and/or connecting, and/or hooking-up, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) associated component(s), part(s), mechanism(s), device(s), system(s), and/or apparatus assembly type(s), automatically, and/or manually, and/or autonomously (wirelessly), and/or remotely, when in motion, and/or stationary.

Such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s) also, has, and/or is holding, and/or carrying, and/or interacting, and/or integrating, and/or amalgamating, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), and/or a ring-shaped (annular) rotary manifold slip-ring wiring harness assembly type(s), and/or other wiring harness assembly type(s), and, a corresponding adjoined, and/or adjoining, vehicle junction boxes and hook-up(s) point(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), that are integrated, and/or amalgamated, within, in, into, on, onto, beneath, between, surrounding, thru, and/or throughout, and/or associated with, the specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), holding, and/or carrying, and/or shielding, and/or protecting, and/or insulating, and/or isolating, and/or aligning, and/or organizing, and/or securing (fixed) in-place, and/or encasing, and/or sealing, and/or hermetically sealing, and/or hooking-up the specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive permanent magnet(s) assemblage(s), and/or other similar working, electromotive/electric motor (combined) permanent magnet(s) assemblage(s), and/or permanent magnet(s) inductive/conductive assemblage(s) of, for, from, into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), for the purpose of, generating, and/or making, and/or transiting, and/or transferring, and/or receiving, and/or transmitting, and/or operating, and/or functioning, and/or using, and/or storing, and/or controlling, and/or managing, and/or measuring, and/or diagnosing, and/or storing, and/or communicating, and/or cooling, and/or connecting, and/or hooking-up magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other associated electricity, and/or digital, and/or magnetic, and/or other, operation(s), function(s), purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and associated component(s), part(s), mechanism(s), device(s), system(s), and/or apparatus assembly type(s) (i.e., when attached, and/or hooked-up together, and/or interacting with one another, and/or in proximity of one another, and, when in motion, and/or stationary), and, for the purpose of running corresponding chosen adjoined, and/or adjoining, electrical, and/or electric, and/or electricity actuated operation(s), and/or function(s), and/or purpose(s), and/or task(s), of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, for the purpose of direct electrical, and/or electricity, and/or electric use(s), and/or battery recharging, and/or battery storage (later use(s)), and/or other electrical storage assemblage(s) (E.g., an electricity capacitor(s), and/or supercapacitor(s) assemblage(s)), and/or other corresponding chosen electrical, and/or electricity, and/or electric, operation(s), and/or function(s), and/or purpose(s), and/or task(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), when in motion, and/or stationary, and, for the purpose of, simultaneously reliably, generating, and/or linking, and/or connecting, and/or transiting, and/or transferring, and/or transmitting, and/or receiving, and/or working, and/or communicating, and/or operating, and/or functioning, and/or integrating, and/or interacting, and/or controlling, and/or measuring, and/or diagnosing, and/or connecting, and/or managing, and/or recording, and/or using, and/or storing, and/or hooking-up (unbroken, and/or unimpeded), a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other (stationary, and/or fixed, and/or moving, and/or rotating, and/or spinning, and/or turning) integrated, and/or amalgamated, (fixed) ring-shaped (annular) rotary manifold assembly type(s) (piece(s)), and/or a ring-shaped (annular) rotary manifold slip-ring wiring harness assembly type(s), and/or other wiring harness assembly type(s), and/or a vehicle junction boxes and hook-up(s) point(s) assembly type(s), are assembled together, and/or integrated, and/or amalgamated, with, within, in, into, on, onto, beneath, between, thru, and/or throughout, and/or associated with a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive permanent magnet(s) assemblage(s), and/or similar working, electromotive/electric motor (combined) permanent magnet(s) assemblage(s), and/or permanent magnet(s) inductive/conductive assemblage(s), that is held, and/or carried, and/or protected, and/or shielded, and/or insulated, and/or isolated, and/or operating, and/or functioning, and/or secured (fixed) in-place, and/or hooking-up within, in, into, on, onto, beneath, between, surrounding, thru, and/or throughout, and/or associated with, the specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other (stationary, and/or fixed, and/or moving, and/or rotating, and/or spinning, and/or turning), electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., as assembled, and/or hooked-up), of, for, from, into, thru, out of, and/or between, and/or associated with a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), and/or another necessary, and/or required, suitable, and/or workable, and/or configurable means, and/or ways, and/or material(s), and/or element(s), and/or composite(s), and/or equipment assembly type(s), for the purpose of, generating, and/or transiting, and/or transferring, and/or linking, and/or transmitting, and/or receiving, and/or diagnosing, and/or measuring, and/or controlling, and/or managing, and/or communicating, and/or connecting, and/or operating, and/or functioning, and/or using, and/or storing, and/or cooling, and/or hooking-up magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding electrical, and/or electric, and/or electricity actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, electrical, and/or electricity, and/or electric assemblage(s), and/or electrical, and/or electricity, and/or electric, and/or magnetic, and/or digital assemblage(s), and/or other assemblages, of, for, from, into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary, and, for the purpose of, simultaneously reliably, generating, and/or linking, and/or connecting, and/or transiting, and/or transferring, and/or transmitting, and/or receiving, and/or working, and/or communicating, and/or operating, and/or functioning, and/or integrating, and/or interacting, and/or controlling, and/or managing, and/or measuring, and/or diagnosing, and/or recording, and/or using, and/or storing, and/or cooling, and/or hooking-up (unbroken, and/or unimpeded), a desired media(s), and/or medium(s) (such as compressed air, and/or other gases for inflating, and/or deflating (+ and/or −), a corresponding attached pneumatic tire(s) chamber(s) assembly type(s)), and/or electricity supply, data, and/or digital signal(s), and/or fluid(s)), and/or other necessary, and/or required, corresponding chosen operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive permanent magnet(s) assemblage(s), and/or similar working, electromotive/electric motor (combined) permanent magnet(s) assemblage(s), and/or permanent magnet(s) inductive/conductive assemblage(s), and, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), and/or a ring-shaped (annular) rotary manifold slip-ring (wiring harness) assembly type(s), and/or other wiring harness assembly type(s), and, a corresponding adjoined, and/or adjoining vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other (stationary, and/or fixed, and/or moving, and/or rotating, and/or spinning, and/or turning), component(s), part(s), mechanism(s), device(s), system(s), and/or apparatus assembly type(s) (magnetic, electrical, electric, electricity actuated, digital and/or other), are assembled separately, and/or together, and/or amalgamated, and/or integrated, and/or held, and/or embedded, and/or slotted, and/or compacted, and/or packaged, and/or insulated, and/or isolated, and/or aligned, and/or organized, and/or hooked-up, and/or secured (fixed) in-place, and/or protected, and/or positioned, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s), protective housing(s) case(s) assembly type(s) (piece(s)), and/or contour protective housing case(s) assembly type(s) (piece(s)) (i.e., "Exoskeleton" assemblage(s)), for the purpose of, generating, and/or transiting, and/or transferring, and/or receiving, and/or transmitting, and/or linking, and/or controlling, and/or managing, and/or communicating, diagnosing, and/or recording, and/or operating, and/or functioning, and/or using, and/or storing, and/or cooling, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding magnetic, and/or electrical, and/or electric, and/or electricity, and/or digital, and/or other actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, magnetic, and/or electrical, and/or electricity, and/or electric, and/or digital assemblage(s), and/or other associated assemblage(s) type(s), and/or other electrical, and/or electricity, and/or electric assembly type(s), of, for, from, into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically (i.e., computer/digital control(s)), and/or manually (i.e., a corresponding adjoined vehicle assembly type(s) physical operator(s) selection(s), and/or other associated physical operator(s), and/or equipment assembly type(s) E.g., physical diagnostic technician(s) selection(s), aided by computer/digital control(s)), and/or autonomously (wirelessly), and/or remotely (i.e., computer/digital control(s) via associated satellite, antennae, device(s), system(s), apparatus, software(s), operating system(s), and spectrum(s), frequencies, wave(s), band-width(s), and/or magnetic field(s)), and/or another necessary, and/or required, suitable, and/or workable, and/or configurable, mean(s), and/or ways, and/or material(s), and/or element(s), and/or composite(s), and/or equipment assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), has, and/or is holding, and/or carrying, and/or protecting, and/or isolating, and/or insulating, and/or integrating, and/or diagnosing, and/or measuring, and/or communicating, and/or transmitting, and/or transferring, and/or transiting, and/or connecting, and/or operating, and/or functioning, and/or working, and/or interacting, and/or controlling, and/or using, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) cooling system(s) assembly type(s), and/or liquid cooling system(s) assembly type(s), and/or cooling fin(s) assembly type(s), and/or protrusion(s) assembly type(s), and/or flange(s) assembly type(s), and/or valve(s) assembly type(s), and/or channel(s) assembly type(s), and/or aperture(s) assembly type(s), and/or area(s), and/or place(s) and/or protrusion(s) assembly type(s), and other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), that are held, and/or carried, and/or placed, and/or positioned, and/or oriented, and/or protected, and/or operated and/or functioned, and/or controlled, and/or communicated, and/or connected, and/or used, and/or stored, and/or isolated, and/or insulated, and/or secured (fixed) in-place, and/or hooked-up, with, within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), for the purpose of, focusing, and/or funneling, and/or channeling, and/or directing, and/or forcing, and/or injecting, and/or using, mixed liquid(s), and/or fluid(s) (i.e., water, glycol, synthetic(s), and/or multi-grade petroleum-based oil(s), and/or vegetable-based oil(s), and/or other lubricant(s) assembly type(s), and/or material(s), and/or element(s), and/or combination(s) thereof, and/or other), and/or ambient air, and/or compressed air, and/or gases, as a cooling technique(s), and/or method(s), to mitigate unwanted, and/or dangerous, heat-build, of, for, from, into, thru, out of, upon, and/or between, and/or associated with, such corresponding adjoined, and/or adjoining, electromotive assemblage(s), and/or similar working, electromotive/electric motor (combined) assemblage(s), and/or permanent magnet(s) inductive/conductive assemblage(s), that are within, in, into, on, onto, beneath, between, surrounding, thru, and/or throughout, and/or associated with the corresponding adjoined, and/or adjoining, electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" assemblage(s)), caused by high rotational movement(s), and/or torque(s), and/or other causation(s) of, and/or upon, and/or between, and/or into, and/or onto, and/or associated with such corresponding adjoined, and/or adjoining, electromotive, and/or similar working, electromotive/electric motor (combined) assemblage(s), and/or such permanent magnet(s) inductive/conductive assemblage(s) when, such a corresponding adjoined, and/or adjoining, vehicle wheel assembly type(s), and/or such a corresponding adjoined, and/or adjoining pneumatic tire(s) assembly type(s) is mounted, and/or attached, and/or hooked-up onto, and/or with, a corresponding adjoined vehicle assembly type(s), and, when in motion (i.e., torque, and/or gravity is applied), and/or stationary.

Such cooling is done with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) direct injection pump(s) assembly type(s), and/or pump(s) assembly type(s), injecting, and/or circulating, water, and/or glycol, and/or synthetic(s), and/or petroleum(s) fluid(s), and/or water based, and/or other fluid(s) based, coolant(s) assembly type(s), and/or a mix thereof, and/or other necessary, and/or required, suitable, and/or workable, and/or configurable, means, and/or ways, and/or element(s), and/or composite(s), and/or equipment assembly type(s), and/or directly, by venting surface environment air, and/or gases into, thru, out of, and/or between, and/or surrounding, such electromotive, and/or similar working, electromotive/electric motor (combined) assemblage(s), and/or such permanent magnet(s) inductive/conductive assemblage(s), and/or directly injecting, and/or circulating, ambient air, and/or generated compressed air, and/or gases, and/or another necessary, and/or required, suitable, and/or workable, and/or configurable, means, and/or ways, and/or material(s), and/or element(s), and/or equipment assembly type(s), for the purpose of, maintaining a corresponding chosen operating, and/or functioning temperature(s) of, for, from, into, thru, out of, and/or between, and/or associated with, the electromotive, and/or similar working, electromotive/electric motor (combined) permanent magnet(s) rotor(s) assembly type(s), and/or stator(s) assembly type(s), and/or armature(s) assembly type(s), and/or the permanent magnet(s) inductive/conductive assemblage(s), and, the corresponding adjoined, and/or adjoining, electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and, channel(s) assembly type(s), and/or aperture(s) assembly type(s), and/or area(s) assembly type(s), of, and/or within, in, into, on, onto, beneath, between, surrounding, thru, and/or throughout, and/or associated with the electromotive, and/or similar working, electromotive/electric motor (combined) assemblage(s), and/or permanent magnet(s) inductive/conductive assemblage(s), protective housing case(s) assembly type(s) (piece(s)), and/or contour protective housing case(s) assembly type(s) (piece(s)), and, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary.

Such cooling, and/or temperature management, of, for, from, into, thru, out of, and/or between, and/or associated with, an electromotive, and/or similar working, electromotive/electric motor (combined) assemblage(s), and/or permanent magnet(s) inductive/conductive assemblage(s), protective housing case(s) assembly type(s) (piece(s)), and/or contour protective housing case(s) assembly type(s) (piece(s)) is by way of, and/or with the use of, and/or with the assistance of, and/or with the interaction(s) of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), and/or ring-shaped (annular) slip-ring rotary manifold wiring harness assembly type(s), and/or other wiring harness assembly type(s), and, a corresponding adjoined, and/or adjoining, vehicle assembly type(s), vehicle junction boxes and hook-up(s) point(s) assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with such a corresponding adjoined, and/or adjoining, vehicle wheel assembly type(s), and/or such a corresponding adjoined, and/or adjoining pneumatic tire(s) assembly type(s), and, a corresponding adjoined vehicle assembly type(s), that comprise, but, are not exclusive to, namely; a hose(s) assembly type(s), and/or tube(s) assembly type(s), and/or pipe(s) assembly type(s), and/or valve(s) assembly type(s), and/or electrical wiring harness assembly type(s), and/or electrical wiring assembly type(s), and/or electrical circuit(s) assembly type(s), and/or electrical hook-up(s assembly type(s), and/or magnetic hook-up(s) assembly type(s), and/or electromagnetic hook-up(s) assembly type(s), and/or electrical connection(s) assembly type(s), and/or connection(s) assembly type(s), and/or electrical sensor(s) assembly type(s), and/or sensor(s) assembly type(s), and/or circuit(s) assembly type(s), and/or On-Board Diagnostic(s) (OBD) assembly type(s), and/or integrated computer chip(s) assembly type(s), and/or micro-controller(s) assembly type(s), and/or wireless antennae assembly type(s), and/or inductive pick-up(s) assembly type(s), and/or micro-computer(s) assembly type(s), and/or pump(s) assembly type(s), and/or injector(s) assembly type(s), electrical, and/or digital control(s) assembly type(s), and/or control panel(s) assembly type(s), and/or actuator(s) assembly type(s), and/or software(s) assembly type(s), and/or spectrum(s) assembly type(s), and/or frequencies, and/or band-width(s), and/or magnetic field(s), and/or wave(s), and/or microprocessor(s) assembly type(s), and/or computer(s) assembly type(s), and/or associated satellite system(s) assembly type(s), and/or ground based communication(s)/navigation(s) equipment assembly type(s), and/or another necessary, and/or required, suitable, and/or workable, and/or configurable, means, and/or ways, and/or element(s), and/or composite(s), and/or material(s), and/or equipment assembly type(s), that is being held, and/or carried, and/or embedded, and/or slotted, and/or secured (fixed), in-place, within, in, into, on, onto, beneath, between, surrounding, thru, throughout, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), for the purpose of, cooling, and/or maintaining, and/or measuring, and/or isolating, and/or insulating, and/or sealing, and/or protecting, and/or diagnosing, and/or operating, and/or functioning, and/or using, and/or connecting, and/or transiting, and/or circulating, and/or expelling, and/or hooking-up temperature(s) (automatically, and/or manually, and/or autonomously (wirelessly), and/or remotely), of, for, from, into, thru, out of, and/or between, and/or associated with, such a corresponding adjoined, and/or adjoining, electromotive, and/or similar working electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, the associated electromotive assemblage(s), and/or similar working associated electromotive/electric motor (combined) assemblage(s), and/or the permanent magnet(s) inductive/conductive assemblage(s), when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) cooling, and/or temperature management system(s), of, for, from, into, thru, out of, and/or between, and/or associated with a corresponding adjoined, and/or adjoining, electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), has, and/or is holding, and/or carrying, and/or operating, and/or functioning, and/or integrating, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) injector(s) assembly type(s), and/or pump(s) assembly type(s), and/or compressor(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) cooling, and/or temperature management, component(s), part(s), mechanism(s), device(s), system(s), and/or apparatus assembly type(s), for the purpose of, focusing, and/or funneling, and/or channeling, and/or directing, and/or forcing, and/or using, and/or circulating, and/or expelling, and/or venting, mixed fluid(s), and/or fluid(s), and/or gases assembly type(s) (i.e., water, glycol, synthetic(s), and/or multi-grade oil(s), and/or ambient, and/or compressed air, and/or gases and/or other), as a cooling technique(s), and/or method(s) of, for, from, into, thru, out of, and/or between, and/or associated with such electromotive, and/or similar working, electromotive/electric motor (combined) assemblage(s), and/or permanent magnet(s) inductive/conductive assemblage(s), and/or protective housing case(s) assembly type(s) (piece(s)), and/or contour protective housing case(s) assembly type(s) (piece(s)), and, for the purpose of, mitigating, unwanted, and/or dangerous, heat-build, to, and/or upon, the corresponding adjoined, and/or adjoining, associated electromotive assemblage(s), and/or similar working, associated electromotive/electric motor (combined) assemblage(s), and/or permanent magnet(s) inductive/conductive assemblage(s) (i.e., as assembled, and/or attached, and/or interacting, and/or hooked-up within, in, into, on, onto, beneath, between, surrounding, thru, and/or throughout, and/or associated with, the corresponding adjoined, and/or adjoining, electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), caused by high rotational movement(s), and/or torque(s), and/or other causation(s) of, and/or upon, and/or between, such corresponding adjoined, and/or adjoining, electromotive, and/or similar working, electromotive/electric motor (combined) assemblage(s), and/or such permanent magnet(s) inductive/conductive assemblage(s) when, such a corresponding adjoined, and/or adjoining, vehicle wheel assembly type(s), and, such a corresponding adjoined, and/or adjoining pneumatic tire(s) assembly type(s) is mounted, and/or attached, and/or hooked-up onto, and/or with, a corresponding adjoined vehicle assembly type(s), and, when in motion, and/or stationary.

Such an electromotive, and/or similar working electromotive/electric motor (combined) assemblage(s), and/or such a permanent magnet(s) inductive/conductive assemblage(s), and, associated protective housing case(s) assembly type(s) (piece(s)), and/or contour protective housing case(s) assembly type(s) (piece(s)), has, and/or is holding, and/or carrying, and/or integrating, and/or operating, and/or functioning, and/or insulating, and/or isolating, and/or protecting, and/or organizing, and/or diagnosing, and/or measuring, and/or transmitting, and/or assembling, and/or integrating, and/or connecting, and/or storing, and/or communicating, and/or controlling, and/or working, and/or interacting, and/or hooking-up, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; a permanent magnetic gear(s) assembly type(s), and/or mechanical gear(s) assembly type(s), and, electrical wiring assembly type(s), and, electrical cabling assembly type(s), and, permanent magnet(s) gear boxes assembly type(s), and, electronic(s) assembly type(s), and, inductive/conductive assemblage(s), and, inductive electricity pick-up(s) assemblage(s), and, sensor(s) assembly type(s), and, circuit(s) assembly type(s), and, antennae assembly type(s), and, wiring harness assembly type(s), and, wire(s) assembly type(s), and, actuator(s) assembly type(s), and, seal(s) assembly type(s), and, fastener(s) assembly type(s), and, sealing materials, and, joint(s) assembly type(s), and, ball bearing(s) assembly type(s), and, sealed ball bearing(s) assembly type(s), and, ball bearing(s) track(s), assembly type(s), and, valve(s) assembly type(s), and, hose(s) assembly type(s), and, tube(s) assembly type(s), and, channel(s) assembly type(s), and, aperture(s) assembly type(s), and, area(s) assembly type(s), and, vessel(s) assembly type(s), and, protrusion(s) assembly type(s), and, flange(s) assembly type(s), and, connecting point(s) assembly type(s), and, hook-up point(s) assembly type(s), and, socket(s) assembly type(s), and/or plug(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and, connected control(s) assembly type(s), and/or control(s) assembly type(s), and/or autonomous control(s) assembly type(s), and/or wireless control(s) assemblage(s), and/or electricity converting assembly type(s), and/or electricity convertor(s) assembly type(s), and/or electrical invertor(s) assembly type(s), and/or electricity storing apparatus assembly type(s), and/or electricity battery apparatus assembly type(s), and/or magnetic inductive pick-up(s) assembly type(s), and/or sensor(s) assembly type(s), and/or integrated circuit(s) assembly type(s), and/or computer(s) assembly type(s), and/or software(s) assembly type(s) and/or another necessary, and/or required, suitable, and/or workable, and/or configurable, means, and/or ways, and/or material(s), and/or element(s), and/or composite(s) and/or equipment assembly type(s), for the purpose of, assembling, and/or hooking-up, and/or connecting, and/or protecting, and/or shielding, and/or generating, and/or using, and/or storing, and/or transiting, and/or insulating, and/or isolating, and/or transferring, and/or transiting, and/or transmitting, and/or diagnosing, and/or measuring, and/or receiving, and/or controlling, and/or communicating, and/or managing, and/or working, and/or operating, and/or functioning, and/or cooling, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding magnetic, and/or electrical, and/or electric, and/or electricity, and/or digital, and/or other actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, magnetic, and/or electrical, and/or electricity, and/or electric, and/or digital assemblage(s), and/or other associated assemblage(s) type(s), and/or other electrical, and/or electricity, and/or electric assembly type(s) (unbroken, and/or unimpeded), of, for, from, into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s), protective housing case(s) assembly type(s) (piece(s)), and/or contour protective housing case(s) assembly type(s) (piece(s)), has, and/or is holding, and/or carrying, and/or operating, and/or functioning, and/or working, and/or integrating, and/or amalgamating, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s), and/or protrusion(s) assembly type(s) (with the use of, and/or by way of, a corresponding adjoined, and/or adjoining, fastener(s) assembly type(s), and/or seal(s) assembly type(s), and/or sealing material(s) (flush mounting, and/or other)), for the purpose of, separating, and/or compartmentalizing, and/or organizing, and/or sealing, and/or insulating, and/or isolating, and/or operating, and/or functioning, and/or aligning, and/or securing (fixed) in-place, and/or protecting, and/or assembling, and/or hooking-up a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) permanent magnet(s) rotor(s) assembly type(s), and/or permanent magnet(s) stator(s) assembly type(s), and/or permanent magnet(s) armature(s) assemblage(s), and/or permanent magnet(s) inductive/conductive assemblage(s) (i.e., inductive pick-up(s), and/or other associated assemblage(s)) from outside, and/or inside element(s), and/or influence(s) (E.g., deviating temperature(s), dust, ice, fluid(s), dirt, etc. and/or other), and, for the purpose of, safety (i.e., mitigating heat-build, sparking, shorting, and/or other electrical, and/or mechanical, negative influence(s) (E.g., electrical shock(s)), of, for, from, into, thru, and/or upon, and/or between, and/or associated with such corresponding adjoined, and/or adjoining, associated electromotive, and/or similar working, associated electromotive/electric motor (combined) permanent magnet(s) assemblage(s), and/or such permanent magnet(s) inductive/conductive assemblage(s) of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s) automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) opposing permanent magnet(s) assemblage(s) stator(s) assembly type(s), and/or armature(s) assembly type(s), is the stationary part, of a electromotive, and/or similar working, electromotive/electric motor (combined) permanent magnet(s) electricity generating assemblages and/or permanent magnet(s) electricity generating/electricity motor(s) (combined) assemblages (but, can be configured to be the rotating piece(s), of such permanent magnet(s) electricity generating assemblages, and/or electricity generating/electricity motor(s) (combined) assemblage(s), if so desired, and/or necessary, and/or required, for a corresponding chosen operating, and/or functioning, standard(s), of such corresponding adjoined, and/or adjoining, assemblage(s)), for the purpose of, specific, and/or strategic, use(s), and/or application(s), and/or necessity, and/or requirement(s), and/or other operation(s), and/or function(s), and/or purpose(s), and/or task(s), of, for, from, into, thru, out of, and/or between, and/or associated with such a corresponding adjoined, and/or adjoining, vehicle wheel, and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a permanent magnet(s) stator(s) assembly type(s), and/or armature(s) assembly type(s), are found in both electromotive assemblage(s), and/or other similar working electromotive/electric motor (combined) assemblage(s). Magnetic electricity energy flows through such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) permanent magnet(s) stator(s) assembly type(s), and/or permanent magnet(s) armature(s) assembly type(s), of, from, into, thru, out of, and/or between, a void (air gap) of the specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) rotor(s) assembly type(s), for the purpose of, generating magnetic electricity flux (i.e., Ideally, with a permanent magnet(s) electrical, and/or electricity, and/or electric motor(s) assembly type(s), the corresponding adjoined, and/or adjoining, permanent magnet(s) stator(s) assembly type(s), provide(s) a rotating magnetic electricity field, that drives the rotating armature(s) assembly type(s); in an electrical, and/or electricity, and/or electric, generator(s), and/or alternator(s) assembly type(s), the corresponding adjoined, and/or adjoining, permanent magnet(s) assembly type(s) stator(s) assembly type(s), converts the rotating magnetic electricity field to electric current. The stator(s) assembly type(s) can also be found in a fluid device(s), where their function(s) are dictated by the design(s), and/or intended use(s) of such device(s). Depending on the configuration(s) of a corresponding adjoined, and/or adjoining, spinning electromotive device(s), and/or similar working, corresponding adjoined, and/or adjoining, electromotive/electric motor (combined) device(s), the stator(s) assembly type(s), may act as the field magnet(s), interacting with a corresponding adjoined, and/or adjoining armature(s) assembly type(s) to create motion, or the stator(s) assembly type(s), may act as the armature(s) assembly type(s), receiving its magnetic electricity influence(s), from a corresponding adjoined, and/or adjoining moving (rotational) permanent magnet(s) rotor(s) assembly type(s)), and/or another necessary, and/or required, suitable, and/or workable, and/or configurable means, and/or ways, and/or material(s), and/or equipment assembly type(s), for the purpose of, generating, and/or transmitting, and/or transferring, and/or transiting, and/or using, and/or storing, and/or controlling, and/or communicating, and/or operating, and/or functioning, and/or hooking-up (unbroken, and/or unimpeded), magnetic electricity flux, and/or sustainable electrical power, and/or sustainable electricity supply, and/or sustainable electric driven propulsion, of, for, from, into, thru, out of, and/or between, and/or associated with a corresponding adjoined vehicle assembly type(s), and, such a corresponding adjoined, and/or adjoining, vehicle wheel assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) stator(s) assembly type(s), can be in the form of a permanent magnet(s) assembly type(s), and/or other form(s) of magnet(s) assembly type(s), and/or electromagnet(s) assembly type(s), using, and/or constructed of a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) wiring, metal(s), and/or magnet(s) assembly type(s), and/or other suitable, and/or working, and/or configurable, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or element(s), and/or composite(s), and/or equipment assembly type(s) (i.e., as assembled, and/or hooked-up, with, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s), and/or place(s), and/or protrusion(s) assembly type(s), of a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) protective housing case(s) assembly type(s) (piece(s)), and/or contour protective housing case(s) assembly type(s) (piece(s)), and, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), for the purpose of, generating, and/or transmitting, and/or transferring, and/or transiting, and/or using, receiving, and/or storing, and/or measuring, and/or diagnosing, and/or controlling, and/or communicating, and/or operating, and/or protecting, and/or insulating, and/or isolating, and/or connecting, and/or functioning, and/or hooking-up (unbroken, and/or unimpeded), magnetic electricity flux, and/or sustainable electrical power, and/or sustainable electricity supply, and/or sustainable electric driven propulsion, of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) opposing permanent magnet(s) assemblage(s) armature(s) assembly type(s), is a component of an electrical machine which carries Alternating Current (AC), (i.e., an armature, can be on either the rotor(s) assembly type(s) (rotating part), or the stator(s) assembly type(s) (stationary part) of such electrical machine(s) assembly type(s)). An armature assembly type(s), interact(s) with the magnetic electricity field (magnetic flux); the magnetic electricity field is generated by opposing magnetic interaction(s), either by permanent magnet(s) assembly type(s), or electromagnet(s) assembly type(s), and/or other magnet(s) assembly type(s), such as those formed by a conducting coil(s) assembly type(s). Armature(s) assembly type(s) must carry electricity current, so it is always a conductor, and/or a conductive coil(s). Depending on the magnetic electrical machine(s) assembly type(s), the armature(s) assembly type(s), function is either to carry electricity current across a magnetic electricity field, thus creating shaft torque in a rotating machine(s) assembly type(s), or force in a linear machine(s) assembly type(s), or to generate an electromotive force (EMF) (i.e., an electrical action produced by a non-electrical force, a device that converts other form(s) of energy into electrical energy, such as a batteries assembly type(s), and/or a generator(s), and/or alternator(s) assembly type(s), provide(s) such an (EMF) as its output). In the armature(s) assembly type(s), an electromotive force is created by the relative motion, of the armature(s) assembly type(s), and the magnetic electricity field. When the magnetic electrical machine(s) assembly type(s), or magnetic electrical motor(s) assembly type(s), is used as a motor, this electromotive force (EMF) opposes the armature(s) assembly type(s) current, and the armature(s) assembly type(s), convert(s) electrical power, to mechanical power, in the form of torque(s), and transfer(s) it via a corresponding adjoined, and/or adjoining, shaft(s) assembly type(s), and/or gear(s) assembly type(s), and/or another necessary, and/or required, suitable, and/or workable, and/or configurable, means, and/or ways, and/or material(s), and/or equipment assembly type(s). When the magnetic electrical machine(s) assembly type(s), is used as a generator(s), and/or alternator(s) assembly type(s), the armature(s) assembly type(s) electromotive force (EMF) drive(s) the armature(s) assembly type(s) current, and the corresponding adjoined, and/or adjoining, shaft(s) assembly type(s), and/or gear(s) assembly type(s) movement(s), is converted to electrical power (electrical machine(s) assembly type(s) incorporating, and/or integrating, and/or amalgamating, a corresponding adjoined, and/or adjoining, shaft(s) assembly type(s), and/or gear(s) assembly type(s)), and/or another necessary, and/or required, suitable, and/or workable, and/or configurable, means, and/or ways, and/or material(s), and/or equipment assembly type(s). Depending on the electrical machine(s) assembly type(s), the armature(s) assembly type(s) can serve several tasks. In most magnetic electrical generator(s), and/or alternator(s) assembly type(s), the field magnet(s) assembly type(s), is rotating, and is part of the rotor(s) assembly type(s), while the magnetic armature(s) assembly type(s) is stationary and is part of the stator(s) assembly type(s). Both electrical, and/or electricity, and/or electric motor(s) assembly type(s), and generator(s), or alternator(s) assembly type(s), can be built either with a stationary armature(s) assembly type(s), and a rotating field, or a rotating armature(s) assembly type(s), and, a stationary field (i.e., as configured within a two piece protective housing case(s) assembly type(s), and/or assembled together, with other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, electromotive assembly type(s), and/or similar working electromotive/electric motor (combined) assembly type(s), and, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and/or another necessary, and/or required, suitable, and/or workable, and/or configurable, means, and/or ways, and/or material(s), and/or element(s), and/or equipment assembly type(s), for the purpose of, generating, and/or receiving, and/or transmitting, and/or transferring, and/or transiting, and/or using, and/or storing, and/or controlling, and/or communicating, and/or operating, and/or functioning, and/or hooking-up, and/or cooling (unbroken, and/or unimpeded), magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding magnetic, and/or electrical, and/or electric, and/or electricity, and/or digital, and/or other actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, magnetic, and/or electrical, and/or electricity, and/or electric, and/or digital assemblage(s), and/or other associated assemblage(s) type(s), and/or other electrical, and/or electricity, and/or electric assembly type(s), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s) (unbroken, and/or unimpeded), automatically, and/or manually, and/or autonomously (wirelessly), and/or remotely, when in motion, and/or stationary. The pole piece, of a permanent magnet(s) assembly type(s), or electromagnet(s) assembly type(s), and/or another suitable, and/or workable, and/or configurable magnet(s) assembly type(s), and the moving iron and/or another necessary, and/or required, suitable, and/or workable, and/or configurable, means, and/or ways, and/or material(s), and/or equipment assembly type(s), and/or metal(s) assembly type(s), and/or composite(s) assembly type(s)) part of a solenoid assembly type(s), especially, if the latter act(s) as a switch or relay, may also be referred to as armature(s) assembly type(s), and/or another necessary, and/or required, suitable, and/or workable, and/or configurable, means, and/or ways, and/or material(s), and/or equipment assembly type(s), used for the purpose of, generating, and/or transmitting, and/or transferring, and/or transiting, and/or using, and/or storing, and/or controlling, and/or communicating, and/or operating, and/or functioning, and/or hooking-up, and/or cooling (unbroken, and/or unimpeded), magnetic electricity flux, and/or sustainable electrical power, and/or sustainable electricity supply, and/or sustainable electric driven propulsion, and/or magnetic inductive electricity charging, of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s) (unbroken, and/or unimpeded), automatically, and/or manually, and/or autonomously (wirelessly), and/or remotely, when in motion, and/or stationary.

Magnetic Inductive Charging capabilities of, for, from, into, thru, out of, and/or between, and/or associated with, such a corresponding adjoined, and/or adjoining pneumatic tire(s) assembly type(s), and, such a corresponding adjoined, and/or adjoining, vehicle wheel assembly type(s), and, a corresponding adjoined vehicle assembly type(s), and, associated component(s), part(s), mechanism(s), device(s), system(s), and/or apparatus assembly type(s), is a wireless electricity (power) transfer with the use of, and/or by way of, magnetic, and/or permanent magnet, and/or electromagnetic assembly type(s), and/or assemblages used to transfer, and/or transit, and/or receive, and/or convert, and/or use and/or store electricity, automatically, and/or manually, and/or autonomously (wirelessly), and/or remotely, when in motion, and/or stationary. Inductive charging transfer(s) and/or receive(s) energy (electricity) through inductive coupling (i.e., a proximity between a magnetic conductive assemblage(s), and a magnetic inductive assemblage(s) with the use of an electrical (power) source(s)). Electricity that is transferred, and/or received by an inductive "Pick-up(s)" assembly type(s) as Alternating Current (AC) is converted to Direct Current (DC) for use(s), and/or for storage (i.e., held within associated batteries, and/or capacitor(s) (charging)) by way of, and/or with the use of an electricity rectifier, and/or inverter assembly type(s). Greater distance between sender, and receiver coils (i.e., Pick-Up(s) assembly type(s)) can be achieved when the inductive charging system uses resonant inductive coupling (i.e., magnetic electricity coupling becomes stronger when the secondary (load bearing) side of the loosely coupled coil resonate(s)).

Magnetic Inductive Communication(s), and/or Navigation, and/or Transmission(s), and/or Connection(s) (i.e., electrical, and/or digital, and/or magnetic means, ways, or capabilities), are by way of, and/or with the use of Permanent Magnet(s) Inductive/Conductive assemblage(s), and, associated component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated protective housing case(s) assembly type(s) (piece(s)), and/or contour protective housing case(s) assembly type(s) (piece(s)) (i.e., "Exoskeleton" assemblage(s)), automatically, and/or manually, and/or autonomously (wirelessly), and/or remotely, when in motion, and/or stationary.

Such a magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding magnetic, and/or electrical, and/or electric, and/or electricity, and/or digital, and/or other actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, magnetic, and/or electrical, and/or electricity, and/or electric, and/or digital assemblage(s), and/or other associated assemblage(s) type(s), and/or other electrical, and/or electricity, and/or electric assembly type(s), is being initiated, through the spontaneous interaction(s), and/or reaction(s), that are caused by the magnetic interaction(s), and/or magnetic excitement(s) of, and/or upon, and/or between, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) permanent magnet(s) rotor(s) assembly type(s), and, permanent magnet(s) stator(s) assembly type(s), and, permanent magnet(s) armature(s) assembly type(s), and/or permanent magnet(s) inductive/conductive assemblage(s) as fully assembled (i.e., encased within a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s))), and/or contour protective housing case(s) assembly type(s) (piece(s)), that is secured (fixed) in-place within, in, into, on, onto, beneath, between, surrounding, thru, and/or throughout, and/or associated with, a corresponding adjoined, and/or adjoining channel(s) assembly type(s), and/or aperture(s) assembly type(s), and/or area(s) assembly type(s), and/or protrusion(s) assembly type(s) (by way of, and/or with the use of, a corresponding adjoined, and/or adjoining, flush mounting, and/or other, fastener(s) assembly type(s), and/or seal(s) assembly type(s), and/or sealing materials), within, in, into, on, onto, beneath, between, surrounding, thru, and/or throughout, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s)), for the purpose of, generating, and/or receiving, and/or transmitting, and/or transferring, and/or transiting, and/or using, and/or storing, and/or measuring, and/or controlling, and/or communicating, and/or operating, and/or functioning, and/or cooling, and/or hooking-up (unbroken, and/or unimpeded), such magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding magnetic, and/or electrical, and/or electric, and/or electricity, and/or digital, and/or other actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, magnetic, and/or electrical, and/or electricity, and/or electric, and/or digital assemblage(s), and/or other associated assemblage(s) type(s), and/or other electrical, and/or electricity, and/or electric assembly type(s), of, for, from, into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a magnetic electricity flux, is coming from, and/or resulting from, the spontaneous rotational magnetic interaction(s), and/or magnetic reaction(s), of, and/or upon, and/or between, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) assembly type(s) (i.e., rotor, stator, armature assembly type(s), and/or permanent magnet(s) inductive/conductive assemblage(s)), caused by (torque), and/or movement(s), and/or proximity (excitement(s)), of, and/or by, and/or upon such a corresponding adjoined, and/or adjoining, vehicle wheel assembly type(s), and/or such a corresponding adjoined, and/or adjoining pneumatic tire(s) assembly type(s), that is attached with, and/or onto, a corresponding adjoined vehicle assembly type(s), for the purpose of, generating, and/or making, and/or using, and/or storing, and/or transiting, and/or transferring, transmitting, and/or receiving, and/or controlling, and/or managing, and/or communicating, and/or operating, and/or functioning, and/or hooking-up, and/or cooling (unbroken, and/or unimpeded), such magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding magnetic, and/or electrical, and/or electric, and/or electricity, and/or digital, and/or other actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, magnetic, and/or electrical, and/or electricity, and/or electric, and/or digital assemblage(s), and/or other associated assemblage(s) type(s), and/or other electrical, and/or electricity, and/or electric assembly type(s), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and associated component(s), part(s), mechanism(s), device(s), system(s), and/or apparatus assembly type(s), automatically, and/or manually, and/or autonomously (wirelessly), and/or remotely (i.e., by physical operator(s), and/or associated physical diagnostic technician(s), and/or associated electrical, and/or digital equipment selection(s), and/or prompt(s), with the use of, and/or by way of, an associated corresponding adjoined, and/or adjoining, control(s) panel(s) assembly type(s), and/or control(s) assembly type(s), and/or associated switches assembly type(s), and/or software(s) assembly type(s), and/or operating system(s) assembly type(s), and/or computer(s) assembly type(s), and/or antennae assembly type(s), and/or satellite(s) assembly type(s), and/or spectrum(s) assembly type(s), and/or band-width(s) assembly type(s), and/or frequencies assembly type(s), and/or magnetic field(s) assembly type(s), and/or digital equipment assembly type(s), and/or another necessary, and/or required, suitable, and/or workable, and/or configurable means, and/or ways, and/or material(s), and/or element(s), and/or composite(s), and/or equipment assembly type(s) (internal, and/or external), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electromotive assemblage(s), and/or similar working, electromotive/electric motor (combined) assemblage(s), and/or permanent magnet(s) inductive/conductive assemblage(s), protective housing(s) case(s) assembly type(s) (piece(s)), and/or contour protective housing case(s) assembly type(s) (piece(s)), is secured (fixed) in-place, embedded, and/or slotted, and/or compacted, and/or packaged, and/or positioned, and/or mounted, and/or anchored, and/or orientated, and/or hooked-up, with, within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s) assembly type(s), and/or mounting plate(s) assembly type(s), and/or mooring(s) assembly type(s), and/or bracket(s) assembly type(s), and/or brace(s) assembly type(s), and/or joint(s) assembly type(s), and/or protrusion(s) assembly type(s) (with, and/or without an corresponding aperture(s) assembly type(s)), and/or flange(s) assembly type(s) (with, and/or without an corresponding aperture(s) assembly type(s)), and/or fastener(s) assembly type(s), and/or seal(s) assembly type(s), and/or sealing material(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) securing, and/or anchoring, and/or docking, and/or affixing, component(s), part(s), mechanism(s), device(s), system(s), and/or apparatus assembly type(s), and/or another necessary, and/or required, suitable, and/or workable, and/or configurable means, and/or ways, and/or material(s), and/or element(s), and/or composite(s), and/or equipment assembly type(s), that are deemed necessary, and/or required, for a corresponding chosen operating, and/or functioning, standard(s), of such corresponding adjoined, and/or adjoining assemblage(s), for the purpose of, alignment, and/or orientation, and/or placement, and/or assembly, and/or insulation, and/or isolation, and/or operating, and/or functioning, and/or securing (fixed) in-place and/or hooking-up, such assemblage(s), and, for the purpose of, preventing dangerous, and/or unwanted, oscillation(s), and/or vibration(s), and/or slippage(s), and/or movement(s), of such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s), and, a (fixed) ring-shaped (annular) rotary manifold housing (case) assembly type(s) (piece(s)), and, a ring-shaped (annular) rotary manifold shaft (cap) assembly type(s) (piece(s)), and/or a ring-shaped (annular) rotary manifold slip-ring wiring harness assembly type(s), and/or other wiring harness assembly type(s), and, vehicle junction boxes and hook-up(s) point(s) assembly type(s) (as assembled together), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s) (as assembled with, within, in, into, on, onto, beneath, between, surrounding, thru, and/or throughout, and/or associated with such a corresponding adjoined, and/or adjoining, electromotive, and/or similar working, electromotive/electric motor (combined) assemblage(s), and/or [permanent magnet(s) inductive/conductive assemblage(s) protective housing case(s) assembly type(s) (piece(s)), and/or contour protective housing case(s) assembly type(s) (piece(s)), and, a corresponding adjoined vehicle assembly type(s), and, such a corresponding adjoined, and/or adjoining vehicle wheel assembly type(s), and, such a corresponding adjoined, and/or adjoining pneumatic tire(s) assembly type(s), when, such a corresponding adjoined, and/or adjoining, vehicle wheel assembly type(s), and, such a corresponding adjoined, and/or adjoining pneumatic tire(s) assembly type(s), is mounted, and/or attached, and/or hooked-up onto, and/or with, a corresponding adjoined vehicle assembly type(s), and, when torque(s) (movement(s)) are applied, and/or when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) permanent magnet(s) electricity generating stator(s) assembly type(s), and, permanent magnet(s) armature(s) assembly type(s), and, permanent magnet(s) rotor(s) assembly type(s) (as used in a corresponding adjoined, and/or adjoining, (ring-shaped (annular), and/or other), permanent magnet(s) electricity generating assembly type(s), and/or a corresponding adjoined, and/or adjoining, (ring-shaped (annular), and/or other), permanent magnet(s) electricity motor(s) assembly type(s), and/or a corresponding adjoined, and/or adjoining, (ring-shaped (annular), and/or other), permanent magnet(s) electromotive assemblage(s), and/or other similar working, corresponding adjoined, and/or adjoining, (ring-shaped (annular), and/or other), permanent magnet(s) electromotive/electric motor (combined) assemblage(s)), is held, and/or carried, and/or operate(s), and/or function(s), and/or integrate(s), and/or amalgamate(s), and/or work(s), and/or interact(s), and/or hook(s)-up, by way of, and/or with the use of, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), for the purpose of, converting an opposing rotating magnetic field (kinetic energy, and/or magnetic electricity flux, that is generated from the rotational movement(s) (torque(s)), of an opposing corresponding adjoined, and/or adjoining, (ring-shaped (annular), and/or other), permanent magnet(s) rotor(s) assembly type(s), upon, and/or between (passing across an air gap), such a corresponding adjoined, and/or adjoining (ring-shaped (annular), and/or other), permanent magnet(s) electricity generating stator(s) assembly type(s), and/or a corresponding adjoined, and/or adjoining (ring-shaped (annular), and/or other), permanent magnet(s) armature(s) assembly type(s) (as assembled, and/or hooked-up, with, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) protective housing case(s) assembly type(s) (piece(s)), and/or contour protective housing case(s) assembly type(s) (piece(s)), and, for the purpose of, generating, and/or converting, magnetic interaction(s) (kinetic energy, and/or magnetic electricity flux), into electricity current (stator(s) assembly type(s)), and, carry alternating electricity current due to commutator action, and, converting electrical power into mechanical power in the form of torque(s) (armature(s) assembly type(s)), when such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), are in motion.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) armature(s) assembly type(s), can be on, and/or a part of, either the corresponding adjoined, and/or adjoining, (ring-shaped (annular), and/or other) permanent magnet(s) rotor(s) assembly type(s) (rotating part), or the corresponding adjoined, and/or adjoining (ring-shaped (annular), and/or other) permanent magnet(s) stator(s) assembly type(s) (opposing stationary part), depending on the corresponding adjoined, and/or adjoining (ring-shaped (annular), and/or other), permanent magnet(s) electricity generating assemblage(s), and/or similar working, permanent magnet(s) electricity generating/electric motor(s) (combined) assemblage(s), and/or placement(s), and/or configuration(s), and/or another necessary, and/or required, suitable, and/or workable, and/or configurable, means, and/or ways, and/or element(s), and/or composite(s), and/or material(s), and/or equipment assembly type(s) (i.e., as attached with, within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and/or such a corresponding adjoined, and/or adjoining pneumatic tire(s) assembly type(s)), for the purpose of, generating, and/or making, and/or exciting, and/or transiting, and/or transferring, and/or using, and/or receiving, and/or operating, and/or functioning, and/or cooling, and/or communicating, and/or controlling, and/or managing, and/or storing, magnetic electricity flux, and/or sustainable electrical power, and/or sustainable electricity supply, and/or sustainable electric driven propulsion, and/or magnetic inductive electricity charging, of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary.

Depending on the specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electricity generating assembly type(s), of such electromotive assemblage(s), and/or similar working electromotive/electric motor (combined) assemblage(s), and/or permanent magnet(s) inductive/conductive assemblage(s) (i.e., those producing, or tending to produce, and/or receive, and/or transmit, and/or transfer, an electrical, and/or electricity, and/or electric current), the specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning) permanent magnet(s) electricity generating stator(s) assembly type(s), may also act, as a corresponding adjoined, and/or adjoining, (ring-shaped (annular), and/or other), permanent magnet(s) armature assembly type(s), receiving its influence (magnetic excitability), from a corresponding adjoined, and/or adjoining, moving, and/or spinning, and/or turning, and/or rotating, field coil(s) (magnet(s) assembly type(s), and/or permanent magnet(s) assembly type(s), and/or electromagnet(s) assembly type(s), and/or another necessary, and/or required, and/or suitable, and/or workable, and/or configurable, magnetized compound(s), and/or composite(s) and/or element(s) assembly type(s), and/or wound metal wire(s) assembly type(s) (i.e., copper, and/or other metal(s), composite(s), and/or element(s) assembly type(s), or a mixture thereof), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning) opposing permanent magnet(s) assembly type(s), that make up a corresponding adjoined, and/or adjoining, (ring-shaped (annular), and/or other), permanent magnet(s) electricity generating rotor(s) assemblage(s), or, act as a corresponding adjoined, and/or adjoining, (ring-shaped (annular), and/or other), permanent magnet(s) field magnet(s) assembly type(s), that is interacting with a corresponding adjoined, and/or adjoining, (ring-shaped (annular), and/or other), permanent magnet(s) armature assembly type(s), and/or stator(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electrical, and/or electricity, and/or electric actuated, component(s), part(s), mechanism(s), device(s), system(s), and/or apparatus assembly type(s), and/or another necessary, and/or required, suitable, and/or workable, and/or configurable, means, and/or ways, and/or material(s), and/or element(s), and/or composite(s), and/or equipment assembly type(s), for the purpose of, creating motion (i.e., armature(s) assembly type(s) is a component of an electric machine(s) assembly type(s), and/or associated electrical equipment assembly type(s) which carries Alternating Current (AC), and/or Direct Current (DC)) and, for the purpose of, generating, and/or receiving, and/or making, and/or exciting, and/or transiting, and/or transferring, and/or using, and/or operating, and/or functioning, and/or cooling, and/or communicating, and/or controlling, and/or managing, and/or storing, magnetic electricity flux, and/or sustainable electrical power, and/or sustainable electricity supply, and/or sustainable electric driven propulsion, and/or magnetic inductive electricity charging, of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electrical, and/or electricity, and/or electric armature(s) assembly type(s), is formed, and/or made, and/or work(s), by way of, and/or with the use of, a corresponding adjoined, and/or adjoining, wire winding(s) (i.e., copper, and/or other necessary, and/or required, suitable, and/or workable, and/or configurable, means, and/or ways, and/or metal(s), and/or composite(s), and/or compound(s), and/or element(s), and/or material(s), and/or equipment assembly type(s), or a mixture thereof), and/or corresponding adjoined, and/or adjoining, (ring-shaped (annular), and/or other), permanent magnet(s) assembly type(s), and/or magnet(s) assembly type(s), and/or electromagnet(s) assembly type(s), for the purpose of, conducting alternating electricity current (AC), even on direct electricity current (DC) electrical, and/or electricity, and/or electric machine(s) assembly type(s).

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) armature(s) assembly type(s), and/or wire winding(s) assembly type(s), and/or a corresponding adjoined, and/or adjoining, (ring-shaped (annular), and/or other), permanent magnet(s) armature(s) assembly type(s), are for the purpose of interacting with a corresponding adjoined, and/or adjoining, (ring-shaped (annular), and/or other), opposing permanent magnetic field, and, for the purpose of, creating (magnetic electricity flux) inside, and/or within, a void (air gap), between a corresponding adjoined, and/or adjoining, (ring-shaped (annular), and/or other), permanent magnet(s) rotor(s) assembly type(s), and, a corresponding adjoined, and/or adjoining, (ring-shaped (annular), and/or other), permanent magnet(s) stator(s) assembly type(s) (i.e., adjacent to one another, however, never physically touching), and/or another necessary, and/or required, suitable, and/or workable, and/or configurable, means, and/or ways, and/or material(s), and/or element(s), and/or composite(s), and/or equipment assembly type(s) (i.e., as assembled within, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) protective housing case(s) assembly type(s) (piece(s))), and/or contour protective housing case(s) assembly type(s) (piece(s)), that is attached, with, within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), depending, on a necessary, and/or required, and/or suitable, and/or workable, and/or configurable, placement(s), and/or configuration(s), of such corresponding adjoined, and/or adjoining, assemblage(s), and, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) armature(s) assembly type(s), and/or other electricity armature(s) assembly type(s), carry electricity current, always acting as a conductor, or conductive coil assembly type(s) (i.e., a conductor is an object, or type of necessary, and/or required, and/or suitable, and/or workable, and/or configurable, metal(s), and/or material(s), and/or element(s), and/or compound(s), and/or composite(s), and/or properties assembly type(s)), for the purpose of, allowing the flow of an electricity charge in one, or more directions. Such necessary, and/or required, and/or suitable, and/or workable, metal(s), and/or material(s), and/or element(s), and/or compound(s), and/or composite(s), and/or properties assembly type(s), are common electrical conductor(s), oriented normal to both the field, and, to the direction of motion (i.e., torque on a permanent magnet(s) electrical rotating assembly type(s)), or (force) for a permanent magnet(s) electrical linear machine assembly type(s)).

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) armature(s) assembly type(s), work is twofold; first, to carry electricity current across an opposing permanent magnet(s) assembly type(s) field that is creating torque(s), in a corresponding adjoined, and/or adjoining, (ring-shaped (annular), and/or other), permanent magnet(s) rotating electricity generating assemblage(s), and/or a similar working corresponding adjoined, and/or adjoining permanent magnet(s) rotating electricity generating/electricity motor (combined) assemblage(s), and, second, to generate an electromotive force (EMF). When a corresponding adjoined, and/or adjoining, permanent magnet(s) rotor(s) assembly type(s), and/or permanent magnet(s) stator(s) assembly type(s), and/or permanent magnet(s) armature(s) assembly type(s), is used for an electricity generating assemblage(s), and/or similar working, electricity generating/electricity motor(s) (combined) assemblage(s) (i.e., as assembled, and/or installed, and/or hooked-up, with, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s) assembly type(s), and/or protrusion(s) assembly type(s), of a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s) protective housing case(s) assembly type(s) (piece(s)), and/or contour protective housing case(s) assembly type(s) (piece(s)), and, the body of a corresponding adjoined vehicle assembly type(s), and, the body of such a corresponding adjoined, and/or adjoining, vehicle wheel assembly type(s), and/or such a corresponding adjoined, and/or adjoining pneumatic tire(s) assembly type(s), the corresponding adjoined, and/or adjoining, armature(s) assembly type(s) electro-magnetic field (EMF), drives the corresponding adjoined, and/or adjoining, armature(s) assembly type(s) electricity current, and, the opposing movement is converted into magnetic electricity flux, and/or sustainable electrical power, and/or sustainable electricity supply, and/or sustainable electric driven propulsion, and/or magnetic inductive electricity charging, automatically, and/or manually, and/or autonomously (wirelessly), and/or remotely, when in motion.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive assemblage(s), and/or similar working, electromotive/electric motor combined assemblage(s), and/or permanent magnet(s) inductive/conductive assemblage(s) (i.e., a permanent magnet(s) electricity generating assembly type(s), and/or a corresponding adjoined, and/or adjoining, (ring-shaped (annular), and/or other), rotary permanent magnet(s) electricity generating assembly type(s), and/or a corresponding adjoined, and/or adjoining, (ring-shaped (annular), and/or other), direct-drive permanent magnet(s) rotary electricity generating assembly type(s), and/or a corresponding adjoined, and/or adjoining, (ring-shaped (annular), and/or other), permanent magnet(s) rotary electricity generating turbine assembly type(s), and/or a corresponding adjoined, and/or adjoining, (ring-shaped (annular), and/or other), axial flux permanent magnet(s) electricity generator(s)/motor(s) (combined) assembly type(s), and/or a corresponding adjoined, and/or adjoining, (ring-shaped (annular), and/or other), axial flux permanent magnet(s) electricity generator(s) assembly type(s), and/or a corresponding adjoined, and/or adjoining, (ring-shaped (annular), and/or other), permanent magnet(s) electricity generating dynamo assembly type(s), and/or a corresponding adjoined, and/or adjoining, (ring-shaped (annular), and/or other), permanent magnet(s) electricity generating magneto(s) assembly type(s), and/or a corresponding adjoined, and/or adjoining, (ring-shaped (annular), and/or other), permanent magnet(s) synchronous electricity generator assembly type(s), and/or a permanent magnet(s) inductive/conductive assemblage(s), and/or another necessary, and/or required, suitable, and/or workable, and/or configurable means, and/or ways, and/or materials, and/or element(s), and/or composite(s), and/or equipment assembly type(s)), is assembled, and/or integrate(s), and/or attaches, and/or operate(s), and/or function(s), and/or hook(s)-up, with, within, in, into, on, onto, beneath, between, surrounding, thru, and/or throughout, and/or is associated with other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and, a ring-shaped (annular) rotary manifold assembly type(s) (piece(s)), and/or a ring-shaped (annular) rotary manifold slip-ring wiring harness assembly type(s), and/or other wiring harness assembly type(s), and, a vehicle junction boxes and hook-up(s) point(s) assembly type(s) (with the use of, and/or by way of, flush mounting corresponding adjoined, and/or adjoining, fastener(s) assembly type(s), and/or seal(s) assembly type(s), and/or sealing material(s), and/or joint(s) assembly type(s), and/or ball bearing(s) assembly type(s), and/or sealed ball bearing(s) assembly type(s), and/or ball bearing track(s) assembly type(s), and/or another necessary, and/or required, suitable, and/or workable, and/or configurable sealing, and/or fastening means, and/or ways, and/or material(s), and/or element(s), and/or composite(s), and/or equipment assembly type(s), with, within, in, into, on, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s) assembly type(s), and/or protrusion(s) assembly type(s), of the body of a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblages, and/or permanent magnet(s) inductive/conductive assemblage(s) protective housing case(s) assembly type(s) (piece(s)), and/or contour protective housing case(s) assembly type(s) piece(s), and, the body of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), for the purpose of, assembling, and/or orienting, and/or insulating, and/or isolating, and/or controlling, and/or communicating, and/or amalgamating, and/or interacting, and/or aligning, and/or positioning, and/or compacting, and/or packaging, and/or connecting, and/or integrating, and/or amalgamating, and/or operating, and/or functioning, and/or working, and/or protecting, and/or shielding, and/or hooking-up, such corresponding adjoined, and/or adjoining, assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s) (unbroken, and/or unimpeded), automatically, and/or manually, and/or autonomously (wirelessly), and/or remotely, when in motion, and/or stationary, and, for the purpose of, hooking-up, and/or connecting, and/or generating, and/or using, and/or storing, and/or transiting, and/or transferring, and/or transmitting, and/or receiving, and/or controlling, and/or communicating, and/or managing, and/or working, and/or operating, and/or functioning, and/or cooling, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding magnetic, and/or electrical, and/or electric, and/or electricity, and/or digital, and/or other actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, magnetic, and/or electrical, and/or electricity, and/or electric, and/or digital assemblage(s), and/or other associated assemblage(s) type(s), and/or other electrical, and/or electricity, and/or electric assembly type(s), (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary.

Such a permanent magnet(s) electricity generating apparatus assembly type(s), and/or a corresponding adjoined, and/or adjoining, (ring-shaped (annular), and/or other), rotary permanent magnet(s) electricity generator(s) assembly type(s), and/or a corresponding adjoined, and/or adjoining, (ring-shaped (annular), and/or other), direct-drive permanent magnet(s) rotary electricity generator(s) assembly type(s), and/or a corresponding adjoined, and/or adjoining, (ring-shaped (annular), and/or other), permanent magnet(s) rotary electricity generating turbine assembly type(s), and/or a corresponding adjoined, and/or adjoining, (ring-shaped (annular), and/or other), axial flux permanent magnet(s) electricity generator(s)/motor(s) (combined) assembly type(s), and/or a corresponding adjoined, and/or adjoining, (ring-shaped (annular), and/or other), axial flux permanent magnet(s) electricity generator(s) assembly type(s), and/or a corresponding adjoined, and/or adjoining, (ring-shaped (annular), and/or other), permanent magnet(s) electricity generating dynamo assembly type(s), and/or a corresponding adjoined, and/or adjoining, (ring-shaped (annular), and/or other), permanent magnet(s) electricity generating magneto(s) assembly type(s), and/or a corresponding adjoined, and/or adjoining, (ring-shaped (annular), and/or other), permanent magnet(s) synchronous electricity generator assembly type(s), and/or other corresponding adjoined, and/or adjoining, similar working, (ring-shaped (annular), and/or other), permanent magnet(s) electromotive assemblage(s), and/or other corresponding adjoined, and/or adjoining, similar working (ring-shaped (annular), and/or other), permanent magnet(s) electromotive/electric motor (combined) assemblage(s), and/or permanent magnet(s) inductive/conductive assemblage(s), and, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and, a ring-shaped (annular) rotary manifold assembly type(s) (piece(s)), and/or a ring-shaped (annular) rotary manifold slip-ring wiring harness assembly type(s), and/or other wiring harness assembly type(s), and, a vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), that are held, and/or carried, and/or secured (fixed) in-place, and/or operate, and/or function, and/or work, and/or hook-up, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or apertures(s) assembly type(s), and/or area(s) assembly type(s), and/or protrusion(s) assembly type(s) of a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), are made of specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), comprising, but, are not exclusive to, namely; metal(s) assembly type(s), and/or metal alloy(s) assembly type(s), and/or plastic(s) assembly type(s), and/or permanent magnet(s) assembly type(s), and/or electromagnet(s) assembly type(s), and/or magnet(s) assembly type(s), and/or synthetic(s) material(s) assembly type(s), and/or polymer(s) assembly type(s), and/or rubber material(s) assembly type(s), and/or vulcanized rubber assembly type(s), and/or composite(s) assembly type(s), and/or graphene(s) assembly type(s), and/or composite(s) type(s), and/or carbon fiber(s) type(s), and/or polymer(s) type(s), and/or polyimide(s) type(s), and/or thermoplastic(s) type(s), and/or thermoset(s) type(s), and/or elastomer(s) type(s), and/or textile(s) type(s), and/or silicone(s) type(s), and/or rubber type(s), and/or compound(s) type(s), and/or other element(s) type(s), and/or another necessary, and/or required, suitable, and/or workable, and/or configurable, metal(s) assembly type(s), and/or compound(s) assembly type(s), and/or element(s) assembly type(s), and/or composite(s) assembly type(s), and/or graphene(s) assembly type(s), and/or another necessary, and/or required, suitable, and/or workable, and/or configurable means, and/or ways, and/or element(s), and/or material(s), and/or equipment assembly type(s) (depending on a necessary, and/or required, corresponding application(s), and/or use(s), and/or operating, and/or functioning standard(s), and/or purpose(s), and/or task(s), and/or environment(s), and/or governance by international, and/or world-wide, and/or country specific law(s), and/or unified state(s) law(s), and/or state(s) law(s), and/or regulation(s) and/or standard(s), and/or homologation, and/or other governance, of such electromotive assemblage(s), and/or similar working, electromotive/electric motor (combined) assemblage(s), and/or permanent magnet(s) inductive/conductive assemblage(s), for the purpose of, generating, and/or making, and/or exciting, and/or transiting, and/or transferring, and/or transmitting, and/or receiving, and/or using, and/or operating, and/or functioning, and/or cooling, and/or diagnosing, and/or measuring, and/or protecting, and/or communicating, and/or controlling, and/or managing, and/or storing, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or other corresponding magnetic, and/or electrical, and/or electric, and/or electricity, and/or digital, and/or other actuated, operation(s), and/or function(s), and/or purpose(s), and/or task(s), that are deemed necessary, and/or required, for a corresponding chosen operating, and/or functioning, standard(s), of such corresponding adjoined, and/or adjoining assemblage(s), and/or other corresponding adjoined, and/or adjoining, magnetic, and/or electrical, and/or electricity, and/or electric, and/or digital assemblage(s), and/or other associated assemblage(s) type(s), and/or other electrical, and/or electricity, and/or electric assembly type(s), of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) is built, and/or made-up, using various material(s) assembly type(s), and/or element(s) assembly type(s), and/or composite(s) assembly type(s), that comprise, but, are not exclusive to, namely; metal(s) type(s), and/or non-ferrous metal(s) type(s), and/or magnet(s), and/or permanent magnet(s), and/or electromagnet(s) assemblage(s), and/or metal alloy(s) type(s), and/or composite(s) type(s), and/or carbon fiber(s) type(s), and/or synthetic(s) type(s), and/or polymer(s) type(s), and/or plastic(s) type(s), and/or polyimide(s) type(s), and/or thermoplastic(s) type(s), and/or thermoset(s) type(s), and/or elastomer(s) type(s), and/or textile(s) type(s), and/or vulcanized rubber type(s), and/or vulcanized silicone(s) type(s), and/or rubber type(s), and/or compound(s) type(s), and/or element(s) type(s), and/or another necessary, and/or required, suitable, and/or workable, and/or configurable, metal(s) assembly type(s), and/or compound(s) assembly type(s), and/or element(s) assembly type(s), and/or composite(s) assembly type(s), and/or graphene(s) assembly type(s) and/or material(s) assembly type(s), and/or means, and/or ways, and/or equipment, assembly type(s), for the purpose of, shielding, and/or isolating, and/or insulating, and/or generating, and/or making, and/or exciting, and/or receiving, and/or transiting, and/or transferring, and/or transmitting, and/or using, and/or operating, and/or functioning, and/or cooling, and/or communicating, and/or controlling, and/or managing, and/or storing, and/or hooking-up magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or another necessary, and/or required, suitable, and/or workable, and/or configurable, magnetic, and/or permanent magnet, and/or electromagnetic operation(s), and/or function(s), and/or purpose(s), and/or task(s) (unbroken, and/or unimpeded), of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s) automatically, and/or manually, and/or autonomously (wirelessly), and/or remotely, when in motion, and/or stationary.

Such an electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" (outer skeleton) assemblage(s)) has, and/or is holding, and/or carrying, and/or hooking-up, with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) protrusion(s) assembly type(s), and/or flange(s) assembly type(s) (with, and/or without corresponding adjoined, and/or adjoining aperture(s) assembly type(s)), and/or channel(s) assembly type(s), and/or protrusion(s) assembly type(s), and/or area(s) assembly type(s), for the purpose of allowing, and/or enabling, and/or facilitating, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) to be assembled, and/or installed, and/or embedded, and/or slotted, and/or compacted, and/or packaged, and/or positioned, and/or orientated, and/or aligned, and/or secured (fixed), in-place, and/or hooked-up (i.e., with the use of, and/or by way of, a corresponding adjoined, and/or adjoining, flush mounting fastener(s) assembly type(s), and/or bracket(s) assembly type(s), and/or tie rod(s) assembly type(s), and/or mount(s) assembly type(s), and/or seal(s) assembly type(s), and/or sealing material(s) assembly type(s)), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) anchoring assemblage(s), and, mooring assemblage(s), and, component(s), part(s), mechanism(s), device(s), system(s), and/or apparatus assembly type(s), that are deemed necessary, and/or required, and/or suitable, and/or workable, and/or configurable, for a corresponding chosen operating, and/or functioning standard(s), of such corresponding adjoined, and/or adjoining, assemblage(s), within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s) assembly type(s), and/or protrusion(s) assembly type(s) of the body (architecture) of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, for the purpose of, mitigating dangerous wobbling, and/or gyration(s), and/or oscillation(s), and/or vibration(s), and/or electrical shortage(s), and/or electrical mishap(s), and/or other mishap(s), and/or irregularities of, for, from, into, thru, out of, and/or between, and/or upon, and/or associated with such corresponding adjoined, and/or adjoining assemblage(s), that is caused by high-speed(s), and/or torque(s), and/or movement(s), and/or use(s) of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), when in motion, and/or stationary, and, for the purpose of, generating, and/or using, and/or receiving, and/or transiting, and/or transferring, and/or transmitting, and/or operating, and/or functioning, and/or storing, and/or communicating, and/or controlling, and/or recording, and/or measuring, and/or managing, and/or cooling, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or magnetic connection(s), and/or another necessary, and/or required, suitable, and/or workable, and/or configurable, magnetic, and/or permanent magnet, and/or electromagnetic operation(s), and/or function(s), and/or purpose(s), and/or task(s) (unbroken, and/or unimpeded), of, for, from into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electromotive, and/or similar working electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) has, and/or is holding, and/or carrying, and/or operating, and/or functioning, and/or integrating, and/or amalgamating, and/or using, and/or interacting, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) cooling, and/or temperature maintenance component(s), part(s), mechanism(s), device(s), system(s), and/or apparatus assembly type(s), for the purpose of dissipating heat, and/or high-temperature(s) build-up, as a result of interaction(s), caused by rotation(s), and/or movement(s), and/or use(s) between, and/or upon, a corresponding adjoined, and/or adjoining, opposing permanent magnet(s) assembly type(s) (i.e., rotor(s), stator(s), and/or armature(s) assembly type(s), and/or other associated magnetic, permanent magnet(s), and/or electromagnetic assemblage(s)), that are part of a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) magnetic, and/or permanent magnet(s), and/or electromagnetic electromotive assemblage(s), and/or a similar working, permanent magnet(s) electromotive/electric motor (combined) assemblage(s), and/or permanent magnet(s) inductive/conductive assemblage(s), and/or other similar working, electromotive assemblage(s), and/or electromotive/electric motor (combined) assemblage(s), and/or permanent magnet(s) inductive/conductive assemblage(s) that have, and/or hold, and/or carry, and/or operate, and/or function, and/or hook-up, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) assembly type(s), and/or opposing permanent magnet(s) assembly type(s), and/or magnet(s) assembly type(s), and/or electromagnet(s) assembly type(s), and/or rotor(s) assembly type(s), and/or stator(s) assembly type(s), and/or armature(s) assembly type(s), and, for the purpose of, generating, and/or using, and/or transiting, and/or receiving, and/or transmitting, and/or transferring, and/or operating, and/or functioning, and/or storing, and/or communicating, and/or controlling, and/or managing, and/or cooling, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or another necessary, and/or required, suitable, and/or workable, and/or configurable, magnetic, and/or permanent magnet, and/or electromagnetic operation(s), and/or function(s), and/or purpose(s), and/or task(s) (unbroken, and/or unimpeded), of, for, from into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) cooling, and/or temperature(s), maintenance component(s), part(s), mechanism(s), device(s), system(s), and/or apparatus assembly type(s), facilitate, and/or aid, and/or enable, the dissipation of heat build, and/or high-temperature(s), with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) cooling fin(s) assembly type(s), and/or shape(s) assembly type(s), and/or channel(s) assembly type(s), and/or aperture(s) assembly type(s), and/or area(s) assembly type(s), and/or protrusion(s), and/or connection(s), and/or plug(s), and/or socket(s), and/or valve(s), and/or hook-up(s) of, within, in, into, on, onto, beneath, between, surrounding, thru, and/or throughout, and/or associated with, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) electromotive, and/or similar working, electromotive/electric motor combined) assemblage(s), and/or permanent magnet(s) inductive/conductive assemblage(s) protective housing case(s) assembly type(s) (piece(s)), and/or contour protective housing case(s) assembly type(s) (piece(s)), and/or with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), that is injecting, and circulating, liquid(s), and/or fluid(s), and/or coolant(s), and/or cooling protocol(s), (i.e., compressed air, and/or natural air, and/or water, and/or water-glycol (mix) type(s), and/or oil(s) type(s), and/or oil(s) (mix) type(s), and/or another necessary, and/or required, suitable, and/or workable, and/or configurable liquid(s), and/or fluid(s), and/or gases substance(s), and/or element(s), and/or material(s) with, and/or at, a controlled pressure(s), and/or temperature(s), and/or flow(s), and/or transit(s), and/or transfer(s), and/or measurable rate(s)), of, for, from, into, thru, out of, and/or between, and/or associated with, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary.

Such coolant(s), and/or cooling protocol(s), is supplied, and/or generated, and/or controlled, and/or managed, and/or communicated, and/or hooked-up, with the use of, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; a pump(s) assembly type(s), and/or injection assembly type(s), and/or storage vessel(s) assembly type(s), and/or storage tank(s) assembly type(s), and/or storage chamber(s) assembly type(s), and/or reservoir assembly type(s), and/or hose(s) assembly type(s), and/or tube(s) assembly type(s), and/or pipe(s) assembly type(s), and/or valve(s) assembly type(s), and/or sensor(s) assembly type(s), and/or circuit(s), and/or actuator(s) assembly type(s), and/or connection(s) assembly type(s), and/or wiring assembly type(s), and/or line(s) assembly type(s), and/or socket(s) assembly type(s), and/or plug(s) assembly type(s), and/or hook-up(s) assembly type(s), and/or a (fixed) ring-shaped (annular) rotary manifold assembly type(s) (piece(s)), and/or a ring-shaped (annular) rotary manifold slip-ring wiring harness assembly type(s), and/or other wiring harness assembly type(s), and/or a vehicle junction boxes and hook-up(s) point(s) assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) wiring harness assembly type(s), and/or wiring assembly type(s), and/or component(s), part(s), mechanism(s), device(s), system(s), and/or apparatus assembly type(s), and/or another necessary, and/or required, suitable, and/or workable, and/or configurable, means, and/or ways, and/or material(s), and/or element(s), and/or composite(s), and/or equipment assembly type(s) within, in, into, on, onto, beneath, between, surrounding, thru, and/or throughout, and/or associated with, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), for the purpose of, withstanding extreme environmental, and/or, use condition(s) (heat, and/or high temperature(s), and/or other temperature(s) variation(s), caused by rotational interaction(s), of the opposing permanent magnet(s) assemblage(s), (upon, and/or between one another; E.g., maximum power densities automated, and/or manually selected permanent magnet(s) gearing ratio(s) assembly type(s), and/or other internal, and/or external factor(s)), as applied to, and/or operating, and/or functioning, with, and/or by, and/or between, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning) permanent magnet(s), and/or other magnet(s), electromotive, and/or electromotive/electric motor (combined) assemblage(s), and/or permanent magnet(s) inductive/conductive assemblage(s) that are operating, and/or functioning, and/or integrating, and/or amalgamating, and/or working, and/or hooking-up, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) assemblages, and/or other inductive/conductive assemblage(s), and/or associated gear(s) assembly type(s), and/or associated permanent magnet(s) gearboxes assembly type(s), and/or associated conventional (mechanical, and/or other) gear(s) assembly type(s), and/or associated conventional (mechanical, and/or other) gearboxes assembly type(s), and/or associated hook-up(s) (i.e., those found, and/or operating, and/or hooking-up, with, within, in, into, on, onto, beneath, between, surrounding, thru, and/or throughout, and/or associated with a corresponding adjoined, and/or adjoining, (ring-shaped (annular), and/or other), permanent magnet(s) axial flux generator(s) assembly type(s), and/or permanent magnet(s) axial flux motor(s) assembly type(s), and/or permanent magnet(s) axial flux generator/motor (combined) assemblage(s)), and/or other similar working, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electricity generating assemblage(s), and/or electricity generating/electric motor (combined) assemblage(s), and/or inductive/conductive assemblage(s) of, for, from, into, thru, out of, and/or between, and/or associated with such a corresponding adjoined, and/or adjoining, vehicle wheel assembly type(s), and, a corresponding adjoined vehicle assembly type(s), and, such a corresponding adjoined, and/or adjoining pneumatic tire(s) assembly type(s), and, for the purpose of, generating, and/or using, and/or receiving, and/or transmitting, and/or transiting, and/or transferring, and/or operating, and/or functioning, and/or storing, and/or communicating, and/or controlling, and/or measuring, and/or recording, and/or managing, and/or cooling, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or another necessary, and/or required, suitable, and/or workable, and/or configurable, magnetic, and/or permanent magnet, and/or electromagnetic operation(s), and/or function(s), and/or purpose(s), and/or task(s) (unbroken, and/or unimpeded), of, for, from into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such an electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), has, and/or is holding, and/or carrying, and/or operating, and/or functioning, and/or integrating, and/or amalgamating, and/or interacting, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) inner (annular), and/or outer (annular), casing wall(s) assembly type(s), and/or casing cover(s) assembly type(s), and/or hook-up(s) point(s) assembly type(s), that has, and/or is holding, and/or carrying, and/or operating, and/or functioning, and/or integrating, and/or amalgamating, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) cooling fin(s) assembly type(s), and/or vent(s) assembly type(s), and/or channel(s) assembly type(s), and/or aperture(s) assembly type(s), and/or area(s) assembly type(s), and/or protrusion(s) assembly type(s), and/or flap(s), assembly type(s), and/or vent(s) assembly type(s), and/or fan(s) assembly type(s), and/or gate(s) assembly type(s), for the purpose of allowing, and/or enabling, built-up heat, and/or high-temperature(s) to dissipate out, and, for the purpose of, directing, and/or steering, and/or circulating, and/or venting, natural air flow(s) (air supply from the external environment), and other operation(s), and/or function(s), and/or purpose(s), and/or task(s) of, for, from, into, thru, out of, and/or between, and/or associated with such a corresponding adjoined, and/or adjoining electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, other associated component(s), part(s), mechanism(s), device(s), system(s), and/or apparatus assembly type(s), within, in, in, into, on, onto, beneath, between, surrounding, thru, and/or throughout, and/or associated with such a corresponding adjoined, and/or adjoining electromotive, and/or similar working, electromotive/electric motor (combined) assemblage(s), and/or permanent magnet(s) inductive/conductive assemblage(s), protective housing case(s) assembly type(s) (piece(s)), and/or contour protective housing case(s) assembly type(s) (piece(s)), and, and, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s) automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnet, and/or permanent magnet, and/or electromagnetic assembly type(s), and/or other, (stationary, and/or fixed, and/or moving, and/or rotating, and/or spinning, and/or turning) air cooling fin(s) assembly type(s), and/or cooling fin(s) assembly type(s), and/or vent(s) assembly type(s), and/or fan(s) assembly type(s), and/or gate(s) assembly type(s), and/or flap(s), and/or actuator(s), and/or hose(s), and/or pipe(s), and/or wire(s), and/or wiring harness, and/or hook-up(s), and/or valve(s), assembly type(s), and/or protrusion(s) assembly type(s) and/or channel(s) assembly type(s), and/or aperture(s) assembly type(s), and/or area(s) assembly type(s), and/or other associated component(s), part(s), mechanism(s), device(s), system(s), and/or apparatus assembly type(s), within, in, into, on, onto, beneath, between, surrounding, thru, and/or throughout, and/or associated with, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), are for the purpose of, drawing, and/or directing, and/or funneling, natural air flow(s) of, for, from, into, thru, out of, and/or between such assemblage(s) (externally or internally), and/or dissipating internal heat, for cooling, and/or managing, heat build, and/or high-temperature(s), of, for, from, into, thru, out of, and/or between, and/or associated with a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive permanent magnet(s) assemblage(s), and/or other similar working, electromotive/electric motor (combined) permanent magnet(s) assemblage(s), and/or permanent magnet(s) inductive/conductive assemblage(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic, and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary.

Moving, and/or directing, and/or funneling, of natural air, and/or ambient air flow(s) from the external environment, and/or dissipating internal heat, for cooling, and/or managing, heat build, and/or high-temperature(s), of, and/or upon, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), is also generated, and/or provided, and/or aided, and/or enabled, and/or facilitated by way of, the continual rotational movement(s) (torque(s)), of, and/or by, such a corresponding adjoined, and/or adjoining, vehicle wheel assembly type(s), and/or such a corresponding adjoined, and/or adjoining pneumatic tire(s) assembly type(s), when mounted, and/or attached, and/or hooked-up with, and/or onto, a corresponding adjoined vehicle assembly type(s), automatically, and/or manually, and/or autonomously (wirelessly), and/or remotely, when, in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) electromotive, and/or electromotive/electric motor (combined) assemblage(s), and/or permanent magnet(s) inductive/conductive assemblage(s) within, in, into, on, onto, beneath, between, surrounding, thru, and/or throughout, and/or associated with a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), are for the purpose of, reducing maintenance, and, improving reliability, and/or protection, and/or insulation, and/or organization, and/or offering overload protection(s), and/or providing cooling and/or venting of associated component(s), part(s), mechanism(s), device(s), system(s), and/or apparatus assembly type(s) caused by excessive high-torque(s), and/or movement(s), and/or excessive rotational speed(s), and/or proximity, and/or other causation(s) of, for, from, into, thru, out of, upon, and/or between, and/or associated with, such corresponding adjoined, and/or adjoining, permanent magnet(s) electromotive assemblage(s), and/or other similar working, corresponding adjoined, and/or adjoining, electromotive/electric motor (combined) assemblage(s), and/or permanent magnet(s) inductive/conductive assemblage(s), and/or for other associated operation(s), and/or function(s), and/or purpose(s) and/or task(s) of, for, from, into thru, out of and/or between and/or associated with such magnet, and/or permanent magnet, and/or electromagnetic assemblage(s) within, in, into, on, onto, beneath, between, surrounding, thru, and/or throughout, and/or associated with such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) permanent magnet(s) gear(s) assembly type(s), and/or permanent magnet(s) gear boxes assemblage(s), offer an advantage over conventional mechanical gear(s), and/or mechanical gearing, and/or mechanical gear boxes assembly type(s), that are susceptible, and/or at risk, of ruin, and/or gear teeth wear and tear, as a result of such high rotational torque(s) and/or movement(s) of such electromotive, and/or similar working, electromotive/electric motor (combined) assemblage(s).

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), allow, and/or enable, a more compact, and/or thinner final assemblage(s), and/or hook-up(s) of such corresponding adjoined, and/or adjoining, permanent magnet(s) electromotive assemblage(s), and/or other similar working, corresponding adjoined, and/or adjoining, permanent magnet(s) electromotive/electric motor (combined) assemblage(s), and/or permanent magnet(s) inductive/conductive assemblage(s). However, high rotational movement(s) (torque(s)), applied from a corresponding adjoined, and/or adjoining, (ring-shaped (annular), and/or other), permanent magnet(s) rotor(s) assemblage(s), on, and/or upon, and/or between, a corresponding adjoined, and/or adjoining, (ring-shaped (annular), and/or other), stationary opposing permanent magnet(s) stator(s) assemblage(s), and/or a corresponding adjoined, and/or adjoining, (ring-shaped (annular), and/or other), stationary opposing permanent magnet(s) armature(s) assemblage(s), and/or permanent magnet(s) inductive/conductive assemblage(s), may, have the tendency to overheat (overload) from time to time, whilst interacting with, and/or upon, and/or between, one another, during the processes, and/or interaction(s) (movement(s), and/or torque(s)), that are causing magnetic electricity flux. If, and/or when, such overloading occurs with, and/or between, and/or upon, such a corresponding adjoined, and/or adjoining, (ring-shaped (annular), and/or other), opposing permanent magnet(s) electromotive assemblage(s), and/or other similar working, corresponding adjoined, and/or adjoining, opposing permanent magnet(s) electromotive/electric motor (combined) assemblage(s), and/or permanent magnet(s) inductive/conductive assemblage(s), such assemblage(s) (i.e., as assembled, and/or held and/or carried, and/or operated, and/or hooked-up, within, in, into, on, onto, beneath, between, surrounding, thru, and/or throughout, and/or associated with, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), have the ability (through, and/or by way of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) sensor(s) assembly type(s), and/or circuit(s) assembly type(s), and/or plug(s) assembly type(s), and/or socket(s) assembly type(s), and/or wiring harness assembly type(s), and/or hook-up point(s), and/or control(s) assembly type(s), and/or control(s) panel(s) assembly type(s), and/or switches assembly type(s) and/or microprocessor(s) assembly type(s), and/or software(s) assembly type(s), and/or operating system(s) assembly type(s), and/or spectrum(s) assembly type(s), and/or digital signal(s) assembly type(s), and/or cloud based software(s) assembly type(s), and/or cloud based computer(s) assembly type(s), and/or actuator(s) assembly type(s), and/or antennae assembly type(s), and/or associated satellite system(s) assembly type(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with a corresponding adjoined vehicle assembly type(s), and, such a corresponding adjoined, and/or adjoining, vehicle wheel assembly type(s), and/or such a corresponding adjoined, and/or adjoining pneumatic tire(s) assembly type(s), and/or other associated assemblage(s) (when, and/or as assembled together), to automatically, and/or manually, and/or autonomously (wirelessly), and/or remotely, temporarily, disengage(s) such a corresponding adjoined, and/or adjoining, (ring-shaped (annular), and/or other), permanent magnet(s) assemblage(s), and, opposing permanent magnet(s) assemblage(s), from one another, as deemed necessary, and/or required, for a corresponding chosen operating, and/or functioning standard(s), of such corresponding adjoined, and/or adjoining, (ring-shaped (annular), and/or other), permanent magnet(s) assemblage(s), and, remain idle, and/or disconnected, until a corresponding chosen re-engage criteria(s) (cooling), and/or signal(s) has been fulfilled, for the purpose of, protecting, and/or safely operating, and/or functioning, such corresponding adjoined, and/or adjoining, (ring-shaped (annular), and/or other), permanent magnet(s) electromotive assemblage(s), and/or other similar working, corresponding adjoined, and/or adjoining, (ring-shaped (annular), and/or other), permanent magnet(s) electromotive/electric motor (combined) assemblage(s) from overheating, and/or potential hazardous overheating situation(s), and/or another necessary, and/or required, suitable, and/or workable, and/or configurable, means, and/or ways, and/or element(s), and/or material(s), and/or equipment assembly type(s) to achieve protection(s), and/or safety for a corresponding chosen operating, and/or functioning standard(s) of such permanent magnet(s) inductive/conductive assemblage(s), automatically, and/or manually, and/or autonomously (wirelessly), and/or remotely, when in motion, and/or stationary.

Such a corresponding adjoined, and/or adjoining, vehicle wheel assembly type(s), and, such a corresponding adjoined, and/or adjoining pneumatic tire(s) assembly type(s) and, a corresponding adjoined vehicle assembly type(s), has and/or hold(s), and/or carries, and/or is operating, and/or functioning, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) permanent magnet(s) assemblage(s), and/or permanent magnet(s) inductive/conductive assemblage(s), and/or a corresponding adjoined, and/or adjoining, (ring-shaped (annular), and/or other) permanent magnet(s) gear(s) assembly type(s), and/or a corresponding adjoined, and/or adjoining, (ring-shaped (annular), and/or other), permanent magnet(s) gear boxes assemblage(s), and/or a corresponding adjoined, and/or adjoining, (ring-shaped (annular), and/or other), permanent magnet(s) rotor(s) assembly type(s), and/or a corresponding adjoined, and/or adjoining, (ring-shaped (annular), and/or other), permanent magnet(s) stator(s) assembly type(s), and/or a corresponding adjoined, and/or adjoining, (ring-shaped (annular), and/or other), permanent magnet(s) armature(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), for the purpose of, converting kinetic energy into electrical energy (magnetic electricity flux), and/or electrical energy into kinetic energy (i.e., kinetic energy (KE) of an object, is the energy that it possesses due to its motion. It is defined, as the work needed to accelerate the body of a given mass from rest to its stated velocity. Having gained this energy during its acceleration, the body maintains this kinetic energy (KE)), and/or for the purpose of, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or another necessary, and/or required, suitable, and/or workable, and/or configurable, magnetic, and/or permanent magnet, and/or electromagnetic operation(s), and/or function(s), and/or purpose(s), and/or task(s) (unbroken, and/or unimpeded).

Such magnetic electricity flux, and/or sustainable electrical power, and/or sustainable electricity supply, and/or sustainable electric driven propulsion, is created, and/or generated by, such a corresponding adjoined, and/or adjoining, (ring-shaped (annular), and/or other), permanent magnet(s) electromotive assemblage(s), and/or other similar working, corresponding adjoined, and/or adjoining, (ring-shaped (annular), and/or other), permanent magnet(s) electromotive/electric motor (combined) assemblage(s) (i.e., a sustainable electrical energy (magnetic electricity flux) that is collected, and/or generated, and/or transmitted, and/or transferred, from a corresponding adjoined, and/or adjoining, (ring-shaped (annular), and/or other), rotating, and/or continually moving, permanent magnet(s) assemblage(s) (source), onto, and/or upon, and/or between, other corresponding adjoined, and/or adjoining, (ring-shaped (annular), and/or other), stationary, and/or opposing, permanent magnet(s) assemblage(s) (E.g. similar to those corresponding adjoined, and/or adjoining, (ring-shaped (annular), and/or other), permanent magnet(s) electricity generator(s) assemblage(s) that are found within, and/or held by, and/or operating, and/or functioning, as part of, a permanent magnet(s) electricity generator(s) Wind Turbine(s) assembly type(s)), and/or another necessary, and/or required, suitable, and/or workable, and/or configurable means, and/or ways, and/or element(s), and/or material(s), and/or component(s), and/or part(s), and/or device(s), and/or system(s) and/or apparatus, and/or equipment assembly type(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), for the purpose of, generating, and/or using, and/or transiting, and/or transferring, and/or transmitting, and/or receiving, and/or recording, and/or measuring, and/or operating, and/or functioning, and/or storing, and/or communicating, and/or controlling, and/or managing, and/or cooling, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or another necessary, and/or required, suitable, and/or workable, and/or configurable, magnetic, and/or permanent magnet, and/or electromagnetic operation(s), and/or function(s), and/or purpose(s), and/or task(s) (unbroken, and/or unimpeded), of, for, from into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary.

Such a corresponding adjoined, and/or adjoining, (ring-shaped (annular), and/or other), permanent magnet(s) electromotive assemblage(s), and/or similar working, corresponding adjoined, and/or adjoining, (ring-shaped (annular), and/or other), permanent magnet(s) electromotive/electric motor (combined) assemblage(s), and/or permanent magnet(s) inductive/conductive assemblage(s) are fully assembled separately, and/or together, within, with, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)), and, connected, and/or connecting, and/or operating, and/or functioning, and/or integrating, and/or hooking-up, with other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), for the purpose of, generating, and/or making, and/or receiving, and/or transmitting, and/or transiting, and/or transferring, and/or using, and/or interacting, and/or storing, and/or controlling, and/or managing, and/or communicating, and/or cooling, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or another necessary, and/or required, suitable, and/or workable, and/or configurable, magnetic, and/or permanent magnet, and/or electromagnetic operation(s), and/or function(s), and/or purpose(s), and/or task(s) (unbroken, and/or unimpeded), of, for, from, into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary.

Such a corresponding adjoined, and/or adjoining, (ring-shaped (annular), and/or other), permanent magnet(s) electromotive assemblage(s), and/or other similar working, corresponding adjoined, and/or adjoining, (ring-shaped (annular), and/or other), permanent magnet(s) electromotive/electric motor (combined) assemblage(s), and/or permanent magnet(s) inductive/conductive assemblage(s) (i.e., as assembled, and/or attached, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electromotive, and/or similar working, electromotive/electric motor (combined) assemblage(s), and/or permanent magnet(s) inductive/conductive assemblage(s) protective housing case(s) assembly type(s) (piece(s)), and/or contour protective housing case(s) assembly type(s) (piece(s)) (i.e., "Exoskeleton" outer skeleton assemblage(s)), and, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s) carry, and/or hold, and/or operate, and/or function, and/or integrate, and/or amalgamate, and/or interact, and/or work, and/or use, and/or hook-up, with, and/or by way of, and/or via a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) electricity power rectifier(s) assembly type(s), and/or inverter(s) assembly type(s), and/or electricity capacitor(s) assembly type(s) (i.e., a corresponding adjoined, and/or adjoining, power electricity device(s) assembly type(s), and/or electrical circuitry assembly type(s), and/or electrical sensor(s) assembly type(s), and/or wiring assembly type(s), that change(s), and/or convert(s), alternating electricity current (AC), into direct electricity current (DC), and/or vice versa), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and, a (fixed) ring-shaped (annular) rotary manifold assembly type(s) (piece(s)), and/or a ring-shaped (annular) rotary manifold slip-ring wiring harness assembly type(s), and/or other wiring harness assembly type(s), and, a vehicle junction boxes and hook-up(s) point(s) assembly type(s), and/or another necessary, and/or required, suitable, and/or workable, and/or configurable, means, and/or ways, and/or element(s), and/or composite(s), and/or material(s), and/or component(s), and/or part(s), and/or mechanism(s), and/or device(s), and/or system(s), and/or apparatus, and/or equipment assembly type(s), for the purpose of, generating, and/or making, and/or converting, and/or using, and/or receiving, and/or transmitting, and/or transiting, and/or transferring, and/or communicating, and/or controlling, and/or recording, and/or measuring, and/or managing, and/or diagnosing, and/or operating, and/or functioning, and/or storing, and/or cooling, and/or hooking-up, magnetic electricity flux, and/or sustainable electrical power, and/or sustainable electricity supply, and/or sustainable electric driven propulsion, and/or magnetic inductive electricity charging, and/or magnetic navigation, and/or magnetic communication(s), and/or magnetic transmission(s), and/or another necessary, and/or required, suitable, and/or workable, and/or configurable, magnetic, and/or permanent magnet, and/or electromagnetic operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), automatically, and/or manually, and/or autonomously (wirelessly), and/or remotely, when in motion, and/or stationary, and, for the purpose of, simultaneously reliably, generating, and/or transiting, and/or transferring, and/or transmitting, and/or transmitting, and/or using, and/or measuring, and/or receiving, and/or operating, and/or functioning, and/or using, and/or relating, and/or integrating, and/or interacting, and/or cooling, and/or communicating, and/or controlling, and/or monitoring, and/or diagnosing, and/or recording, and/or expelling, and/or circulating, and/or working, and/or hooking-up, a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other necessary, and/or required, operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s) automatically, and/or manually, and/or autonomously (wirelessly), and/or remotely, when in motion, and/or stationary.

7. In its most preferred alternative embodiment, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s) has, and/or is holding, and/or carrying, and/or using, and/or operating, and/or functioning, and/or communicating, and/or hooking-up a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s) and/or other, (stationary, and/or fixed, and/or moving, and/or rotating, and/or spinning, and/or turning) video camera assembly type(s), and/or infrared radar assembly type(s), and/or radar assembly type(s), and/or photography apparatus assembly type(s), and/or motion filming apparatus assembly type(s), and/or picture capturing system(s) assembly type(s), and/or electronic camera assembly type(s), and/or image capturing device(s) assembly type(s), and/or single-camera vehicle vision system(s) assembly types, and/or assistance vision technologies assembly type(s), and/or digital sensor(s) technologies assembly type(s), and/or digital radar technologies assembly type(s), and/or digital radar sensor(s) technologies assembly type(s), and/or sonar equipment assembly type(s), and/or Wi-Fi equipment assembly type(s), and/or Near Field Communication(s) (NFC) equipment assembly type(s), and/or Initiator (i.e., a carrier field) and/or Target (i.e., a transponder (transmitter/responder) Communication(s) Device(s) assembly type(s), and/or Bluetooth wireless communication(s) equipment assembly type(s), and/or Ultrawide Band (UWB) radio technology assembly type(s), and/or Inertial Measurement Unit(s) (IMU) assembly type(s), and/or Quantum Compass assembly type(s), and/or Inertial Navigation System(s) assembly type(s), and/or magnetic, or permanent magnet, or electromagnet communication(s), and/or navigation(s) equipment assembly type(s), and/or associated satellite system(s) assembly type(s), and/or associated antennae assembly type(s), and/or associated Global Positioning System(s) (GPS) assembly type(s), and/or associated laser light navigation system(s) assembly type(s), and/or associated navigation system(s) assembly type(s), and/or associated ground based navigation system(s) assembly type(s) and/or associated band-width(s) assembly type(s), and/or associated spectrum(s) assembly type(s), and/or associated Wi-Fi frequencies assembly type(s), and/or associated radio frequencies assembly type(s), and/or associated frequencies assembly type(s), and/or signal(s) assembly type(s), and/or associated magnetic signaling assembly type(s), and/or associated magnetic signature(s) assembly type(s), and/or associated signal(s) assembly type(s), and/or associated computer(s) assembly type(s), and/or associated Cloud Based Computing system(s) assembly type(s), and/or associated software(s) assembly type(s), and/or associated digital operating instruction(s) assembly type(s), and/or associated cloud computing assemblage(s), and/or associated Artificial Intelligence (AI) equipment, and software(s) assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or compatible, and/or configurable, means, and/or ways, and/or material(s), and/or element(s) and/or equipment assembly type(s), of, for, from, into, thru, out of, and/or between, and/or associated with such a corresponding adjoined, and/or adjoining, vehicle wheel assembly type(s), and, such a corresponding adjoined, and/or adjoining pneumatic tire(s) assembly type(s), and, a corresponding vehicle assembly type(s), and, associated component(s), part(s), mechanism(s), device(s), system(s), and/or apparatus assembly type(s), for the purpose of, capturing, and/or recording, and/or analyzing, and/or controlling, and/or managing, and/or using, and/or storing, and/or operating, and/or functioning, and/or integrating, and/or sending, and/or transmitting, and/or receiving, and/or transiting, and/or transferring, and/or communicating, and/or hooking-up, visual, and/or light scanned data, and/or digital data, and/or data, and/or image(s), and/or magnetic signaling, and/or sonar frequencies, and/or other signal(s), band-width(s), frequencies, and/or spectrum(s), and/or visual cues, and/or visual target(s) assembly type(s) of, for, from, into, thru, out of, and/or between, and/or associated with such a corresponding adjoined, and/or adjoining vehicle wheel assembly type(s), and, a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary (i.e., Pneumatic Tire to Vehicle Wheel to Vehicle to Everything (PT2VW2V2X) and Vehicle to Vehicle Wheel to Pneumatic Tire to Everything (V2VW2PT2X)), and, for the purpose of, determining, a corresponding adjoined vehicle assembly type(s), operating area(s), and, its delimiters (i.e., free space(s)), and/or the geometry of the route(s), and/or path(s), within the operating area(s) (i.e., operating path(s)), and/or any, and/or all obstacle(s), within the operating area(s), or path(s) (i.e., moving, and/or stationary object(s)), and/or visual cue(s) (explicit and implicit) (i.e., operating scene semantics), and/or other necessary, and/or required, operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary, and for the purpose of dynamic control, and/or performance, and/or safety, of such a corresponding adjoined, and/or adjoining vehicle wheel assembly type(s), and, a corresponding adjoined, and/or adjoining pneumatic tire(s) assembly type(s), and, a corresponding adjoined vehicle assembly type(s), and associated component(s), part(s), mechanism(s), device(s), system(s), and/or apparatus assembly type(s), and/or other operation(s), and/or function(s), and/or purpose(s), and/or task(s) of such associated assemblage(s) (unbroken and/or unimpeded), automatically, and/or manually, and/or autonomously (wirelessly), and/or remotely, when in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) visual equipment assembly type(s), and/or laser light sensor(s) scanning/operating/recording system(s) assembly type(s) (i.e., Camera(s) assembly type(s), and/or Advance Driver (operator(s)) Assistance System(s) (ADAS), and/or Light Detection and Ranging (LiDAR) radar scanning system(s) (i.e., a method(s) for measuring distance(s) (ranging) by illuminating a target with a laser, and measuring the reflection with a sensor(s) based on wavelength(s), and return time(s) thereof, to produce a digital 3D representation of the target(s)), and, associated data software(s) assembly type(s), and/or digital operating system(s) assembly type(s), and/or associated Artificial Intelligence (AI) operating system(s) assembly type(s), and/or associated antennae assembly type(s), and/or associated cloud based computer system(s), and/or associated satellite system(s) assembly type(s), and/or associated navigation system(s) assembly type(s), and/or associated wireless spectrum(s) assembly type(s), and/or associated digital band-width(s) assembly type(s), and/or associated radio frequencies assembly type(s), and/or sonar frequencies assembly type(s), and/or other single(s), band-width(s), spectrum(s), and/or frequencies assembly type(s) and/or associated magnetic, and permanent magnet signaling assembly type(s), and/or associated digital device(s), and/or electrical device(s) assembly type(s), and/or magnetic devices (i.e. Inertial Measurement Unit (IMU) (Quantum Compass), Inertial Navigation Systems (INS)), and/or associated computer hardware(s) system(s) assembly type(s), and software(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/ or turning) component(s), part(s), mechanism(s), device(s), system(s), and/or apparatus assembly type(s), and, a (fixed) ring-shaped rotary manifold assembly type(s) (piece(s)), and/or a ring-shaped (annular) rotary manifold slip-ring wiring harness assembly type(s), and/or other wiring harness assembly type(s), and, a vehicle junction boxes and hook-up(s) point(s) assembly type(s), and/or another necessary, and/or required, suitable, and/or workable, and/or configurable, means, and/or ways, and/or element(s), and/or material(s), and/or equipment assembly type(s), and/or associated channel(s) assembly type(s), and/or aperture(s) assembly type(s), and/or area(s) assembly type(s), and/or protrusion(s) assembly type(s) and/or associated protective housing case(s) assembly type(s), and/or associated wiring, and/or pneumatic or fluid(s) plumbing equipment and harnesses assembly type(s) within, in, into, on, onto, beneath, between, surrounding, thru, and/or throughout, and/or associated with, such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), are for the purpose of, providing, and/or enabling, and/or facilitating, operating, and/or functioning, and/or transiting, and/or transferring, and/or transmitting, and/or receiving, and/or controlling, and/or communicating, and/or using, and/or storing, and/or connecting, and/or diagnosing, and/or analyzing, and/or recording, and/or measuring, and/or positioning, and/or packaging, and/or compacting, and/or aligning, and/or hooking-up, such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet and/or other, (stationary, and/or fixed, and/or moving, and/or rotating, and/or spinning, and/or turning) state-of-the-art camera, and/or scanning, and/or data mapping technologies assembly type(s), and/or navigation system(s) assembly type(s), and/or communications system(s) assembly type(s), and/or transmission(s) equipment assembly type(s), and, for the purpose of, supporting instantaneous reliable dynamic operating safety, and performance with the use of, and/or by way of associated visual, or non-visual assemblages and/or radio frequencies, and/or frequencies, and/or band-width(s), and/or spectrum(s), and/or wave(s), and/or signal(s), and/or field(s), and/or sonar frequencies, and/or magnetic signaling, and/or permanent magnet wi-fi communications/navigation(s) assemblages, and/or Near Field Communication(s) (NFC) assemblage(s), and/or laser assembly type(s), and/or sensor(s) assembly type(s), and/or circuit(s) assembly type(s), and/or associated computer(s) assembly type(s), and/or associated software instruction(s) assembly type(s), and/or other associated component(s), part(s), mechanism(s), device(s), system(s), and/or apparatus assembly type(s), and/or another necessary, and/or required, suitable, and/or workable, and/or configurable, means, and/or ways, and/or element(s), and/or material(s), and/or equipment assembly type(s), for engaging, and/or deploying operation(s), and/or function(s), and/or purpose(s), and/or task(s) (unbroken, and/or unimpeded), that are deemed necessary, and/or required, for a corresponding operating, and/or functioning standard(s), of such corresponding adjoined, and/or adjoining, assemblage(s), of, for from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining, pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) visual equipment assembly type(s), and/or radio frequencies system(s) assembly type(s) and/or laser(s) assembly type(s), and/or sonar(s) assembly type(s), and/or communication assemblages and/or associated sensor(s) scanning/operating/recording system(s) assembly type(s) (i.e., Advance Driver (operator(s)) Assistance System(s) (ADAS), and/or Light Detection and Ranging (LiDAR) radar scanning system(s), and/or other), and, associated camera(s) assembly type(s), and/or scanning equipment assembly type(s), and/or sensor(s) assembly type(s), and/or circuit(s) assembly type(s), and, other associated, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or associated protective housing case(s) assembly type(s), and, a (fixed) ring-shaped (annular) rotary manifold assembly type(s) (piece(s)), and/or a ring-shaped (annular) rotary manifold slip-ring wiring harness assembly type(s), and/or other wiring harness assembly type(s) and, a vehicle junction boxes and hook-up(s) point(s) assembly type(s), and/or another necessary, and/or required, suitable, and/or workable, and/or configurable means, and/or ways, element(s), and/or material(s), and/or equipment assembly type(s), are held, and/or carried, and/or embedded, and/or slotted, and/or positioned, and/or compacted, and/or packaged, and/or oriented, and/or aligned, and/or integrated, and/or amalgamated, and/or secured (fixed) in-place, and/or hooked-up, within, in, into, on, onto, beneath, between, surrounding, thru, and/or throughout, and/or associated with, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s) assembly type(s), and/or protrusion(s) assembly type(s) of, within, in, into, on, onto, beneath, between, surrounding, thru, and/or throughout, and/or associated with the body (architecture) of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), (with the use of corresponding adjoined, and/or adjoining fastener(s) assembly type(s), and/or seal(s) assembly type(s), and/or sealing material(s)), for the purpose of, functioning, and/or operating, and/or using, and/or engaging, and/or deploying and/or implementing, and/or diagnosing, and/or measuring, and/or connecting, and/or communicating, and/or controlling, and/or interacting, and/or transmitting, and/or receiving, and/or transiting, and/or transferring, and/or hooking-up, corresponding data, and/or digital signal(s), and/or other signal(s), spectrum(s), frequencies, band-width(s), and/or magnetic field(s), wave(s), pulse(s), signal(s), frequencies, spectrum(s) for corresponding chosen operation(s), and/or function(s), and/or purpose(s), and/or task(s), of such visual (camera(s) assembly type(s)), and/or light scanning (laser(s) assembly type(s), and/or sonar(s) assemblage(s), and/or permanent magnet assemblage(s), and/or other associated sensor(s), receiver(s), and/or transmitter(s), and/or magnetic, permanent magnet, and/or electromagnetic assemblages), and/or antennae assembly type(s), and/or receiver(s) assembly type(s), and/or transmitter(s) assembly type(s), and/or another necessary, and/or required, suitable, and/or workable, and/or configurable, means, and/or ways, and/or element(s), and/or composite(s), and/or material(s), and/or equipment assembly type(s) (unbroken, and/or unimpeded) of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary, via, and/or by way of, a corresponding adjoined vehicle assembly type(s), physical operator(s), and/or associated physical operator(s), and/or associated digital/electrical machine(s) assembly type(s), and/or associated digital computer(s) assembly type(s), and/or associated antennae assembly type(s), and/or associated band-width(s) assembly type(s), and/or associated spectrum(s) assembly type(s), and/or associated frequencies assembly type(s), and/or associated software(s) assembly type(s), and/or associated magnetic signaling assembly type(s), and/or other associated signal(s) assembly type(s), and/or associated control(s) assembly type(s), selection(s), and/or prompt(s), and/or other associated specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnet assembly type(s), and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or outside of, but, associated with, such a corresponding adjoined, and/or adjoining vehicle wheel assembly type(s), and, such a corresponding adjoined, and/or adjoining pneumatic tire(s) assembly type(s), and, a corresponding vehicle assembly type(s), and other associated component(s), part(s), mechanism(s), device(s), system(s), and/or apparatus assembly type(s), automatically, and/or manually, and/or autonomously (wirelessly), and/or remotely, when in motion, and/or stationary.

Such visual equipment assembly type(s) (i.e., camera(s) assembly type(s), and/or laser(s) assembly type(s), and/or radio frequency equipment assembly type(s), and/or sensor(s) assembly type(s), and/or circuit(s) assembly type(s), and/or digital system(s) assembly type(s) scanning/operating/recording system(s) assembly type(s)), and/or other camera(s) assembly type(s), and/or radar(s) assembly type(s), and/or infrared radar(s) assembly type(s), and/or Advance Driver (operator(s)) Assistance System(s) (ADAS), and/or Light Detection and Ranging (LiDAR) radar scanning system(s) assembly type(s), and/or Global Position System(s) (GPS) assembly type(s), and/or sonar system(s) assembly type(s), and/or associated satellite system(s) assembly type(s), and/or associated navigation system(s) assembly type(s), and/or associated antennae assembly type(s), and/or associated transmitter(s) assembly type(s), and/or associated receiver(s) assembly type(s), and/or associated magnetic field(s) assembly type(s), and/or electromagnetic fields(s) assembly type(s), and/or permanent magnet field(s) assembly type(s) and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), and, a (fixed) ring-shaped (annular) rotary manifold assembly type(s) (piece(s)), and/or a ring-shaped (annular) rotary manifold slip-ring wiring harness assembly type(s), and or other wiring harness assembly type(s) and, a vehicle junction boxes and/or hook-up(s) point(s) assembly type(s), and/or another necessary, and/or required, suitable, and/or workable, and/or configurable, means, and/or ways, and/or material(s), and/or element(s), and/or composites, and/or equipment assembly type(s) are embedded, and/or slotted, and/or compacted, and/or packaged, and/or secured (fixed), in-place, and/or hooked up, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), shaped, and/or smooth, and/or measured, and/or dimensional, channel(s) assembly type(s), and/or aperture(s) assembly type(s), and/or area(s) assembly type(s), and/or protrusion(s) assembly type(s) (isolated, and/or insulated, internal, and/or external), within, in, into, on, onto, beneath, between, surrounding, thru, and/or throughout, and/or associated with, such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), of, within, in, into, on, onto, beneath, between, surrounding, thru, and/or throughout, and/or associated with the body (architecture) of such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), for the purpose of, enhancing a corresponding adjoined vehicle(s) assembly type(s) passive, and/or active safety, and/or drivability, and/or performance, and/or navigation, and/or other necessary, and/or required, operation(s), and/or function(s), and/or purpose(s), and/or task(s) when associated with such electrical, and/or digital, and/or magnetic, and/or permanent magnet, and/or camera, and/or radar, and/or scanning, and/or sensor(s), and/or transmitter(s), and/or receiver(s), and/or navigation, and/or communication assemblage(s), and, for the purpose of, protecting, such assemblage(s) from internal, and/or external impact(s), and/or varied environment(s), and/or use(s), and/or temperature(s) variation(s), when in motion, and/or stationary, and, for the purpose of staging, and/or assembling, and/or using, and/or operating, and/or functioning, and/or hooking-up such assemblies, within, in, into, on, onto, beneath, between, surrounding, thru, and/or throughout, and/or associated with the body (architecture) of such a corresponding adjoined, and/or adjoining, vehicle wheel assembly type(s), and, a corresponding adjoined, and/or adjoining pneumatic tire assembly type(s), and, a corresponding adjoined vehicle assembly type(s), in accordance with, international, and/or country, and/or state(s), specific law(s), and/or other law(s), regulation(s), standard(s), and/or homologation(s), and, for the purpose of, determining, a corresponding adjoined vehicle assembly type(s), operating area(s), and, its delimiters (i.e., free space(s)), and/or the geometry of the route(s), and/or path(s), within the operating area(s) (i.e., operating path(s)), and/or any, and/or all obstacle(s), within the operating area(s), or path(s) (i.e., moving, and/or stationary object(s)), and/or visual cue(s) (explicit and implicit) (i.e., operating scene semantics), and/or other necessary, and/or required, operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) visual, and/or sensor(s) scanning/operating/recording system(s) assembly type(s), and/or camera(s) assembly type(s), and/or radar(s) assembly type(s), and/or infrared radar(s) assembly type(s), sonar(s) assembly type(s), and/or magnetic, permanent magnet, electromagnetic system assembly type(s), and/or Advance Driver (operator(s)) Assistance System(s) (ADAS), and/or Light Detection and Ranging (LiDAR) radar scanning system(s) assembly type(s), are for the purpose of, operating, and/or functioning as a light detection, and/or ranging radar system(s) (i.e., a remote sensing method that uses light in the form of a pulsed laser to measure range(s) (variable distance(s)). A visual, and/or sensor(s) operating/recording system(s) assembly type(s), and/or camera(s) assembly type(s), and/or radar(s) assembly type(s), and/or infrared radar(s) assembly type(s), and/or Advance Driver (operator(s)) Assistance System(s) (ADAS), and/or Light Detection and Ranging (LiDAR) radar scanning system(s) assembly type(s), instrument(s), works on the principle of radar, but uses light from a laser and a specialized Global Positioning System (GPS) receiver, and/or associated ground navigation system(s) assembly type(s), and/or corresponding adjoined, and/or adjoining receiver(s), and/or transmitter(s) assembly type(s)), and/or another necessary, and/or required, suitable, and/or workable, and/or configurable, means, and/or ways, and/or material(s), and/or element(s), and/or equipment assembly type(s) as installed within, in, into, on, onto, beneath, between, surrounding, thru, and/or throughout, and/or associated with the body of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s). Such visual, and/or light, and/or frequency, and/or magnetic field(s), and/or sensor(s) operating/recording/navigating/communicating system(s) assembly type(s), and/or camera(s) assembly type(s), and/or radar(s) assembly type(s), and/or sonar(s) assembly type(s), and/or visual cue(s), and/or visual target(s) and/or infrared radar(s) assembly type(s), and/or Advance Driver (operator(s)) Assistance System(s) (ADAS), and/or Light Detection and Ranging (LiDAR) radar scanning system(s) assembly type(s), range on the spectrum from passive to active. A passive system alerts the vehicle operator(s), and/or associated vehicle system(s), of a dangerous, and/or potentially dangerous situation(s), so that the vehicles' physical operator(s), and/or associated vehicles' operating system(s) assembly type(s), can take the appropriate action(s) to avoid, and/or correct it. For example, Lane Departure Warning (LDW) alert(s) the vehicles' physical operator(s), and/or associated operating system(s) assembly type(s), of unintended, and/or unindicated, lane departure; Forward Collision Warning (FCW) indicates that under a current dynamic(s) relative to a vehicle ahead, when a collision is imminent. The vehicles' physical operator(s), then need(s) to brake to avoid a collision.

In contrast, active safety system(s) take-action(s) (automatically, and/or autonomously (wirelessly), and/or remotely), by way of, and/or with the use of automated vehicle system(s), and/or associated software(s), and/or operating instruction(s), and/or Artificial Intelligence (AI) system(s) assembly type(s), and, other associated vehicle system(s), and, specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and/or another associated necessary, and/or required, suitable, and/or workable, and/or configurable, means, and/or ways, and/or element(s), and/or material(s), and/or equipment assembly type(s), that automatically assess the situation(s), engage the correct action(s), and/or task(s) and, deploy the appropriate response(s), operation(s), and/or function(s), and/or equipment assembly type(s) (E.g. an Automatic Emergency Braking (AEB), that identifies the imminent collision, and automatically applies the vehicle braking without any intervention from the vehicle assembly type(s) physical operator(s), or Torque Vectoring (Dynamically applied measured, and/or additional rotation to an axel, or selective wheel(s) for extra traction, or grip, and, to maintain a modulated power correction(s) for avoiding a loss of vehicle control). Examples of other vehicle active safety functions are: Adaptive Cruise Control (ACC), Lane Keeping Assist (LKA), Lane Centering (LC), and Traffic Jam Assist (TJA) to name a few. It is these few automated features that form the basis of present-day semi/fully autonomous vehicle operation.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) camera, or video (visual) system(s), and/or radar, light detection, sonar (sensor(s)) system(s) and/or scanning equipment assembly type(s), and/or magnetic, permanent magnet, electromagnetic navigation or communications equipment assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and/or another necessary, and/or required, suitable, and/or workable, and/or configurable, means, and/or ways, and/or element(s), and/or composites, and/or materials, and/or equipment assembly type(s), are for the purpose of, enhanced safety, and performance, for a corresponding adjoined vehicle assembly type(s), in that they allow, and/or facilitate, and/or enable, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s) having, and/or holding, and/or operating, and/or using, and/or interacting, and/or securing (fixed) in-place, and/or communicating, and/or controlling, and/or hooking-up such an automated visual (camera(s)) equipment assembly type(s), and/or laser(s) assembly type(s), and/or sonar(s) assembly type(s), and/or magnetic device(s) assembly type(s), and/or sensor(s) assembly type(s), and/or circuit(s), and/or associated computer(s) assemblage(s), and software(s) assemblages and, other associated component(s), part(s), mechanism(s), device(s), system(s), and/or apparatus assembly type(s), cue(s), and/or signal(s), that reach human-level perception(s), and/or actuation, and/or activation (by way of, and/or with the use of, visual cue(s), and/or visual target(s), spectrum(s), and/or frequencies, and/or band-width(s), and/or signal(s), and/or digital signal(s), and/or magnetic, permanent magnet, electromagnetic field(s), and/or data, and/or digital data transmitted, and/or received, and/or used, and/or hooked-up, and/or analyzed, and/or communicated, and/or recorded (historical, and/or real-time, and/or near real-time), and, for the purpose of, robust, and/or immediate, automatic, and/or manual, and/or autonomous (wireless), and/or remote, action(s), and/or operation(s), and/or function(s), and/or purpose(s), and/or task(s) (unbroken, and/or unimpeded) for a corresponding adjoined vehicle assembly type(s), that has, and/or is holding, and/or carrying, and/or operating, and/or functioning, and/or hooking-up, such a corresponding adjoined, and/or adjoining, vehicle wheel assembly type(s), and, such a corresponding adjoined, and/or adjoining pneumatic tire(s) assembly type(s), and, such associated assemblage(s), when in motion, and/or stationary.

Such a corresponding adjoined, and/or adjoining, vehicle wheel assembly type(s), and, such a corresponding adjoined, and/or adjoining pneumatic tire(s) assembly type(s) also has, and/or is holding, and/or carrying, and/or operating, and/or functioning, and/or working, and/or integrating, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold assembly type(s) (piece(s)), and/or a ring-shaped (annular) rotary manifold slip-ring wiring harness assembly type(s), and/or other wiring harness assembly type(s), and, a vehicle junction boxes and hook-up(s) point(s) assembly type(s), and/or another necessary, and/or required, suitable, and/or workable, and/or configurable, means, and/or ways, and/or element(s), and/or material(s), and/or equipment assembly type(s), are for the purpose of, linking, and/or connecting, and/or hooking-up, with a corresponding adjoined vehicle assembly type(s), that has, and/or is holding, and/or carrying, and/or operating, and/or functioning, and/or using, and/or integrating, and/or storing, and/or working and/or interacting, and/or communicating, and/or controlling, and/or managing, and/or hooking-up, other associated specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), and, for the purpose of, transferring, and/or transiting, and/or transmitting, and/or receiving, and/or analyzing, and/or interpreting, and/or deciphering and/or interacting, and/or instigating, and/or using, and/or storing, and/or communicating, and/or controlling, and/or diagnosing, and/or measuring, and/or recording, and/or operating, and/or functioning, and/or working, and/or hooking-up, such corresponding adjoined, and/or adjoining, digital data, and/or data, and/or video, and/or camera, and/or radar, and/or sonar, and/or magnetic, and/or digital transmission(s), and/or digital signal(s) assembly type(s), and/or other signal(s), frequencies, spectrum(s), band-width(s), and/or magnetic field(s), and/or visual cue(s), and/or target(s) assembly type(s) (unbroken, and/or unimpeded), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), when in motion, and/or stationary, and, for the purpose of, determining, a corresponding adjoined vehicle assembly type(s), operating area(s), and, its delimiters (i.e., free space(s)), and/or the geometry of the route(s), and/or path(s), within the operating area(s) (i.e., operating path(s)), and/or any, and/or all obstacle(s), within the operating area(s), or path(s) (i.e., moving, and/or stationary object(s)), and/or visual cue(s) (explicit and implicit) (i.e., operating scene semantics), and/or other necessary, and/or required, operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) visual equipment assembly type(s) (i.e., video, camera(s) assembly type(s)), and/or scanning assembly type(s) (i.e., laser(s), sonar(s) assembly type(s)), and/or magnetic, permanent magnet, electromagnetic navigation, and communication equipment assembly type(s), and/or sensor(s) assembly type(s), and/or circuit(s) assembly type(s) (i.e., Advance Driver (operator(s)) Assistance System(s) (ADAS), and/or Light Detection and Ranging (LiDAR) radar scanning system(s), and/or Ground Positioning System(s) (GPS) assembly type(s), and/or ground based navigation system(s) assembly type(s)), and, associated data software(s) assembly type(s), and/or Artificial intelligence (AI) system(s) assembly type(s) and/or digital operating system(s) assembly type(s), and/or cloud computing operating system(s) assembly type(s), and/or other associated software(s) assembly type(s) and/or antennae assembly type(s), and/or cloud based computer system(s), and/or satellite system(s) assembly type(s), and/or wireless spectrum(s) assembly type(s), and/or digital band-width(s) assembly type(s), and/or radio frequencies assembly type(s), and/or sonar frequencies assembly type(s), and/or associated magnetic, permanent magnet, electromagnetic signaling, or field(s), or signature(s), and/or associated digital device(s), and/or computer hardware(s) system(s) assembly type(s), and/or magnetic pick-up(s) assembly type(s), have, and/or hold, and/or carry, and/or are hooked-up with a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) sensor(s), and/or circuit(s), and/or lenses, and/or receive/send antennae, and/or satellite-based radio-navigation system(s), and/or other light sensitive instrument(s) assembly type(s), and/or magnetic, permanent magnet, electromagnetic send/receive apparatus assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or element(s), and/or material(s), and/or equipment assembly type(s), for the purpose of, navigation, and/or mapping, and/or capturing, and/or identifying, and/or detecting, and/or recording, and/or diagnosing, and/or measuring, and/or receiving, and/or transferring, and/or transiting, and/or transmitting, and/or analyzing, and/or storing, and/or processing, and/or working, and/or using, and/or integrating, and/or interacting, and/or operating, and/or functioning, and/or comparing, and/or localizing, and/or communicating, and/or hooking-up Global Positioning System(s) (GPS) data, and/or data, and/or digital data, and/or obstacle(s), and/or landmark(s), and/ or position(s), and/or other associated data, and/or digital signal(s), and/or magnetic signal(s), and/or other necessary, and/or required, suitable, and/or workable, and/or configurable operation(s), and/or function(s), and/or purpose(s), and/or task(s) (unbroken and unimpeded) of, for, from, into, thru, out of, and/or associated with such a corresponding adjoined, and/or adjoining vehicle wheel assembly type(s), and, such a corresponding adjoined, and/or adjoining pneumatic tire assembly type(s), and, a corresponding vehicle assembly type(s) in real-time, and/or near-time, and/or historically (i.e., Pneumatic Tire to Vehicle Wheel to Vehicle to Everything (PT2VW2V2X) and Vehicle to Vehicle Wheel to Pneumatic Tire to Everything (V2VW2PT2X)). Such information, and/or data, allows a corresponding adjoined vehicle assembly type(s) physical operator(s), and/or vehicle control(s) assembly type(s), and/or a corresponding adjoined, and/or adjoining, automated system(s), and/or autonomous (wireless) system(s), and/or semi-autonomous system(s), and/or remote system(s), and/or computer system(s) (i.e., computer hardware(s), and, software(s), assembly type(s), and/or associated Artificial Intelligence (AI) system(s) assembly type(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, such a corresponding adjoined, and/or adjoining pneumatic tire(s) assembly type(s), and, a corresponding vehicle assembly type(s), to simultaneously reliably act on, and/or react to, such data, and/or digital signal(s), and/or magnetic signals, and/or radar(s), and/or sensor(s), and/or other signal(s) assembly type(s), and/or information assembly type(s), automatically, and/or manually, and/or autonomously (wirelessly), and/or remotely, when in motion, and/or stationary.

Such associated specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) visual, and/or laser, and/or sensor(s) scanning/operating/recording/navigating/communicating system(s) assembly type(s), and/or camera(s) assembly type(s), and/or radar(s) assembly type(s), and/or infrared radar(s) assembly type(s), and/or sonar(s) assembly type(s), and/or magnetic, permanent magnet, electromagnetic equipment assembly type(s), and/or Advance Driver (operator(s)) Assistance System(s) (ADAS), and/or Light Detecting and Ranging (LiDAR) radar scanning system(s) assembly type(s), and/or camera assemblage(s), and/or radar(s) assemblage(s), and/or radio signal(s) assemblages, and/or Global Positioning System(s) (GPS) assembly type(s), and/or navigation system(s) assembly type(s), and/or ground based navigation system(s) assembly type(s), and/or other signal(s), frequencies, band-width(s), spectrum(s), and/or magnetic field(s), and/or magnetic signal(s), and/or magnetic signature(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with, such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), comprise, but, are not exclusive to, namely; a (fixed) ring-shaped (annular) rotary manifold assembly type(s) (piece(s)), and/or a ring-shaped (annular) rotary manifold slip-ring wiring harness assembly type(s), and/or other wiring harness assembly type(s), and, a vehicle junction boxes and hook-up(s) point(s) assembly type(s), and/or sensor(s) assembly type(s), and/or programmable microprocessor chip(s) assembly type(s), and/or microprocessor(s) assembly type(s), and/or circuit(s) assembly type(s), and/or operating software(s) assembly type(s), and/or cloud based operating system(s) assembly type(s), and/or Artificial Intelligence (AI) operating system(s) assembly type(s), and/or electrical circuit(s) assembly type(s), and/or electrical wiring harness assembly type(s), and/or electrical wiring assembly type(s), and/or electrical plug(s) assembly type(s), and/or electrical socket(s) assembly type(s), and/or cabling assembly type(s), and/or inductive connection(s) assembly type(s), and/or video cable assembly type(s), and/or video transmission line(s) assembly type(s), and/or transmission line(s) assembly type(s), and/or fiber optic equipment assembly type(s), and/or fiber optic transmission line(s), and/or microprocessor assembly type(s), and/or laser light system(s) assembly type(s), and/or camera lenses assembly type(s), and/or receive/send wireless antennae assembly type(s), and/or satellite-based radio-navigation system(s) assembly type(s), and/or ground based navigation equipment assembly type(s), and/or magnet, permanent magnet, electromagnet equipment assembly type(s), and/or other light sensitive, and/or visual, and/or frequency, and/or magnetic scanning/operating/recording/navigating/communicating instrument(s) assembly type(s), and/or data/digital signal(s)/laser light/radio frequencies, sonar frequencies scanning/operating/recording instrument(s) assembly type(s), and/or associated frequencies, equipment assembly type(s), and/or associated spectrum(s) equipment assembly type(s), and/or associated band-width(s) equipment assembly type(s), and/or associated laser light equipment assembly type(s) and/or associated magnet, permanent magnet, electromagnetic equipment assembly type(s), and/or other associated signaling, frequencies, band-width(s), spectrum(s), and/or magnetic equipment assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnet, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or element(s), and/or material(s), and/or equipment assembly type(s) that are ideally, located, and/or positioned, and/or oriented, and/or aligned, and/or embedded, and/or slotted, and/or compacted, and/or packaged, and/or hooked-up, and/or secured (fixed), in-place, with, within, in, into, on, onto, beneath, between, surrounding, thru, and/or throughout, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s), and/or other, (stationary, and/or fixed, and/or moving, and/or rotating, and/or spinning, and/or turning) channel(s) assembly type(s), and/or aperture(s) assembly type(s), and/or area(s) assembly type(s), and/or protrusion(s) assembly type(s), and/or protective housing case(s) assembly type(s) (piece(s)), and/or contour protective housing case(s) assembly type(s) (piece(s)) "i.e., "Exoskeleton" assemblage(s), modular pieces, harnesses, belt(s), ribbon(s), band(s), ring(s) ribbon(s) within, in, into, on, onto, beneath, between, surrounding, thru, and/or throughout, and/or associated with, the body (architecture) of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s)), with portion(s) (i.e., sensor(s) assembly type(s), and/or lenses assembly type(s), and/or laser(s) assembly type(s), and/or other associated transmitter(s), and/or receiver(s) assembly type(s) of such assemblage(s)), exposed, and/or positioned, and/or oriented, and/or aligned, in such a way as to view, and/or scan, and/or transmit, and/or receive, communicate (unbroken, and/or unimpeded, and/or unobstructed), as secured (fixed) in-place, within, in, into, on, onto, beneath, between, surrounding, thru, and/or throughout, the body (architecture) of such a corresponding adjoined, and/or adjoining, vehicle wheel assembly type(s) and, such a corresponding adjoined, and/or adjoining pneumatic tire assembly type(s), and, a corresponding adjoined vehicle assembly type(s), and, their associated component(s), part(s), mechanism(s), device(s), system(s), and/or apparatus assembly type(s), for the purpose of, operating, and/or functioning, and/or using, and/or hooking-up such assemblies, automatically, and/or manually, and/or autonomously (wirelessly), and/or remotely, when in motion, and/or stationary, in accordance with, international, and/or country, and/or state(s), specific law(s), and/or other law(s), regulation(s), standard(s), and/or homologation(s) for such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), when such a corresponding adjoined, and/or adjoining vehicle wheel assembly type(s), and, such a corresponding adjoined, and/or adjoining pneumatic tire(s) assembly type(s), is mounted, and/or attached, and/or hooked-up onto, and/or with, a corresponding adjoined vehicle assembly type(s), and, for the purpose of, determining, a corresponding adjoined vehicle assembly type(s), operating area(s), and, its delimiters (i.e., free space(s)), and/or the geometry of the route(s), and/or path(s), within the operating area(s) (i.e., operating path(s)), and/or any, and/or all obstacle(s), within the operating area(s), or path(s) (i.e., moving, and/or stationary object(s)), and/or visual cue(s) (explicit and implicit) (i.e., operating scene semantics), and/or other necessary, and/or required, operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and such a corresponding adjoined, and/or adjoining pneumatic tire(s) assembly type(s), and, the associated component(s), part(s), mechanism(s), device(s), system(s), and/or apparatus assembly type(s), automatically, and/or manually, and/or autonomously (wirelessly), and/or remotely, when in motion, and/or stationary, and, for the purpose, of simultaneously reliably, generating, and/or supplying, and/or enabling, and/or facilitating, and/or transferring, and/or transiting, and/or transmitting, and/or receiving, and/or delivering, and/or discharging, and/or depleting, and/or operating, and/or functioning, and/or using, and/or storing, and/or controlling, and/or managing, and/or monitoring, and/or communicating, and/or recording, and/or diagnosing, and/or measuring, and/or working, and/or interacting, and/or integrating, and/or hooking-up (unbroken, and/or unimpeded), a corresponding desired media(s), and/or medium(s) (such as, compressed air, and/or other gases (+ and/or −) for a corresponding attached pneumatic tire(s) chamber(s) assembly type(s)), and/or electricity supply, data, and/or digital signal(s), and/or fluid(s)), and/or other corresponding chosen operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

8. In its most preferred alternative embodiment, such a corresponding adjoined, and/or adjoining, vehicle wheel assembly type(s), has, and/or is holding, and/or carrying, and/or operating, and/or functioning, and/or integrating, and/or amalgamating, and/or interacting, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or hydraulic (fluid actuated, and/or activated, and/or use), and/or other, (stationary, and/or fixed, and/or moving, and/or rotating, and/or spinning, and/or turning) actuated plug(s) assembly type(s), and/or socket(s) assembly type(s), and/or connection(s) assembly type(s), and/or connecting(s) point(s) assembly type(s), and/or pick-up(s) assembly type(s), and/or hook-up point(s) assembly type(s), and/or wiring harness assembly type(s), and/or wiring assembly type(s), and/or other permanent magnet(s) assembly type(s), and/or permanent magnet wiring harness assembly type(s), and/or permanent magnet inductive pick-up(s) assembly type(s), and/or sensor(s) assembly type(s), and/or circuit(s) assembly type(s), and/or computer(s) assembly type(s), and/or pump(s) assembly type(s), and/or valve(s) assembly type(s), and/or channel(s) assembly type(s), and/or aperture(s) assembly type(s), and/or area(s) assembly type(s), and/or passageway(s) assembly type(s), and/or tunnel(s) assembly type(s), and/or path(s) assembly type(s), and/or compartment(s) assembly type(s), and/or vessel(s) assembly type(s), and/or protrusion(s) assembly type(s), and/or flange(s) assembly type(s), and/or hose(s) assembly type(s), and/or tube(s) assembly type(s), and/or pipe(s) assembly type(s), and/or grommet(s) assembly type(s), and/or fastener(s) assembly type(s), and/or seal(s) assembly type(s), and/or sealing material(s), and/or joint(s) assembly type(s), and/or mooring(s) assembly type(s), and/or receptacle(s) assembly type(s), and/or protective housing case(s) assembly type(s) (piece(s)), and/or contour protective housing case(s) assembly type(s) (piece(s)) (i.e., “Exoskeleton” assemblage(s)) and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or hydraulic (fluid actuated, and/or activated, and/or use), and/or other, (stationary, and/or fixed, and/or moving, and/or rotating, and/or spinning, and/or turning) component(s), part(s) mechanism(s), device(s), system(s), and/or apparatus assembly type(s), and/or form-fitting protective housing case(s) assembly type(s), and/or ridged, or semi-ridged modular protective housing case(s) assembly type(s) for associated pneumatic line(s), electrical wiring, sensor(s), circuit(s), component(s) part(s), mechanism(s), device(s), system(s), and/or apparatus assembly type(s) (i.e., “Exoskeleton” protective housing case(s) assembly type(s) that accurately contour surface(s)) within, in, into, on, onto, beneath, between, surrounding, thru, and/or throughout, and/or associated with the body of such a corresponding adjoined, and/or adjoining, vehicle wheel assembly type(s) (i.e., internal, and/or external hub, and/or spoke(s), and/or rim portion(s), and/or area(s), and/or section(s)), and, a (fixed) ring-shaped (annular) rotary manifold assembly type(s) (piece(s)), and/or a ring-shaped (annular) rotary manifold slip-ring electrical wiring harness assembly type(s), and/or permanent magnet wiring harness assembly type(s), and/or other wiring harness assembly type(s) and, a vehicle junction boxes and hook-up(s) point(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or hydraulic (fluid actuated, and/or activated, and/or use), and/or other, (stationary, and/or fixed, and/or moving, and/or rotating, and/or spinning, and/or turning) component(s), part(s), mechanism(s), device(s), system(s), and/or apparatus assembly type(s), of, for, from, into, thru, out of, and/or between, and/or associated with the body (architecture) of such a corresponding adjoined, and/or adjoining, vehicle wheel assembly type(s), and/or such a corresponding adjoined, and/or adjoining pneumatic tire(s) assembly type(s), and, a corresponding adjoined vehicle assembly type(s), and/or another necessary, and/or required, suitable, and/or workable, and/or configurable means, and/or ways, and/or element(s), and/or composite(s), and/or material(s), and/or equipment assembly type(s), for the purpose of, simultaneously reliably, generating, and/or receiving, and/or transmitting, and/or transferring, and/or transiting, and/or controlling, and/or coordinating, and/or managing, and/or measuring, and/or using, and/or circulating, and/or evacuating, and/or depleting and/or diagnosing, and/or communicating, and/or storing, and/or recording, and/or monitoring, and/or operating, and/or functioning, and/or working, and/or hooking-up, a corresponding electrical charge, and/or electricity supply, and/or electromagnetic inductive charging; when in motion, and/or stationary, and/or dynamically (i.e., an energy transmission in an induction format utilizing permanent magnets for transferring electricity from a corresponding associated electricity conductor(s) assembly type(s) E.g., those type(s) that can be embedded within, in, inside, on, onto, beneath, between, surrounding, thru, and/or throughout, and/or associated with, any surface(s) (i.e., a roadway(s), and/or highway(s) assembly type(s), and/or other surface(s) assembly type(s), and/or location(s), or charging place(s), and/or geographical location(s) used to receive, and/or supply, and/or transfer, such electricity (power) (i.e., magnetic, and/or permanent magnet(s), and/or electromagnetic inductive/conductive electricity exchange(s)), for such a corresponding adjoined, and/or adjoining, vehicle wheel assembly type(s), and, such a corresponding adjoined, and/or adjoining pneumatic tire(s) assembly type(s), and, a corresponding vehicle assembly type(s) use(s), and/or another necessary, and/or required, suitable, and/or workable, and/or configurable magnetic, and/or permanent magnet, and/or electromagnetic, and/or other electrical, and/or electricity operation(s), and/or function(s), and/or purpose(s), and/or task(s) (i.e., communication(s), and, navigation(s)), and/or data, and/or digital signal(s), and/or fluid(s) (i.e., synthetic fluid(s) assembly type(s), and/or petroleum based fluid(s) assembly type(s), and/or vegetable based fluid(s) assembly type(s) and/or ethylene glycol fluid(s) assembly type(s), and/or propylene glycol fluid(s) assembly type(s), and/or water (H20), and/or other fluid(s) assembly type(s) and/or element(s) assembly type(s), and/or chemical compound(s) assembly type(s), and/or a suitable, workable, and/or configurable mixture(s) therefrom) of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, electromagnetic assembly type(s), and/or hydraulic (fluid actuated, and/or activated, and/or use), and/or other, (stationary, and/or fixed, and/or moving, and/or rotating, and/or spinning, and/or turning) associated component(s), part(s), mechanism(s), device(s), system(s), and/or apparatus assembly type(s) within, in, in, into, on, onto, beneath, between, surrounding, thru, and/or throughout, and/or associated with, a specifically, and/or strategically, engineered, designed, fabricated, fashioned, or formed corresponding adjoined, and/or adjoining pneumatic tire assembly type(s), and, for the purpose of, simultaneously reliably, activating, and/or deactivating, and/or controlling, and/or communicating, and/or managing, and/or monitoring, and/or recording, and/or diagnosing, and/or, and/or transiting, and/or transferring, and/or transmitting, and/or receiving, and/or using, and/or measuring, and/or operating, and/or functioning, and/or working, and/or hooking-up (automatically, and/or manually, and/or autonomously (wirelessly), and/or remotely), a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or hydraulic (fluid actuated, and/or activated, and/or use), and/or other, (stationary, and/or fixed, and/or moving, and/or rotating, and/or spinning, and/or turning) actuated solenoid(s) assembly type(s), and/or actuator(s) assembly type(s), permanent magnet inductive pick-up(s) assembly type(s), and/or wiring(s) assembly type(s), and/or wiring harness assembly type(s), and/or mechanism(s) assembly type(s), and/or hook-up(s) point(s) assembly type(s), and/or connection(s) assembly type(s), and/or valve(s) assembly type(s), and/or hose(s) assembly type(s), and/or tube(s) assembly type(s), and/or protective housing case(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or hydraulic (fluid actuated, and/or activated, and/or use), and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with the body (architecture) of such a corresponding adjoined, and/or adjoining, pneumatic tire assembly type(s) (i.e., internal chamber(s) portion(s), of such a corresponding adjoined, and/or adjoining pneumatic tire assembly type(s) having at least one internal pneumatic chamber, or as many as three independent operating and/or functioning internal pneumatic chamber(s), or more, and/or the external body portion(s), and/or bead portion(s), and/or other portion(s), and/or area(s), and/or section(s) of such a corresponding adjoined, and/or adjoining pneumatic tire assembly type(s)), and/or another suitable, and/or workable, and/or configurable portion(s), and/or area(s), and/or section(s) of the body of such a specifically, and/or strategically, engineered, designed, fabricated, fashioned, and/or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or hydraulic (fluid actuated, and/or activated, and/or use), and/or other, (stationary, and/or fixed, and/or moving, and/or rotating, and/or spinning, and/or turning) corresponding adjoined, and/or adjoining, pneumatic tire(s) assembly type(s) when mounted, and/or attached, and/or hooked-up onto, and/or with, such a corresponding adjoined, and/or adjoining, vehicle wheel assembly type(s), and, a corresponding adjoined vehicle assembly type(s). Such a three chamber(s) pneumatic tire(s) assembly type(s) (i.e., in-bound chamber assembly type(s), middle chamber assembly type(s), and, out-bound chamber assembly type(s)) makes it possible to simultaneously reliably, and precisely, control compressed air, and/or other gases, and/or fluid(s) flow(s), and/or other necessary, and/or required operation(s), and/or function(s), and/or purpose(s), and/or task(s) for each pneumatic tire chamber assembly type(s) (i.e., independently, and/or together) when in motion, and/or stationary, when mounted, and/or attached, and/or hooked-up, onto, and/or with, such a corresponding adjoined, and/or adjoining, vehicle wheel assembly type(s), and, a corresponding adjoined vehicle assembly type(s), and, associated component(s), part(s), mechanism(s), device(s), system(s), and/or apparatus assembly type(s), and, associated protective housing case(s) assembly type(s) (piece(s), and/or contour protective housing case(s) assembly type(s) (piece(s)) ("Exoskeleton"), automatically, and/or manually, and/or autonomously (wirelessly), and/or remotely. It is conceivable, in a dynamic situation (E.g., during high speed cornering, or abrupt braking, or a minimized contact patch, or other), such a three chamber pneumatic tire assembly type(s) offers greater control characteristics than a conventional single chamber pneumatic tire assembly type(s) (i.e., by perpetually analyzing, measuring, managing, and/or providing, optimal, and/or precise tire pressure(s) (+ and/or −), and/or another necessary, and/or required, operation(s), and/or function(s), and/or purpose(s), and/or task(s) for each chamber assembly type(s) when in motion, and/or stationary, to maximize contact, and/or grip, and handling, and/or other characteristics for a corresponding adjoined vehicle assembly type(s), simultaneously reliably controlling Elastic Hysteresis, aka; "Pneumatic Slip" the difference between the strain energy required to generate a given stress in a material, and the materials elastic energy at that stress, and/or other circumstance(s)), and, for the purpose of, simultaneously reliably, managing, and/or controlling, and/or monitoring, and/or recording, and/or adjusting, and/or using, and/or working, and/or operating, and/or functioning, and/or hooking-up, such a corresponding adjoined, and/or adjoining, pneumatic tire assembly type(s) embedded permanent magnet inductive pick-up(s) assembly type(s), and/or heating element(s) assembly type(s), and/or cooling element(s) assembly type(s) (i.e., associated permanent magnet inductive charging equipment assembly type(s), wiring assembly type(s), and/or wire harness assembly type(s), and/or wire ribbon(s) assembly type(s), and/or conductive metal(s), and/or alloys assembly type(s), and/or composite(s) assembly type(s), and/or etched-foil "photo-etching" connection(s) assembly type(s), and/or conductive polydimethylsiloxane (PDMS) assembly type(s) "positive temperature coefficient (PTC) silicone rubber sheet(s) assembly type(s)", and/or thick film heater(s) assembly type(s) "printed polymer(s)

infusing metal(s), and/or alloy(s), and/or composite(s) assembly type(s), and/or polymer (PTC) heating element(s) assembly type(s), and/or embedded hose(s) assembly type(s), and/or embedded tube(s) assembly type(s), and/or embedded high pressure flex tube(s) "polyamide core tube(s) having a high tensile, reinforce synthetic fiber and polyamide outer cover" assembly type(s), and/or polymeric tubing assembly type(s), and/or silicone hose(s) assembly type(s), and/or fluoropolymer (PFA) Teflon hose(s) assembly type(s), and/or convoluted Teflon with carbon hose(s) assembly type(s)), and/or associated fastener(s) assembly type(s), and/or associated connection(s) assembly type(s), and/or associated hook-up(s) assembly type(s), and/or associated valve(s) assembly type(s), and/or associated sensor(s) assembly type(s), and/or associated circuit(s) assembly type(s), and/or associated thermostat(s) assembly type(s), and/or associated rheostat(s) assembly type(s), and/or another necessary, and/or required suitable, workable, and/or configurable means, and/or ways, and/or compound(s), and/or element(s), and/or material(s), and/or equipment assembly type(s) used for collection and transfer of electrical inductive charging (i.e., electricity, or electrical supply), and/or adjustable, and/or controlled, and/or managed heating, and/or cooling capabilities within, in, into, on, onto, beneath, between, surrounding, thru, and/or throughout, and/or out of, and/or associated with the body of such a corresponding adjoined, and/or adjoining, pneumatic tire assembly type(s), when attached, and/or mounted, onto, and/or with such a corresponding adjoined, and/or adjoining, vehicle wheel assembly type(s), and, a corresponding adjoined vehicle assembly type(s), and other associated component(s), part(s), mechanism(s), device(s) and/or system(s), and/or apparatus assembly type(s), and/or traction element(s) assembly type(s) (i.e., associated, automatically deployable, and/or adjustable, rising, and/or retractable, protrusion(s) assembly type(s), and/or spike(s) assembly type(s), and/or rod(s) assembly type(s), and/or cleat(s) assembly type(s), and/or stud(s) assembly type(s)), and, associated component(s), part(s) mechanism(s), device(s), and/or apparatus assembly type(s), and/or associated mount(s) assembly type(s), and/or associated bracing assembly type(s), and/or associated anchor(s) assembly type(s), and/or associated fastener(s) assembly type(s), and/or associated mounting track(s) assembly type(s), and/or associated protective housing case(s) assembly type(s), and/or associated wiring assembly type(s), and/or associated wiring harness assembly type(s), and/or associated valve(s) assembly type(s), and/or associated hose(s) assembly type(s), and/or associated tube(s) assembly type(s), and/or associated sensor(s) assembly type(s), and/or associated circuit(s) assembly type(s), and/or another necessary, and/or required suitable, workable, and/or configurable means, and/or ways, and/or compound(s), and/or element(s), and/or material(s), and/or equipment assembly type(s) used for adjustable, and/or controlled, and/or managed traction, and/or extra grip capabilities within, in, into, on, onto, beneath, between, surrounding, thru, and/or throughout, and/or associated with the body of such a corresponding adjoined, and/or adjoining, pneumatic tire assembly type(s), when attached, and/or mounted, and/or hooked-up onto, and/or with such a corresponding adjoined, and/or adjoining, vehicle wheel assembly type(s), and, a corresponding adjoined vehicle assembly type(s), and/or lighting, and/or illumination element(s) assembly type(s) (i.e., embedded operating lighting assembly type(s), and/or illumination assembly type(s), and/or signaling lighting assembly type(s), and/or operating lighting assembly type(s), and/or LED (Light-Emitting Diodes) assembly type(s), and/or illumination apparatus assembly type(s) (ideally embedded within, in, into, on, onto, beneath, between, surrounding, thru, and/or throughout the tread, and/or groove pattern(s), and/or other portion(s), and/or section(s), and/or area(s) assembly type(s) of the body of such a corresponding adjoined, and/or adjoining, pneumatic tire assembly type(s)), and/or another necessary, and/or required, suitable, and/or workable, and/or configurable, portion(s), and/or area(s), and/or section(s), and/or placement(s) within, in, into, on, onto, beneath, between, surrounding, thru, and/or throughout, and/or associated with the body of such a corresponding adjoined, and/or adjoining, pneumatic tire assembly type(s), that match, and/or hook-up, and/or synchronize, and/or work, and/or operate, and/or function in coordination, and/or capacities with a corresponding adjoined vehicle assembly type(s), and such a corresponding adjoined, and/or adjoining vehicle wheel assembly type(s) illumination assembly type(s), and/or operating lighting assembly type(s), and/or signaling lighting assembly type(s), and/or LED (Light-Emitting Diodes) lighting assembly type(s) use(s), operation(s), function(s), purpose(s), task(s), color(s), candela, lumen, lux, luminance rate(s), and lighting efficiencies, and, other associated component(s), part(s), mechanism(s), device(s), system(s), and/or apparatus assembly type(s) of, for, from, into, thru, out of, and/or between, and/or associated with a corresponding adjoined vehicle assembly type(s), and such a corresponding adjoined, and/or adjoining vehicle wheel assembly type(s)), and/or other safety, and/or performance element(s), and/or attribute(s), and/or feature(s) (i.e., permanent magnet electrical inductive charging capabilities (stationary, and/or dynamically)), and/or other consideration(s), and/or operation(s), and/or function(s), and/or purpose(s), and/or task(s), that is specifically, and/or strategically, embedded, and/or placed within, in, into, on, onto, beneath, between, surrounding thru, and/or throughout, and/or associated with the body of such a corresponding adjoined, and/or adjoining, pneumatic tire assembly type(s) (i.e., the vulcanized rubber and/or other compound(s), composite(s), element(s), component(s), and/or part(s), and/or mechanism(s), device(s), system(s), and/or apparatus assembly type(s), that make-up such a specifically, and/or strategically, engineered, designed, fabricated, fashioned, or formed, corresponding adjoined, and/or adjoining, pneumatic tire(s) assembly type(s)), automatically, and/or manually, and/or autonomously (wirelessly), and/or remotely, when in motion, and/or stationary.

Such a corresponding adjoined, and/or adjoining, pneumatic tire assembly type(s), has, and/or is holding, and/or carrying, and/or embedding, and/or positioning, and/or aligning, and/or compacting, and/or packaging, and/or operating, and/or functioning, and/or integrating, and/or amalgamating, and/or interacting, and/or working, and/or using, and/or storing, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnets, and/or electromagnetic assembly type(s), and/or hydraulic (fluid actuated, and/or activated, and/or use), and/or other, (stationary, and/or fixed, and/or moving, and/or rotating, and/or spinning, and/or turning) component(s), part(s), mechanism(s), device(s), system(s), and/or apparatus assembly type(s), comprising, but, not exclusive to, namely; electrical, and/or electricity, and/or electric actuated, wiring(s) assembly type(s), wiring harness assembly type(s), connection(s) assembly type(s), plug(s) assembly type(s), socket(s) assembly type(s), permanent magnet(s) assembly type(s) inductive pick-up(s) assembly type(s), and/or electrical inductive connection(s) assembly type(s), and/or heating element(s) assembly type(s), and/or carbon fiber heating element(s) assembly type(s), and/or rheostat(s) assembly type(s), and/or thermostat(s) assembly type(s), and/or digital sensor(s) assembly type(s), and/or magnetic inductive sensor(s) assembly type(s), and/or sensor(s) assembly type(s), and/or circuit(s) assembly type(s), and/or digital circuit(s) assembly type(s), actuator(s) assembly type(s), and/or carbon fiber reinforcement element(s) assembly type(s), fastener(s) assembly type(s), and/or joint(s), and/or seal(s) assembly type(s), and/or sealing material(s), and/or channel(s) assembly type(s), and/or aperture(s) assembly type(s), and/or area(s) assembly type(s), and/or protrusion(s) assembly type(s), and/or hose(s) assembly type(s), and/or tube(s) assembly type(s), and/or pneumatic line(s) assembly type(s), and/or valve(s) assembly type(s), and/or protective housing case(s) assembly type(s), and/or contoured protective housing case(s) "Exoskeleton" assembly type(s), and/or attached, and/or attaching, embedded illumination assembly type(s), and/or lighting assembly type(s), and/or associated lighting assemblage(s), and/or LED (Light-Emitting Diode(s)) lighting assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or electromagnetic, and/or permanent magnet, and/or electromagnetic assembly type(s), and/or hydraulic (fluid actuated, and/or activated, and/or use), and/or other, (stationary, and/or fixed, and/or moving, and/or rotating, and/or spinning, and/or turning) component(s), part(s), mechanism(s), device(s), system(s), and/or apparatus assembly type(s), and/or hook-up point(s) assembly type(s), and/or another necessary, and/or required, suitable, and/or workable, and/or configurable, means, and/or ways, and/or element(s), and/or material(s), and/or equipment assembly type(s), for the purpose of, simultaneously reliably, measuring, and/or monitoring, and/or recording, and/or controlling, and/or managing, and/or operating, and/or functioning, and/or communicating, and/or transiting, and/or transferring, and/or transmitting, and/or receiving, and/or using, and/or working, and/or hooking-up, instantaneous inductive electricity charging operation(s), and/or function(s), and/or purpose(s), and/or task(s) and, instantaneous automatic digital, and/or magnetic signal(s), and/or data, and/or electrical, and/or electricity, and/or electric actuated heating, and/or temperature control(s), and/or circulated cooling and/or heating fluid(s) assembly type(s), and/or other fluid(s) assembly type(s), and/or pneumatic, and/or contact surface(s) temperature supervision, and/or command(s), and/or observation(s), and/or guidance(s), and/or operation(s), and/or function(s), and/or associated navigation operation(s), and/or function(s), and/or automatic deployable, and/or retractable, and/or adjustable traction spike(s) assembly type(s), and/or post(s) assembly type(s), and/or stud(s) assembly type(s), and/or rod(s) assembly type(s) operation(s), and/or function(s), and/or safety, directional, and conspicuity illumination assembly type(s), and/or operating lighting assembly type(s), and/or lighting assembly type(s), and/or LED (Light-Emitting Diode(s)) lighting assembly type(s) (i.e., directional, and/or safety, and/or operating lighting operation(s), and/or function(s), and/or color(s) illumination, and/or lighting assembly type(s) that operate, and/or function, and/or work, and/or integrate, and/or coordinate, and/or correspond, and/or synchronize, and/or hook-up with a corresponding adjoined vehicle assembly type(s) illumination, and/or lighting system(s) assembly type(s), and, such a corresponding adjoined, and/or adjoining, vehicle wheel assembly type(s) illumination, and/or lighting system(s) assembly type(s)), and/or other necessary, and/or required, performance, and/or safety operation(s), and/or function(s), and/or purpose(s), and/or task(s) (unbroken, and/or unimpeded), for such a corresponding adjoined, and/or adjoining, pneumatic tire(s) assembly type(s) (automatically, and/or manually, and/or autonomously (wirelessly), and/or remotely), when in motion, and/or stationary, when, mounted, and/or attached, and/or hooked-up, onto, and/or with, such a corresponding adjoined, and/or adjoining, vehicle wheel assembly type(s), and, a corresponding adjoined vehicle assembly type(s), and, for the purpose of proximity, and/or assembly of such corresponding adjoined, and/or adjoining, assemblage(s), and, for the purpose of, governance by international, and/or world-wide, and/or country specific law(s), and/or unified state(s) law(s), and/or state(s) law(s), and/or regulation(s) and/or standard(s) and/or other governance, or homologation, and, for the purpose of, enhanced safety, and/or performance value(s), of such a corresponding adjoined, and/or adjoining pneumatic tire(s) assembly type(s), by providing maximum tread contact, and/or grip, and/or uniform surface temperature(s), and/or contact surface(s) temperature(s), and/or visibility, and/or conspicuity, and/or operating direction(s), and/or pneumatic operation(s), and/or function(s) and/or inductive electricity charging (stationary, and/or dynamically), and/or other magnetic, and/or permanent magnet(s), and/or electromagnetic inductive operation(s), and/or function(s), purpose(s), and/or task(s), and/or another necessary, and/or required, suitable, and/or workable, and/or configurable operation(s), and/or function(s), and/or purpose(s), and/or task(s) for such a corresponding adjoined, and/or adjoining, pneumatic tire(s) assembly type(s) (automatically, and/or manually, and/or autonomously (wirelessly), and/or remotely), when in motion, and/or stationary, when, mounted, and/or attached, and/or hooked-up, onto, and/or with, such a corresponding adjoined, and/or adjoining, vehicle wheel assembly type(s), and, a corresponding adjoined vehicle assembly type(s), and, for the purpose of, operating, and/or functioning, and/or working, and/or using, and/or hooking-up such a corresponding adjoined, and/or adjoining, pneumatic tire(s) assembly type(s), in extreme, and/or variable, temperature(s), and/or environment(s), and/or condition(s), automatically, and/or manually, and/or autonomously (wirelessly), and/or remotely, when in motion, and/or stationary (i.e., such a corresponding adjoined, and/or adjoining, pneumatic tire(s) assembly type(s), in wet, and/or cold, and/or hot, and/or freezing, and/or icing, and/or snowing, meteorological condition(s) and/or other variable environmental condition(s), and/or surface(s), and/or contact surface(s) condition(s)). A cold pneumatic tire assembly type(s) (compound(s)) is much stiffer, and can't conform to an asphalt surface(s), and/or other covered hard surface(s), nearly as well, delivering less traction onto the surface(s), leading, to less handling performance, and, safety, for a corresponding adjoined vehicle assembly type(s), while conversely, operating a corresponding adjoined vehicle assembly type(s) in extreme heated surface(s) condition(s) (E.g., caused by meteorological, and/or natural, and/or man-made occurrence(s)), can negatively affect a pneumatic tire assembly type(s) (compound(s)) causing the pneumatic tire assembly type(s) to rupture violently without warning if overheated.

Such a specifically, and/or strategically, engineered, designed, fabricated, fashioned, or formed, corresponding adjoined, and/or adjoining, pneumatic tire assembly type(s) has, and/or is holding, and/or carrying, and/or controlling, and/or operating, and/or functioning, and/or integrating, and/or amalgamating, and/or interacting, and/or working, and/or using, and/or storing, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or hydraulic (fluid actuated, and/or activated, and/or use) and/or other, (stationary, and/or fixed, and/or moving, and/or rotating, and/or spinning, and/or turning) automatically deployable, and/or adjustable, rising, and/or retractable, protrusion(s) assembly type(s), and/or spike(s) assembly type(s), and/or cleat(s) assembly type(s), and/or stud(s) assembly type(s) (i.e., a number of, and/or many, automated, and/or adjustable deployable, pin(s) assembly type(s), and/or projecting piece(s) assembly type(s), and/or rod(s) assembly type(s), and/or stud(s) assembly type(s), and/or cleat(s) assembly type(s), and associated corresponding adjoined, and/or adjoining protective housing case(s) assembly type(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnet assembly type(s), and/or hydraulic (i.e., fluid actuated, and/or activated, and/or use) and/or other, (stationary, and/or fixed, and/or moving, and/or rotating, and/or spinning, and/or turning) component(s), part(s), mechanism(s), device(s), system(s), and/or apparatus assembly type(s), that are assembled together, and work together in a defined pattern(s), and/or a coordinated manner, as placed, and/or mounted, and/or attached, and/or hooked-up within, in, into, on, onto, beneath, between, surrounding, thru, and/or throughout, and/or associated with the body of such a corresponding adjoined, and/or adjoining, pneumatic tire(s) assembly type(s) (i.e., the tread pattern, and/or groove, portion(s), and/or area(s), and/or section(s), and/or construction, and/or chamber(s) assembly type(s) (internal, and/or external) of the body (architecture) of such a corresponding adjoined, and/or adjoining, pneumatic tire assembly type(s)), and/or another necessary, and/or required, suitable, and/or workable, and/or configurable, portion(s), and/or area(s), and/or section(s) within, in, into, on, onto, beneath, between, surrounding, thru, and/or throughout, and/or associated with the body of such a corresponding adjoined, and/or adjoining, pneumatic tire assembly type(s), for the purpose of, simultaneously reliable, automatically deployable, and/or adjustable, rising, and/or retractable, traction, and/or grip, and/or safety, and/or performance, and/or other enhancement(s), and/or capabilities for a corresponding adjoined vehicle assembly type(s), using such a corresponding adjoined, and/or adjoining, vehicle wheel assembly type(s), and, such a corresponding attached pneumatic tire(s) assembly type(s), automatically, and/or manually, and/or autonomously (wirelessly), and/or remotely, when in motion, and/or stationary.

Such a corresponding adjoined, and/or adjoining, pneumatic tire assembly type(s), has, and/or is holding, and/or carrying, and/or operating, and/or functioning, and/or working, and/or hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or hydraulic (fluid actuated, and/or activated, and/or use) and/or other, (stationary, and/or fixed, and/or moving, and/or rotating, and/or spinning, and/or turning) automatically deployable, and/or adjustable, rising, and/or retractable, protrusion(s) assembly type(s), and/or spike(s) assembly type(s), and/or rod(s) assembly type(s), and/or stud(s) assembly type(s), and/or cleat(s) assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic, and/or hydraulic (fluid actuated, and/or activated, and/or use), and/or other, (stationary, and/or fixed, and/or moving, and/or rotating, and/or spinning, and/or turning) component(s), part(s), mechanism(s), device(s), system(s), and/or apparatus assembly type(s), made of material(s) comprising, but, not exclusive to, namely; carbon fiber(s) assembly type(s), and/or metal(s) assembly type(s), metal alloy(s) assembly type(s), magnet(s), permanent magnet(s), electromagnetic assembly type(s), inductive electrical connection(s) assembly type(s), inductive actuator(s) assembly type(s), composite(s) assembly type(s), element(s) assembly type(s), and/or vulcanized rubber(s) assembly type(s), elastomer(s) assembly type(s), spring(s) assembly type(s), wire(s) assembly type(s), wiring harness assembly type(s), plug(s) assembly type(s), socket(s) assembly type(s), actuator(s) assembly type(s), hose(s) assembly type(s), tube(s) assembly type(s), valve(s) assembly type(s), sensor(s) assembly type(s), circuit(s) assembly type(s), assembly type(s), protective housing case(s) assembly type(s), fastener(s) assembly type(s), seal(s) assembly type(s), sealing material(s), sealant(s) assembly type(s), and/or another necessary, and/or required, suitable, and/or workable, and/or configurable, material(s), and/or element(s), and/or composite(s), and/or means, and/or ways, and/or equipment assembly type(s), used for enhanced vehicle safety, and/or vehicle control, and/or vehicle handling, and/or vehicle traction, and/or vehicle grip, and/or inductive electricity charging (stationary, and/or dynamically), and/or inductive communication(s), and/or inductive navigation, and/or inductive transmission(s), and/or other magnetic inductive electricity/digital/data operation(s), and/or function(s), and/or purpose(s), and/or task(s), when operating on variable surface(s) and, variable meteorological condition(s), for the purpose of facilitating, and/or enabling, such assemblage(s), to operate, and/or function, and/or deploy, and/or retract, and/or hook-up, and/or control, and/or manage, and/or communicate, and/or navigate, and/or guide, and/or adjust instantaneously, and/or simultaneously reliably in various operating, and/or hazardous, and/or extreme, and/or variable, temperature(s), and/or environment(s), and/or surface condition(s) (automatically, and/or manually, and/or autonomously (wirelessly), and/or remotely), when in motion, and/or stationary, when such a corresponding adjoined, and/or adjoining, pneumatic tire(s) assembly type(s), is assembled, and/or attached, and/or mounted, and/or hooked-up with, and/or onto, such a corresponding adjoined, and/or adjoining, vehicle wheel assembly type(s), and, a corresponding adjoined vehicle assembly type(s), and, other component(s), part(s), mechanism(s), device(s), system(s), and/or apparatus assembly type(s) of, for, from, into, thru, out of, and/or between, and/or associated with such a corresponding adjoined, and/or adjoining, vehicle wheel assembly type(s), and, a corresponding adjoined vehicle assembly type(s) (i.e., controlling, and/or operating, and/or functioning such a corresponding adjoined, and/or adjoining, pneumatic tire(s) assembly type(s), in wet, and/or cold, and/or freezing, and/or icing, and/or snowing, meteorological condition(s), and/or other variable, environmental condition(s), and/or surface(s) condition(s), and/or contact surface(s) condition(s)), enhancing safety, by delivering more traction, and/or grip, and/or tread performance, by dynamically controlling, and/or managing elastic hysteresis (pneumatic slip) with dynamic (instantaneous) pneumatic adjustment(s), or vehicle braking operation(s), and/or function(s), or engine torque vectoring, onto contact surface(s), and/or vehicle braking, and/or vehicle steering, and/or other safety, and/or performance consideration(s), operation(s), function(s), purpose(s), and/or task(s) when, mounted, and/or attached, and/or hooked-up, onto, and/or with, such a corresponding adjoined, and/or adjoining, vehicle wheel assembly type(s), and, a corresponding adjoined vehicle assembly type(s), and, when, in motion, and/or stationary, and, for the purpose of, proximity, and/or assembly with such a corresponding adjoined, and/or adjoining, vehicle wheel assembly type(s), and, a corresponding adjoined vehicle assembly type(s), and, other associated component(s), part(s), mechanism(s), device(s), system(s), and/or apparatus assembly type(s), within, in, into, on, onto, beneath, between, surrounding, thru, and/or throughout, and/or associated with, such a corresponding adjoined, and/or adjoining, vehicle wheel assembly type(s), and, a corresponding adjoined vehicle assembly type(s) (automatically, and/or manually, and/or autonomously (wirelessly), and/or remotely), when in motion, and/or stationary.

Such a corresponding adjoined, and/or adjoining, pneumatic tire(s), assembly type(s), electrical, and/or electricity, magnets, and/or permanent magnet(s), and/or electromagnetic assembly type(s), and/or electric actuated assemblages, and/or hydraulic (fluid actuated, and/or activated, and/or use) deployable, and/or retractable, and/or adjustable automatic protrusion(s) assembly type(s), and/or automatic spike(s) assembly type(s), automatic rod(s) assembly type(s) and/or automatic cleat(s) assembly type(s), and/or automatic protrusion(s) assembly type(s), and/or automatic pin(s) assembly type(s), and/or automatic stud(s) assembly type(s) (i.e., a number of, and/or many specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnet, and/or permanent magnet assembly type(s) and/or hydraulic (fluid actuated, and/or activated, and/or use), and/or other, (stationary, and/or fixed, and/or moving, and/or rotating, and/or spinning, and/or turning) automated deployable, and/or retractable, and/or adjustable pin(s) assembly type(s), and/or rod(s) assembly type(s) and/or stud(s) assembly type(s), and/or projecting piece(s) assembly type(s), and/or cleat(s) assembly type(s)), are assembled, together, within, in, into, on, onto, beneath, between, surrounding, thru, and/or throughout, and/or associated with a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnet assembly type(s), and/or hydraulic (fluid actuated, and/or activated, and/or use), and/or other, (stationary, and/or fixed, and/or moving, and/or rotating, and/or spinning, and/or turning) activable mechanism(s) assembly type(s), and/or protective housing case(s) assembly type(s) (piece(s)), and/or contour protective housing case(s) assembly type(s) (piece(s)) (i.e., "Exoskeleton" assemblage(s)), and, operate, and/or function, and/or work, and/or hook-up, by way of, and/or with the use of, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or hydraulic (fluid actuated, and/or activated, and/or use) and/or other, (stationary, and/or fixed, and/or moving, and/or rotating, and/or spinning, and/or turning) component(s), part(s) mechanism(s), device(s), system(s), and/or apparatus assembly type(s), and/or another necessary, and/or required, suitable, and/or workable, and/or configurable, means, and/or ways, and/or element(s), and/or material(s), and/or equipment assembly type(s) of, for, from, into, thru, out of, and/or between, and/or associated with such a corresponding adjoined, and/or adjoining, pneumatic tire assembly type(s), and, such a corresponding adjoined, and/or adjoining vehicle wheel assembly type(s), and a corresponding adjoined vehicle assembly type(s), for the purpose of inductive electricity charging, and/or communication(s), and/or navigation(s), and/or transmission(s) (stationary, and dynamically), and, additional instantaneous traction, and/or grip, and/or safety, and, operating lighting and/or other safety, and/or performance capabilities, and/or other necessary, and/or required, operation(s), function(s), purpose(s), and/or task(s) (automatically, and/or manually, and/or autonomously (wirelessly), and/or remotely), when in motion, and/or stationary.

Such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, magnetic, and/or permanent magnet, and/or electromagnetic assembly type(s) and/or hydraulic (fluid actuated, and/or activated, and/or use) and/or other, (stationary, and/or fixed, and/or moving, and/or rotating, and/or spinning, and/or turning) protective housing case(s) assembly type(s) (piece(s)), and/or contour protective housing case(s) assembly type(s) (piece(s)) has, and/or hold(s), and/or is carrying, an associated rising, and/or retractable, pin(s) assembly type(s), and/or protrusion(s) assembly type(s), and/or cleat(s) assembly type(s), and/or spike(s) assembly type(s), and/or stud(s) assembly type(s), and/or rod(s) assembly type(s), and/or hose(s) assembly type(s), and/or tube(s) assembly type(s), and/or pneumatic line(s) assembly type(s), and/or valve(s) assembly type(s), and/or wiring assembly type(s), and/or wiring harness assembly type(s), and/or inductive electrical pick-up(s) assembly type(s), and/or AC/DC rectifier(s) (electricity inverter(s)) assembly type(s), and/or electricity charging conductor(s) assembly type(s) and/or other associated component(s), part(s), mechanism(s), device(s), system(s), and/or apparatus assembly type(s), that is attachable, and/or detachable, as placed, and/or positioned, and/or amalgamated within, in, into, on, onto, beneath, between, surrounding, thru, and/or throughout, such a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or hydraulic (fluid actuated, and/or activated, and/or use), and/or other, (stationary, and/or fixed, and/or moving, and/or rotating, and/or spinning, and/or turning) track(s) assembly type(s), and/or mounting track(s) assembly type(s), protective housing case(s) assembly type(s), and/or "Exoskeleton" contour protective housing case(s) assembly type(s), and/or mount(s) assembly type(s), and/or electricity wiring, and/or pneumatic, and/or fluid(s) plumbing harness assembly type(s), and/or channel(s) assembly type(s), and/or aperture(s) assembly type(s), and/or area(s), and/or protrusions assembly type(s), within, in, into, on, onto, beneath, between, surrounding, thru, and/or throughout, and/or associated with the body (architecture) of such a corresponding adjoined, and/or adjoining, pneumatic tire(s) assembly type(s) (i.e., internal, and/or external), and/or another necessary, and/or required, suitable, and/or workable, and/or configurable, means, and/or ways, and/or element(s), and/or composite(s), and/or equipment assembly type(s), of the body (architecture) of such an corresponding adjoined, and/or adjoining, pneumatic tire(s) assembly type(s), for the purpose of, anchoring, and/or mounting, and/or embedding, and/or slotting, and/or positioning, and/or aligning, and/or orienting, and/or assembling, and/or replacing, and/or repairing, and/or servicing, and/or diagnosing, and/or measuring, and/or operating, and/or functioning, and/or integrating, and/or working, and/or controlling, and/or transferring, and/or transiting, and/or receiving, and/or communicating, and/or expelling, and/or using, and/or bracing, and/or securing (fixed) in-place, and/or hooking-up, such a corresponding adjoined, and/or adjoining, electrical, and/or electricity, and/or electric actuated, and/or magnetic, and/or permanent magnet, and/or electromagnetic assemblages, and/or lighting assemblage(s), and/or hydraulic assemblages (fluid actuated, and/or activated, and/or use), and/or other, assemblage(s), made of material(s) comprising, but not exclusive to, namely; carbon fiber(s) assembly type(s), and/or metal(s) assembly type(s), and/or metal alloy(s) assembly type(s), and/or permanent magnet(s) assembly type(s), and/or synthetic(s) assembly type(s), graphene assembly type(s), plastic(s) assembly type(s) thermoplastic(s) assembly type(s), and/or vulcanized rubber(s) assembly type(s), and/or composite(s) assembly type(s), and/or another necessary, and/or required, suitable, and/or workable, and/or configurable, material(s) assembly type(s), and/or element(s) assembly type(s), and/or composite(s) assembly type(s), and/or means, and/or ways, and/or equipment assembly type(s), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or hydraulic (fluid activated, and/or use), and/or other, (stationary, and/or fixed, and/or moving, and/or rotating, and/or spinning, and/or turning) component(s), part(s), mechanism(s), device(s), system(s), and/or apparatus assembly type(s), that are deemed necessary, and/or required, for a corresponding chosen operation(s), and/or function(s), and/or purpose(s), and/or task(s) (unbroken, and/or unimpeded), automatically, and/or manually, and/or autonomously (wirelessly), and/or remotely), of such corresponding adjoined, and/or adjoining, assemblage(s), for such a corresponding adjoined, and/or adjoining, pneumatic tire(s) assembly type(s), that operate(s), and/or function(s), and/or work(s), when mounted, and/or attached, and/or hooked-up, with, and/or onto, such a corresponding adjoined, and/or adjoining, vehicle wheel assembly type(s), that is attached, and/or mounted, and/or hooked-up onto, and/or with, a corresponding adjoined vehicle assembly type(s), and, when in motion, and/or stationary, and, for the purpose of, electrical, and/or electricity, and/or electric, and/or inductive electricity charging, navigation, communication, transmission (stationary, and dynamically), and/or hydraulic (fluid actuated, and/or activated, and/or use) automatic adjustment(s), and/or deployment(s), and/or retraction(s), electricity charging, and/or electricity transfer, and/or electricity transit(s) (unbroken and/or unimpeded) and/or other operation(s), and/or function(s), and/or purpose(s), and/or task(s) (i.e., adjustable measured projecting pin(s), and/or stud(s) assembly type(s), and/or rod(s) assembly type(s) coming out of, and/or recoiling back into, such a corresponding adjoined, and/or adjoining, pneumatic tire(s) assembly type(s)), and, transit(s), and/or transfer(s) of electricity, and/or data, and/or digital signal(s), and/or other signal(s), and/or electrical, and/or digital, and/or magnetic heating, and/or cooling element(s), and/or circulation of heating, and/or cooling, and/or actuation, and/or activation, and/or use of associated fluid(s) assembly type(s), and embedded associated hose(s) assembly type(s), and/or tube(s) assembly type(s), and/or valve(s) assembly type(s), and/or fastener(s) assembly type(s), and/or sensor(s) assembly type(s), and/or circuit(s) assembly type(s), and/or computer assembly type(s), and/or wiring assembly type(s), and/or wiring harness assembly type(s), and/or heating element(s) assembly type(s), and/or mechanism(s) assembly type(s) and/or, operating, use, conspicuity, or safety lighting, and/or other safety, and operating consideration(s), and/or element(s), and/or data, and/or digital signal(s) of, for, from, into, thru, out of, and/or between, and/or associated with such a corresponding adjoined, and/ or adjoining, pneumatic tire assembly type(s) (automatically, and/or manually, and/or autonomously (wirelessly), and/or remotely), when in motion, and/or stationary), when, such a corresponding adjoined, and/or adjoining, pneumatic tire(s) assembly type(s), is mounted, and/or attached, and/or hooked-up, onto, and/or with, such a corresponding adjoined, and/or adjoining, vehicle wheel assembly type(s), and, a corresponding adjoined vehicle assembly type(s), and, other associated component(s), part(s), mechanism(s), device(s), system(s), and/or apparatus assembly type(s), within, in, into, on, onto, beneath, between, surrounding, thru, and/or throughout, and/or associated with, but outside of, such a corresponding adjoined, and/or adjoining pneumatic tire(s) assembly type(s), and, such a corresponding adjoined, and/or adjoining vehicle wheel assembly type(s), and a corresponding adjoined vehicle assembly type(s), when in motion, and/or stationary.

Such a specifically, and/or strategically, engineered, designed, fabricated, fashioned, and/or formed, corresponding attached pneumatic tire(s) assembly type(s), when mounted, and/or attached, and/or hooked-up onto, and/or with, such a corresponding adjoined, and/or adjoining, vehicle wheel assembly type(s), and, a corresponding adjoined vehicle assembly type(s), has, and/or is holding, and/or carrying, and/or operating, and/or functioning, and/or integrating, and/or controlling, and/or communicating, and/or using, and/or generating, and/or working, and/or storing, and/or transiting, and/or transferring, and/or hooking-up, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or hydraulic (fluid actuated, and/or activated, and/or use), and/or other, (stationary, and/or fixed, and/or moving, and/or rotating, and/or spinning, and/or turning) component(s), part(s), mechanism(s), device(s), system(s), and/or apparatus assembly type(s), within, in, into, on, onto, beneath, between, surrounding, thru, and/or throughout, and/or associated with, a corresponding adjoined vehicle assembly type(s), and, such a corresponding adjoined, and/or adjoining, vehicle wheel assembly type(s), comprising, but, not exclusive to, namely; a (fixed) ring-shaped (annular) rotary manifold assembly type(s) (piece(s)), and/or a ring-shaped (annular) rotary manifold slip-ring wiring harness assembly type(s), and/or other wiring harness assembly type(s), and, a vehicle junction boxes and hook-up(s) point(s) assembly type(s), and, an automated vehicle Central Tire Inflation System (CTIS) assembly type(s), an associated pump(s) assembly type(s), associated hose(s), and/or tube(s) assembly type(s), associated fastener(s) assembly type(s), associated wiring assembly type(s), associated magnetic inductive electricity pick-up(s), associated magnetic inductive electricity charging assemblage(s), associated magnetic navigation assemblage(s), associated magnetic communication(s) assemblage(s), associated magnetic transmission(s) assemblage(s), associated magnetic receiver(s) assemblage(s), associated magnetic, and/or other associated part(s), mechanism(s), device(s), system(s), and/or apparatus assembly type(s), (AC/DC) rectifier(s) (invertor(s)) assemblage(s), associated computer(s) assembly type(s), associated software(s) assembly type(s), associated software(s) instruction(s) assembly type(s), associated control(s) assembly type(s), associated instrument panel(s) assembly type(s), associated switches assembly type(s), associated spectrum(s) assembly type(s), associated band-width(s) assembly type(s), associated frequencies assembly type(s), associated antennae assembly type(s), and/or other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or hydraulic (fluid actuated, and/or activated, and/or use), and/or other, (stationary, and/or fixed, and/or moving, and/or rotating, and/or spinning, and/or turning) component(s), part(s) mechanism(s), device(s) system(s) and/or apparatus assembly type(s), and/or another necessary, and/or required, suitable, and/or workable, and/or configurable, means, and/or ways, and/or material(s), and/or element(s), and/or equipment assembly type(s), of, for, from, into, thru, out of, and/or between, and/or associated with a corresponding adjoined vehicle assembly type(s), and, such a corresponding adjoined, and/or adjoining, vehicle wheel assembly type(s), and, such a corresponding adjoined, and/or adjoining pneumatic tire(s) assembly type(s), for the purpose of, facilitating, and/or providing, and/or enabling, electricity inductive charging (collection, transfer, and rectifying), and magnetic navigation, and communication(s), and transmission(s), and/or other enhanced safety, and/or uniformity, and/or performance value(s), and/or consideration(s), and/or element(s), of, from, into, thru, out of, and/or between, and/or associated with such a corresponding attached pneumatic tire assembly type(s) (i.e., electricity inductive pick-up, pneumatic management (air pressure), and/or temperature, and/or stability, and/or handling, and/or traction, and/or breaking, and/or steering, and/or communication, and/or diagnostic(s), and/or performance element(s), and/or visibility, and/or conspicuity, safety, and/or operating, and/or functioning, and/or directional lighting), automatically, and/or manually, and/or autonomously (wirelessly), and/or remotely, when in motion, and/or stationary, when such a corresponding adjoined, and/or adjoining, pneumatic tire assembly type(s) is attached onto, and/or with, such a corresponding adjoined, and/or adjoining, vehicle wheel assembly type(s), and a corresponding adjoined vehicle assembly type(s), and, for the purpose of, simultaneously reliably, generating, and/or transiting, and/or transferring, and/or transmitting, and/or receiving, and/or operating, and/or functioning, and/or using, and/or diagnosing, and/or measuring, and/or relating, and/or integrating, and/or interacting, and/or communicating, and/or controlling, and/or monitoring, and/or recording, and/or expelling, and/or circulating, and/or working, and/or hooking-up, a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other necessary, and/or required, operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding attached pneumatic tire(s) assembly type(s), and, a corresponding adjoined vehicle assembly type(s), and associated component(s), part(s), mechanism(s), device(s), and/or apparatus assembly type(s), automatically, and/or manually, and/or autonomously (wirelessly), and/or remotely, when in motion, and/or stationary.

9. In its most preferred alternative embodiment, such a corresponding adjoined, and/or adjoining, vehicle wheel assembly type(s), and a corresponding adjoined, and/or adjoining, (fixed) ring-shaped (annular) rotary manifold assembly type(s) (piece(s)), and/or a corresponding adjoined, and/or adjoining, ring-shaped (annular) rotary manifold slip-ring wiring harness assembly type(s), and/or other wiring harness assembly type(s), and, a corresponding adjoined, and/or adjoining, vehicle junction boxes and hook-up(s) point(s) assembly type(s), and, a corresponding adjoined, and/or adjoining, automated vehicle Central Tire Inflation System (CTIS) assembly type(s), and, a corresponding adjoined, and/or adjoining, permanent magnet(s) electromotive assemblage(s), and/or a similar working, permanent magnet(s) electromotive/electric motor (combined) assemblage(s), and, associated permanent magnet(s) gear(s) assemblage(s), and, associated permanent magnet(s) gear boxes assemblage(s), and, associated storage batteries assemblage(s), and, associated capacitor(s) assemblage(s), and, associated computer(s) assemblage(s), and, associated sensor(s) assembly type(s), and associated circuit(s) assembly type(s), and, actuator(s) assembly type(s), and, valve(s) assembly type(s), and, associated wiring assembly type(s), and, associated hose(s), and/or tube(s), and/or pipe(s) assemblage(s), and/or associated connection(s), and/or connector(s), and/or toggle(s), and/or joint(s), and/or track(s), and/or seal(s), and/or fastener(s) assembly type(s), and, permanent magnet(s) inductive/conductive assemblage(s), and, inductive electrical connection(s), and/or hook-up(s) assemblage(s), and, inductive electricity pick-up(s) assemblage(s), and, inductive navigation equipment assemblage(s), and, inductive communication(s) equipment assemblage(s), and, inductive transmission(s)/receiver(s) equipment assemblage(s), and/or associated antennae assemblage(s), and, associated protective housing case(s) assembly type(s) (piece(s)), and/or associated contour protective housing case(s) assembly type(s) (piece(s)) (i.e., “Exoskeleton” assemblage(s)) and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) component(s), part(s), mechanism(s), device(s), system(s), and/or apparatus assembly type(s), and/or other associated docking, and/or mooring, and/or bracing architecture assembly type(s) and/or protective housing case(s) assembly type(s) (piece(s)), and/or contour protective housing case(s) assembly type(s) (piece(s)) (i.e., “Exoskeleton” assemblage(s)), and/or associated channel(s) assembly type(s), and/or aperture(s) assembly type(s), and/or area(s), and/or protrusion(s) assembly type(s) and/or another necessary, and/or required, suitable, and/or workable, and/or configurable, means, and/or ways, and/or element(s), and/or composite(s), and/or material(s), and/or equipment assembly type(s), within, in, into, on, onto, beneath, between, surrounding, thru, and/or throughout, and/or associated with, such a corresponding adjoined, and/or adjoining vehicle wheel assembly type(s), and, a corresponding adjoined, and/or adjoining pneumatic tire(s) assembly type(s) and, a corresponding adjoined vehicle assembly type(s), and, associated component(s), part(s), mechanism(s), device(s) and/or apparatus assembly type(s), has, and/or holding, and/or carrying, and/or bonding, and/or adhering, and/or affixing, a protective sealant(s) assembly type(s), and/or adhesive(s) assembly type(s) and/or coating(s) assembly type(s), and/or finishes assembly type(s), and/or paint(s) assembly type(s), and/or tint(s) assembly type(s), that is injected, and/or daubed, and/or sprayed, and/or applied, and/or spread, and/or distributed within, in, into, on, onto, beneath, between, surrounding, thru, and/or throughout, and/or associated with, specific, and/or strategic, place(s), and/or area(s), of such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, a corresponding adjoined, and/or adjoining, protective housing case(s) assembly type(s) (piece(s), and/or contour protective housing case(s) assembly type(s) (piece(s)) (i.e., “Exoskeleton” assemblage(s)), and, their corresponding adjoined, and/or adjoining, associated assemblage(s), component(s), part(s), mechanism(s), device(s), system(s), and/or apparatus assembly type(s) with the use of, and/or by way of, various application technique(s), machinery, tool(s), coating(s), material(s), composite(s), element(s), and/or product(s), comprising, but, not exclusive to, namely; organic coating(s) assembly type(s), petroleum coating(s) assembly type(s), vegetable coating(s) assembly type(s), paint coating(s) assembly type(s), sealants coating(s) assembly type(s), extreme high temperature paint(s) assembly type(s), and heat sealant(s) assembly type(s), strontium aluminate(s) coating(s) assembly type(s), and/or sealant(s) assembly type(s), copper-activated zinc sulfide(s) coating(s) assembly type(s), and/or sealant(s) assembly type(s), non-radioactive glowing pigment(s) assembly type(s), powder coating(s) assembly type(s), sealant(s) assembly type(s) (electrostatic polymers), clear coating(s) assembly type(s), and/or sealant(s) assembly type(s), plating assembly type(s), rubber coating(s) assembly type(s) and, sealant(s) assembly type(s), plastic coating(s) assembly type(s), composite(s) coating(s) assembly type(s), coating(s) assembly type(s), sealant(s) assembly type(s), polymer(s) coating(s) assembly type(s), and sealant(s) assembly type(s), acrylic polyurethane enamel(s) coating(s) assembly type(s) and sealant(s) assembly type(s), acrylic enamel(s) coating(s) assembly type(s), and sealant(s) assembly type(s), lacquer(s) coating(s) assembly type(s), and sealant(s) assembly type(s), foam coating(s) assembly type(s), sprayed-on insulation coating(s) assembly type(s), electrolytic coloring assembly type(s) (anodizing), lubricant(s) assembly type(s), and/or another necessary, and/or required, suitable, and/or workable, and/or configurable, application technique(s), and/or coating(s), and/or sealant(s), and/or element(s), and/or composite(s), and/or composition(s), and/or compound(s), and/or means, and/or ways, and/or material(s), and/or equipment assembly type(s), for the purpose of, protection from corrosion, and/or wear, and tear, when exposed to various atmospheric, and/or temperature(s), and/or meteorological (weather), condition(s) and, other element(s) (i.e., air, rain, snow, ice, heat, cold, dirt, sand, grease, grime, fluids, surface(s) . . . etc.), and, for the purpose of, assembly, and, for the purpose of, insulation (i.e., padding, lining, filling, sound, and/or temperature proofing), and, for the purpose of, isolation (separation), and, for the purpose of, enhanced safety, and, for the purpose of, conspicuity at night, and/or day, and, for the purpose of, aesthetic, and, for the purpose of sound deadening, and, for the purpose of heat shielding, and/or for other necessary, and/or required, suitable, and/or workable, and/or configurable operation(s), and/or function(s), and/or purpose(s), and/or task(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e. "Exoskeleton" assemblage(s)), and, associated component(s), part(s), mechanism(s), device(s), system(s), and/or apparatus assembly type(s), when in motion, and/or stationary.

10. In its most preferred alternative embodiment, such a corresponding adjoined, and/or adjoining, vehicle wheel assembly type(s), and, such a corresponding adjoined, and/or adjoining pneumatic tire assembly type(s), and a corresponding adjoined vehicle assembly type(s), and, associated component(s), part(s), mechanism(s), device(s), system(s), and/or apparatus assembly type(s) is using, and/or generating, and/or operating, and/or functioning, and/or interacting, and/or working, and/or using, and/or transmitting, and/or transferring, and/or transiting, and/or measuring, and/or diagnosing, and/or analyzing, and/or navigating, and/or directing, and/or controlling, and/or communicating, and/or cooperating, and/or connecting, and/or interconnecting, and/or linking, and/or conversing, and/or interpreting, and/or deciphering, and/or reading, and/or hooking-up, with, and/or by way of, and/or with the use of a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) wired, and/or wireless transmitter(s), and/or receiver(s) assembly type(s), and/or antennae assembly type(s), and/or pick-up(s), and/or hook-up(s), and/or connection(s), and/or wiring, and/or cable(s), and/or line(s), and/or Wi-Fi equipment assembly type(s), and/or visual cues assembly type(s), and/or visual target(s) assembly type(s), and/or beacon(s) assemblage(s), and/or transponder(s) assemblage(s), and/or quantum compass assembly type(s), and/or Inertial Measurement Unit (IMU) assembly type(s), Inertial Navigation System (INS) assembly type(s), (i.e., ground based (hybrid terrestrial), communication(s), and/or navigation system(s) assembly type(s), and/or communication system(s) assembly type(s), and/or digital signal(s), and/or signal(s), and/or frequencies, and/or band-width(s), and/or spectrum(s), and/or magnetic field(s), and/or magnetic signaling, and/or magnetic signature(s), and/or radar(s), and/or light emitting signal(s), and/or sonar signal(s), and/or other signal(s) assembly type(s), and/or wiring assembly type(s), and/or wiring harness assembly type(s), and/or associated protective housing case(s) assembly type(s) (piece(s)), and/or contour protective housing case(s) assembly type(s) (piece(s)) (i.e., "Exoskeleton" assemblage(s)), and/or digital computer(s) assembly type(s), and/or software(s) assembly type(s), and/or cloud computing equipment assembly type(s), and/or Artificial Intelligence (AI) computing equipment assembly type(s), and (AI) software assembly type(s), and/or digital device(s) assembly type(s), and/or associated navigation equipment assemblages, and/or circuit(s) assembly type(s), and/or sensor(s) assembly type(s), and/or target(s) assembly type(s), and/or prompt(s) assembly type(s), and/or sign(s), post(s), pole(s), marker(s), guard-rail(s), wall(s), cantilever structure(s), architectural structure(s), light(s) assembly type(s), magnetic, and/or permanent magnet, and/or electromagnetic assembly type(s), and magnetic navigation, inductive charging, communication(s), and/or magnetic signaling assembly type(s) (indicator(s))), and/or another necessary, and/or required, suitable, and/or workable, and/or configurable, digital, electrical, wireless, magnetic, secure signaling, communication, navigation, transmission, receiving, inductive charging means, and/or ways, and/or material(s), and/or element(s), and/or composite(s), and/or equipment assembly type(s) that are painted on, and/or embedded, and/or amalgamated, and/or assembled, and/or used, and/or coated, and/or rendered, and/or adhered, and/or stuck on, and/or glued on, and/or part of, and/or secured (in-place), and/or hooked-up (E.g. by way of, and/or with the use of highway, road, lane, street, shoulder, sidewalk, drainage gutter(s), tarmac(s), circuit(s), parking lot demarcation(s) assemblage(s) in the form of ridged piece(s) such as dimensional road markers assemblage(s), and/or flexible piece(s), such as sectional piece(s), or tape roll(s) (reflective, and/or other) that are housing, and/or amalgamating, such navigation, communication(s), transmission(s), receiver(s), and/or inductive/conductive charging assemblage(s), and, that can be retrofitted onto, and/or near existing traveled surface(s), and, plugged into, and/or connected with security battery power system assemblage(s), and/or ground-based electricity grid assemblage(s), and/or security data grid(s) assemblage(s), and/or digital data receiving/transmitting assemblage(s), and/or security hybrid satellite communication(s) assemblage(s)), and/or specifically, and/or strategically placed, and/or embedded, and/or amalgamated within, in, into, on, onto, beneath, between, above, surrounding, thru, and/or throughout, and/or associated with, a corresponding adjoined, and/or adjoining, road(s), and/or surface(s), and/or route(s), and/or highway(s), and/or expressway(s), and/or runway(s), and/or landing field(s), and/or taxiway(s), and/or rail lines, and/or track(s), and/or launch pad(s), and/or agricultural area(s), and/or path(s), and/or driveway(s), and/or alleyway(s), and/or lane(s), and/or parking garage(s), and/or bridge(s), tunnel(s), and/or boulevard(s), and/or street(s), and/or field(s), and/or planting area(s), and/or farm(s), and/or golf course(s), and/or sidewalk(s), and/or pedestrian walkways, and/or ground(s), and/or hospital(s), campuses, and/or building(s), and/or shopping center(s), and/or city(s), and/or metropolitan area(s), and/or ranches, and/or territories, and/or any, and/or all associated area(s), and/or geographies that interact, and/or come in contact with, and/or are associated with, such a corresponding adjoined, and/or adjoining vehicle wheel assembly type(s), and, such a corresponding adjoined, and/or adjoining pneumatic tire(s) assembly type(s), and a corresponding adjoined vehicle assembly type(s), and their associated component(s), part(s) mechanism(s), device(s), system(s), and/or apparatus assembly type(s), for the purpose of, capturing, and/or recording, and/or analyzing, and/or controlling, and/or managing, and/or using, and/or storing, and/or operating, and/or functioning, and/or integrating, and/or sending, and/or transmitting, and/or receiving, and/or transiting, and/or transferring, and/or communicating, and/or measuring, and/or diagnosing, and/or hooking-up (unbroken and/or unimpeded), visual, and/or light scanned data, and/or digital data, and/or data, and/or image(s), and/or magnetic reference(s), and/or electromagnetic signal(s), and/or sonar frequencies, and/or other signal(s), and/or band-width(s), and/or frequencies, and/or spectrum(s) and/or video, and/or camera, and/or fiber optic transmission(s) assemblages, and/or magnetic, and/or permanent magnet, and/or electromagnetic assembly type(s) inductive charging, and/or inductive navigation, and/or inductive communication(s), and/or inductive transmission(s), signals, field(s), pulse(s), and/or wave(s) of, for, from, into, thru, out of, and/or between, and/or associated with such a corresponding adjoined, and/or adjoining vehicle wheel assembly type(s), and, such a corresponding adjoined, and/or adjoining, pneumatic tire(s) assembly type(s), and, a corresponding adjoined vehicle assembly type(s), automatically, and/or manually, and/or autonomously (wirelessly), and/or remotely, when in motion, and/or stationary, and, for the purpose of, determining, such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), operating area(s), and, its delimiters (i.e., free space(s)), and/or the geometry of the route(s), and/or path(s), within the operating area(s) (i.e., operating path(s)), and/or any, and/or all obstacle(s), within the operating area(s), or path(s) (i.e., moving, and/or stationary object(s)), and/or visual cue(s) (explicit and implicit) (i.e., operating scene semantics), and/or other necessary, and/or required, operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and such a corresponding adjoined, and/or adjoining pneumatic tire(s) assembly type(s) (i.e. those having, and/or holding, and/or operating, and/or functioning, and/or hooking-up, magnet(s), and/or permanent magnet(s), and/or electromagnetic component(s), part(s), mechanism(s), device(s), system(s), and/or apparatus assembly type(s)) and/or other associated component(s), part(s), mechanism(s), device(s), system(s), and/or apparatus assembly type(s), within, in, into, on, onto, beneath, between, surrounding, thru, and/or throughout, and/or outside of, but, associated with such a corresponding adjoined, and/or adjoining vehicle wheel assembly type(s), and, such a corresponding adjoined, and/or adjoining pneumatic tire(s) assembly type(s), and, a corresponding vehicle assembly type(s), automatically, and/or manually, and/or autonomously (wirelessly), and/or remotely, when in motion, and/or stationary, and, for the purpose of, dynamic control that allows for instantaneous reliable control, adjustments, and manipulations of aspects or characteristics of such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), when in motion, and/or stationary, and, for the purpose of, simultaneously reliably, generating, and/or transiting, and/or transferring, and/or transmitting, and/or receiving, and/or storing, and/or operating, and/or functioning, and/or using, and/or diagnosing, and/or measuring, and/or relating, and/or integrating, and/or interacting, and/or communicating, and/or controlling, and/or monitoring, and/or recording, and/or expelling, and/or circulating, and/or working, and/or hooking-up, a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other necessary, and/or required, operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding attached pneumatic tire(s) assembly type(s), and, a corresponding adjoined vehicle assembly type(s), and associated component(s), part(s), mechanism(s), device(s), and/or apparatus assembly type(s), automatically, and/or manually, and/or autonomously (wirelessly), and/or remotely, when in motion, and/or stationary.

Such specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) transmitter(s), and/or receiver(s), and/or antennae assembly type(s), magnetic conductor(s) assembly type(s) or magnetic inductive pick-up(s) assembly type(s), and/or magnetic signaling equipment assembly type(s), and/or magnetic signature equipment assembly type(s), and/or magnetic navigation assembly type(s), and/or magnetic communication(s) assembly type(s), and/or other associated sonar frequencies, and/or associated band-width(s), and/or associated frequencies, and/or associated Wi-Fi (wireless) equipment assembly type(s), and/or other associated signal(s) assembly type(s), and/or associated spectrum(s), and/or frequencies, and/or band-width(s), and/or pulse(s), and/or wave(s), and/or field(s), and/or applied visual cues, or target(s) assembly type(s) (i.e., those that are specifically, and/or strategically engineered, designed, fabricated, fashioned, and/or formed as, and/or within, in, into, on, onto, beneath, between, surrounding, thru, and/or throughout, and/or associated with reflector(s), road reflector(s), post(s), pole(s), marker(s), target(s), sign(s), architecture, road(s) assembly type(s), and/or usable surface(s) assembly type(s), and associated protective housing cases assembly type(s) (piece(s)), and/or contour protective housing case(s) assembly type(s) (piece(s)) (i.e., indicator(s)), and/or paint(s) (coating(s), and/or cover(s), and/or other reflective, and/or non-reflective paint(s) assembly type(s)), and/or adhesive sticker(s) assembly type(s) (reflective, and/or non-reflective), and/or communication(s) equipment assembly type(s), and/or navigation equipment assembly type(s) and/or associated Smart Road(s), Track(s), or Grid(s) assembly type(s) (i.e., Wired, and/or Wireless Road(s), Track(s), or Grid(s) assemblage(s)), and/or other associated placement(s), area(s), or component(s), part(s), mechanism(s), device(s), system(s), and/or apparatus assembly type(s)), that have, and/or hold, and/or carry, and/or use, and/or operate, and/or function, and/or communicate, and/or control, and/or work, and/or hook-up digital system(s), and/or computer(s), and/or software(s), and/or digital device(s), and/or sonar device(s), and/or electrical device(s), and/or magnetic, permanent magnet, electromagnet inductive/conductive, navigation, communication, transmission, and receiving component(s), part(s), mechanism(s), device(s), and/or apparatus assembly type(s), and/or wiring assembly type(s), and/or wiring harness assembly type(s), and/or sensor(s) assembly type(s), and/or circuit(s) assembly type(s), and/or magnet(s) assembly type(s), and/or permanent magnet(s) assembly type(s), and/or electromagnet(s) assembly type(s), and/or paint(s) (i.e., reflective coating(s) and/or other coating(s) assembly type(s)), and, other specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) component(s), part(s), mechanism(s), device(s), system(s), and/or apparatus assembly type(s), and/or another necessary, and/or required, suitable, and/or workable, and/or configurable, means, and/or ways, and/or material(s), and/or element(s), and/or composite(s), and/or equipment assembly type(s), for the purpose of relaying, and/or transmitting, and/or receiving digital, electrical, magnetic, and/or other signal(s), and/or frequencies, and/or band-width(s), and/or spectrum(s) and/or electric current(s), and/or magnetic field(s), and/or magnetic signature(s), and/or magnetic wave(s), and/or magnetic pulse(s), and/or sonar signal(s), and/or other signal(s), and/or digital information, and/or visual cues (unbroken and/or unimpeded) to aide and/or guide, and/or direct, and/or point, and/or show, and/or steer and/or inform, and/or communicate such a corresponding adjoined, and/or adjoining vehicle wheel assembly type(s), and, such a corresponding adjoined, and/or adjoining pneumatic tire assembly type(s), and, a corresponding adjoined vehicle assembly type(s), toward(s) intended direction(s), and/or place(s), and/or boundaries and/or terminus, and, for the purpose of, determining, such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), operating area(s), and, its delimiters (i.e., free space(s)), and/or the geometry of the route(s), and/or path(s), within the operating area(s) (i.e., operating path(s)), and/or any, and/or all obstacle(s), within the operating area(s), or path(s) (i.e., moving, and/or stationary object(s)), and/or visual cue(s) (explicit and implicit) (i.e., operating scene semantics), and/or other necessary, and/or required, operation(s), and/or function(s), and/or purpose(s), and/or task(s) (unbroken, and/or unimpeded), of, for, from, into, thru, out of, and/or between, and/or associated with, a corresponding adjoined vehicle assembly type(s), and, such a corresponding adjoined, and/or adjoining, vehicle wheel assembly type(s), and, such a corresponding adjoined, and/or adjoining, pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary, and, for the purpose of, reliably using such corresponding adjoined, and/or adjoining, electrical, and/or digital, and/or sonar, and/or radar, and/or magnetic, and/or electromagnetic assemblages, and/or other, transmitting, and/or receiving, and/or communication, and/or navigation assemblage(s), and/or visual cues, and/or paint(s), and/or sticker(s), and/or marker(s) assembly type(s), and/or another necessary, and/or required, suitable, and/or workable, and/or configurable means, and/or ways, and/or material(s), and/or element(s), and/or equipment assembly type(s), when satellite communication(s) equipment assembly type(s), and/or Global Positioning Systems (GPS) assembly type(s), and/or satellite navigation system(s) assembly type(s), and/or signal(s), and/or frequencies, and/or band-width(s) assembly type(s) are blocked, and/or broken, and/or intermittent, and/or ineffective, and/or unavailable in order to seamlessly communicate, and/or link, and/or connect, and/or converse, and/or read, and/or correspond, and/or control, and/or hook-up, and/or direct (electrically, and/or digitally, and/or magnetically, and/or by frequency, and/or visually, and/or other means, and/or ways) with such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), and, their associated component(s), part(s), mechanism(s), device(s), system(s), and/or apparatus assembly type(s), automatically, and/or manually, and/or autonomously (wirelessly), and/or remotely, when in motion, and/or stationary, and, for the purpose of carrying out other necessary, and/or required operation(s), and/or function(s), and/or purpose(s), and/or task(s), of, for, from, into, thru, out of, and/or between, and/or associated with such assemblages, and/or other transmitter(s) assembly type(s), and/or receiver(s) assembly type(s), and/or antennae assembly type(s), electricity power grid(s) assemblage(s), and/or electricity conductor assemblage(s), and/or electricity inductive assemblage(s), and/or visual cue(s) assembly type(s), and/or frequencies assembly type(s), and/or magnetic, permanent magnet or electromagnetic assemblages (i.e., navigation, communication, transmission, receiving, inductive, or conductive electricity transfer(s), and/or ground based communication(s) system(s) assembly type(s), and/or ground based navigation system(s) assembly type(s), and/or by way of, and/or with the use of associated Smart Road(s), Track(s), or Grid(s) (i.e., Wired, and/or Wireless Road(s), Track(s), and/or Grid(s) assemblages), and/or another necessary, and/or required, suitable, and/or workable, and/or configurable, means, and/or ways, and/or material(s), and/or element(s), and/or equipment assembly type(s), automatically, and/or manually, and/or autonomously (wirelessly), and/or remotely, when in motion, and/or stationary, and, for the purpose of, simultaneously reliably, generating, and/or transiting, and/or transferring, and/or transmitting, and/or receiving, and/or storing, and/or operating, and/or functioning, and/or using, and/or diagnosing, and/or measuring, and/or relating, and/or integrating, and/or interacting, and/or communicating, and/or controlling, and/or monitoring, and/or recording, and/or expelling, and/or circulating, and/or working, and/or hooking-up, a desired media(s), and/or medium(s) (such as compressed air, and/or other gases (+ and/or −), for a corresponding attached pneumatic tire(s) chamber(s) assembly type(s), and/or electricity supply, data, and/or digital signal(s), and/or fluid(s)), and/or other necessary, and/or required, operation(s), and/or function(s), and/or purpose(s), and/or task(s) (unbroken, and/or unimpeded), of, for, from, into, thru, out of, and/or between, and/or associated with, such a corresponding adjoined, and/or adjoining, vehicle wheel assembly type(s), and, such a corresponding attached pneumatic tire(s) assembly type(s), and, a corresponding adjoined vehicle assembly type(s), and associated component(s), part(s), mechanism(s), device(s), and/or apparatus assembly type(s), automatically, and/or manually, and/or autonomously (wirelessly), and/or remotely, when in motion, and/or stationary.

11. In its most preferred alternative embodiment, such a corresponding adjoined, and/or adjoining, vehicle wheel assembly type(s), and, such a corresponding adjoined, and/or adjoining pneumatic tire assembly type(s), and a corresponding adjoined vehicle assembly type(s), and, associated component(s), part(s), mechanism(s), device(s), system(s), and/or apparatus assembly type(s) is using, and/or generating, and/or receiving, and/or operating, and/or functioning, and/or transmitting, and/or transferring, and/or transiting, and/or interacting, and/or working, and/or protecting, and/or organizing, and/or insulating, and/or isolating, and/or controlling, and/or measuring, and/or diagnosing, and/or interacting, and/or communicating, and/or cooperating, and/or connecting, and/or interconnecting, and/or linking, and/or protecting, and/or conversing, and/or interpreting, and/or deciphering, and/or reading, and/or recording, and/or analyzing, and/or hooking-up, with, and/or by way of, and/or with the use of, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) contoured fitting protective housing case(s) assembly type(s), and/or contoured fitting “Exoskeleton” modular, buildable, serviceable, upgradable, interconnecting, interchangeable, interacting protective housing(s) assembly type(s) (piece(s)) (i.e., case(s), belt(s), ribbon(s), piece(s), part(s), component(s), ring(s), hook-up(s) point(s), junction boxes assembly type(s)), and/or another suitable, and/or workable, and/or configurable construction(s), or architecture(s), for the purpose of, housing, holding, storing, anchoring, accommodating, organizing, upgrading, isolating, insulating, building, connecting, mooring, controlling, communicating, interacting, interpreting, diagnosing, reporting, analyzing, servicing, and/or hooking-up; associated component(s), part(s), mechanism(s), device(s), system(s), and/or apparatus assembly type(s), of, for, from, into, thru, out of, and/or between, and/or associated with, the body (architecture), of such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), and, the associated contour protective housing case(s) assembly type(s) (piece(s)) (i.e., “Exoskeleton” piece(s)) and, other associated component(s), part(s), mechanism(s), device(s), system(s), and/or apparatus assembly type(s). Ideally, such a contour protective housing case(s) assembly type(s) “Exoskeleton” (piece(s)), has and/or holds and/or carries, and/or operates, and/or function(s), and/or is hooking-up, a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) On-Board Diagnostic(s) (OBD) assemblages (i.e., self-diagnostic, and reporting capability) automatically, and/or manually, and/or autonomously (wirelessly), and/or remotely, when in motion, and/or stationary. Ideally, such On-Board Diagnostic(s) (OBD) assemblages communicate using a multi-tiered application(s) (i.e., a software, and/or hardware application(s) distributed among more than one layer, logically separating, and/or safeguarding application-specific, operational, and/or functional layer(s)). The number of layer(s) varies by the administrative, and/or operation(s), and/or function(s), and/or purpose(s), and/or task(s), and/or application(s) requirement(s) architecture and/or capabilities. Such an On-Board Diagnostic(s) (OBD) system(s) provides an authorized Original Equipment Manufacturer (OEM), and/or an Original Equipment Supplier (OES) repair technician, and/or vehicle operator, and/or associated automated control system(s), and/or other authorized physical human, electrical, digital, magnetic, radar, sonar, antennae, receiver(s), transmitter(s), and/or device(s), and/or controller(s) assemblages, access to the status of various vehicle sub-system(s), and/or microcontroller(s) (MCU(s)) (i.e., small computer integrated onto computer chip), using such diagnostic(s) assemblages that allow instantaneous identity, analyzing, understanding, remedy, and reporting of malfunctions, operation(s), and/or function(s), or other necessary, and/or required, suitable, and/or workable, and/or configurable operation(s), and/or function(s), and/or purpose(s), and/or task(s), for the associated component(s), part(s), mechanism(s), device(s), system(s), and/or apparatus assembly type(s) within, in, into, on, onto, beneath, between, thru, and/or throughout, and/or associated with such a contour protective housing case(s) “Exoskeleton” assembly type(s) (piece(s)) (E.g., identifying, and communicating, and possibly rectifying a blocked, or leaky pneumatic line, a broken electrical connection, a poorly operating valve, a digital intruder . . . etc.), Ideally, such diagnostic assemblages operate, function, communicate and/or control within dedicated On-Board Diagnostic(s) (OBD), and/or communication(s) (signal(s) protocol(s)) (i.e., established to ISO 15031, OBD-II Diagnostic Data Code(s), SAE J1850 Pulse-Width Modulation (PWM), J1850 Variable Pulse-Width (VPW), and J1979 Parameter Identification Number(s) (PID(s), ISO 9141-2, ISO 14230 Keyword Protocol 2000, ISO 15765 Controller Area Network (CAN BUS, and SAE Standards Documents on (OBD-II)—J1962, J1850, J1978, J1979, J2012, J2178-1, J2178-2, J2178-3, J2284-3, J2411, J1939, ISO 9141, ISO 1989 Part(s) 1, 2, 3, ISO 11898, ISO 14230 Part(s) 1, 2, 3, 4, ISO 15031 Part(s) 1, 2, 3, 4, 5, 6, 7, ISO 15765 Part(s) 1, 2, 3, 4, ISO 26262 (categorizes Quality Management (QM), or Automotive Safety Integrity Levels (ASIL), and/or other SAE, ISO, or ITU data, transmission, signal protocol(s), or standard(s)), and/or another necessary, and/or required suitable, and/or workable, and/or configurable means and/or ways, and/or software(s), and/or equipment architecture(s) (E.g., Domain Controller Architecture(s), or Zonal Architecture(s) assembly type(s)) specifically dedicated to “On-Board Diagnostic(s)” (OBD), and/or digital communication(s), and/or navigation assemblage(s), and/or long-range radar(s), and/or LIDAR, and/or camera, and/or short/medium range radar(s), and/or sonar, and/or Wi-Fi assemblage(s), and/or Near Field Communication(s) (NFC) assemblage(s), and/or associated resonator(s), or oscillator(s), or amplifier(s) assemblage(s), and/or other magnetic, permanent magnet, and/or electromagnetic, and/or ultrasound assemblage(s), and/or frequencies, and/or band-width(s), and/or spectrum(s), and/or signal(s), and/or wave(s), and/or field(s), and/or pulse(s) assembly type(s), communication, navigation, transmission, receiver, antennae, inductive electricity charging assemblages, that have, and/or require the highest security protocol(s) (i.e., those protocols that incorporate “Authentication” (i.e., proving an assertion, such as the identity of the computer system(s), or physical user(s)—The process of verifying that identity by validating personal identity documents, verifying the authenticity of a website or corresponding digital transmission(s), and/or communication(s), with a digital certificate (i.e., Password(s), Digital Key(s), or other access device(s) to allow system access, or ensuring that a digital request is not counterfeit)), and, “Authorization” (i.e., the function of specifying access rights/privileges to resources, which is related to general information security and computer security, and to access control in particular), for the purpose of, secured reliable data, and/or non-hackable (heightened security) digital transmission(s), and/or Cybersecurity, and/or Operating, and/or Functional Safety (i.e., internal, and/or external (send and receive) signal(s) assembly type(s)), and preventing outside third parties (i.e., physical person(s), and/or digital device(s) assembly type(s), and/or computer(s) system(s) assembly type(s), and software(s) assembly type(s), and/or cloud computing assemblages, and/or Artificial Intelligence (AI) assemblages, and/or satellite system(s) assembly type(s), and/or ground based navigation and communication assemblages, and/or magnetic navigation and communication assemblages, and/or sonar assemblages, and/or antennae assemblage(s), and associated frequencies, band-widths, spectrum(s), and/or magnetic field(s) gaining control over many vehicle component(s) by uploading new Firmware into control units (i.e., software that provides low level control), and, for the purpose of other necessary, and/or required, suitable, and/or workable, and/or configurable operation(s), and/or function(s), and/or purpose(s), and/or task(s) for a chosen corresponding adjoined, and/or adjoining, operating, and/or functioning standard(s) of such assemblages, and, for the purpose of, governance, by international, and/or world-wide, and/or country specific law(s), and/or unified state(s) law(s), and/or state(s) law(s), and/or regulation(s) and/or standard(s), and/or other governance, and/or homologation, and for the purpose of, simultaneously reliably, generating, and/or supplying, and/or enabling, and/or facilitating, and/or transferring, and/or transiting, and/or transmitting, and/or receiving, and/or delivering, and/or discharging, and/or depleting, and/or operating, and/or functioning, and/or using, and/or storing, and/or controlling, and/or managing, and/or protecting, and/or isolating, and/or insulating, and/or monitoring, and/or diagnosing, and/or measuring, and/or analyzing, and/or communicating, and/or recording, and/or working, and/or interacting, and/or integrating, and/or hooking-up (unbroken, and/or unimpeded), a corresponding desired media(s), and/or medium(s) (such as, compressed air, and/or other gases (+ and/or −) for a corresponding attached pneumatic tire(s) chamber(s) assembly type(s)), and/or electricity supply, data, and/or digital signal(s), and/or fluid(s)), and/or other corresponding chosen operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary. Ideally, such a contour protective housing architecture, or “Exoskeleton” (i.e., outer skeleton assemblage(s) (piece(s)), also contains corresponding adjoined, and/or adjoining pneumatic line(s), and/or fluid(s) line(s), or hose(s), or tube(s) assembly type(s), and communication(s) line(s), electricity line(s), or wiring assembly type(s), plug(s) assembly type(s), socket(s) assembly type(s), magnet(s), permanent magnet(s), and/or electromagnetic assemblages, magnetic induction pick-up(s) assemblage(s), and/or magnetic connection(s) point(s) (i.e., regulated under “QI”, and/or “PMA” standard(s), and/or other), and associated connection(s), and docking point(s) assembly type(s), junction boxes assembly type(s), hook-up(s) point(s) assembly type(s), valve(s) assembly type(s), actuator(s) assembly type(s), circuit(s) assembly type(s), sensor(s) assembly type(s), fastener(s) assembly type(s), seal(s) assembly type(s), and sealing materials and/or other component(s), part(s), mechanism(s), device(s), system(s), and/or apparatus assembly type(s) deemed necessary, and/or required, for a corresponding adjoined, and/or adjoining, operating, and/or functioning standard(s) of such contour protective housing case(s) assembly type(s) (piece(s)) (i.e., “Exoskeleton” assemblage(s)), when mounted and/or attached, and/or hooked-up within, inside, into, out of, on, onto, beneath, between, surrounding, thru, and/or throughout, and/or associated with, a specific, and/or strategic contour(s), area(s), portion(s), section(s) of such a corresponding adjoined, and/or adjoining vehicle wheel assembly type(s) (i.e., the inner backside hub face, the inner rim, the outer rim, the outer frontside hub face of such a corresponding adjoined, and/or adjoining, vehicle wheel assembly type(s)), and/or such a corresponding adjoined, and/or adjoining pneumatic tire(s) assembly type(s) (i.e., the inner chamber(s), sidewalls, bead(s), section(s), area(s), portion(s), of such a corresponding adjoined, and/or adjoining pneumatic tire(s) assembly type(s)), and/or another necessary, and/or required, suitable, and/or workable and/or configurable, place(s), or area(s), within, in, into, out of, on, onto, beneath, between, surrounding, thru, and/or throughout, and/or associated with, the body (architecture) of such a corresponding adjoined, and/or adjoining, vehicle wheel assembly type(s), and/or such a corresponding adjoined, and/or adjoining pneumatic tire(s) assembly type(s), and, a corresponding adjoined vehicle assembly type(s), for the purpose of, completing a reliable, safe, secure, organized, insulated, isolated, and protected pneumatic connection(s) or hook-up(s), and electrical connection(s) or hook-up(s), and digital connection(s), or hook-up(s), and, magnetic inductive connection(s), and/or hook-up(s), and fluid(s) connection(s), or hook-up(s), and/or other associated connection(s), or hook-up(s) of, for, from, into, thru, out of, and/or between, and/or associated with a corresponding adjoined vehicle assembly type(s), and/or a corresponding adjoined, and/or adjoining, ring-shaped (annular) rotary manifold assembly type(s) (piece(s)) and/or other, and/or a corresponding adjoined, and/or adjoining, ring-shaped (annular) slip-ring wiring harness assembly type(s), and/or other wiring harness assembly type(s), and, a corresponding adjoined, and/or adjoining, vehicle junction boxes and hook-up(s) point(s) assembly type(s), and, other associated component(s), part(s), mechanism(s), device(s), system(s), and/or apparatus assembly type(s) (i.e., a stationary and/or moving source(s)), and, such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s) (i.e., a moving and/or stationary structure(s)). Ideally, such a corresponding adjoined, and/or adjoining vehicle wheel assembly type(s), and, such a corresponding adjoined, and/or adjoining pneumatic tire assembly type(s) are manufactured with specifically, and/or strategically placed aperture(s), and/or channel(s), and/or area(s) and/or protrusion(s) assembly type(s), for the purpose of assembling, and/or connecting, and/or holding, and/or having, and/or guiding, and/or anchoring, and/or mooring, and/or fitting and/or hooking-up, and/or securing "in-place" such a contour protective housing(s) case(s) assembly type(s) (piece(s)) (i.e., "Exoskeleton" assemblage(s)), and/or "Exoskeleton" contour architecture(s) assemblage(s) (piece(s)) (i.e., with the use of corresponding adjoined, and/or adjoining, seal(s), and/or sealing material(s), and/or flush mounting fastener(s) assembly type(s)), and/or another necessary, and/or required, suitable, and/or workable, and/or configurable means, and/or ways, and/or material(s), and/or element(s), and/or composite(s), and/or equipment assembly type(s), and, for the purpose of, simultaneously reliably, generating, and/or transferring, and/or transiting, and/or transmitting, and/or receiving, and/or controlling, and/or managing, and/or monitoring, and/or communicating, and/or diagnosing, and/or measuring, and/or recording, and/or using, and/or storing, and/or interacting, and/or integrating, and/or operating, and/or functioning, and/or working, and/or connecting, and/or hooking-up, a desired media(s), and/or medium(s) (such as compressed air, and/or other gases (+ and/or −) for a corresponding attached pneumatic tire(s) chamber(s) assembly type(s), and/or electricity, data, and/or digital signal(s), and/or fluid(s)), and/or other necessary, and/or required corresponding chosen, operation(s), and/or function(s), and/or purpose(s), and/or task(s) (unbroken, and/or unimpeded), of such corresponding adjoined, and/or adjoining assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary. Depending on the corresponding adjoined vehicle assembly type(s), such a layered on, contour armor protective housing case(s) assembly type(s) (piece(s)), and/or contour protective casing(s) assembly type(s) (piece(s)), and/or contour protective housing case "shell(s)" assembly type(s) (piece(s)), and/or contour architectural protective housing(s) case(s) assembly type(s) (i.e., "Exoskeleton" assemblage(s)) (piece(s)) (i.e., a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, airtight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) outer skeleton contour protective housing(s) case(s) assembly type(s) (piece(s)), hold, and/or contain, and/or protect, and/or organize, and/or isolate, and/or insulate, and/or connect, and/or control, and/or use, and/or hook-up, and/or secure (in-place), a corresponding adjoined, and/or adjoining pneumatic line(s) assembly type(s), and electrical line(s) assembly type(s), and/or digital line(s) assembly type(s), and, magnetic inductive electricity charging assemblage(s), and, magnetic navigation assemblage(s), and, magnetic communication(s) assemblage(s), and, magnetic transmitter(s) assemblage(s), and, magnetic receiver(s) assemblage(s), and, associated sensor(s) assemblage(s), and, associated circuit(s) assemblage(s), and, associated actuator(s) assemblage(s), and, associated antennae assemblage(s), and, associated wiring assemblage(s), associated camera(s), and/or video camera(s), associated radar(s) assemblage(s), associated sonar(s) assemblage(s), associated LIDAR(s) assemblage(s), associated magnetic navigation, communication, transmission assemblage(s), associated Near Field Communication(s) (NFC) assemblage(s), associated Wi-Fi assemblage(s), associated sensor(s) assembly type(s), associated illumination, lighting, and/or LED(s) (light emitting diode(s)) lighting assemblage(s), and, associated wiring harness assemblage(s), and, associated magnetic inductive electricity pick-up(s), connection(s), plug(s), socket(s), and/or hook-up(s) assemblage(s), permanent magnet(s) inductive/conductive assemblage(s), electromotive, and/or electromotive/electric motor (combined) assemblage(s), superfluous pneumatic valve(s) and, passageway(s), associated docking assemblage(s), associated ring-shaped (annular) and/or other rotary manifold (housing case(s)) assemblage(s), associated permanent magnetic ring-shaped (annular) rotor(s) assemblage(s), and, associated AC/DC rectifier(s), invertor(s), amplifier(s), oscillator(s) assemblage(s), and, associated valve(s) assemblage(s), and, associated computer(s), associated computer-on-chip(s), chipset(s) ("Data Flow Management System(s)"), associated processor(s), associated operating system(s), Microcontroller(s) (MCUs) and/or sensor(s), and/or inertial sensor(s), motion sensor(s), tilt sensor(s), gyros, phase radio-altimeter(s), other altimeter(s), rotation sensor(s), magnetic sensor(s), magnetometer(s), Inertial Navigation System(s) (INSs), Inertial Measurement Unit(s) (IMUs), and, other digital, and/or electrical, and/or magnetic assemblage(s), and/or other associated component(s), part(s), mechanism(s), device(s), system(s), apparatus assembly type(s), and/or another necessary, and/or required, suitable, and/or workable, and/or configurable, means, and/or ways, and/or element(s), and/or material(s), and/or equipment, and/or component(s), and/or part(s), and/or mechanism(s), and/or device(s), and/or system(s), and/or apparatus assembly type(s) of, for, from, into, out of, thru, and/or between, and/or associated with such a corresponding adjoined, and/or adjoining, protective housing case(s) assembly type(s) (piece(s)), and/or such a corresponding adjoined, and/or adjoining, contour protective housing case(s) assembly type(s) (piece(s)) (i.e., "Exoskeleton" assemblage(s)), and, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), that allows, and/or makes available, quick change servicing of, and/or for; malfunction(s), or maintenance, or upgrade(s) to such a system (i.e., cleaning, flushing, inspecting, testing, or replacement of integrated component(s), part(s), mechanism(s), device(s), system(s), and/or apparatus assembly type(s)), it also eliminates the need to form and/or use pneumatic line(s), and/or passage(s) for electrical line(s), and/or their associated connection(s) point(s) with a pneumatic rotary manifold assembly type(s) inside the hub, and/or hub aperture(s), and/or spoke(s) portion(s), and/or area(s) of a corresponding adjoined, and/or adjoining vehicle wheel assembly type(s) (i.e. those hollowed-out area(s) internally integrated within the hub, and/or hub aperture(s), or spoke(s) portion(s), and/or area(s), or other area(s) of a corresponding adjoined, and/or adjoining, vehicle wheel assembly type(s)), thus removing the possibility of unknown damage(s) to pneumatic, and fluid(s) line(s), and associated electrical wiring, such as fraying, breakage, bending, corrosion, cutting, and/or other, and also removing any other unknown system(s) problem(s) E.g., with broken, leaking, or problematic pneumatic line(s) or pneumatic connection(s), or fluid(s) line(s), or connection(s), and/or electrical line(s), or electrical connection(s), and/or other digital, or other connection(s) when such a corresponding adjoined, and/or adjoining vehicle wheel assembly type(s) is slightly damaged in a minor accident (E.g., distorting or pinching off, or altering, or breaking, or tearing of system designed pneumatic, and/or fluid(s) flow(s), and/or electrical, and/or digital connection(s) when such line(s), and/or connection(s) is directly inserted within a hollowed-out area(s) of a vehicle wheel structure), in these examples, the pneumatic line(s), and/or electrical line(s), and/or other connection(s) point(s) associated with an associated pneumatic rotary manifold assembly type(s) that is directly installed inside a hollowed-out portion of such a vehicle wheel, could fail, and/or malfunction without notice, and their replacement would entail changing-out (i.e., replacement) of the entire vehicle wheel. On the other hand, such a contour protective housing case(s) assembly type(s) (piece(s)), or "Exoskeleton" contour protective housing case(s) assembly type(s) (piece(s)) having, and/or holding, and/or carrying, and/or operating, and/or functioning, and/or hooking-up the pneumatic, fluid(s) and electrical line(s), connection(s), anchoring(s), docking(s), mooring(s), and/or other associated component(s), part(s), mechanism(s), device(s), system(s), and/or apparatus assembly type(s), and/or operation(s), and/or function(s), and/or purpose(s), and/or task(s) of, for, from, into, out of, thru, and/or between, and/or associated with such a corresponding adjoined, and/or adjoining vehicle wheel assembly type(s), and/or such a corresponding adjoined, and/or adjoining pneumatic tire(s) assembly type(s), and, a corresponding adjoined vehicle assembly type(s), and other associated component(s), part(s), mechanism(s), device(s), system(s), and/or apparatus assembly type(s), facilitates quick and easy servicing, replacement, testing, cleaning, installation, repair, diagnostic(s), measurement(s), changing, retrofitting, and upgrade(s) of, and/or for, such corresponding adjoined, and/or adjoining assemblages by simply removing any damaged or malfunctioning, or outdated protective housing case(s) assembly type(s) (piece(s)), and/or contour protective housing case(s) assembly type(s) (piece(s)), and replacing with a new corresponding replacement part (piece(s)). Ideally, such a protective housing case(s) assembly type(s) (piece(s)), and/or contour protective housing case(s) assembly type(s) (piece(s)) (i.e., "Exoskeleton" assemblage(s)), is made to assemble and/or disassemble quickly, and easily by an interlocking, and/or connecting (toggle) assemblage(s) with the corresponding (piece(s)) fitting, and/or connecting seamlessly together, to complete the designed connected circuit, or system(s) assembly type(s), or by disconnecting any malfunctioned (piece(s)), and replacing with new pre-manufactured Original Equipment Manufacturer (OEM) part(s) (piece(s) (i.e., the correct corresponding (piece(s))), and/or another necessary, and/or required, suitable, and/or workable, and/or configurable means, and/or ways, and/or materials, and/or element(s), and/or composite(s) and/or equipment assembly type(s) for a chosen corresponding adjoined, and/or adjoining, operating, and/or functioning standard(s) of such assemblage(s). Ideally, it is conceivable, that such a protective housing case(s) assembly type(s) (piece(s)), and/or contour protective housing case(s) assembly type(s) (piece(s)) (i.e., "Exoskeleton" assemblage(s)) and, accompanying, associated components, part(s), mechanism(s), device(s), system(s), and/or apparatus assembly type(s), and, their associated capabilities, could be adapted, and made readily available, and scalable for retrofitting to an existing vehicles' wheel(s), pneumatic tire(s), and, the associated vehicle as an aftermarket system(s) upgrade (i e, enhancement) for transferrable key feature(s) (E.g., dynamic tire inflation and management (+ and/or −), navigation, communication, inductive electricity charging, or use of single chamber pneumatic tire(s) assembly type(s), or higher performance three chamber pneumatic tire(s) assembly type(s), On-Board Diagnostic(s) (OBD) system assembly type(s), or use of pneumatic tire(s) assembly type(s) with integrated vehicle lighting, heating, cooling, and, advance grip and traction (i.e., a measured deployable and retractable stud(s) or protrusion(s)) capabilities . . . and/or another capabilities based on the corresponding adjoined vehicle assembly type(s)). Ideally, such protective housing case(s) assembly type(s) (piece(s)) are made of, and/or having, and/or holding, and/or using; thermo-plastic(s) assembly type(s), vulcanized rubber assembly type(s), carbon fiber assembly type(s), composite(s) assembly type(s), graphene assembly type(s), element(s) assembly type(s), plastic(s) assembly type(s), metal(s) assembly type(s), metal alloy(s) assembly type(s), magnet(s) assembly type(s), permanent magnet(s) assembly type(s), electromagnet(s) assembly type(s), and, associated seal(s), fastener(s), and, sealing material(s), and/or another necessary, and/or required, suitable, and/or workable, and/or configurable means, and/or ways, and/or materials, and/or element(s), and/or composite(s), and/or equipment assembly type(s), for the purpose of, precise, flush mounting, and/or fitment, and/or assembly, and/or other necessary, and/or required, suitable, and/or workable, and/or configurable operation(s), function(s), purpose(s), and/or task(s) of such assemblages. Ideally, such contour protective housing case(s) assembly type(s) use, and/or hold, and/or house, and/or operate, and/or function, and/or hook-up; magnetic, and/or permanent magnet(s), and/or electromagnetic component(s), part(s), mechanism(s), device(s), system(s), and/or apparatus assembly type(s), for the purpose of, electricity connection(s) point(s), (i.e., magnetic inductive coupling regulated under "QI" or "PMA" standard(s)), and/or electricity supply, and/or electrical inductive charging of a corresponding adjoined vehicle assembly type(s) batteries, and/or electrochemical cell(s), and/or another necessary, and/or required, suitable, and/or workable, and/or configurable operation(s), and/or function(s), and/or purpose(s), and/or task(s) of, for, from, into, thru, out of, and/or between, and/or associated with, associated component(s), part(s), mechanism(s), device(s), system(s), and/or apparatus assembly type(s) of such a corresponding adjoined, and/or adjoining, vehicle wheel assembly type(s), and/or such a corresponding adjoined, and/or adjoining pneumatic tire(s) assembly type(s), and/or a corresponding adjoined vehicle assembly type(s), automatically, and/or manually, and/or autonomously (wirelessly), and/or remotely, when in motion, and/or stationary. Such a contour protective housing case(s) assembly type(s) (piece(s)) gives additional protection from any damage(s)

that may occur from outside element(s) such as weather, road conditions, or dirt, dust, mud, rock(s) . . . etc., or vehicle use(s) by packaging the corresponding component(s), part(s), mechanism(s), device(s), system(s), and/or apparatus assembly type(s) into a hermetically sealed, shock resistant, insulated, isolated contour protective housing case(s) (piece(s)) ("Exoskeleton") assembly type(s).

12. In its most preferred alternative embodiment, such a corresponding adjoined, and/or adjoining, vehicle wheel assembly type(s), and, such a corresponding adjoined, and/or adjoining pneumatic tire assembly type(s), and a corresponding adjoined vehicle assembly type(s), and, associated component(s), part(s), mechanism(s), device(s), system(s), and/or apparatus assembly type(s) is using, and/or generating, and/or storing, and/or operating, and/or functioning, and/or interacting, and/or working, and/or protecting, and/or recording, and/or analyzing, and/or transferring, and/or transiting, and/or transmitting, and/or depleting, and/or diagnosing, and/or measuring, and/or organizing, and/or insulating, and/or isolating, and/or controlling, and/or communicating, and/or cooperating, and/or connecting, and/or interconnecting, and/or linking, and/or conversing, and/or interpreting, and/or deciphering, and/or reading, and/or hooking-up, with, and/or by way of, and/or with the use of, and/or via a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) (fixed) ring-shaped (annular) rotary manifold (housing case) assembly type(s) (piece), and, a corresponding adjoined, and/or adjoining, ring-shaped (annular) rotary manifold (shaft cap) assembly type(s) (piece) that is amalgamated, and/or emanating, and/or hooked-up, and/or (fixed) secured in-place with, within, in, into, on, onto, beneath, between, surrounding, thru, and/or throughout, and/or associated with a corresponding adjoined, and/or adjoining, "Exoskeleton" hub docking assembly type(s) (piece(s)), and/or a corresponding adjoined vehicle hub/rotor assembly type(s) (piece(s)) (i.e., the moving, spinning, rotating, hub (rotor) section having, and/or holding corresponding mounting, and/or securing threaded mounting bolt(s) assembly type(s), and/or the hub/rotor section that is connected to a corresponding adjoined vehicles' axel, and/or drivetrain, allowing such a corresponding adjoined, and/or adjoining, vehicle wheel(s) assembly type(s), and/or such a corresponding adjoined, and/or adjoining pneumatic tire(s) assembly type(s), to torque (move) when mounted, and/or attached, and/or hooked-up, onto, and/or with the corresponding adjoined vehicle assembly type(s), and when power is applied). Such a corresponding adjoined, and/or adjoining, ring-shaped (annular) rotary manifold (housing case) assembly type(s) (piece), is assembled with a corresponding adjoined, and/or adjoining, ring-shaped (annular) rotary manifold (shaft cap) assembly type(s) (piece), with the use, and/or by way of, an associated ball bearing(s) assembly type(s), ball bearing(s) track(s), and/or sealed ball bearing(s) assembly type(s), seal(s) assembly type(s), locking ring(s) assembly type(s), sealing materials, and, fastener(s) assembly type(s), that is assembled between the ring-shaped (annular) rotary manifold (housing case) assembly type(s) (piece), and, the ring-shaped (annular) rotary manifold (shaft cap) assembly type(s) (piece), and/or another necessary, and/or required, suitable, and/or workable, and/or configurable, means, and/or ways, and/or element(s), and/or composite(s), and/or material(s), and/or equipment assembly type(s) for the purpose of, allowing the ring-shaped (annular) rotary manifold (housing case) assembly type(s) (piece), to move freely when mounted, and/or attached, and/or hooked-up, and/or docking, with such a corresponding adjoined, and/or adjoining, vehicle wheel assembly type(s), and/or such a corresponding adjoined, and/or adjoining pneumatic tire(s) assembly type(s), and, when gravity, and/or torque (motion) is applied. Ideally, the ring-shaped (annular) rotary manifold (shaft cap) assembly type(s) (piece), is amalgamated, and/or emanating, and/or hooked-up, and/or secured (fixed) in-place from, and/or surrounding the corresponding adjoined vehicles' hub(s) housing case(s) assembly type(s) (piece(s)), and, situated directly behind the ring-shaped (annular) rotary manifold (housing case) assembly type(s) (piece) (i.e., separated by associated bearing(s), bearing(s) track(s), sealed ball bearing(s), and seal(s) assemblage(s)). The ring-shaped (annular) rotary manifold (housing case) assembly type(s) (piece) is amalgamated, and/or emanating, and/or hooked-up to, and/or from, and/or surrounding, the vehicles' hub (rotor) section assembly type(s) (i.e., the moving section of the corresponding adjoined vehicles' attachment hub, or the "rotor" assembly type(s) (piece) that connect(s) directly with such a corresponding adjoined, and/or adjoining, vehicle wheel(s) assembly type(s) corresponding hub(s) and/or bolt(s) (pattern(s)) aperture(s) assembly type(s), and/or another necessary, and/or required, suitable, and/or workable, and/or configurable, means, and/or ways, and/or element(s), and/or composite(s), and/or material(s), placement(s), and/or area(s), and/or equipment assembly type(s), for the purpose of, docking into a corresponding adjoined, and/or adjoining, contour protective housing case(s) assembly type(s) "Exoskeleton" receptacle(s) assembly type(s) (piece(s)) (i.e., a specifically, and/or strategically, engineered, designed, fabricated, fashioned, or formed, in-built, inherent, attached, and/or attachable, corresponding adjoined, and/or adjoining (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s), and/or other, (stationary, and/or fixed, and/or moving, and/or rotating, and/or spinning, and/or turning) receptacle, and/or mooring, and/or anchoring assemblage(s) having, and/or receiving, and/or connecting, and/or sealing, and/or isolating, and/or insulating, and/or holding, and/or carrying and/or operating, and/or aligning, and/or protecting, and/or functioning, and/or controlling, and/or hooking-up associated, permanent magnet inductive electricity connection(s), electricity connection(s), pneumatic connection(s), digital connection(s), fluid(s) connection(s), and/or other associated connection(s) of, for, from, into, thru, out of, and/or between, and/or associated with, such a corresponding adjoined, and/or adjoining, protective housing case(s) assembly type(s) (piece(s), and/or contour protective housing case(s) assembly type(s) (piece(s)) (i.e., "Exoskeleton" assemblage(s)), and, such a corresponding adjoined, and/or adjoining, vehicle wheel assembly type(s), and, such a corresponding adjoined, and/or adjoining pneumatic tire(s) assembly type(s), and a corresponding adjoined vehicle assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary. Ideally, when assembled together, the ring-shaped (annular) rotary manifold assembly type(s) (piece(s)), are hooked-up with, and/or connected onto, and/or assembled together, in front of, and/or surrounding, a corresponding adjoined vehicle assembly type(s) brake(s), and/or rotor(s), and/or brake(s) caliper(s) assembly type(s), with a corresponding adjoined, and/or adjoining, ring-shaped (annular) wiring harness assembly type(s), and/or other wiring harness assembly type(s), and/or a vehicle junction box and hook-up(s) point(s) assembly type(s), and/or other associated component(s), part(s), mechanism(s), device(s), system(s), and/or apparatus assembly type(s) (i.e., a stationary, and/or fixed, and/or moving, and/or rotating, and/or spinning, and/or turning structure(s), and/or source(s) assembly type(s)) of, for, from, into, thru, out of, and/or between, and/or associated with, a corresponding vehicle assembly type(s), as placed, and/or connected, and/or hooked-up, directly behind such a corresponding adjoined, and/or adjoining, ring-shaped (annular) rotary manifold assembly type(s) (piece(s)) (i.e., as assembled, and/or hooked-up together), and/or another necessary, and/or required, suitable, and/or workable, and/or configurable means, and/or ways, and/or element(s), and/or composite(s), and/or material(s), and/or placement(s), and/or area(s), and/or equipment assembly type(s), for the purpose of, and/or for completing a, pneumatic connection(s), or hook-up(s), and electrical connection(s), or hook-up(s), and, permanent magnet electrical inductive connection(s), and/or hook-up(s), and digital connection(s), or hook-up(s), and, fluid(s) connection(s), or hook-up(s), and/or other necessary, and/or required connection(s), or hook-up(s), of, for, from, into, thru, out of, and/or between, and/or associated with, a corresponding adjoined vehicle assembly type(s), and/or the corresponding adjoined, and/or adjoining, ring-shaped (annular) rotary manifold assembly type(s) (piece(s)), and/or a corresponding adjoined, and/or adjoining, ring-shaped (annular) wiring harness assembly type(s), and/or other wiring harness assembly type(s), and/or other, and, a corresponding adjoined, and/or adjoining, vehicle junction boxes and hook-up(s) point(s) assembly type(s), and, other associated component(s), part(s), mechanism(s), device(s), system(s), and/or apparatus assembly type(s) (i.e., a stationary, and/or fixed, and/or moving, and/or rotating, and/or spinning, and/or turning structure(s), and/or source(s) assembly type(s)), of such a corresponding adjoined, and/or adjoining vehicle wheel assembly type(s), and, such a corresponding adjoined, and/or adjoining pneumatic tire(s) assembly type(s), and, a corresponding adjoined vehicle assembly type(s), and, associated component(s), part(s), mechanism(s), device(s), system(s), and/or apparatus assembly type(s) (i.e., a moving and/or stationary structure(s)) when such a corresponding adjoined, and/or adjoining, vehicle wheel assembly type(s), and/or such a corresponding adjoined, and/or adjoining pneumatic tire(s) assembly type(s) is mounted, and/or attached, and/or hooked-up, onto, and/or with a corresponding adjoined vehicle assembly type(s), having, and/or holding, and/or carrying, and/or operating, and/or functioning, and/or controlling, and/or hooking-up such a corresponding adjoined, and/or adjoining, ring-shaped (annular) rotary manifold assembly type(s) (piece(s)), and, associated component(s), part(s), mechanism(s), device(s), system(s), and/or apparatus assemblage(s), and, for the purpose of, assembling, and/or interacting, and/or operating, and/or functioning, and/or controlling, and/or recording, and/or measuring, and/or diagnosing, and/or analyzing, and/or communicating, and/or transiting and/or receiving, and/or transmitting, and/or connecting, and/or anchoring, and/or mooring, and/or fitting and/or hooking-up, and/or securing (fixed) in-place such assemblages with, within, in, into, on, onto, beneath, between, surrounding, thru, and/or throughout, and/or associated with, such a corresponding adjoined, and/or adjoining, protective housing case(s) assembly type(s) (piece(s)), and/or contour protective housing(s) case(s) assembly type(s) (piece(s)) (i.e., "Exoskeleton" assemblage(s)), and/or contour protective housing architecture(s) assembly type(s) (piece(s)), and, associated component(s), part(s), mechanism(s), device(s), system(s), and/or apparatus assembly type(s) (i.e., with the use of, and/or by way of, a corresponding adjoined, and/or adjoining, seal(s) assembly type(s), and/or sealing material(s), and/or flush mounting fastener(s) assembly type(s), and/or "Exoskeleton" docking receptacle(s) assemblage(s) (piece(s)), and/or "Exoskeleton" mooring assemblage(s) (piece(s))), and/or another necessary, and/or required, suitable, and/or workable, and/or configurable means, and/or ways, and/or material(s), and/or element(s), and/or composite(s), and/or equipment assembly type(s), for the purpose of, simultaneously reliably, generating, and/or using, and/or transferring, and/or transiting, and/or transmitting, and/or receiving, and/or recording, and/or controlling, and/or managing, and/or analyzing, and/or diagnosing, and/or monitoring, and/or communicating, and/or recording, and/or measuring, and/or diagnosing, and/or connecting, and/or storing, and/or depleting, and/or evacuating, and/or interacting, and/or integrating, and/or operating, and/or functioning, and/or working, and/or hooking-up, a desired media(s), and/or medium(s) (such as compressed air, and/or other gases (+ and/or −) for a corresponding attached pneumatic tire(s) chamber(s) assembly type(s), and/or electricity, data, and/or digital signal(s), and/or fluid(s)), and/or other necessary, and/or required corresponding chosen, operation(s), and/or function(s), and/or purpose(s), and/or task(s) (unbroken, and/or unimpeded), of such corresponding adjoined, and/or adjoining assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), and associated component(s), part(s), mechanism(s), device(s), system(s), and/or apparatus assembly type(s), automatically, and/or manually, and/or autonomously (wirelessly), and/or remotely, when in motion, and/or stationary.

Exemplary Embodiments of the Invention

1. A vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., "Exoskeleton" assemblage(s)), that has, and/or is holding, and/or carrying, and/or operating, and/or functioning, and/or hooking-up, and/or supporting, specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, channel(s), aperture(s), area(s), tunnel(s), passageway(s), path(s), compartment(s), and, vessel(s) assembly type(s), for assembly, and proximity, and, hook-up of associated component(s), part(s), mechanism(s), device(s), system(s), and/or apparatus assembly type(s), and/or another necessary, and/or required, operation(s), function(s), purpose(s), and/or task(s) (unbroken and/or unimpeded), when mounted, and/or attached, and/or hooked up with, and/or onto, a corresponding adjoined vehicle assembly type(s), automatically, and/or manually, and/or autonomously (wirelessly), and/or remotely, and, when in motion, and/or stationary.

2. A vehicle wheel assembly type(s), and, a corresponding adjoined vehicle assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., “Exoskeleton” assemblage(s)), and associated component(s), part(s), mechanism(s), device(s), system(s), and/or apparatus assembly type(s), that has, and/or is holding, and/or carrying, various applied coating(s), and/or sealant(s), and/or adhesive(s), and/or finishes assembly type(s) for assembly, conspicuity, isolation, insulation, safety, aesthetic(s), and protection purposes, and/or other operation(s), function(s), purpose(s), and/or task(s), when in motion, and/or stationary.

3. A vehicle wheel assembly type(s), and, such a corresponding adjoined, and/or adjoining pneumatic tire(s) assembly type(s), and, a corresponding adjoined, and/or adjoining, protective housing case(s) assembly type(s) (piece(s)), and/or a corresponding adjoined, and/or adjoining, contour protective housing case(s) assembly type(s) (piece(s)) (i.e., “Exoskeleton” assemblage(s)), that has, and/or is holding, and/or carrying, a superfluous tire valve stem(s) assembly type(s), and, corresponding passageway(s), for a corresponding attached pneumatic tire(s) chamber(s) assembly type(s), as needed, or required, or ordained by law, for operation, and/or use, when mounted, and/or attached, onto, and/or with, a corresponding adjoined vehicle assembly type(s), and, when in motion, and/or stationary.

4. A vehicle wheel assembly type(s), and, such a corresponding adjoined, and/or adjoining pneumatic tire(s) assembly type(s) that has, and/or is holding, and/or carrying, and/or operating, and/or hooking-up, an electric heating element(s) assembly type(s), cooling element(s) assembly type(s) and, electrical plug(s) assembly type(s), socket(s) assembly type(s), wiring harness assembly type(s), wiring assembly type(s), and, hook-up(s) assembly type(s), and, other associated component(s), part(s), mechanism(s), device(s), system(s), and/or apparatus assembly type(s) (i.e., as structured, and/or assembled within, in, into, on, onto, beneath, between, surrounding, thru, and/or throughout, and/or associated with, a corresponding adjoined, and/or adjoining, protective housing case(s) assembly type(s) (piece(s)), and/or contour protective housing case(s) assembly type(s) (piece(s)) (i.e., “Exoskeleton” assemblage(s)) to operate, and/or function, a corresponding attached pneumatic tire(s) assembly type(s) that incorporate(s), and/or use(s), a specifically, and/or strategically, engineered, designed, fabricated, fashioned, or formed, in-built, inherent, attached, and/or attachable, corresponding adjoined, and/or adjoining, (ring-shaped (annular), and/or other, flush mounting, and/or other, air-tight (sealed), and/or other), isolated, and/or insulated, internal, and/or external, shaped, and/or smooth, and/or measured, and/or dimensional, electrical, and/or digital, and/or magnetic, and/or permanent magnet, and/or electromagnetic assembly type(s) and/or other, (stationary, and/or fixed, and/or moving, and/or rotating, and/or spinning, and/or turning) tread heating/cooling element(s) assembly type(s), hose(s) assembly type(s), valve(s) assembly type(s), traction stud(s) assembly type(s), safety, operating, and/or conspicuity lighting assembly type(s), magnetic, permanent magnet, and/or electromagnetic inductive/conductive pick-up(s), connection(s), communication(s), navigation(s), transmission(s), and/or electricity charging apparatus and other associated component(s), part(s) mechanism(s), device(s), system(s), and/or apparatus assembly type(s) for enhanced safety, and/or performance, and/or traction (grip), and/or conspicuity, and/or guidance, and/or control, and/or another necessary, and/or required operation(s), and/or function(s), and/or purpose(s), and/or task(s) of, for, from, into, thru, out of, and/or between, and/or associated with, a corresponding adjoined vehicle assembly type(s), and, such a corresponding adjoined, and/or adjoining vehicle wheel assembly type(s), and such a corresponding adjoined, and/or adjoining pneumatic tire(s) assembly type(s), and, associated component(s), part(s), mechanism(s), device(s), system(s), and/or apparatus assembly type(s), automatically, and/or manually, and/or autonomously (wirelessly), and/or remotely, when in motion, and/or stationary.

5. A vehicle wheel assembly type(s), that has, and/or is holding, and/or carrying, tube(s), hose(s), wiring, cabling, transmission(s) line(s), fiber-optic line(s), circuit(s), sensor(s), socket(s), plug(s), valve(s) assembly type(s), and, other hook-up(s) assembly type(s) (i.e., as structured, and/or assembled within, in, into, on, onto, beneath, between, surrounding, thru, and/or throughout, and/or associated with, a corresponding adjoined, and/or adjoining, protective housing case(s) assembly type(s) (piece(s)), and/or contour protective housing case(s) assembly type(s) (piece(s)) (i.e., “Exoskeleton” assemblage(s)), to facilitate assembly, and/or connection(s), and/or hook-up(s), and/or operation(s), and/or function(s), and/or purpose(s), and/or task(s), with associated component(s), part(s), mechanism(s), device(s), system(s) and/or apparatus assembly type(s), that are within, in, into, on, onto, beneath, between, surrounding, thru, and/or throughout, and/or associated with, such a vehicle wheel assembly type(s), and, such a corresponding adjoined, and/or adjoining pneumatic tire(s) assembly type(s), and, a corresponding adjoined vehicle assembly type(s), and, to carry out corresponding operation(s), and/or function(s), and/or purpose(s), and/or task(s), that are associated with such a vehicle wheel assembly type(s), and, a corresponding attached pneumatic tire assembly type(s), when mounted, and/or attached, and/or hooked-up, onto, and/or with a corresponding adjoined vehicle assembly type(s), automatically, and/or manually, and/or autonomously (wirelessly), and/or remotely, and, when in motion, and/or stationary.

6. A vehicle wheel assembly type(s), and, such a corresponding adjoined, and/or adjoining pneumatic tire(s) assembly type(s) that has, and/or is holding, and/or carrying, and/or operating, and/or functioning, and/or hooking-up, illumination, and/or lighting assembly type(s), and/or LED (Light Emitting Diode(s)) assembly type(s), to enable greater conspicuity, safety, and visual perception, as to direction(s), and/or operating intention(s), and/or other necessary, and/or required, operation(s), function(s), purpose(s), and/or task(s), and/or intention(s) of a corresponding adjoined vehicle assembly type(s), when mounted, and/or attached, and/or hooked-up with, and/or onto, and coordinated with, a corresponding adjoined vehicle assembly type(s), and, it's associated operating lighting, computer(s), software(s), satellite system(s), ground-based communication(s) system(s), and antennae assembly type(s), and, other associated component(s), part(s), mechanism(s), device(s), system(s), and/or apparatus assembly type(s), of, for, from, into, thru, out of, and/or between, and/or associated with, such a vehicle wheel assembly type(s), and, such a corresponding adjoined, and/or adjoining pneumatic tire(s) assembly type(s), and, a corresponding adjoined vehicle assembly type(s), and, other associated component(s), part(s), mechanism(s), device(s), system(s), and/or apparatus assembly type(s), automatically, and/or manually, and/or autonomously (wirelessly), and/or remotely, and, when in motion, and/or stationary.

7. A vehicle wheel assembly type(s), that has, and/or is holding, and/or carrying, and/or operating, and/or functioning, and/or hooking-up, electrical/digital camera, video, laser-light, and/or radar, sensor(s), and circuit(s) assemblage(s), to enhance safety, control, and navigation, and/or other operation(s), function(s), purposes, and/or task(s), for a corresponding adjoined vehicle assembly type(s), when mounted, and/or attached, and/or hooked-up onto, and/or with the corresponding adjoined vehicle assembly type(s), and, other associated component(s), part(s), mechanism(s), device(s), system(s), and/or apparatus assembly type(s), that are within, in, into, on, onto, beneath, between, surrounding, thru, and/or throughout, and/or associated with, a corresponding adjoined vehicle assembly type(s), and, such a vehicle wheel assembly type(s), when in motion, and/or stationary.

8. A vehicle wheel assembly type(s), that has, and/or is holding, and/or carrying, and/or operating, and/or functioning, and/or hooking-up, an automated vehicle Central Tire Inflation System (CTIS) assembly type(s) (i.e., with an on-board air compressor(s) to fill, and/or refill an associated air tank(s) assembly type(s), and/or with an attachable/detachable associated air tank(s) assembly type(s) that is pre-filled with pressurized air, and/or nitrogen gas, and/or other usable material(s), and/or working in cooperation with both), and, other associated component(s), part(s), mechanism(s), device(s), system(s), and/or apparatus assembly type(s), that when assembled together, is capable of simultaneously reliably, generating, and/or supplying, and/or enabling, and/or facilitating, and/or transferring, and/or transiting, and/or transmitting, and/or receiving, and/or delivering, and/or discharging, and/or depleting, and/or operating, and/or functioning, and/or using, and/or storing, and/or controlling, and/or managing, and/or monitoring, and/or communicating, and/or recording, and/or diagnosing, and/or analyzing, and/or working, and/or interacting, and/or integrating, and/or connecting, and/or hooking-up (unbroken, and/or unimpeded), a corresponding desired media(s), and/or medium(s) (such as, compressed air, and/or other gases (+ and/or −) for a corresponding attached pneumatic tire(s) chamber(s) assembly type(s), and/or electricity supply, data, and/or digital signal(s), and/or fluid(s)), and/or other corresponding chosen operation(s), and/or function(s), and/or purpose(s), and/or task(s) (unbroken, and/or unimpeded), that are deemed necessary, and/or required, for a corresponding chosen operating, and/or functioning, standard(s), of such corresponding adjoined, and/or adjoining, assemblage(s), of, for, from, into, thru, out of, and/or between, and/or associated with, such a corresponding adjoined, and/or adjoining, vehicle wheel assembly type(s), and, such a corresponding adjoined, and/or adjoining pneumatic tire(s) assembly type(s), and, a corresponding adjoined vehicle assembly type(s), automatically, and/or manually, and/or autonomously (wirelessly), and/or remotely, when in motion, and/or stationary.

9. A vehicle wheel assembly type(s), that has, and/or is holding, and/or carrying, and/or operating, and/or functioning, and/or hooking-up, an electrical power source(s), and/or electricity supply, to operate, and/or function, associated component(s), part(s), mechanism(s), device(s), system(s), and/or apparatus assembly type(s) within, in, into, on, onto, beneath, between, surrounding, thru, and/or throughout, and/or associated with, such a vehicle wheel assembly type(s), and, such a corresponding adjoined, and/or adjoining pneumatic tire(s) assembly type(s) (automatically, and/or manually, and/or autonomously (wirelessly), and/or remotely), when mounted, and/or attached, and/or hooked-up onto, and/or with a corresponding adjoined vehicle assembly type(s), and, other associated component(s), part(s), mechanism(s), device(s), system(s), and/or apparatus assembly type(s), and, when in motion, and/or stationary.

10. A vehicle wheel assembly type(s), that has, and/or is holding, and/or carrying, and/or operating, and/or functioning, and/or using, and/or hooking-up, a control mechanism(s), and/or control(s) assembly type(s), to operate, and/or function, and/or carry out, corresponding operation(s), function(s), purpose(s), and/or task(s) (automatically, and/or manually, and/or autonomously (wirelessly), and/or remotely), when mounted, and/or attached, and/or hooked-up with a corresponding adjoined vehicle assembly type(s), and, other associated component(s), part(s), mechanism(s), device(s), system(s), and/or apparatus assembly type(s), and, when in motion, and/or stationary.

11. A vehicle wheel assembly type(s), that has, and/or is holding, and/or carrying, and/or operating, and/or functioning, and/or using, and/or hooking-up, a computer(s), and/or micro-processor(s), and/or chip-set(s), and/or circuit(s), and/or sensor(s), and/or receiver(s), and/or transmitter(s), and/or antennae, and/or digital instrument(s) assembly type(s), and/or another necessary, and/or required, suitable, and/or workable, and/or configurable, means, and/or ways, and/or element(s), and/or composite(s), and/or material(s), and/or equipment assembly type(s), to control, and/or manage, and/or operate, and/or function, and/or carry out, corresponding operation(s), and/or function(s), and/or purpose(s), and/or task(s), that are associated with such a vehicle wheel assembly type(s), when mounted, and/or attached, onto, and/or with, a corresponding adjoined vehicle assembly type(s), and, when in motion, and/or stationary.

12. A vehicle wheel assembly type(s), that is operating, and/or functioning, and/or communicating, and/or carrying out corresponding operation(s), and/or function(s), and/or purpose(s), and/or task(s), automatically, and/or manually, and/or autonomously (wirelessly), and/or remotely, by way of, and/or with the use of, a corresponding digital software(s), and/or digital instruction(s), and/or digital signal(s), and/or digital coding, and/or digital language(s), and/or digital spectrum(s), and/or band-width(s) assembly type(s), and/or frequencies assembly type(s), and/or antennae assembly type(s), and/or radar(s) assembly type(s), and/or sonar(s) assembly type(s), laser light assemblage(s), camera(s), and/or video assemblage(s) and/or other magnetic, permanent magnet, and/or electromagnetic field(s), wave(s), pulse(s), and/or assemblage(s), when mounted, and/or attached, and/or hooked-up, onto, and/or with a corresponding adjoined vehicle assembly type(s), and, other associated component(s), part(s), mechanism(s), device(s), system(s), and/or apparatus assembly type(s), of such a corresponding adjoined, and/or adjoining, vehicle wheel assembly type(s), and, a corresponding adjoined, and/or adjoining pneumatic tire(s) assembly type(s), and, a corresponding adjoined vehicle assembly type(s), and, when in motion, and/or stationary.

13. A vehicle wheel assembly type(s), that has, and/or is holding, and/or carrying, and/or operating, and/or functioning, and/or using, and/or hooking-up, a permanent magnet(s) electromotive system(s) assembly type(s), and/or similar working, permanent magnet(s) electromotive/electric motor(s) (combined) assembly type(s), and/or a permanent magnet(s) inductive/conductive assemblage(s), that amalgamate(s), and/or connect(s), and/or use(s), a ring-shaped (annular) rotary manifold assembly type(s) (piece(s)), and/or a ring-shaped (annular) rotary manifold slip-ring wiring harness assembly type(s), and/or another wiring harness assembly type(s), and, a vehicle junction boxes and hook-up(s) point(s) assembly type(s), and/or magnetic inductive/conductive connection(s) point(s), and/or hook-up(s) assemblage(s), when mounted, and/or attached, and/or hooked-up onto, and/or with, a corresponding adjoined vehicle assembly type(s), and, other associated component(s), part(s), mechanism(s), device(s), system(s), and/or apparatus assembly type(s), that are within, in, into, on, onto, beneath, between, surrounding, thru, and/or throughout, and/or associated with, a corresponding adjoined vehicle assembly type(s), and, such a vehicle wheel assembly type(s), to receive, and/or generate, and/or, produce, and/or carry out, and/or use, and/or store, and/or transfer, and/or transmit, and/or transit, and/or communicate, and/or measure, and/or record, and/or analyze, and/or diagnose, and/or hook-up sustainable electrical power, sustainable electricity supply, and, sustainable electric driven propulsion, and/or magnetic inductive electricity, navigation, communication, and/or transmission and/or other necessary, and/or required, operation(s), and/or function(s), and/or purpose(s), and/or task(s), automatically, and/or manually, and/or autonomously (wirelessly), and/or remotely, when in motion, and/or stationary.

14. A vehicle wheel assembly type(s), that has, and/or is holding, and/or carrying, and/or operating, and/or hooking-up, a corresponding adjoined, and/or adjoining pneumatic tire(s) assembly type(s), a protective housing case(s) assembly type(s) (piece(s)), and/or a contour protective housing case(s) assembly type(s) (piece(s)) (i.e., "Exoskeleton" assemblage(s)), a (fixed) ring-shaped (annular) rotary manifold assembly type(s) (piece(s)), and/or a corresponding adjoined ring-shaped (annular) rotary manifold slip-ring wiring harness assembly type(s), and/or another wiring harness assembly type(s), and, permanent magnet(s) inductive/conductive assemblage(s), and, a vehicle junction boxes and hook-up(s) point(s) assembly type(s), and, a corresponding adjoined automated vehicle Central Tire Inflation System (CTIS) assembly type(s), and, other associated component(s), part(s), mechanism(s), device(s), system(s), and/or apparatus assembly type(s), to simultaneously reliably, enable, and/or transit, and/or transfer compressed air, and/or other gases, to inflate, and/or deflate (+ and/or −), a corresponding attached pneumatic tire(s) chamber(s) assembly type(s), and/or electricity supply, data, digital signal(s), or fluid(s), and/or to carry out other operation(s), and/or function(s), and/or purpose(s), and/or task(s), of, for, from, into, thru, out of, and/or between, and/or associated with, such a vehicle wheel assembly type(s), and, a corresponding adjoined vehicle assembly type(s), and, a corresponding adjoined, and/or adjoining pneumatic tire(s) assembly type(s), and, associated component(s), part(s), mechanism(s), device(s), system(s), and/or apparatus assembly type(s) (unbroken and/or unimpeded), automatically, and/or manually, and/or autonomously (wirelessly), and/or remotely, when mounted, and/or attached, and/or hooked-up onto, and/or with, a corresponding adjoined vehicle assembly type(s), and, when in motion, and/or stationary.

15. A vehicle wheel assembly type(s), that has, and/or is holding, and/or carrying, and/or operating, and/or functioning, and/or hooking-up, channel(s), aperture(s), area(s), protrusion(s), tunnel(s), passageway(s), path(s), compartment(s), and, vessel(s) assembly type(s), and/or protective housing case(s) assembly type(s) (piece(s)), and/or contour protective housing case(s) assembly type(s) (piece(s)) (i.e., "Exoskeleton" assemblage(s)), that are used for embedding, and/or slotting, and/or compacting, and/or packaging, and/or protecting, and/or positioning, and/or anchoring, and/or orienting, and/or aligning, and/or assembling, and/or securing (fixed) in-place, and/or hooking-up, a (fixed) ring-shaped (annular) rotary manifold assembly type(s) (piece(s)), and/or a ring-shaped (annular) rotary manifold slip-ring wiring harness assembly type(s), and/or another wiring harness assembly type(s) and, a corresponding adjoined vehicle junction boxes and hook-up(s) point(s) assembly type(s), and, other associated component(s), part(s), mechanism(s), device(s), system(s), and/or apparatus assembly type(s), within, in, into, on, onto, beneath, between, surrounding, thru, and/or throughout, the body (architecture) of such a corresponding adjoined, and/or adjoining, vehicle wheel assembly type(s), and, a corresponding adjoined vehicle assembly type(s), when in motion, and/or stationary.

16. A vehicle wheel assembly type(s), that has and/or is holding, and/or carrying, and/or operating, and/or functioning, and/or hooking-up, a corresponding (fixed) ring-shaped (annular) rotary manifold assembly type(s) (piece(s)), and/or a corresponding adjoined slip-ring wiring harness assembly type(s), and/or another wiring harness assembly type(s), that is placed, assembled, hooked-up, and/or fixed within, in, into, on, onto, beneath, between, surrounding, thru, and/or throughout, and/or associated with the inside back portion(s), and/or place(s) and/or channel(s), and/or aperture(s), and/or area(s), and/or protrusion(s) assembly type(s), and/or associated protective housing case(s) assembly type(s) (piece(s)), and/or contour protective housing case(s) (piece(s)) (i.e., "Exoskeleton" assemblage(s)) of the body (architecture) of such a vehicle wheel assembly type(s), for proximity, and, assembly, and/or connection(s) and/or hook-up, and/or another necessary, and/or required, operation(s), function(s), purpose(s), and/or task(s) with an associated corresponding adjoined, and/or adjoining, vehicle junction boxes and hook-up(s) point(s) assembly type(s), and, other associated component(s), part(s), mechanism(s), device(s), system(s), and/or apparatus assembly type(s), within, in, into, on, onto, beneath, between, surrounding, thru, and/or throughout, and/or associated with, a corresponding adjoined vehicle assembly type(s), when such a corresponding adjoined, and/or adjoining, vehicle wheel assembly type(s) is mounted, and/or attached, and/or hooking-up, onto, and/or with, the corresponding adjoined vehicle assembly type(s), and, when in motion, and/or stationary.

17. A vehicle wheel assembly type(s), that has, and/or is holding, and/or carrying, and/or operating, and/or functioning, and/or hooking-up, a corresponding adjoined, and/or adjoining, (fixed) ring-shaped (annular) rotary manifold assembly type(s) (piece(s)), and/or a corresponding adjoined, and/or adjoining, ring-shaped (annular) slip-ring wiring harness assembly type(s), and/or another wiring harness assembly type(s), and/or magnetic inductive/conductive hook-up(s) assembly type(s) that is made with an attachable/detachable, smooth, shaped, measured, dimensional, corresponding protective housing (case(s)) assembly type(s) (piece(s)), and/or contour protective housing (case(s)) assembly type(s) (piece(s)) (i.e., "Exoskeleton" assemblage(s)), to facilitate assembly, and/or proximity, and/or protection, and/or hook-up, and/or another necessary, and/or required, operation(s), and/or function(s), and/or purpose(s), and/or task(s) with, within, in, into, on, onto, beneath, between, surrounding, thru, and/or throughout, and/or associated with a corresponding channel(s), and/or aperture(s), and/or area(s), and/or protrusion(s), and/or tunnel(s), and/or passageway(s), and/or path(s), and/or compartment(s), and/or vessel(s) assembly type(s), of the body (architecture) of such a vehicle wheel assembly type(s), and/or other associated component(s), part(s), mechanism(s), device(s), system(s), and/or apparatus assembly type(s), of, for, from, into, thru, out of, and/or between, and/or associated with, such a vehicle wheel assembly type(s), and a corresponding adjoined vehicle assembly type(s), and/or for other operation(s), function(s), purpose(s), task(s), and/or reason(s), when in motion, and/or stationary.

18. A vehicle wheel assembly type(s), that has, and/or is holding, and/or carrying, and/or operating, and/or functioning, and/or hooking-up, a corresponding adjoined, and/or adjoining, (fixed) ring-shaped (annular) rotary manifold housing (case) assembly type(s) (piece), that is in-built, and/or inherent, and/or connected, and/or assembled, and/or is a part-of the body (architecture) of such a corresponding vehicle wheel assembly type(s), for proximity, and/or to facilitate assembly, and/or connect, and/or hook-up with other associated component(s), part(s), mechanism(s), device(s), system(s), and/or apparatus assembly type(s), of, for, from, into, thru, out of, and/or between, and/or associated with, such a vehicle wheel assembly type(s), and, a corresponding adjoined vehicle assembly type(s), when in motion, and/or stationary.

19. A vehicle wheel assembly type(s), that has, and/or is holding, and/or carrying, and/or operating, and/or functioning, and/or hooking-up, a corresponding adjoined, and/or adjoining, (fixed) ring-shaped (annular) rotary manifold assembly type(s) (piece(s)), and/or a corresponding adjoined ring-shaped (annular) slip-ring wiring harness assembly type(s), and/or another wiring harness assembly type(s), that is placed, and, assembled, with, within, in, into, on, onto, beneath, between, surrounding, thru, and/or throughout, and/or associated with, a corresponding adaptor, and/or attachment, and/or bridging, and/or connecting, mount, and/or base, and/or pedestal, and/or stand, and/or frame, and/or plate, and/or bracketing, and/or bracing architecture assembly type(s), and/or a protective housing (case) assembly type(s) (piece(s)), and/or a contour protective housing case(s) assembly type(s) (piece(s)), that hold(s), and/or carries, and/or assemble(s), and/or protect(s), and/or connect(s), and/or anchor(s), and/or receptacle(s), and/or hook(s)-up, the (fixed) ring-shaped (annular) rotary manifold assembly type(s) (piece(s)), and/or ring-shaped (annular) rotary manifold slip-ring wiring harness assembly type(s), and, that also place(s), and/or position(s), and/or attaches, and/or align(s), and/or hook(s)-up, the corresponding adjoined, and/or adjoining, (fixed) ring-shaped (annular) rotary manifold assembly type(s) (piece(s)), and/or ring-shaped (annular) rotary manifold slip-ring wiring harness assembly type(s), and/or other wiring harness assembly type(s) with, within, in, into, on, onto, beneath, between, surrounding, thru, and/or throughout, and/or associated with, a corresponding adjoined vehicle assembly type(s), wheel hub/rotor assembly type(s) (i.e., wheel hub bolt(s) pattern(s) assembly type(s)), for proximity, and/or assembly, and/or hook-up with, within, in, into, on, onto, beneath, between, surrounding, thru, and/or throughout, and/or associated with, such a vehicle wheel assembly type(s), and, a corresponding adjoined vehicle assembly type(s), and, vehicle junction boxes and hook-up(s) point(s) assembly type(s), and, other associated component(s), part(s), mechanism(s), device(s), system(s), and/or apparatus assembly type(s), with, within, in, into, on, onto, beneath, between, surrounding, thru, and/or throughout, and/or associated with, such a vehicle wheel assembly type(s), and, a corresponding adjoined vehicle assembly type(s), when in motion, and/or stationary.

20. A vehicle wheel assembly type(s), that has, and/or is holding, and/or carrying, and/or operating, and/or functioning, and/or hooking-up, such a corresponding adjoined, and/or adjoining, (fixed) ring-shaped (annular) rotary manifold protective housing (case) assembly type(s) (piece), that is assembled with an attachable/detachable corresponding ring-shaped (annular) rotary manifold shaft (cap) assembly type(s) (piece), via a supporting corresponding ring-shaped (annular) ball bearing joint(s) assembly type(s), and/or ball bearing(s), and/or track(s), and/or corresponding flush mounting fastener(s) assembly type(s), and/or seal(s) assembly type(s), and/or sealing material(s), that when assembled together, allow(s) for separate movement(s), and/or idle, of the adjoined ring-shaped (annular) rotary manifold shaft (cap) assembly type(s) (piece), and/or the corresponding ring-shaped (annular) rotary manifold housing (case) assembly type(s) (piece), as held, and/or assembled, within, in, into, on, onto, beneath, between, surrounding, thru, and/or throughout, and/or associated with, the body (architecture) of such a corresponding vehicle wheel assembly type(s), and, a corresponding adjoined vehicle assembly type(s), when mounted, and/or attached, and/or hooked-up, with, and/or onto, a corresponding adjoined vehicle assembly type(s), and, when in motion, and/or stationary.

21. A vehicle wheel assembly type(s), that has, and/or is holding, and/or carrying, and/or operating, and/or functioning, and/or hooking-up, such a corresponding adjoined, and/or adjoining, (fixed) ring-shaped (annular) rotary manifold assembly type(s) (piece(s)), that is assembled with a corresponding adjoined ring-shaped (annular) slip-ring wiring harness assembly type(s), and/or other wiring harness assembly type(s), to transfer compressed air, and/or other gases, fluid(s), electricity supply, data, and digital signal(s) of, for, from, into, thru, out of, and/or between, and/or associated with, a rotating part(s) (i.e., a vehicle wheel assembly type(s), and, a pneumatic tire(s) assembly type(s)), and, a stationary source (i.e., a corresponding adjoined vehicle assembly type(s), and, associated component(s), part(s), mechanism(s), device(s), system(s), and/or apparatus assembly type(s)) (unbroken, and/or unimpeded), via, and/or by way of, a corresponding adjoined, and/or adjoining, vehicle junction boxes and hook-up(s) point(s) assembly type(s), and, other permanent magnet(s) inductive/conductive assemblage(s) automatically, and/or manually, and/or autonomously (wirelessly), and/or remotely, when in motion, and/or stationary.

22. A vehicle wheel assembly type(s), that has, and/or is holding, and/or carrying, and/or operating, and/or functioning, and/or hooking-up, such a corresponding adjoined, and/or adjoining, vehicle junction boxes and hook-up(s) point(s) assembly type(s), that act(s) as a bridge, and/or anchor, and/or connection(s) for the transit, and/or transfer of desired media(s) (unbroken, and/or unimpeded), of, for, from, into, thru, out of, and/or between, and/or associated with, such a vehicle wheel assembly type(s), and, a corresponding adjoined vehicle assembly type(s), and, other associated component(s), part(s), mechanism(s), device(s), system(s), and/or apparatus assembly type(s), within, in, into, on, onto, beneath, between, surrounding, thru, and/or throughout, and/or associated with, such a vehicle wheel assembly type(s), and, a corresponding adjoined vehicle assembly type(s), when mounted, and/or attached, and/or hooked-up, onto, and/or with, the corresponding vehicle junction boxes and hook-up(s) point(s) assembly type(s), that is located, and/or placed, surrounding a portion(s) and/or area(s), of a corresponding vehicle assembly type(s) brake caliper(s), and/or brake rotor(s), and/or brake(s), and/or hub(s), and/or axel(s) assembly type(s), and/or another necessary, and/or required, suitable, and/or workable, and/or configurable, area(s), and/or location(s), means, and/or ways, and/or material(s), and/or equipment assembly type(s), of the corresponding adjoined vehicle assembly type(s), and, when in motion, and/or stationary.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system of visually indicating at least one of: an electrified vehicle operation, functioning, or safety modality, the system comprising:

an electrified vehicle having at least two wheel assemblies, the at least two wheel assemblies each having rim structures and a tire connected to at least a portion of the rim structures;

at least one tread on an outer surface of the tire, the tread having at least one tread groove formed within the outer surface of the tire;

a light assembly incorporated in each of the at least two wheel assemblies, the light assembly being an embedded light assembly with at least one light-emitting diode (LED) positioned within the at least one tread groove of the at least one tread of the tire; and at least one on-board computer carried by the electrified vehicle and controlling illumination techniques of the embedded light assembly, wherein the embedded light assembly illuminates corresponding to at least one of: an electrified vehicle operation, an electrified vehicle functioning, or an electrified vehicle safety modality.

2. The system of claim 1, wherein the embedded light assembly is elongated and is positioned along a circumferential length of at least one of the tire or the wheel assemblies.

3. The system of claim 1, wherein the embedded light assembly is positioned along an entire circumference of at least one of the tire or the wheel assemblies.

4. The system of claim 1, wherein the at least one tread of the tire has at least three tread grooves, wherein the embedded light assembly is positioned within each of the at least three tread grooves.

5. The system of claim 4, wherein the at least three tread grooves are non-intersecting.

6. The system of claim 1, wherein the embedded light assembly is positioned radially interior of a radially exterior surface of the at least one tread of the tire.

7. The system of claim 1, wherein at least one of the electrified vehicle operation, the electrified vehicle functioning, or the electrified vehicle safety modality further comprises at least one of: automatically, or manually, or autonomously, or remotely.

8. The system of claim 1, wherein at least one of the electrified vehicle operation, the electrified vehicle functioning, or the electrified vehicle safety modality further comprises a charging function.

9. The system of claim 8, wherein the charging function further comprises at least one of: an inductive charging of a battery or for a propulsion system of the electrified vehicle.

10. The system of claim 1, wherein at least one of the electrified vehicle operation, the electrified vehicle functioning, or the electrified vehicle safety modality further comprises enhancing at least one of: safety, visibility, conspicuity, navigation, communication, or utility of or for the electrified vehicle.

* * * * *